United States Patent
Schick et al.

(10) Patent No.: US 12,332,352 B2
(45) Date of Patent: *Jun. 17, 2025

(54) DETECTOR FOR IDENTIFYING AT LEAST ONE MATERIAL PROPERTY

(71) Applicant: trinamix GmbH, Ludwigshafen am Rhein (DE)

(72) Inventors: Friedrich Schick, Ludwigshafen (DE); Peter Schillen, Ludwigshafen (DE); Patrick Schindler, Ludwigshafen (DE); Andre Schmidt, Ludwigshafen (DE); Michael Eberspach, Ludwigshafen (DE); Christian Lennartz, Ludwigshafen (DE); Robert Send, Karlsruhe (DE); Lars Diesselberg, Karlsruhe (DE); Heiko Hengen, Steinweiler (DE); Ingmar Bruder, Ludwigshafen (DE); Jakob Unger, Ludwigshafen (DE); Christian Bonsignore, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,352

(22) Filed: Jun. 14, 2024

(65) Prior Publication Data

US 2024/0377533 A1    Nov. 14, 2024

Related U.S. Application Data

(63) Continuation of application No. 18/425,144, filed on Jan. 29, 2024, which is a continuation of application
(Continued)

(30) Foreign Application Priority Data

Mar. 15, 2019   (EP) .................................. 19163250

(51) Int. Cl.
*G01S 17/46* (2006.01)
*G01B 11/22* (2006.01)
(Continued)

(52) U.S. Cl.
CPC .............. *G01S 17/46* (2013.01); *G01B 11/22* (2013.01); *G01C 21/16* (2013.01); *G01S 17/66* (2013.01);
(Continued)

(58) Field of Classification Search
CPC ......... G01S 17/46; G01S 17/66; G06T 7/521; G06T 7/73; G06T 5/002; G06T 5/20;
(Continued)

(56) References Cited

U.S. PATENT DOCUMENTS

2016/0155006 A1   6/2016  Makkapati et al.
2016/0206216 A1   7/2016  Kirenko
(Continued)

FOREIGN PATENT DOCUMENTS

CN    108363482 A     8/2018
DE    19846619 A1 *   4/2000   ........... G01B 11/303
(Continued)

OTHER PUBLICATIONS

Eichler et al., "Lasertechnik in der Medizin: Grundlagen, Systeme, Anwendungen", "Wirkung von Laserstrahlung auf Gewebe", 1991, pp. 171 to 266, Springer Verlag, ISBN 0939-0979. Cited in specification, no English translation available.
(Continued)

*Primary Examiner* — Frantz B Jean
(74) *Attorney, Agent, or Firm* — Armstrong Teasdale LLP

(57) ABSTRACT

Described herein is a detector for identifying at least one material property m. The detector includes at least one sensor element including a matrix of optical sensors, the optical sensors each having a light-sensitive area. The sensor
(Continued)

element is configured for recording at least one reflection image of a light beam originating from at least one object. The detector includes at least one evaluation device configured for determining the material property m by evaluation of at least one beam profile of the reflection image and evaluation of a material feature $\varphi 2m$.

30 Claims, 2 Drawing Sheets

Related U.S. Application Data

No. 17/439,492, filed as application No. PCT/EP2020/056759 on Mar. 13, 2020, now Pat. No. 11,947,013.

(51) Int. Cl.
| | |
|---|---|
| *G01C 21/16* | (2006.01) |
| *G01S 17/66* | (2006.01) |
| *G06T 5/20* | (2006.01) |
| *G06T 5/70* | (2024.01) |
| *G06T 7/20* | (2017.01) |
| *G06T 7/521* | (2017.01) |
| *G06T 7/73* | (2017.01) |
| *G06V 10/145* | (2022.01) |
| *G06V 10/60* | (2022.01) |
| *G06V 10/764* | (2022.01) |
| *H04N 23/56* | (2023.01) |
| *H04N 23/74* | (2023.01) |

(52) U.S. Cl.
CPC .................. *G06T 5/20* (2013.01); *G06T 5/70* (2024.01); *G06T 7/20* (2013.01); *G06T 7/521* (2017.01); *G06T 7/73* (2017.01); *G06V 10/145* (2022.01); *G06V 10/60* (2022.01); *G06V 10/764* (2022.01); *H04N 23/56* (2023.01); *H04N 23/74* (2023.01)

(58) Field of Classification Search
CPC ........ G06T 7/20; G06V 10/60; G06V 10/145; G06V 10/764; H04N 23/74; H04N 23/56; G01B 11/22; G01C 21/16
USPC .......................................................... 348/135
See application file for complete search history.

(56) References Cited

U.S. PATENT DOCUMENTS

| | | | |
|---|---|---|---|
| 2017/0363465 A1* | 12/2017 | Send | ........................ G01J 1/08 |
| 2018/0033146 A1* | 2/2018 | Bleyer | ............... G01B 11/2513 |
| 2018/0276843 A1* | 9/2018 | Send | ........................ G02B 3/14 |

FOREIGN PATENT DOCUMENTS

| | | |
|---|---|---|
| WO | 2012110924 A1 | 8/2012 |
| WO | 2014097181 A1 | 6/2014 |
| WO | 2014198629 A1 | 12/2014 |
| WO | 2018091638 A1 | 5/2018 |
| WO | 2018091649 A1 | 5/2018 |
| WO | 2018091640 A2 | 8/2018 |
| WO | 2019042956 A1 | 3/2019 |

OTHER PUBLICATIONS

International Preliminary Report on Patentability for corresponding PCT/EP2020/056759 mailed Sep. 30, 2021, 9 Pages.
International Search Report and Written Opinion for corresponding PCT/EP2020/056759 mailed May 29, 2021, 11 Pages.
Jiang et al., "Dreidimensionales Computersehen" Springer, Berlin Heidelberg, 1997, Chapter 2. 32 pages. Cited in specification, No English translation available.
R.A. Street: Technology and Applications of Amorphous Silicon, Springer-Verlag Heidelberg, 2010, pp. 346-349.

* cited by examiner

DETECTOR FOR IDENTIFYING AT LEAST ONE MATERIAL PROPERTY

CROSS-REFERENCE TO RELATED APPLICATIONS

This application is a continuation application of U.S. patent application Ser. No. 18/425,144, filed Jan. 29, 2024, which is a continuation application of U.S. patent application Ser. No. 17/439,492, filed Sep. 15, 2021, and which issued as U.S. Pat. No. 11,947,013 on Apr. 2, 2024, which is a U.S. National Phase Application of International Patent Application No. PCT/EP20/56759, filed Mar. 13, 2020, which claims priority to European Patent Application No. 19163250.4, filed Mar. 15, 2019, the entire contents of which are hereby incorporated by reference herein.

DESCRIPTION

Field of the Invention

The invention relates to a detector, a detector system and a method for determining at least one material property of at least one object. The invention further relates to a human-machine interface for exchanging at least one item of information between a user and a machine, an entertainment device, a tracking system, a camera, a scanning system and various uses of the detector device. The devices, methods and uses according to the present invention specifically may be employed for example in various areas of daily life, security technology, gaming, traffic technology, production technology, photography such as digital photography or video photography for arts, documentation or technical purposes, safety technology, information technology, agriculture, crop protection, maintenance, cosmetics, medical technology or in the sciences. However, other applications are also possible.

Prior Art

A large number of methods for material classification and identification are known from the prior art. For example, material identification can be used in machine vision applications, medical applications and security applications, for image classification purposes or in gesture recognition algorithms.

For example, US 2016/0206216 A1 describes a device, system and method for skin detection. The device comprises a thermal sensor input for obtaining thermal sensor data of a scene, a light sensor input for obtaining light sensor data of the scene, and an evaluation unit for analyzing the obtained thermal sensor data and the obtained light sensor data and for detecting skin areas within the scene based on said analysis. US 2016/155006 A1 describes a device and a corresponding method for skin detection. The device comprises an illumination unit configured to project a predetermined illumination pattern onto a scene, an imaging unit configured to acquire an image of the scene, and an evaluation unit configured to evaluate the acquired image by analyzing the imaged illumination pattern as reproduced in the image and to detect skin areas within the image and distinguish them from non-skin areas within the image based on said analysis.

Material classification and identification is usually done in through beam mode, namely shining light through a sample and analyzing extinction. Further, material classification and identification can be done in reflective mode in controlled environments. However, in reflective mode usually wavelengths larger than 1000 nm are necessary in order to yield reliable results. Thus, despite the advantages of known methods for material identification, new concepts for reliable identification of materials are desired. Specifically, identifying a material from its reflection beam profile would be highly desirable. However, most image filters used for beam profile analysis (BPA) yield features that depend on both, distance and material such that reliable identification and classification of the material is not possible. A typical example is the width of a beam profile reflected from a translucent material.

DE 198 46 619 A1 describes structured surface appearance quality determining equipment, which evaluates electrical measurement signal from photosensor array to derive structure code characterizing structure-dependent characteristic of measurement surface.

CN 108 363 482 A describes a method for controlling smart televisions via three-dimensional gestures on basis of binocular structured light. The method comprises the following steps of: synchronously acquiring images through a binocular camera; reconstructing a three-dimensional image ac-cording to an obtained left-right view; carrying out preprocessing; recognizing a gesture action after three-dimensional gestures are segmented; and converting the recognized gesture action into an operation instruction for a smart television, and executing the operation instruction.

US 2018/033146 A1 describes systems and methods for determining a depth map and a reflectivity map from a structured light image. The depth map can be determined by capturing the structured light image and then using a triangulation method to determine a depth map based on the dots in the captured structured light image. The reflectivity map can be determined based on the depth map and based on performing additional analysis of the dots in the captured structured light image.

Problem Addressed by the Invention

It is therefore an object of the present invention to provide devices and methods facing the above-mentioned technical challenges of known devices and methods. Specifically, it is an object of the present invention to provide devices and methods which reliably may identify at least one material property of an object, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a detector for identifying at least one material property m is disclosed.

As used herein, the term "material property" refers to at least one arbitrary property of the material configured for characterizing and/or identification and/or classification of the material. For example, the material property may be a property selected from the group consisting of: roughness, penetration depth of light into the material, a property characterizing the material as biological or non-biological material, a reflectivity, a specular reflectivity, a diffuse reflectivity, a surface property, a measure for translucence, a scattering, specifically a back-scattering behavior or the like. The at least one material property may be a property selected from the group consisting of: a scattering coefficient, a translucency, a transparency, a deviation from a Lambertian surface reflection, a speckle, and the like. As used herein, the term "identifying at least one material property" refers to one or more of determining and assigning the material property to the object. The detector may comprise at least one database comprising a list and/or table, such as a lookup list or a lookup table, of predefined and/or predetermined material properties. The list and/or table of material properties may be determined and/or generated by performing at least one test measurement using the detector according to the present invention, for example by performing material tests using samples having known material properties. The list and/or table of material properties may be determined and/or generated at the manufacturer site and/or by the user of the detector. The material property may additionally be assigned to a material classifier such as one or more of a material name, a material group such as biological or non-biological material, translucent or non-translucent materials, metal or non-metal, skin or non-skin, fur or non-fur, carpet or non-carpet, reflective or non-reflective, specular reflective or non-specular reflective, foam or non-foam, hair or non-hair, roughness groups or the like. The detector may comprise at least one database comprising a list and/or table comprising the material properties and associated material name and/or material group.

Specifically, the detector may be configured for detection of biological tissue, in particular human skin. As used herein, the term "biological tissue" generally refers to biological material comprising living cells. The detector may be a device for detection, in particular optical detection, of biological tissue, in particular of human skin. The term "detection of biological tissue" refers to determining and/or validating whether a surface to be examined or under test is or comprises biological tissue, in particular human skin, and/or to distinguish biological tissue, in particular human skin, from other tissues, in particular other surfaces, and/or distinguishing different types of biological tissue such as distinguishing different types of human tissue e.g. muscle, fat, organs, or the like. For example, the biological tissue may be or may comprise human tissue or parts thereof such as skin, hair, muscle, fat, organs, or the like. For example, the biological tissue may be or may comprise animal tissue or a part thereof such as skin, fur, muscle, fat, organs, or the like. For example, the biological tissue may be or may comprise plant tissue or a part thereof. The detector may be adapted to distinguish animal tissue or parts thereof from one or more of inorganic tissue, metal surfaces, plastics surfaces, for example of farming machines or milking machines. The detector may be adapted to distinguish plant tissue or parts thereof from one or more of inorganic tissue, metal surfaces, plastics surfaces, for example of farming machines. The detector may be adapted to distinguish food and/or beverage from dish and/or glasses. The detector may be adapted to distinguish different types of food such as a fruit, meat, and fish. The detector may be adapted to distinguish a cosmetics product and/or, an applied cosmetics product from human skin. The detector may be adapted to distinguish human skin from foam, paper, wood, a display, a screen. The detector may be adapted to distinguish human skin from cloth. The detector may be adapted to distinguish a maintenance product from material of machine components such metal components etc. The detector may be adapted to distinguish organic material from inorganic material. The detector may be adapted to distinguish human biological tissue from surfaces of artificial or non-living objects. The detector may be used, in particular, for non-therapeutic and non-diagnostic applications.

The detector may be a stationary device or a mobile device. Further, the detector may be a stand-alone device or may form part of another device, such as a computer, a vehicle or any other device. Further, the detector may be a hand-held device. Other embodiments of the detector are feasible.

A detector for identifying at least one material property m comprising
  at least one sensor element comprising a matrix of optical sensors, the optical sensors each having a light-sensitive area, wherein the sensor element is configured for recording at least one reflection image of a light beam originating from at least one object;
  at least one evaluation device configured for determining the material property by evaluation of at least one beam profile of the reflection image, wherein the evaluation device is configured for determining at least one distance feature $\varphi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depthfrom-defocus filter or a linear combination thereof by $|\rho_{\phi_{1other},\phi_z}| \geq 0.40$ with $\phi_z$ being one of the depth-from-photon-ratio filter or the depth-from-defocus filter, or a linear combination thereof, wherein the evaluation device is configured for determining at least one material feature $\phi_{2m}$ by applying at least one material dependent image filter $\phi_2$ to the reflection image, wherein the evaluation device is configured for determining a longitudinal coordinate z and the material property m by evaluating the distance feature $\phi_{1z}$ and the material feature $\phi_{2m}$.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The sensor element comprises a matrix of optical sensors. The sensor element may comprise at least one CMOS sensor. The matrix may be composed of independent pixels such as of independent optical sensors. Thus, a matrix of inorganic photodiodes may be composed.

Alternatively, however, a commercially available matrix may be used, such as one or more of a CCD detector, such as a CCD detector chip, and/or a CMOS detector, such as a CMOS detector chip. Thus, generally, the sensor element may be and/or may comprise at least one CCD and/or CMOS device and/or the optical sensors may form a sensor array or may be part of a sensor array, such as the above-mentioned matrix. Thus, as an example, the sensor element may comprise an array of pixels, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Thus, as an example, tolerances of less than 20°, specifically less than 10° or even less than 5°, may be acceptable. In order to provide a wide range of view, the matrix specifically may have at least 10 rows, preferably at least 500 rows, more preferably at least 1000 rows. Similarly, the matrix may have at least 10 columns, preferably at least 500 columns, more preferably at least 1000 columns. The matrix may comprise at least 50 optical sensors, preferably at least 100000 optical sensors, more preferably at least 5000000 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Thus, as an example, the sensor element may be part of or constitute a pixelated optical device. For example, the sensor element may be and/or may comprise at least one CCD and/or CMOS device. As an example, the sensor element may be part of or constitute at least one CCD and/or CMOS device having a matrix of pixels, each pixel forming a light-sensitive area. The sensor element may employ a rolling shutter or global shutter method to read out the matrix of optical sensors.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination at least one sensor signal is generated. The light-sensitive area may specifically be located on a surface of the respective optical sensor. Other embodiments, however, are feasible. The detector may comprise a plurality of optical sensors each having a light sensitive area. As used herein, the term "the optical sensors each having at least one light sensitive area" refers to configurations with a plurality of single optical sensors each having one light sensitive area and to configurations with one combined optical sensor having a plurality of light sensitive areas. The term "optical sensor" furthermore refers to a light-sensitive device configured for generating at least one output signal. In case the detector comprises a plurality of optical sensors, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the set-up. Other embodiments, however, are feasible.

The optical sensor specifically may be or may comprise at least one photodetector, preferably inorganic photodetectors, more preferably inorganic semiconductor photodetectors, most preferably silicon photodetectors. Specifically, the optical sensor may be sensitive in the infrared spectral range. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensor may be or may comprise at least one inorganic photodiode which are sensitive in the infrared spectral range, preferably in the range of 700 nm to 3.0 micrometers. Specifically, the optical sensor may be sensitive in the part of the near infrared region where silicon photodiodes are applicable specifically in the range of 700 nm to 1100 nm. Infrared optical sensors which may be used for optical sensors may be commercially available infrared optical sensors, such as infrared optical sensors commercially available under the brand name Hertzstueck™ from trinamiX™ GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one photoconductive sensor such as a PbS or PbSe sensor, a bolometer, preferably a bolometer selected from the group consisting of a VO bolometer and an amorphous Si bolometer.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

Preferably, the light sensitive area may be oriented essentially perpendicular to an optical axis of the detector. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The sensor element is configured for recording at least one reflection image of a light beam originating from at least one object. As used herein, the term "reflection image" refers to an image determined by the sensor element comprising at least one reflection feature. As furthermore used herein, without limitation, the term "reflection image" specifically may relate to data recorded by using the sensor element, such as a plurality of electronic readings from an imaging device, such as the pixels of the sensor element. The reflection image itself, thus, may comprise pixels, the pixels of the image correlating to pixels of the matrix of the sensor element. Consequently, when referring to "pixels", reference is either made to the units of image information generated by the single pixels of the sensor element or to the single pixels of the sensor element directly. As used herein, the term "reflection feature" refers to a feature in an image plane generated by the object in response to illumination, for example with at least one illumination feature. As used herein, the term "determining at least one reflection feature" refers to imaging and/or recording at least one light beam generated by the object in response to illumination with a light beam, in particular with the at least one illumination feature. In particular, the sensor element may be configured for determining and/or imaging and/or recording at least reflection image. The reflection image may comprise at least one reflection pattern comprising the at least one reflection feature.

The detector comprises at least one illumination source. The detector may comprise at least one illumination source configured for illuminating the object with at least one illumination beam. The illumination source may be configured for projecting at least one illumination pattern comprising the at least one illumination feature on at least one surface of the object. As used herein, the term "at least one illumination source" refers to at least one arbitrary device configured for providing at least one illumination light beam, specifically the at least one illumination pattern, for illumination of the object. The illumination source may be adapted to directly or indirectly illuminating the object, wherein the illumination light beam is reflected or scattered by the object and, thereby, is at least partially directed towards the detector. The illumination source may be adapted to illuminate the object, for example, by directing a light beam towards the object, which reflects the light beam.

The illumination source may comprise at least one light source. The illumination source may comprise a plurality of light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1100 nm, especially 500 to 1100 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1100 nm may be used. Using light in the near infrared region allows that light is not or only weakly detected by human eyes and is still detectable by silicon sensors, in particular standard silicon sensors. The illumination source may be adapted to emit light at a single wavelength. In other embodiments, the illumination may be adapted to emit light with a plurality of wavelengths allowing additional measurements in other wavelengths channels. The light source may be or may comprise at least one multiple beam light source. For example, the light source may comprise at least one laser source and one or more diffractive optical elements (DOEs).

Specifically, the illumination source may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. The illumination source may comprise one or more diffractive optical elements (DOEs) adapted to generate the illumination pattern. For example, the illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source as the illumination source is particularly preferred. The illumination source may be integrated into a housing of the detector.

The illumination source, specifically, may be configured for emitting light in the infrared spectral range. It shall be noted, however, that other spectral ranges are feasible, additionally or alternatively. Further, the illumination source specifically may be configured for emitting modulated or non-modulated light. In case a plurality of illumination sources is used, the different illumination sources may have different modulation frequencies which, as outlined in further detail below, later on may be used for distinguishing the light beams. The detector may be configured for evaluating a single light beam or a plurality of light beams. In case a plurality of light beams propagates from the object to the detector, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

The illuminating light beam generally may be parallel to the optical axis or tilted with respect to the optical axis, e.g. including an angle with the optical axis. The detector may be configured such that the illumination light beam propagates from the detector towards the object along an optical axis of the detector. For this purpose, the detector may comprise at least one reflective element, preferably at least one prism, for deflecting the illuminating light beam onto the optical axis. As an example, the illumination light beam, such as the laser light beam, and the optical axis may include an angle of less than 10°, preferably less than 5° or even less than 2°. Other embodiments, however, are feasible. Further, the illumination light beam may be on the optical axis or off the optical axis. As an example, the illumination light beam may be parallel to the optical axis having a distance of less than 10 mm to the optical axis, preferably less than 5 mm to the optical axis or even less than 1 mm to the optical axis or may even coincide with the optical axis.

Specifically, the illumination source and the optical sensors may be arranged in a common plane or in different planes. The illumination source and the optical sensors may have different spatial orientation. In particular, the illumination source and the sensor element may be arranged in a twisted arrangement.

The illumination source may be configured for generating at least one illumination pattern for illumination of the object. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "at least one illumination pattern" refers to at least one arbitrary pattern comprising at least one illumination feature adapted to illuminate at least one part of the object. As used herein, the term "illumination feature" refers to at least one at least partially extended feature of the pattern. The illumination pattern may comprise a single illumination feature. The illumination pattern may comprise a plurality of illumination features. For example, the illumination pattern may comprise at least one line pattern. For example, the illumination pattern may comprise at least one stripe pattern. For example, the illumination pattern may comprise at least one checkerboard pattern. For example, the illumination pattern may comprise at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. For example, the illumination source may be adapted to generate and/or to project a cloud of points. A distance between two features of the illumination pattern and/or an area of the at least one illumination feature may depend on the circle of confusion in the image. The illumination source may comprise the at least one light source configured for generating the at least one illumination pattern. Specifically, for generating and projecting the illumination pattern, the illumination source may comprise at least one laser source and at least one diffractive optical element (DOE). The detector may comprise at least one point projector, such as the at least one laser source and the DOE, adapted to project at least one point pattern. As further used herein, the term "projecting at least one illumination pattern" refers to providing the at least one illumination pattern for illuminating the at least one object. The projected illumination pattern may be scarce, as only a single illumination feature, such as a single point, may be present. For increasing reliability, the illumination pattern may comprise several illumination features such as several points. If the pattern is scarce, a single image can be used for detection of biological tissue and face identification simultaneously.

For example, the illumination source may comprise at least one line laser. The line laser may be adapted to send a laser line to the object, for example a horizontal or vertical laser line. The illumination source may comprise a plurality of line lasers. For example, the illumination source may comprise at least two line lasers which may be arranged such that the illumination pattern comprises at least two parallel or crossing lines. The illumination source may comprise the at least one light projector adapted to generate a cloud of points such that the illumination pattern may comprise a plurality of point pattern. The illumination source may comprise at least one mask adapted to generate the illumination pattern from at least one light beam generated by the illumination source. The illumination source may be one of attached to or integrated into a mobile device such as a smartphone. The illumination source may be used for further functions that may be used in determining an image such as for an autofocus function. The illumination source may be integrated in a mobile device or attached to a mobile device such as by using a connector such as a USB- or phone-connector such as the headphone jack.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however. The transfer device may be configured for one or more of adjusting, defining and determining the beam profile, in particular a shape of the beam profile.

As used herein, the term "object" refers to a point or region emitting at least one light beam, in particular the at least one reflection pattern. For example, the object may be at least one object selected from the group consisting of: a scene, a human such as a human, wood, carpet, foam, an animal such as a cow, a plant, a piece of tissue, a metal, a toy, a metallic object, a beverage, a food such as a fruit, meat, fish, a dish, a cosmetics product, an applied cosmetics product, cloth, fur, hair, a maintenance product, a cream, an oil, a powder, a carpet, a juice, a suspension, a paint, a plant, a body, a part of a body, organic material, inorganic material, a reflective material, a screen, a display, a wall, a sheet of paper, such as photograph. The object may comprise at least one surface on which the illumination pattern is projected. The surface may be adapted to at least partially reflect the illumination pattern back towards the detector. For example, without wishing to be bound by this theory, human skin may have a reflection profile, also denoted back scattering profile, comprising parts generated by back reflection of the surface, denoted as surface reflection, and parts generated by very diffuse reflection from light penetrating the skin, denoted as diffuse part of the back reflection. With respect to reflection profile of human skin reference is made to "Lasertechnik in der Medizin: Grundlagen, Systeme, Anwendungen", "Wirkung von Laserstrahlung auf Gewebe", 1991, pages 171 to 266, Jürgen Eichler, Theo Seiler, Springer Verlag, ISBN 0939-0979. The surface reflection of the skin may increase with the wavelength increasing towards the near infrared. Further, the penetration depth may increase with increasing wavelength from visible to near infrared. The diffuse part of the back reflection may increase with penetrating depth of the light. These material properties may be used to distinguish skin from other materials, specifically by analyzing the back scattering profile.

The least one light beam may propagate from the object towards the detector. The light beam may originate from the object or may originate from an illumination source, such as from an illumination source directly or indirectly illuminating the object, wherein the light beam is reflected or scattered by the object and, thereby, is at least partially directed towards the detector. The detector may be used in active and/or passive illumination scenarios. For example, the at least one illumination source may be adapted to illuminate the object, for example, by directing a light beam towards the object, which reflects the light beam. Additionally or alternatively to the at least one illumination source, the detector may use radiation already present in the scene such as from at least one ambient light source.

The sensor element may be configured for recording a beam profile of at least one reflection feature of the reflection image. The evaluation device may be configured for identifying and/or selecting at least one reflection feature in the reflection image, specifically at least one light spot, provided by the sensor element. The evaluation device may be configured for performing at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. Specifically, the evaluation of the reflection image comprises selecting the region of interest in the reflection image. The region of interest may be determined manually by a user or may be determined automatically, such as by recognizing an object within an image generated by the sensor element. For example, in case of a spot-like reflection feature the region of interest may be selected as a region around the spot profile.

For example, the illumination source may be adapted to generate and/or to project a cloud of points such that a plurality of illuminated regions is generated on the matrix of optical sensors, for example the CMOS detector. Additionally, disturbances may be present on the matrix of optical sensors such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or an edge filter and/or object recognition method.

The evaluation device may be configured for performing at least one image correction. The image correction may comprise at least one background subtraction. The evaluation device may be adapted to remove influences from background light from the reflection beam profile, for example, by an imaging without further illumination.

The evaluation device may be configured for determining the material property m by evaluating the beam profile of the reflection image. As used herein, the term "beam profile of the reflection image" refers to at least one intensity distribution of at least one of the reflection features of the reflection image, such as of a light spot on the sensor element, as a function of the pixel. The beam profile of the reflection image, also denoted reflection beam profile, may be selected from the group consisting of a trapezoid beam profile; a triangle beam profile; a conical beam profile and a linear combination of Gaussian beam profiles. As used herein, the term "evaluating the beam profile" refers to applying at least one distance dependent image filter and at least one material dependent image filter to the beam profile and/or to at least one specific region of the beam profile. As used herein, the term "image" refers to a two-dimensional function, f(x,y), wherein brightness and/or color values are given for any x,y-position in the image. The position may be discretized corresponding to the recording pixels. The brightness and/or color may be discretized corresponding to a bit-depth of the optical sensors. As used herein, the term "image filter" refers to at least one mathematical operation applied to the beam profile and/or to the at least one specific region of the beam profile. Specifically, the image filter $\phi$ maps an image f, or a region of interest in the image, onto a real number, $\phi(f(x,y))=\varphi$, wherein $\varphi$ denotes a feature, in particular a distance feature in case of distance dependent image filters and a material feature in case of material dependent image filters. Images may be subject to noise and the same holds true for features. Therefore, features may be random variables. The features may be normally distributed. If features are not normally distributed, they may be transformed to be normally distributed such as by a Box-Cox-Transformation.

The evaluation device is configured for determining at least one distance feature $\varphi_{1z}$ by applying at least one distance dependent image filter $\phi_1$ to the reflection image. As used herein, the term "distance" refers to the distance of the object, specifically between the object and the detector. As used herein, the term "distance dependent" image filter refers to an image having a distance dependent output. The output of the distance dependent image filter is denoted herein "distance feature $\varphi_{1z}$" or "distance dependent feature $\varphi_{1z}$". The distance feature may be or may comprise at least one information about the distance of the object such as at least one measure for the distance of the object, a distance value, a longitudinal coordinate of the object or the like. The distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1other, \phi z}| \geq 0.40$ with $\phi_z$ being one of the depth-from-photon-ratio filter or the depth-from-defocus filter or a linear combination thereof. The further distance dependent image filter $\phi_{1other}$ may correlate to one or more of the distance dependent image filters $\phi_z$ by $|\rho_{\phi 1other, \phi z}| \geq 0.60$, preferably by $|\rho_{\phi 1other, \phi z}| \geq 0.80$. The similarity of two image filters $\phi_i$ and $\phi_j$ may be assessed through the correlation of their features, specifically, by calculating Pearson's correlation coefficients, $$\rho_{\Phi_i \Phi_j} = \frac{\text{cov}((\Phi_i(f(x,y)) - \mu_i)(\Phi_j(f(x,y)) - \mu_j))}{\sigma_i \sigma_j},$$

wherein $\mu$ and $\sigma$ are mean value and standard deviation of the obtained features. The testing of correlation of filters may be performed using a set of random test images, specifically matrices filled with random numbers. The number of random test images may be chosen as such that the results of the correlation test are statistically significant. The correlation coefficient takes values between −1 and 1, whereas 0 means there is no linear correlation. The correlation coefficients are well suited to determine whether two filters are similar or even equivalent. To measure whether the features of a filter correlate with a given property, for example the distance, the test images may be chosen as such, that a correlated filter actually yields the property. As an example, in order to measure whether the features of a filter correlate with distance, beam profiles recorded in different distances may be used as test images. To obtain a comparable, transferable, and transparent assessment, a fixed test-set of test images may be defined.

For example, the distance dependent image filter may be a depth-from-photon-ratio filter. The depth-from-photon-ratio filter may comprise evaluating a combined signal Q from at least two sensor signals of the sensor element. The evaluation device may be configured for determining the distance feature Piz by evaluation of the combined signal Q. The distance feature determined by evaluation of the combined signal Q may correspond directly to the longitudinal coordinate of the object. As used herein, a "sensor signal" generally refers to a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like. As generally used herein, the term "combine" generally may refer to an arbitrary operation in which two or more components such as signals are one or more of mathematically merged in order to form at least one merged combined signal and/or compared in order to form at least one comparison signal or comparison result. As used herein, the term "combined signal Q" refers to a signal which is generated by combining the sensor signals, in particular by one or more of dividing the sensor signals, dividing multiples of the sensor signals or dividing linear combinations of the sensor signals. In particular, the combined signal may be a quotient signal. The combined signal Q may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider.

The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the distance feature $\phi_{1z}$ for determining the distance feature $\phi_{1z}$. For example, the evaluation device may be configured for deriving the combined signal Q by $$Q(z_O) = \frac{\int\int_{A_1} E(x, y; z_O) dx dy}{\int\int_{A_2} E(x, y; z_O) dx dy},$$

wherein x and y are transversal coordinates, A1 and A2 are different areas of at least one beam profile of the light beam propagating from the object to the detector at the sensor position, and $E(x,y,z_O)$ denotes the beam profile given at the object distance $z_O$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_O)$ and beam shape $S(x,y;z_O)$. Thus, by deriving the combined signal it may allow determining the longitudinal coordinate independent from luminance. In addition, using the combined signal allows determination of the distance $z_O$ independent from the object size. Thus, the combined signal allows determination of the distance $z_O$ independent from the material properties and/or reflective properties and/or scattering properties of the object and independent from alterations of the light source such as by manufacturing precision, heat, water, dirt, damages on the lens, or the like. As an example, the distance dependent feature $\phi_{1z}$ may be a function of the combined signal Q, $\phi_{1z}=\phi_{1z}(Q)$, whereas the function may be a linear, quadratic, or higher order polynomial in Q. Further, as an example, the object distance $z_O$ may be a function of the distance dependent feature $\phi_{1z}$, $z_O=z_O(\phi_{1z})$, whereas the function may be a linear, quadratic, or higher order polynomial in $\phi_{1z}$. Thus, the object distance $z_O$ may be a function of the combined signal Q, $z_O=z_O(Q)$, whereas the function may be a linear, quadratic, or higher order polynomial in Q.

The light-sensitive areas of at least two optical sensors may be arranged such that a first sensor signal comprises information of a first area of the beam profile and a second sensor signal comprises information of a second area of the beam profile. The first area of the beam profile and the second area of the beam profile are one or both of adjacent or overlapping regions. As used herein, the term "area of the beam profile" generally refers to an arbitrary region of the beam profile at the sensor position used for determining the combined signal Q.

The evaluation device may be configured for determining and/or for selecting the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The evaluation device may be configured for deriving the combined signal Q by one or more of dividing the edge information and the center information, dividing multiples of the edge information and the center information, dividing linear combinations of the edge information and the center information. Thus, essentially, photon ratios may be used as the physical basis of the method.

The evaluation device specifically may be configured for deriving the combined signal Q by dividing the first and second sensor signals, by dividing multiples of the first and second sensor signals or by dividing linear combinations of the first and second sensor signals. As an example, Q may simply be determined as $Q=s_1/s_2$ or $Q=s_2/s_1$, with $\phi_1$ denoting the first sensor signal and $\phi_2$ denoting the second sensor signal. Additionally or alternatively, Q may be determined as $Q=a \cdot s_1/b \cdot s_2$ or $Q=b \cdot s_2/a \cdot s_1$, with a and b being real numbers which, as an example, may be predetermined or determinable. Additionally or alternatively, Q may be determined as $Q=(a \cdot s_1+b \cdot s_2)/(c \cdot \phi_1+d \cdot \phi_2)$, with a, b, c and d being real numbers which, as an example, may be predetermined or determinable. As a simple example for the latter, Q may be determined as $Q=s_1/(s_1+\phi_2)$. Other combined or quotient signals are feasible.

Typically, the combined signal Q is a monotonous function of the longitudinal coordinate of the object and/or of the size of the light spot such as the diameter or equivalent diameter of the light spot. Thus, as an example, specifically in case linear optical sensors are used, the quotient $Q=s_1/s_2$ is a monotonously decreasing function of the size of the light spot. Without wishing to be bound by this theory, it is believed that this is due to the fact that, in the setup described above, both the first signal $s_1$ and the second signal $\phi_2$ decrease as a square function with increasing distance to the light source, since the amount of light reaching the detector decreases. Therein, however, the first signal $\phi_1$ decreases more rapidly than the second signal $\phi_2$, since, in the optical setup as used in the experiments, the light spot in the image plane grows and, thus, is spread over a larger area. The quotient of the first and second sensor signals, thus, continuously decreases with increasing diameter of the light beam or diameter of the light spot on the first and second light-sensitive areas. The quotient, further, is mainly independent from the total power of the light beam, since the total power of the light beam forms a factor both in the first sensor signal and in the second sensor signal. Consequently, the combined signal Q may form a secondary signal which provides a unique and unambiguous relationship between the first and second sensor signals and the size or diameter of the light beam. Since, on the other hand, the size or diameter of the light beam is dependent on a distance between the object, from which the incident light beam propagates towards the detector, and the detector itself, i.e. dependent on the longitudinal coordinate of the object, a unique and unambiguous relationship between the first and second sensor signals and the longitudinal coordinate may exist. For the latter, reference e.g. may be made to WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

With respect to further details and embodiments of evaluation of the combined signal Q reference e.g. may be made to WO 2018/091640, WO 2018/091649 A1 and WO 2018/091638 A2 the full disclosure of which is incorporated herein by reference.

For example, the distance dependent image filter may be a depth-from-defocus filter. As outlined above, the evaluation device may be configured for determining at least one image of the region of interest from the sensor signals. The evaluation device may be configured for determining from the image the distance feature $\phi_{1z}$ of the object by optimizing at least one blurring function $f_a$. The determined distance feature $\phi_{1z}$ may correspond directly to the longitudinal coordinate of the object. The distance feature $\phi_{1z}$ may be determined by using at least one convolution-based algorithm such as a depth-from-defocus algorithm. To obtain the distance from the image, the depth-from-defocus algorithm estimates the defocus of the object. For this estimation, the blurring function is assumed. As used herein, the term "blurring function $f_a$", also referred to as blur kernel or point spread function, refers to a response function of the detector to the illumination from the object. Specifically, the blurring function models the blur of a defocused object.

The at least one blurring function $f_a$ may be a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

The blurring function may be optimized by varying the parameters of the at least one blurring function. The reflection image may be a blurred image $i_b$. The evaluation device may be configured for reconstructing the distance feature $\phi_{1z}$ from the blurred image $i_b$ and the blurring function $f_a$. The distance feature $\phi_{1z}$ may be determined by minimizing a difference between the blurred image $i_b$ and the convolution of the blurring function $f_a$ with at least one further image $i'_b$, $$\min\|(i'_b * f_a(\sigma(\varphi_{1z})) - i_b)\|,$$

by varying the parameters σ of the blurring function. σ(z) is a set of distance dependent blurring parameters. The further image may be blurred or sharp. As used herein, the term "sharp" or "sharp image" refers to a blurred image having a maximum contrast. The at least one further image may be generated from the blurred image $i_b$ by a convolution with a known blurring function. Thus, the depth-from-defocus algorithm may be used to obtain the distance feature $\phi_{1z}$.

The evaluation device may be configured for determining at least one combined distance information z considering the distance feature $\phi_{1z}$ determined by applying the depth-from-photon-ratio filter and the distance feature $\phi_{1z}$ determined by applying the depth-from-defocus filter. The combined distance information z may be a real function depending on the distance feature $\phi_{1z}$ determined by applying the depth-from-photon-ratio filter and the distance feature $\phi_{1z}$ determined by applying the depth-from-defocus filter. The combined distance information z may be a rational or irrational polynomial of the distance feature $\phi_{1z}$ determined by applying the depth-from-photon-ratio filter and the distance feature $\phi_{1z}$ determined by applying the depth-from-defocus filter. Depth-from-defocus is a complementary method to depth-from-photon-ratio but uses a similar hardware set up. Further, depth-from-defocus distance measurements may have a similar accuracy. Combining both technologies may yield advantageous distance measurement results with enhanced precision.

The evaluation device may be configured for determining at least one combined distance information using at least one recursive filter. The recursive filter may be at least one Kalman filter or at least one Extended Kalman filter (EKF). The combined distance information z may be obtained using a real function $z=f(z_{DPR}, z_{DFD})$, wherein $z_{DPR}$ is the distance feature $\phi_{1z}$ determined by applying the depth-from-photon-ratio filter and $z_{DFD}$ is the distance feature $\phi_{1z}$ determined by applying the depth-from-defocus filter, such as the arithmetic or geometric mean, a polynomial, preferably a polynomial up to the eights order in $z_{DPR}$ and $z_{DFD}$. The function f may be or may be based on a look-up table of prerecorded values. For example, the evaluation device may comprise at least one data storage device configured for storing the prerecorded values and/or one or more look-up tables. The function f may be based on a look-up table in combination with an interpolation scheme for interpolation between the values in the look-up table. The interpolation scheme may be a linear interpolation, a splines interpolation, or the like. The $z_{DFD}$ and $z_{DPR}$ may be used as input variables within the recursive filter, in combination with a model or model function such as the function f, concerning the relationship between z, $z_{DFD}$, and $z_{DPR}$. The model or model function may comprise statistical assumptions and/or statistical models concerning the distances z, $z_{DFD}$, and $z_{DPR}$ such as a distribution, such as a Gaussian distribution of a measured distance z, $z_{DFD}$, and/or $z_{DPR}$ around a real distance $z_{real}$.

The recursive filter may be configured for determining the combined distance information considering further sensor data and/or further parameters. The further parameters may comprise further information from the sensor element, for example the CMOS sensor, such as information about quality and/or noise of recorded data and/or information about overexposure and/or information about underexposure or the like. The detector may comprise at least one further sensor configured for determining the further sensor data. The recursive filter may be configured for determining the combined distance information considering the further sensor data. The further sensor may be at least one sensor selected from the group consisting of: a temperature sensor, an illumination sensor such as a control sensor for determining illumination information, an inertial measurement unit; a gyroscope. The model and/or the Kalman filter may comprise further input parameters such as the further sensor data, e.g. temperature and/or detector motion from a gyroscope and/or information from an inertial measurement unit, and/or information from an illumination sensor) and/or further parameters such as the quality/noise of recorded data, overexposure, underexposure, or the like. The further sensor data may be provided by the sensor element, in particular by at least one CMOS sensor, and/or by further image analysis. The model and/or the Kalman filter may comprise the at least one material feature $\phi_{2m}$ as input variable.

For example, the distance dependent image filter may be a structured-light-filter in combination with a depth-from-photon-ratio filter and/or a depth-from-defocus image filter. For example, the detector may comprise at least two sensor elements each having a matrix of optical sensors. At least one first sensor element and at least one second sensor element may be positioned at different spatial positions. A relative distance between the first sensor element and the second element may be fixed. The at least one first sensor element may be adapted to determine at least one first reflection pattern, in particular at least one first reflection feature, and the at least one second sensor element may be adapted to determine at least one second reflection pattern, in particular at least one second reflection feature. The evaluation device may be configured for selecting at least one image determined by the first sensor element or the second sensor element as reflection image and for selecting at least one image determined by the other one of the first sensor element or the second sensor element as reference image. As used herein, the term "reference image" refers to an image different from the reflection image which is determined at a different spatial position compared to the reflection image. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device may be adapted to select the at least one reflection feature in the reflection image and to determine at least one distance estimate of the selected reflection feature of the reflection image given by the distance feature $\phi_{1z}$ determined by applying the depth-from-photon ratio image filter and/or the depth-from-defocus image filter and an error interval ±ε.

The evaluation device may be adapted to determine the at least one reference feature in the at least one reference image corresponding to the at least one reflection feature. The evaluation device may be adapted to perform an image analysis and to identify features of the reflection image. The evaluation device may be adapted to identify at least one reference feature in the reference image having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference image and the reflection image may be images of the object determined at different spatial positions and/or spatial orientations having a fixed distance. The evaluation device may be adapted to determine an epipolar line in the reference image. The relative position of the reference image and reflection image may be known. For example, the relative position of the reference image and reflection image may be stored within at least one storage unit of the evaluation device. The evaluation device may be adapted to determine a straight line extending from the selected reflection feature of the reflection image. The straight line may comprise possible object features corresponding to the selected feature. The straight line and the baseline span an epipolar plane. As the reference image is determined at a different relative position from the reflection image, the corresponding possible object features may be imaged on a straight line, called epipolar line, in the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector, whereas the calibration is comparable to a teach-in of the epipolar geometry of the specific camera.

The evaluation device may be configured for determining at least one displacement region in the reference image corresponding to the distance estimate. As used herein, the term "displacement region" refers to a region in the reference image in which the reference feature corresponding to the selected reflection feature may be imaged. Specifically, the displacement region may be a region in the reference image in which the reference feature corresponding to the selected reflection feature is expected to be located in the reference image. Depending on the distance to the object, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line or a section of an epipolar line. The displacement region may comprise more than one epipolar line or more sections of more than one epipolar line. As used herein, the term "reference feature" refers to at least one feature of the reference image. The displacement region may extend along the epipolar line, orthogonal to an epipolar line, or both. The evaluation device may be adapted to determine the reference feature along the epipolar line corresponding to the distance feature and to determine an extent of the displacement region along the epipolar line corresponding to the error interval ±ε or orthogonal to an epipolar line. The measurement uncertainty of the distance estimate may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extend in an orthogonal direction with respect to the epipolar line or epipolar lines. The evaluation device may determine the displacement region around the image position of the reflection feature. The evaluation device may be adapted to determine the distance estimate and to determine the displacement region along the epipolar line corresponding to $\phi_{1z}\pm\varepsilon$.

The evaluation device may be configured for matching the selected feature of the reflection pattern with at least one feature of the reference pattern within the displacement region. As used herein, the term "matching" refers to determining and/or evaluating corresponding reference and reflection features. The evaluation device may be configured for matching the selected feature of the reflection image with the reference feature within the displacement region by using at least one evaluation algorithm considering the determined distance estimate. The evaluation algorithm may be a linear scaling algorithm. The evaluation device may be adapted to determine the epipolar line closest to and/or within the displacement region. The evaluation device may be adapted to determine the epipolar line closest to the image position of the reflection feature. The extent of the displacement region along the epipolar line may be larger than the extent of the displacement region orthogonal to the epipolar line. The evaluation device may be adapted to determine an epipolar line before determining a corresponding reference feature. The evaluation device may determine a displacement region around the image position of each reflection feature. The evaluation device may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be adapted to determine the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

The evaluation device may be configured for determining a displacement of the matched reference feature and the selected reflection feature. The evaluation device may be configured for determining a longitudinal information of the matched features using a predetermined relationship between the longitudinal coordinate and the displacement. As used herein, the term "displacement" refers to a difference between a position in the reference image to a position in the reflection image. As used herein, the term "longitudinal information" refers to information relating to the longitudinal coordinate. For example, the longitudinal information may be a distance value. The predetermined relationship may be one or more of an empiric relationship, a semi-empiric relationship and an analytically derived relationship. The evaluation device may comprise at least one data storage device for storing the predetermined relationship, such as a lookup list or a lookup table. The evaluation device may be adapted to determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device may be adapted to select, for example subsequent and/or column by column, a reflection feature and to determine for each potential position of the reference feature the corresponding distance value using triangulation. Displacement and corresponding distance value may be stored in at least one storage device of the evaluation device.

Additionally or alternatively, the evaluation device may be configured for performing the following steps:

Determining the displacement region for the image position of each reflection feature;

Assigning an epipolar line to the displacement region of each reflection feature such as by assigning the epipolar line closest to the displacement region and/or within the displacement region and/or closest to the displacement region along a direction orthogonal to the epipolar line;

Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be adapted to decide between more than one epipolar line and/or reference feature to be assigned to a reflection feature such as by comparing distances of reflection features and/or epipolar lines within the reference image and/or by comparing error weighted distances, such as ε-weighted distances of reflection features and/or epipolar lines within the reference image and assigning the epipolar line and/or reference feature in shorter distance and/or ε-weighted distance to the reference feature and/or reflection feature.

The evaluation device is configured for determining at least one material feature $\phi_{2m}$ by applying at least one material dependent image filter $\phi_2$ to the reflection image. As used herein, the term "material dependent" image filter refers to an image having a material dependent output. The output of the material dependent image filter is denoted herein "material feature $\varphi_{2m}$" or "material dependent feature $\varphi_{2m}$". The material feature may be or may comprise at least one information about the at least one material property of the object.

The material dependent image filter may be at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 2other, \phi m}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof. The further material dependent image filter $\phi_{2other}$ may correlate to one or more of the material dependent image filters $\phi_m$ by $|\rho_{\phi 2other, \phi m}| \geq 0.60$, preferably by $|\rho_{\phi 2other, \phi m}| \geq 0.80$.

The material dependent image filter may be at least one arbitrary filter $\phi$ that passes a hypothesis testing. As used herein, the term "passes a hypothesis testing" refers to the fact that a Null-hypothesis $H_0$ is rejected and an alternative hypothesis $H_1$ is accepted. The hypothesis testing may comprise testing the material dependency of the image filter by applying the image filter to a predefined data set. The data set may comprise a plurality of beam profile images. As used herein, the term "beam profile image" refers to a sum of $N_B$ Gaussian radial basis functions, $$f_k(x, y) = \left| \sum_{l=0}^{N_B-1} g_{lk}(x, y) \right|,$$

$$g_{lk}(x, y) = a_{lk} e^{-(\alpha(x-x_{lk}))^2} e^{-(\alpha(y-y_{lk}))^2}$$

wherein each of the $N_B$ Gaussian radial basis functions is defined by a center $(x_{lk}, y_{lk})$, a prefactor, $a_{lk}$, and an exponential factor $\alpha=1/\epsilon$. The exponential factor is identical for all Gaussian functions in all images. The center-positions, $x_{lk}$, $y_{lk}$, are identical for all images $f_k$:$(x_0, x_1, \ldots, x_{N_B-1})$, $(y_0, y_1, \ldots, y_{N_B-1})$. Each of the beam profile images in the dataset may correspond to a material classifier and a distance. The material classifier may be a label such as 'Material A', 'Material B', etc. The beam profile images may be generated by using the above formula for $f_k(x,y)$ in combination with the following parameter table:

| Image Index | Material classifier, Material Index | Distance z | Parameters |
|---|---|---|---|
| k = 0 | Skin, m = 0 | 0.4 m | $(a_{00}, a_{10}, \ldots, a_{N_B-10})$ |
| k = 1 | Skin, m = 0 | 0.6 m | $(a_{01}, a_{11}, \ldots, a_{N_B-11})$ |
| k = 2 | Fabric, m = 1 | 0.6 m | $(a_{02}, a_{12}, \ldots, a_{N_B-12})$ |
| . | . | . | |
| . | . | | |
| k = N | Material J, m = J − 1 | | $(a_{0N}, a_{1N}, \ldots, a_{N_B-1N})$ |

The values for x, y, are integers corresponding to pixels with $$\begin{pmatrix} x \\ y \end{pmatrix} \in [0, 1, \ldots 31]^2.$$

The images may have a pixel size of 32×32. The dataset of beam profile images may be generated by using the above formula for $f_k$ in combination with a parameter set to obtain a continuous description of $f_k$. The values for each pixel in the 32×32-image may be obtained by inserting integer values from 0, ..., 31 for x, y, in $f_k(x,y)$. For example, for pixel (6,9), the value $f_k(6,9)$ may be computed.

Subsequently, for each image $f_k$, the feature value $\varphi_k$ corresponding to the filter $\phi$ may be calculated, $\phi(f_k(x,y), z_k)=\varphi_k$, wherein $z_k$ is a distance value corresponding to the image $f_k$ from the predefined data set. This yields a dataset with corresponding generated feature values $\varphi_k$. The hypothesis testing may use a Null-hypothesis that the filter does not distinguish between material classifier. The Null-Hypothesis may be given by $H_0$: $\mu_1=\mu_2=\ldots\mu_j$, wherein $\mu_m$ is the expectation value of each material-group corresponding to the feature values $\varphi_k$. Index m denotes the material group. The hypothesis testing may use as alternative hypothesis that the filter does distinguish between at least two material classifiers. The alternative hypothesis may be given by $H_1$: $\exists m,m'$: $\mu_m \neq \mu_{m'}$. As used herein, the term "not distinguish between material classifiers" refers to that the expectation values of the material classifiers are identical. As used herein, the term "distinguishes material classifiers" refers to that at least two expectation values of the material classifiers differ. As used herein "distinguishes at least two material classifiers" is used synonymous to "suitable material classifier". The hypothesis testing may comprise at least one analysis of variance (ANOVA) on the generated feature values. In particular, the hypothesis testing may comprise determining a mean-value of the feature values for each of the J materials, i.e. in total J mean values, $$\overline{\varphi}_m = \frac{\sum_i \varphi_{i,m}}{N_m},$$

for $m \in [0,1,\ldots,J-1]$, wherein $N_m$ gives the number of feature values for each of the/materials in the predefined data set. The hypothesis testing may comprise determining a mean-value of all N feature values $$\overline{\varphi} = \frac{\sum_m \sum_i \varphi_{i,m}}{N}.$$

The hypothesis testing may comprise determining a Mean Sum Squares within:

$$mssw = \left(\sum_m \sum_i (\varphi_{i,m} - \overline{\varphi}_m)^2\right)/(N-J).$$

The hypothesis testing may comprise determining a Mean Sum of Squares between, $$mssb = \left(\sum_m (\overline{\varphi}_m - \overline{\varphi})^2 N_m\right)/(J-1).$$

The hypothesis testing may comprise performing an F-Test:

$$CDF(x) = I_{\frac{d_1 x}{d_1 x + d_2}}\left(\frac{d_1}{2}, \frac{d_2}{2}\right), \text{ where } d_1 = N-J, d_2 = J-1,$$

$$F(x) = 1 - CDF(x)$$

$$p = F(mssb/mssw)$$

Herein, $I_x$ is the regularized incomplete Beta-Function, $$I_x(a, b) = \frac{B(x; a, b)}{B(a, b)},$$

with the Euler Beta-Function $$B(a, b) = \int_0^1 t^{a-1}(1-t)^{b-1} dt$$

and $$B(x; a, b) = \int_0^x t^{a-1}(1-t)^{b-1} dt$$

being the incomplete Beta-Function. The image filter may pass the hypothesis testing if a p-value, p, is smaller or equal than a pre-defined level of significance. The filter may pass the hypothesis testing if $p \leq 0.075$, preferably $p \leq 0.05$, more preferably $p \leq 0.025$, and most preferably $p \leq 0.01$. For example, in case the pre-defined level of significance is $\alpha = 0.075$, the image filter may pass the hypothesis testing if the p-value is smaller than $\alpha = 0.075$. In this case the Null-hypothesis $H_0$ can be rejected and the alternative hypothesis $H_1$ can be accepted. The image filter thus distinguishes at least two material classifiers. Thus, the image filter passes the hypothesis testing.

In the following, image filters are described assuming that the reflection image comprises at least one reflection feature, in particular a spot image. A spot image f may be given by a function $f: \mathbb{R}^2 \to \mathbb{R}_{\geq 0}$, wherein the background of the image f may be already subtracted. However, other reflection features may be possible.

For example, the material dependent image filter may be a luminance filter. The luminance filter may return a luminance measure of a spot as material feature. The material feature may be determined by $$\varphi_{2m} = \Phi(f, z) = -\int f(x) dx \frac{z^2}{d_{ray} \cdot n},$$

where f is the spot image. The distance of the spot is denoted by z, where z may be obtained for example by using a depth-from-defocus or depth-from-photon ratio technique and/or by using a triangulation technique. The surface normal of the material is given by $n \in \mathbb{R}^3$ and can be obtained as the normal of the surface spanned by at least three measured points. The vector $d_{ray} \in \mathbb{R}^3$ is the direction vector of the light source. Since the position of the spot is known by using a depth-from-defocus or depth-from-photon ratio technique and/or by using a triangulation technique wherein the position of the light source is known as a parameter of the detector system, $d_{ray}$, is the difference vector between spot and light source positions.

For example, the material dependent image filter may be a filter having an output dependent on a spot shape. This material dependent image filter may return a value which correlates to the translucence of a material as material feature. The translucence of materials influences the shape of the spots. The material feature may be given by $$\varphi_{2m} = \Phi(f) = \frac{\int H(f(x) - \alpha h) dx}{\int H(f(x) - \beta h) dx},$$

wherein 0<α,β<1 are weights for the spot height h, and H denotes the Heavyside function, i.e. H(x)=1:x≥0, H(x)=0: x<0. The spot height h may be determined by $$h = \int_{B_r} f(x)dx,$$

where $B_r$ is an inner circle of a spot with radius r.

For example, the material dependent image filter may be a squared norm gradient. This material dependent image filter may return a value which correlates to a measure of soft and hard transitions and/or roughness of a spot as material feature. The material feature may be defined by $$\varphi_{2m} = \Phi(f) = \int \|\nabla f(x)\|^2 dx.$$

For example, the material dependent image filter may be a standard deviation. The standard deviation of the spot may be determined by $$\varphi_{2m} = \Phi(f) = \int (f(x) - \mu)^2 dx,$$

Wherein μ is the mean value given by $\mu = \int (f(x))dx$.

For example, the material dependent image filter may be a smoothness filter such as a Gaussian filter or median filter. In one embodiment of the smoothness filter, this image filter may refer to the observation that volume scattering exhibits less speckle contrast compared to diffuse scattering materials. This image filter may quantify the smoothness of the spot corresponding to speckle contrast as material feature. The material feature may be determined by $$\varphi_{2m} = \Phi(f, z) = \frac{\int |\mathcal{F}(f)(x) - f(x)| dx}{\int f(x) dx} \cdot \frac{1}{z},$$

wherein $\mathcal{F}$ is a smoothness function, for example a median filter or Gaussian filter. This image filter may comprise dividing by the distance z, as described in the formula above. The distance z may be determined for example using a depth-from-defocus or depth-from-photon ratio technique and/or by using a triangulation technique. This may allow the filter to be insensitive to distance. In one embodiment of the smoothness filter, the smoothness filter may be based on the standard deviation of an extracted speckle noise pattern. A speckle noise pattern N can be described in an empirical way by $$f(x) = f_0(x) \cdot (N(X) + 1),$$

where $f_0$ is an image of a despeckled spot. N(X) is the noise term that models the speckle pattern. The computation of a despeckled image may be difficult. Thus, the despeckled image may be approximated with a smoothed version of f, i.e. $f_0 \approx \mathcal{F}(f)$, wherein $\mathcal{F}$ is a smoothness operator like a Gaussian filter or median filter. Thus, an approximation of the speckle pattern may be given by $$N(X) = \frac{f(x)}{\mathcal{F}(f(x))} - 1.$$

The material feature of this filter may be determined by $$\varphi_{2m} = \Phi(f) = \sqrt{\mathrm{Var}\left(\frac{f}{\mathcal{F}(f)} - 1\right)}.$$

Wherein Var denotes the variance function.

For example, the image filter may be a grey-level-occurrence-based contrast filter. This material filter may be based on the grey level occurrence matrix $M_{f,\rho}(g_1 g_2) = [p_{g1,g2}]$, whereas $p_{g1,g2}$ is the occurrence rate of the grey combination $(g_1,g_2) = [f(x_1,y_1), f(x_2,y_2)]$, and the relation ρ defines the distance between $(x_1,y_1)$ and $(x_2,y_2)$, which is ρ (x,y)=(x+a,y+b) with a and b selected from 0,1.

The material feature of the grey-level-occurrence-based contrast filter may be given by $$\varphi_{2m} = \Phi(f) = \sum_{i,j=0}^{N-1} p_{ij}(i-j)^2.$$

For example, the image filter may be a grey-level-occurrence-based energy filter. This material filter is based on the grey level occurrence matrix defined above.

The material feature of the grey-level-occurrence-based energy filter may be given by $$\varphi_{2m} = \Phi(f) = \sum_{i,j=0}^{N-1} (p_{ij})^2.$$

For example, the image filter may be a grey-level-occurrence-based homogeneity filter. This material filter is based on the grey level occurrence matrix defined above. The material feature of the grey-level-occurrence-based homogeneity filter may be given by $$\varphi_{2m} = \Phi(f) = \sum_{i,j=0}^{N-1} \frac{p_{ij}}{1 + |i-j|}.$$

For example, the image filter may be a grey-level-occurrence-based dissimilarity filter. This material filter is based on the grey level occurrence matrix defined above. The material feature of the grey-level-occurrence-based dissimilarity filter may be given by $$\varphi_{2m} = \Phi(f) = -\sum_{i,j=0}^{N-1} \sqrt{p_{ij} \log(p_{ij})}.$$

For example, the image filter may be a Law's energy filter. This material filter may be based on the laws vector $L_5 = [1, 4, 6, 4, 1]$ and $E_5 = [-1, -2, 0, -2, -1]$ and the matrices $L_5(E_5)^T$ and $E_5(L_5)^T$.

The image $f_k$ is convoluted with these matrices:

$$f^*_{k,L5E5}(x, y) = \sum_{i=-2}^{2}\sum_{j=-2}^{2} f_k(x+i, y+j)L_5(E_5)^T$$

and $$f^*_{k,E5L5}(x, y) = \sum_{i=-2}^{2}\sum_{j=-2}^{2} f_k(x+i, y+j)E_5(L_5)^T.$$

$$E = \int \frac{f^*_{k,L5E5}(x,y)}{\max\left(f^*_{k,L5E5}(x,y)\right)} dxdy,$$

$$F = \int \frac{f^*_{k,E5L5}(x,y)}{\max\left(f^*_{k,E5L5}(x,y)\right)} dxdy,$$

Whereas the material feature of Law's energy filter may be determined by $$\varphi_{2m} = \Phi(f) = E/F.$$

For example, the material dependent image filter may be a threshold area filter. This material feature may relate two areas in the image plane. A first area $\Omega 1$, may be an area wherein the function f is larger than $\alpha$ times the maximum of f. A second area $\Omega 2$, may be an area wherein the function f is smaller than $\alpha$ times the maximum of f, but larger than a threshold value $\varepsilon$ times the maximum of f. Preferably $\alpha$ may be 0.5 and $\varepsilon$ may be 0.05. Due to speckles or noise, the areas may not simply correspond to an inner and an outer circle around the spot center. As an example, $\Omega 1$ may comprise speckles or unconnected areas in the outer circle. The material feature may be determined by $$\varphi_{2m} = \Phi(f) = \frac{\int_{\Omega 1} 1}{\int_{\Omega 2} 1},$$

wherein $(\Omega 1=\{x|f(x)>\alpha\cdot\max(f(x))\}$ and $\Omega 2=\{x|\varepsilon\cdot\max(f(x))<f(x)<\alpha\cdot\max(f(x))\}$.

The material property m and/or the longitudinal coordinate z may be determined by using a predetermined relationship between $\phi_{1z}$, $\phi_{2m}$ and z, m. The evaluation device may be configured for determining the material property m and/or the longitudinal coordinate z by evaluating the features $\phi_{2m}$, $\phi_{1z}$. For example, the evaluation device may be configured for using at least one predetermined relationship between the distance feature $\phi_{1z}$ and the longitudinal coordinate of the object for determining the longitudinal coordinate z of the object. The evaluation device may be configured for using at least one predetermined relationship between the material feature $\phi_{2m}$ and the material property of the object for determining the material property of the object. The predetermined relationship may be one or more of an empirical relationship, a semi-empiric relationship and an analytically derived relationship. The evaluation device may comprise at least one data storage device for storing the predetermined relationship, such as a lookup list or a lookup table. For example, the material property may be determined by evaluating $\phi_{2m}$ subsequently after determining of the longitudinal coordinate z such that the information about the longitudinal coordinate z can be considered for evaluating of $\phi_{2m}$. Specifically, the material property m and/or the longitudinal coordinate z may be determined by a function z ($\phi_{1z}$, $\phi_{2m}$) and/or by a function m ($\phi_{1z}$, $\phi_{2m}$). The function may be predefined and/or predetermined. For example, the function may be a linear function.

In the ideal case, an image filter would yield features that are only dependent on distance or material properties. However, image filters used in beam profile analysis may yield features that depend on distance and material properties, such as translucency. At least one of the material dependent image filter or the distance dependent image filter may be a function of the feature $\phi_{1z}$ or $\phi_{2m}$ of the at least one other image filter. At least of the material dependent image filter or the distance dependent image filter may be a function of the at least one other image filter. The evaluation device may be configured for determining whether at least one of $\phi_1$ or $\phi_2$ is a function of the feature $\phi_{1z}$ or $\phi_{2m}$ of the other image filter and/or whether at least one of $\phi_1$ or $\phi_2$ is a function of the at least one other image filter. Specifically, the evaluation device may be configured for determining a correlation coefficient of the material dependent image filter and the distance dependent image filter. In case the correlation coefficient of the material dependent image filter with the distance dependent image filter is close to 1 or −1, the distance may be projected out, by projecting the material feature on the principal axis with the lowest variance. As an example, the material feature may be projected onto an axis orthogonal to the correlating main component. In other words, the material feature may be projected onto the second main component. This may be done using a principal component analysis as known to the person skilled in the art. The evaluation device may be configured for applying the distance dependent image filter and the material dependent image filter simultaneous to the reflection image. In particular, the evaluation device may be configured for simultaneously determining features that are strongly correlated with distance and weakly correlated with material properties and features that are weakly correlated with distance and strongly correlated with material properties. Alternatively, the evaluation device may be configured for applying the distance dependent image filter and the material dependent image filter sequentially or recursively to the reflection image. The evaluation device may be configured for determining at least one of z and/or m by applying at least one further filter depending on at least one of $\phi_{1z}$ and $\phi_{2m}$ to the reflection image.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. The above-mentioned operations, including analysis of the beam profile, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured for performing the abovementioned evaluation. Additionally or alternatively, however, the evaluation device may also fully or partially be embodied by hardware.

The detector may further comprise one or more additional elements such as one or more additional optical elements. Further, the detector may fully or partially be integrated into at least one housing.

The detector may comprise at least one optical element selected from the group consisting of: transfer device, such as at least one lens and/or at least one lens system, at least one diffractive optical element. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the detector and the transfer device have a common optical axis. As used herein, the term "optical axis of the transfer device" generally refers to an axis of mirror symmetry or rotational symmetry of the lens or lens system. The optical axis of the detector may be a line of symmetry of the optical setup of the detector. The detector comprises at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate I is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate.

As outlined above, the detector may be enabled to determine the at least one longitudinal coordinate of the object, including the option of determining the longitudinal coordinate of the whole object or of one or more parts thereof. For example, the detector may be configured for determining the longitudinal coordinate of the object by using at least one distance dependent filter using the depth-from-photon-ratio technique and/or the depth-from-defocus technique as outlined above. The detector may be configured for determining a position of the object. As used herein, the term "position" refers to at least one item of information regarding a location and/or orientation of the object and/or at least one part of the object in space. The distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. At least one of the optical sensors may determined from which a center signal arises. This may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R.A. Street (Ed.): Technology and Applications of Amorphous Silicon, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured for determining at least one transversal coordinate x, y of the object. The evaluation device may be adapted to combine the information of the longitudinal coordinate and the transversal coordinate and to determine a position of the object in space.

The use of a matrix of optical sensors provides a plurality of advantages and benefits. Thus, a center of the light spot generated by the light beam on the sensor element, such as on the common plane of the light-sensitive areas of the optical sensors of the matrix of the sensor element, may vary with a transversal position of the object. The use of the matrix of optical sensors, thus, provides a significant flexibility in terms of the position of the object, specifically in terms of a transversal position of the object. The transversal position of the light spot on the matrix of optical sensors, such as the transversal position of the at least one optical sensor generating the sensor signal, may be used as an additional item of information, from which at least one item of information on a transversal position of the object may be derived, as e.g. disclosed in WO 2014/198629 A1. Additionally or alternatively, the detector according to the present invention may contain at least one additional transversal detector for, in addition to the at least one longitudinal coordinate, detecting at least one transversal coordinate of the object.

The present invention discloses in a further aspect, a detector for identifying at least one material property m comprising
  at least one sensor element comprising a matrix of optical sensors, the optical sensors each having a light-sensitive area, wherein the sensor element is configured for recording at least one reflection image of a light beam originating from at least one object;
  at least one evaluation device configured for determining the material property by evaluation of at least one beam profile of the reflection image, wherein the evaluation device is configured for determining at least one distance feature $\varphi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1other, \phi x}| \geq 0.40$ with $\phi_2$ being one of the depth-from-photon-ratio filter or the depth-from-defocus filter or a linear combination thereof, wherein the evaluation device is configured for determining at least one material feature $\phi_{2m}$ by applying at least one material dependent image filter $\phi_2$ to the reflection image, wherein the material dependent image filter is at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 1other, \phi x}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof,
  wherein the evaluation device is configured for determining a longitudinal coordinate z and the material property m by evaluating the distance feature $\phi_{1z}$ and the material feature $\phi_{2m}$.

With respect to definitions and embodiments reference is made to the description of the detector described in a first aspect of the present invention.

The present invention discloses in a further aspect, a detector for identifying at least one material property m comprising
  at least one sensor element comprising a matrix of optical sensors, the optical sensors each having a light-sensitive area, wherein the sensor element is configured for recording at least one reflection image of a light beam originating from at least one object;
  at least one evaluation device configured for determining the material property by evaluation of at least one beam profile of the reflection image, wherein the evaluation device is configured for determining at least one distance feature $\varphi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by |P $\phi_{1other}$, $\phi_z$|>0.40 with $\phi_2$ being one of the depth-from-photon-ratio filter or the depth-from-defocus filter or a linear combination thereof, wherein the evaluation device is configured for determining at least one material feature $\phi_{2m}$ by applying at least one material dependent image filter $\phi_2$ to the reflection image, wherein the material dependent image filter is at least one filter that passes a hypothesis testing, wherein the hypothesis testing uses a Null-hypothesis that the filter does not distinguish between material classifiers and an alternative hypothesis that the filter distinguishes at least two material classifiers, wherein the filter passes the hypothesis testing if a p-value, p, is smaller or equal than a pre-defined level of significance, wherein the evaluation device is configured for determining a longitudinal coordinate z and the material property m by evaluating the distance feature $\phi_{1z}$ and the material feature $\phi_{2m}$.

With respect to definitions and embodiments reference is made to the description of the detector described in a first aspect of the present invention.

In a further aspect of the present invention, a detector system is disclosed. The detector system comprises at least one detector according to the present invention, such as according to one or more of the embodiments disclosed above or according to one or more of the embodiments disclosed in further detail below. The detector system further comprises at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 300-500 nm. Alternatively, as outlined above, the infrared spectral range may be used, such as in the range of 780 nm to 3.0 μm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured for enabling at least one item of information to be input by a player by means of the human-machine interface. The entertainment device is further configured for varying the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source adapted to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the optional illumination source of the detector. Alternatively, however, the illumination source of the scanning system may also be fully or partially identical with or integrated into the at least one optional illumination source of the detector.

Thus, the scanning system may comprise at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source. Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300-500 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may, thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined. The illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources.

Alternatively, the illumination source of the scanning system may emit two individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning system. In particular, the scanning system may, thus, use at least one row scan and/or line scan, such as to scan the one or more surfaces of the one or more objects sequentially or simultaneously. Thus, the scanning system may be adapted to measure angles by measuring three or more dots, or the scanning system may be adapted to measure corners or narrow regions such as a gable of a roof, which may be hardly accessible using a conventional measuring stick. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be adapted to shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with several corners and surfaces. One or more flexibly movable laser sources are attached to the scanning system. The one or more laser sources are moved as such that they illuminate points of interest. The position of the illuminated points with respect to the scanning system is measured when pressing a designated button on the scanning system and the position information is transmitted via a wireless interface to a mobile phone. The position information is stored in a mobile phone application. The laser sources are moved to illuminate further points of interest the position of which are measured and transmitted to the mobile phone application. The mobile phone application may transform the set of points into a 3D model by connecting adjacent points with planar surfaces. The 3D model may be stored and processed further. The distances and or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning system may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

As a non-limiting example, the scanning system may be adapted as a line scanning device. In particular, the scanning system may comprise at least one sensor line or row. Triangulation systems require a sufficient baseline such that in the near filed no detection may be possible. Near field detection may be possible if the laser spot is tilted in direction of the transfer device. However, the tilting leads to that the light spot will move out of the field of view which limits detection in far field regions. These near field and far field problems can be overcome by using the detector according to the present invention. In particular, the detector may comprise a CMOS line of optical sensors. The scanning system may be adapted to detect a plurality of light beams propagating from the object to the detector on the CMOS line. The light beams may be generated at different positions on the object or by movement of the illumination source. The scanning system may be adapted to determine at least one longitudinal coordinate for each of the light points as described above and in more detail below.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning system is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning system.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The transfer device can be designed to feed light propagating from the object to the detector to the optical sensor, preferably successively. This feeding can optionally be effected by means of imaging or else by means of non-imaging properties of the transfer device. In particular the transfer device can also be designed to collect the electromagnetic radiation before the latter is fed to the optical sensor. The transfer device can also be wholly or partly a constituent part of at least one optional illumination source, for example by the illumination source being designed to provide a light beam having defined optical properties, for example having a defined or precisely known beam profile, for example at least one linear combination of Gaussian beams, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector.

Alternatively or additionally, at least one illumination source can also be integrated into the at least one beacon device or into one or more of the beacon devices and/or into the object or connected or spatially coupled to the object.

The light emerging from the one or more optional beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers, more preferably in the part of the near infrared region where silicon photodiodes are applicable specifically in the range of 700 nm to 1000 nm. For thermal imaging applications the target may emit light in the far infrared spectral range, preferably in the range of 3.0 micrometers to 20 micrometers. For example, the at least one illumination source is adapted to emit light in the visible spectral range, preferably in the range of 500 nm to 780 nm, most preferably at 650 nm to 750 nm or at 690 nm to 700 nm. For example, the at least one illumination source is adapted to emit light in the infrared spectral range. Other options, however, are feasible.

The feeding of the light beam to the optical sensor can be effected in particular in such a way that a light spot, for example having a round, oval or differently configured cross section, is produced on the optional sensor area of the optical sensor. By way of example, the detector can have a visual range, in particular a solid angle range and/or spatial range, within which objects can be detected. Preferably, the transfer device may be designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses a method for determining at least one material property of at least one object by using at least one detector according to the present invention. The method comprises the following steps:

a) determining at least one reflection image of the object by using at least one sensor element having a matrix of optical sensors, the optical sensors each having a light-sensitive area;

b) determining the material property by evaluating at least one beam profile of the reflection image by using at least one evaluation device, wherein the evaluating comprises:

b1) determining at least one distance feature $\phi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depthfrom-photon-ratio filter and/or the depth-from-defocus filter or a linear combination thereof by $|\rho_{\phi 1 other, \phi z}| \geq 0.40$ with $\phi_z$ being one of the depth-from-photon-ratio filter or the depth-from-defocus filter or a linear combination thereof, b2) determining at least one material feature $\phi_{2m}$ by applying at least one material dependent image filter $\phi_2$ to the reflection image, wherein the material dependent image filter is at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 1 other, \phi z}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof, b3) determining a longitudinal coordinate z and the material property m by evaluating the distance feature $\phi_{1z}$ and the material feature $\phi_{2m}$.

The method steps may be performed in the given order or may be performed in a different order. Further, one or more additional method steps may be present which are not listed. Further, one, more than one or even all of the method steps may be performed repeatedly. For details, options and definitions, reference may be made to the detector as discussed above. Thus, specifically, as outlined above, the method may comprise using the detector according to the present invention, such as according to one or more of the embodiments given above or given in further detail below.

In a further aspect, the present invention discloses a method for determining at least one material property of at least one object by using at least one detector according to the present invention. The method comprises the following steps:

a) determining at least one reflection image of the object by using at least one sensor element having a matrix of optical sensors, the optical sensors each having a light-sensitive area;

b) determining the material property by evaluating at least one beam profile of the reflection image by using at least one evaluation device, wherein the evaluating comprises:

b1) determining at least one distance feature $\phi_{1z}$ by applying at least one distance dependent image filter 1 to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1 other, \phi z}| \geq 0.40$ with $\phi_2$ being one of the depth-from-photon-ratio filter or the depth-from-defocus filter or a linear combination thereof, b2) determining at least one material feature $\phi_{2m}$ by applying at least one material dependent image filter $\phi_2$ to the reflection image, wherein the material dependent image filter is at least one filter that passes a hypothesis testing, wherein the hypothesis testing uses a Null-hypothesis that the filter does not distinguish between material classifiers and an alternative hypothesis that the filter distinguishes at least two material classifiers, wherein the filter passes the hypothesis testing if a p-value, p, is smaller or equal than a pre-defined level of significance, b3) determining a longitudinal coordinate z and the material property m by evaluating the distance feature $\phi_{1z}$ and the material feature $\phi_{2m}$.

The method steps may be performed in the given order or may be performed in a different order. Further, one or more additional method steps may be present which are not listed. Further, one, more than one or even all of the method steps may be performed repeatedly. For details, options and definitions, reference may be made to the detector as discussed above. Thus, specifically, as outlined above, the method may comprise using the detector according to the present invention, such as according to one or more of the embodiments given above or given in further detail below.

In a further aspect, the present invention discloses a method for determining at least one material property of at least one object by using at least one detector according to the present invention. The method comprises the following steps:

a) determining at least one reflection image of the object by using at least one sensor element having a matrix of optical sensors, the optical sensors each having a light-sensitive area;

b) determining the material property by evaluating at least one beam profile of the reflection image by using at least one evaluation device, wherein the evaluating comprises:

b1) determining at least one distance feature $\phi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1 other, \phi z}| \geq 0.40$ with $\phi_2$ being one of the depth-from-photon-ratio filter or the depth-from-defocus filter or a linear combination thereof, b2) determining at least one material feature $\phi_{2m}$ by applying at least one material dependent image filter $\phi_2$ to the reflection image, b3) determining a longitudinal coordinate z and the material property m by evaluating the distance feature $\phi_{1z}$ and the material feature $\phi_{2m}$.

The method steps may be performed in the given order or may be performed in a different order. Further, one or more additional method steps may be present which are not listed. Further, one, more than one or even all of the method steps may be performed repeatedly. For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object. In one embodiment, the object may be a rigid object. Other embodiments are feasible, such as embodiments in which the object is a non-rigid object or an object which may change its shape.

With respect to further uses of the detector and devices of the present invention reference is made to WO 2018/091649 A1, WO 2018/091638 A1 and WO 2018/091640 A1, the content of which is included by reference.

Specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device configured for performing photography. As further used herein, the term digital photography generally refers to the technology of acquiring image information of at least one object by using a plurality of light-sensitive elements configured for generating electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device configured for performing 3D photography. The camera generally may be configured for acquiring a single image, such as a single 3D image, or may be configured for acquiring a plurality of images, such as a sequence of images. Thus, the camera may also be a video camera configured for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be configured for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat, an article of clothing, a hat, a shoe. Other embodiments are feasible.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or anti-parallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device configured for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be configured for performing at least one computer program, such as at least one computer program configured for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and or processing 3D information. Further, devices according to the present invention may be used in 360° digital cameras or surround view cameras.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

The human-machine interface may comprise a plurality of beacon devices which are configured for being at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device configured for generating the at least one light beam to be detected by the detector, such as by having one or more illumination sources for generating the at least one light beam. Additionally or alternatively, the beacon device may fully or partially be designed as a passive beacon device, such as by providing one or more reflective elements configured for reflecting a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be configured in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source configured for generating at least one light beam to be transmitted to the detector, preferably at least one light beam having known beam properties. Additionally or alternatively, the beacon device may comprise at least one reflector configured for reflecting light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command configured for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is configured for gathering information on a series of past positions of the at least one object and/or at least one part of the object. Additionally, the tracking system may be configured for providing information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is configured for tracking a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be configured for initiating one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be configured for initiating at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

In a further aspect of the present invention, an inertial measurement unit for use in an electronic device disclosed. The inertial measurement unit is adapted to receive data determined by at least one detector according to the present invention. The inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope. The inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, speed.

The inertial measurement unit may comprise the detector according to the present invention and/or may be connected to the detector, via at least one data connection. The evaluation device and/or at least one processing device of the inertial measurement unit may be configured for determining the at least one combined distance information, in particular using the at least one recursive filter. The recursive filter may be configured for determining the combined distance information considering further sensor data and/or further parameters such as further sensor data from the further sensor of the inertial measurement unit. With respect to definitions and embodiments of the inertial measurement unit reference is made to the description of the detector.

Overall, in the context of the present invention, the following embodiments are regarded as preferred:

Embodiment 1: A detector for identifying at least one material property m comprising
at least one sensor element comprising a matrix of optical sensors, the optical sensors each having a light-sensitive area, wherein the sensor element is configured for recording at least one reflection image of a light beam originating from at least one object;
at least one evaluation device configured for determining the material property by evaluation of at least one beam profile of the reflection image, wherein the evaluation device is configured for determining at least one distance feature $\varphi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1 other, \phi z}| \geq 0.40$ with $\phi_2$ being one of the depth-from-photon-ratio filter or the depth-from-defocus filter or a linear combination thereof, wherein the evaluation device is configured for determining at least one material feature $\phi_{2m}$ by applying at least one material dependent image filter $\phi_2$ to the reflection image, wherein the material dependent image filter is at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 2 other, \phi z}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof, wherein the evaluation device is configured for determining a longitudinal coordinate z and the material property m by evaluating the distance feature $\phi_{1z}$ and the material feature $\phi_{2m}$.

Embodiment 2: The detector according to the preceding embodiment, wherein the material dependent image filter is at least one filter that passes a hypothesis testing, wherein the hypothesis testing uses a Null-hypothesis that the filter does not distinguish between material classifiers and an alternative hypothesis that the filter distinguishes at least two material classifiers, wherein the filter passes the hypothesis testing if a p-value, p, is smaller or equal than a pre-defined level of significance.

Embodiment 3: The detector according to the preceding embodiment, wherein $p \leq 0.075$, preferably $p \leq 0.05$, more preferably $p \leq 0.025$, most preferably $p \leq 0.01$.

Embodiment 4: The detector according to any one of the preceding embodiments, wherein the at least one material property is a property selected from the group consisting of: a scattering coefficient, a translucency, a transparency, a deviation from a Lambertian surface reflection, a speckle, and the like.

Embodiment 5: The detector according to any one of the preceding embodiments, wherein the further distance dependent image filter $\phi_{1other}$ correlates to one or more of the distance dependent image filters $\phi_2$ by $|\rho_{\phi 1other, \phi z}| \geq 0.60$, preferably by $|\rho_{\phi 2other, \phi z}| \geq 0.80$.

Embodiment 6: The detector according to any one of the preceding embodiments, wherein the further material dependent image filter $\phi_{2other}$ correlates to one or more of the material dependent image filters $\phi_m$ by $|\rho_{\phi 1other, \phi z}| \geq 0.60$, preferably by $|\rho_{\phi 1other, \phi z}| \geq 0.80$.

Embodiment 7: The detector according to any one of the preceding embodiments, wherein the material property m and/or the longitudinal coordinate z are determined by using a predetermined relationship between $\phi_{1z}$, $\phi_{2m}$ and z, m.

Embodiment 8: The detector according to any one of the preceding embodiments, wherein the material property m and/or the longitudinal coordinate z are determined by a function $z(\phi_{1z}, \phi_{2m})$ and/or $m(\phi_{1z}, \phi_{2m})$.

Embodiment 9: The detector according to any one of the preceding embodiments, wherein the evaluation device is configured for applying the distance dependent image filter and the material dependent image filter simultaneous to the reflection image.

Embodiment 10: The detector according to any one of the preceding embodiments, wherein the evaluation device is configured for determining whether at least one of $\phi_1$ or $\phi_2$ is a function of the feature $\phi_{1z}$ or $\phi_{2m}$ of the other image filter or whether at least one of $\phi_1$ or $\phi_2$ is a function of the at least one other image filter, wherein the evaluation device is configured for applying the distance dependent image filter and the material dependent image filter sequentially or recursively to the reflection image.

Embodiment 11: The detector according to the preceding embodiment, wherein the evaluation device is configured for determining at least one of z and/or m by applying at least one further filter depending on at least one of $\phi_{1z}$ and/or $\phi_{2m}$ to the reflection image.

Embodiment 12: The detector according to any one of the preceding embodiments, wherein the depth-from-photon-ratio filter comprises evaluating a combined signal Q from at least two sensor signals of the sensor element, wherein the evaluation device is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the distance feature $\phi_{1z}$ for determining the distance feature $\phi_{1z}$.

Embodiment 13: The detector according to the preceding embodiment, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of the beam profile and $E(x,y,z_0)$ denotes the beam profile given at the object distance $z_0$, wherein each of the sensor signals comprises at least one information of at least one area of the beam profile of the light beam propagating from the object to the detector.

Embodiment 14: The detector according to the preceding embodiment, wherein the light-sensitive areas are arranged such that a first sensor signal comprises information of a first area of the beam profile and a second sensor signal comprises information of a second area of the beam profile, wherein the first area of the beam profile and the second area of the beam profile are one or both of adjacent or overlapping regions.

Embodiment 15: The detector according to the preceding embodiment, wherein the evaluation device is configured for determining the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile.

Embodiment 16: The detector according to any one of the preceding embodiments, wherein the depth-from-defocus filter comprises using at least one convolution-based algorithm such as a depth-from-defocus algorithm, wherein the evaluation device is configured for determining the distance feature $\phi_{1z}$ by optimizing at least one blurring function $f_a$, wherein the blurring function is optimized by varying the parameters of the at least one blurring function.

Embodiment 17: The detector according to the preceding embodiment, wherein the reflection image is a blurred image $i_b$, wherein the evaluation device is configured for reconstructing the distance feature $\phi_{1z}$ from the blurred image $i_b$ and the blurring function $f_a$, wherein the distance feature $\phi_{1z}$ is determined by minimizing a difference between the blurred image $i_b$, and the convolution of the blurring function $f_a$ with at least one further image $i'_b$, $$\min\|(i'_b * f_a(\sigma(\varphi_{1z})) - i_b)\|,$$

by varying the parameters σ of the blurring function.

Embodiment 18: The detector according to any one of the two preceding embodiments, wherein the at least one blurring function $f_a$ is a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

Embodiment 19: The detector according to any one of the preceding embodiments, wherein the sensor element comprises at least one CMOS sensor.

Embodiment 20: The detector according to any one of the preceding embodiments, wherein the detector comprises at least one illumination source, wherein the illumination source is configured for generating at least one illumination pattern for illumination of the object, wherein the illumination pattern comprises at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines.

Embodiment 21: The detector according to the preceding embodiment, wherein the illumination source comprises at least one laser source and at least one diffractive optical element.

Embodiment 22: The detector according to any one of the two preceding embodiments, wherein the detector comprises at least two sensor elements each having a matrix of optical sensors, wherein at least one first sensor element and at least one second sensor element are positioned at different spatial positions, wherein the evaluation device is configured for selecting at least one image determined by the first sensor element or the second sensor element as reflection image and to select at least one image determined by the other one of the first sensor element or the second sensor element as reference image.

Embodiment 23: The detector according to the preceding embodiment, wherein the evaluation device is configured for selecting at least one reflection feature of the reflection image, wherein the evaluation device is configured for determining at least one distance estimate of the selected reflection feature of the reflection image given by the distance feature $\phi_{1z}$ and an error interval $\pm\epsilon$, wherein the evaluation device is configured for determining at least one displacement region in the reference image corresponding to the distance estimate, wherein the evaluation device is configured for matching the selected reflection feature with at least one reference feature within the displacement region, wherein the evaluation device is configured for determining a displacement of the matched reference feature and the selected reflection feature, wherein the evaluation device is configured for determining a longitudinal coordinate of the matched features using a predetermined relationship between the longitudinal coordinate and the displacement.

Embodiment 24: The detector according to the preceding embodiment, wherein the reference image and the reflection image are images of the object determined at different spatial positions having a fixed distance, wherein the evaluation device is adapted to determine an epipolar line in the reference image, wherein the displacement region extends along the epipolar line, wherein the evaluation device is adapted to determine the reference feature along the epipolar line corresponding to the distance feature $\phi_{1z}$ and to determine an extent of the displacement region along the epipolar line corresponding to the error interval $\pm\epsilon$.

Embodiment 25: A detector for identifying at least one material property m comprising
at least one sensor element comprising a matrix of optical sensors, the optical sensors each having a light-sensitive area, wherein the sensor element is configured for recording at least one reflection image of a light beam originating from at least one object;
at least one evaluation device configured for determining the material property by evaluation of at least one beam profile of the reflection image, wherein the evaluation device is configured for determining at least one distance feature $\varphi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1other, \phi z}| \geq 0.40$ with $\phi_2$ being one of the depth-from-photon-ratio filter or the depth-from-defocus filter or a linear combination thereof, wherein the evaluation device is configured for determining at least one material feature $\phi_{2m}$ by applying at least one material dependent image filter $\phi_2$ to the reflection image, wherein the material dependent image filter is at least one filter that passes a hypothesis testing, wherein the hypothesis testing uses a Null-hypothesis that the filter does not distinguish between material classifiers and an alternative hypothesis that the filter distinguishes at least two material classifiers, wherein the filter passes the hypothesis testing if a p-value, p, is smaller or equal than a pre-defined level of significance, wherein the evaluation device is configured for determining a longitudinal coordinate z and the material property m by evaluating the distance feature $\phi_{1z}$ and the material feature $\phi_{2m}$.

Embodiment 26: The detector according to the preceding embodiment, wherein the hypothesis testing is based on a dataset of beam profile images, wherein each beam profile image corresponds to a material classifier and a distance.

Embodiment 27: The detector according to any one of embodiments 25 and 26, wherein $p \leq 0.075$, preferably $p \leq 0.05$, more preferably $p \leq 0.025$, most preferably $p \leq 0.01$.

Embodiment 28: The detector according to any one of embodiments 25 to 27, wherein the at least one material property is a property selected from the group consisting of: a scattering coefficient, a translucency, a transparency, a deviation from a Lambertian surface reflection, a speckle, and the like.

Embodiment 29: The detector according to any one of embodiments 25 to 28, wherein the further distance dependent image filter $\phi_{1other}$ correlates to one or more of the distance dependent image filters $\phi_2$ by $|\rho_{\phi 1other, \phi z}| \geq 0.60$, preferably by $|\rho_{\phi 1other, \phi z}| \geq 0.80$.

Embodiment 30: The detector according to any one of embodiments 25 to 29, wherein the further material dependent image filter $\phi_{2other}$ correlates to one or more of the material dependent image filters $\phi_m$ by $|\rho_{\phi 1other, \phi z}| \geq 0.60$, preferably by $|\rho_{\phi 1other, \phi z}| \geq 0.80$.

Embodiment 31: The detector according to any one of embodiments 25 to 30, wherein the material dependent image filter is at least one filter selected from the group consisting of: a luminance filter; a spot shape filter; a squared norm gradient; a standard deviation; a smoothness filter such as a Gaussian filter or median filter; a grey-leveloccurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 2other, \phi z}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof.

Embodiment 32: The detector according to any one of embodiments 25 to 31, wherein the material property m and/or the longitudinal coordinate z are determined by using a predetermined relationship between $\phi_{1z}, \phi_{2m}$ and z, m.

Embodiment 33: The detector according to any one of embodiments 25 to 32, wherein the material property m and/or the longitudinal coordinate z are determined by a function z ($\phi_{1z}, \phi_{2m}$) and/or m ($\phi_{1z}, \phi_{2m}$).

Embodiment 34: The detector according to any one of embodiments 25 to 33, wherein the evaluation device is configured for applying the distance dependent image filter and the material dependent image filter simultaneous to the reflection image.

Embodiment 35: The detector according to any one of embodiments 25 to 34, wherein the evaluation device is configured for determining whether at least one of $\phi_1$ or $\phi_2$ is a function of the feature $\phi_{1z}$ or $\phi_{2m}$ of the other image filter or whether at least one of $\phi_1$ or $\phi_2$ is a function of the at least one other image filter, wherein the evaluation device is configured for applying the distance dependent image filter and the material dependent image filter sequentially or recursively to the reflection image.

Embodiment 36: The detector according to the preceding embodiment, wherein the evaluation device is configured for determining at least one of z and/or m by applying at least one further filter depending on at least one of $\phi_{1z}$ and $\phi_{2m}$ to the reflection image.

Embodiment 37: The detector according to any one of embodiments 25 to 36, wherein the depth-from-photon-ratio filter comprises evaluating a combined signal Q from at least two sensor signals of the sensor element, wherein the evaluation device is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the distance feature $\phi_{1z}$ for determining the distance feature $\phi_{1z}$.

Embodiment 38: The detector according to the preceding embodiment, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of the beam profile and $E(x,y,z_O)$ denotes the beam profile given at the object distance $z_O$, wherein each of the sensor signals comprises at least one information of at least one area of the beam profile of the light beam propagating from the object to the detector.

Embodiment 39: The detector according to the preceding embodiment, wherein the light-sensitive areas are arranged such that a first sensor signal comprises information of a first area of the beam profile and a second sensor signal comprises information of a second area of the beam profile, wherein the first area of the beam profile and the second area of the beam profile are one or both of adjacent or overlapping regions.

Embodiment 40: The detector according to the preceding embodiment, wherein the evaluation device is configured for determining the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile.

Embodiment 41: The detector according to any one of embodiments 25 to 40, wherein the depth-from-defocus filter comprises using at least one convolution-based algorithm such as a depth-from-defocus algorithm, wherein the evaluation device is configured for determining the distance feature $\phi_{1z}$ by optimizing at least one blurring function $f_a$, wherein the blurring function is optimized by varying the parameters of the at least one blurring function.

Embodiment 42: The detector according to the preceding embodiment, wherein the reflection image is a blurred image $i_b$, wherein the evaluation device is configured for reconstructing the distance feature $\phi_{1z}$ from the blurred image $i_b$ and the blurring function $f_a$, wherein the distance feature $\phi_{1z}$ is determined by minimizing a difference between the blurred image $i_b$ and the convolution of the blurring function $f_a$ with at least one further image $i'_b$, $$\min\|(i'_b * f_a(\sigma(\varphi_{1z})) - i_b)\|,$$

by varying the parameters $\sigma$ of the blurring function.

Embodiment 43: The detector according to any one of embodiments 25 to 42, wherein the at least one blurring function $f_a$ is a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

Embodiment 44: The detector according to any one of embodiments 25 to 43, wherein the sensor element comprises at least one CMOS sensor.

Embodiment 45: The detector according to any one of embodiments 25 to 44, wherein the detector comprises at least one illumination source, wherein the illumination source is configured for generating at least one illumination pattern for illumination of the object, wherein the illumination pattern comprises at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines.

Embodiment 46: The detector according to the preceding embodiment, wherein the illumination source comprises at least one laser source and at least one diffractive optical element.

Embodiment 47: The detector according to any one of the two preceding embodiments, wherein the detector comprises at least two sensor elements each having a matrix of optical sensors, wherein at least one first sensor element and at least one second sensor element are positioned at different spatial positions, wherein the evaluation device is configured for selecting at least one image determined by the first sensor element or the second sensor element as reflection image and to select at least one image determined by the other one of the first sensor element or the second sensor element as reference image.

Embodiment 48: The detector according to the preceding embodiment, wherein the evaluation device is configured for selecting at least one reflection feature of the reflection image, wherein the evaluation device is configured for determining at least one distance estimate of the selected reflection feature of the reflection image given by the distance feature $\phi_{1z}$ and an error interval $\pm\varepsilon$, wherein the evaluation device is configured for determining at least one displacement region in the reference image corresponding to the distance estimate, wherein the evaluation device is configured for matching the selected reflection feature with at least one reference feature within the displacement region, wherein the evaluation device is configured for determining a displacement of the matched reference feature and the selected reflection feature, wherein the evaluation device is configured for determining a longitudinal coordinate of the matched features using a predetermined relationship between the longitudinal coordinate and the displacement.

Embodiment 49: The detector according the preceding embodiment, wherein the reference image and the reflection image are images of the object determined at different spatial positions having a fixed distance, wherein the evaluation device is adapted to determine an epipolar line in the reference image, wherein the displacement region extends along the epipolar line, wherein the evaluation device is adapted to determine the reference feature along the epipolar line corresponding to the distance feature $\phi_{1z}$ and to determine an extent of the displacement region along the epipolar line corresponding to the error interval $\pm\varepsilon$.

Embodiment 50: A detector for identifying at least one material property m comprising
at least one sensor element comprising a matrix of optical sensors, the optical sensors each having a light-sensitive area, wherein the sensor element is configured for recording at least one reflection image of a light beam originating from at least one object;
at least one evaluation device configured for determining the material property by evaluation of at least one beam profile of the reflection image, wherein the evaluation device is configured for determining at least one distance feature Piz by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi1other, \phi z}|\geq 0.40$ with $\phi_2$ being one of the depth-from-photon-ratio filter or the depth-from-defocus filter or a linear combination thereof,
wherein the evaluation device is configured for determining at least one material feature $\phi_{2m}$ by applying at least one material dependent image filter $\phi_2$ to the reflection image,
wherein the evaluation device is configured for determining a longitudinal coordinate z and the material property m by evaluating the distance feature $\phi_{1z}$ and the material feature $\phi_{2m}$.

Embodiment 51: The detector according to the preceding embodiment, wherein the material dependent image filter is at least one filter that passes a hypothesis testing, wherein the hypothesis testing uses a Null-hypothesis that the filter does not distinguish between material classifiers and an alternative hypothesis that the filter distinguishes at least two material classifiers, wherein the filter passes the hypothesis testing if a p-value, p, is smaller or equal than a pre-defined level of significance.

Embodiment 52: The detector according to the preceding embodiment, wherein the hypothesis testing is based on a dataset of beam profile images, wherein each beam profile image corresponds to a material classifier and a distance.

Embodiment 53: The detector according to any one of embodiments 50 and 52, wherein $p\leq 0.075$, preferably $p\leq 0.05$, more preferably $p\leq 0.025$, most preferably $p\leq 0.01$.

Embodiment 54: The detector according to any one of embodiments 50 to 53, wherein the at least one material property is a property selected from the group consisting of: a scattering coefficient, a translucency, a transparency, a deviation from a Lambertian surface reflection, a speckle, and the like.

Embodiment 55: The detector according to any one of embodiments 50 to 54, wherein the further distance dependent image filter $\phi_{1other}$ correlates to one or more of the distance dependent image filters $\phi_2$ by $|\rho_{\phi1other, \phi z}|\geq 0.60$, preferably by $|\rho_{\phi2other, \phi z}|\geq 0.80$.

Embodiment 56: The detector according to any one of embodiments 50 to 55, wherein the further material dependent image filter $\phi_{2other}$ correlates to one or more of the material dependent image filters $|\rho_{\phi2other, \phi z}|\geq 0.60$, preferably by $|\rho_{\phi2other, \phi z}|\geq 0.80$.

Embodiment 57: The detector according to any one of embodiments 50 to 56, wherein the material dependent image filter is at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof, or a further material dependent image filter $\phi_{2other}$ Which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi2other, \phi z}|\geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof.

Embodiment 58: The detector according to any one of embodiments 50 to 57, wherein the material property m and/or the longitudinal coordinate z are determined by using a predetermined relationship between $\phi_{1z}$, $\phi_{2m}$ and z, m.

Embodiment 59: The detector according to any one of embodiments 50 to 58, wherein the material property m and/or the longitudinal coordinate z are determined by a function z ($\phi_{1z}$, $\phi_{2m}$) and/or m ($\phi_{1z}$, $\phi_{2m}$).

Embodiment 60: The detector according to any one of embodiments 50 to 59, wherein the evaluation device is configured for applying the distance dependent image filter and the material dependent image filter simultaneous to the reflection image.

Embodiment 61: The detector according to any one of embodiments 50 to 60, wherein the evaluation device is configured for determining whether at least one of $\phi_1$ or $\phi_2$ is a function of the feature $\phi_{1z}$ or $\phi_{2m}$ of the other image filter or whether at least one of $\phi_1$ or $\phi_2$ is a function of the at least one other image filter, wherein the evaluation device is configured for applying the distance dependent image filter and the material dependent image filter sequentially or recursively to the reflection image.

Embodiment 62: The detector according to the preceding embodiment, wherein the evaluation device is configured for determining at least one of z and/or m by applying at least one further filter depending on at least one of $\phi_{1z}$ and $\phi_{2m}$ to the reflection image.

Embodiment 63: The detector according to any one of embodiments 50 to 62, wherein the depth-from-photon-ratio filter comprises evaluating a combined signal Q from at least two sensor signals of the sensor element, wherein the evaluation device is configured for deriving the combined signal Q by one or more of dividing the sensor signals, dividing multiples of the sensor signals, dividing linear combinations of the sensor signals, wherein the evaluation device is configured for using at least one predetermined relationship between the combined signal Q and the distance feature $\phi_{1z}$ for determining the distance feature $\phi_{1z}$.

Embodiment 64: The detector according to the preceding embodiment, wherein the evaluation device is configured for deriving the combined signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are different areas of the beam profile and $E(x,y,z_O)$ denotes the beam profile given at the object distance $z_O$, wherein each of the sensor signals comprises at least one information of at least one area of the beam profile of the light beam propagating from the object to the detector.

Embodiment 65: The detector according to the preceding embodiment, wherein the light-sensitive areas are arranged such that a first sensor signal comprises information of a first area of the beam profile and a second sensor signal comprises information of a second area of the beam profile, wherein the first area of the beam profile and the second area of the beam profile are one or both of adjacent or overlapping regions.

Embodiment 66: The detector according to the preceding embodiment, wherein the evaluation device is configured for determining the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile.

Embodiment 67: The detector according to any one of embodiments 50 to 66, wherein the depth-from-defocus filter comprises using at least one convolution-based algorithm such as a depth-from-defocus algorithm, wherein the evaluation device is configured for determining the distance feature $\phi_{1z}$ by optimizing at least one blurring function $f_a$, wherein the blurring function is optimized by varying the parameters of the at least one blurring function.

Embodiment 68: The detector according to the preceding embodiment, wherein the reflection image is a blurred image $i_b$, wherein the evaluation device is configured for reconstructing the distance feature $\phi_{1z}$ from the blurred image $i_b$, and the blurring function $f_a$, wherein the distance feature $\phi_{1z}$ is determined by minimizing a difference between the blurred image is and the convolution of the blurring function $f_a$ with at least one further image $i'_b$, $$\min\|(i'_b * f_a(\sigma(\varphi_{1z})) - i_b)\|,$$

by varying the parameters σ of the blurring function.

Embodiment 69: The detector according to any one of embodiments 50 to 68, wherein the at least one blurring function $f_a$ is a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

Embodiment 70: The detector according to any one of embodiments 50 to 69, wherein the sensor element comprises at least one CMOS sensor.

Embodiment 71: The detector according to any one of embodiments 50 to 70, wherein the detector comprises at least one illumination source, wherein the illumination source is configured for generating at least one illumination pattern for illumination of the object, wherein the illumination pattern comprises at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines.

Embodiment 72: The detector according to the embodiment, wherein the illumination source comprises at least one laser source and at least one diffractive optical element.

Embodiment 73: The detector according to any one of the two preceding embodiments, wherein the detector comprises at least two sensor elements each having a matrix of optical sensors, wherein at least one first sensor element and at least one second sensor element are positioned at different spatial positions, wherein the evaluation device is configured for selecting at least one image determined by the first sensor element or the second sensor element as reflection image and to select at least one image determined by the other one of the first sensor element or the second sensor element as reference image.

Embodiment 74: The detector according to the preceding embodiment, wherein the evaluation device is configured for selecting at least one reflection feature of the reflection image, wherein the evaluation device is configured for determining at least one distance estimate of the selected reflection feature of the reflection image given by the distance feature $\phi_{1z}$ and an error interval ±ε, wherein the evaluation device is configured for determining at least one displacement region in the reference image corresponding to the distance estimate, wherein the evaluation device is configured for matching the selected reflection feature with at least one reference feature within the displacement region, wherein the evaluation device is configured for determining a displacement of the matched reference feature and the selected reflection feature, wherein the evaluation device is configured for determining a longitudinal coordinate of the matched features using a predetermined relationship between the longitudinal coordinate and the displacement.

Embodiment 75: The detector according the preceding embodiment, wherein the reference image and the reflection image are images of the object determined at different spatial positions having a fixed distance, wherein the evaluation device is adapted to determine an epipolar line in the reference image, wherein the displacement region extends along the epipolar line, wherein the evaluation device is adapted to determine the reference feature along the epipolar line corresponding to the distance feature $\phi_{1z}$ and to determine an extent of the displacement region along the epipolar line corresponding to the error interval ±ε.

Embodiment 76: A detector system, the detector system comprising at least one detector according to any one of embodiments 1 to 24, 25 to 49, or 50 to 75, the detector system further comprising at least one beacon device adapted to direct at least one light beam towards the detector, wherein the beacon device is at least one of attachable to the object, holdable by the object and integratable into the object.

Embodiment 77: A human-machine interface for exchanging at least one item of information between a user and a machine, wherein the human-machine interface comprises at least one detector system according to the preceding embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 78: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 79: A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 80: A scanning system for determining a depth profile of a scenery, the scanning system comprising at least one detector according to any of embodiments 1 to 24, 25 to 49, or 50 to 75, the scanning system further comprising at least one illumination source adapted to scan the scenery with at least one light beam.

Embodiment 81: A camera for imaging at least one object, the camera comprising at least one detector according to any one of embodiments 1 to 24, 25 to 49, or 50 to 75.

Embodiment 82: An inertial measurement unit for use in an electronic device, wherein the inertial measurement unit is adapted to receive data determined by at least one detector according to any one of embodiments 1 to 24, 25 to 49, or 50 to 75, wherein the inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope, wherein the inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, speed.

Embodiment 83: A method for determining at least one material property of at least one object by using at least one detector according to any one of embodiments 1 to 24, the method comprising the following steps:

a) determining at least one reflection image of the object by using at least one sensor element having a matrix of optical sensors, the optical sensors each having a light-sensitive area;

b) determining the material property by evaluating at least one beam profile of the reflection image by using at least one evaluation device, wherein the evaluating comprises:

b1) determining at least one distance feature $\phi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ Which correlates to the depth-from-photon-ratio filter and/or the depth-from-defocus filter or a linear combination thereof by $|\rho_{\phi_{1other}, \phi_z}| \geq 0.40$ with $\phi_2$ being one of the depth-from-photon-ratio filter or the depth-from-defocus filter or a linear combination thereof, b2) determining at least one material feature $\phi_{2m}$ by applying at least one material dependent image filter $\phi_2$ to the reflection image, wherein the material dependent image filter is at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ Which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 2other, \phi x}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof, b3) determining a longitudinal coordinate z and the material property m by evaluating the distance feature $\phi_{1z}$ and the material feature $\phi_{2m}$.

Embodiment 84: A method for determining at least one material property of at least one object by using at least one detector according to any one of embodiments 25 to 49, the method comprising the following steps:

a) determining at least one reflection image of the object by using at least one sensor element having a matrix of optical sensors, the optical sensors each having a light-sensitive area;

b) determining the material property by evaluating at least one beam profile of the reflection image by using at least one evaluation device, wherein the evaluating comprises:

b1) determining at least one distance feature $\phi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1other, \phi x}| \geq 0.40$ with $\phi$ being one of the depth-from-photon-ratio filter or the depth-from-defocus filter or a linear combination thereof, b2) determining at least one material feature $\phi_{2m}$ by applying at least one material dependent image filter $\phi_2$ to the reflection image, wherein the material dependent image filter is at least one filter that passes a hypothesis testing, wherein the hypothesis testing uses a Null-hypothesis that the filter does not distinguish between material classifiers and an alternative hypothesis that the filter distinguishes at least two material classifiers, wherein the filter passes the hypothesis testing if a p-value, p, is smaller or equal than a pre-defined level of significance, b3) determining a longitudinal coordinate z and the material property m by evaluating the distance feature $\phi_{1z}$ and the material feature $\phi_{2m}$.

Embodiment 85: A method for determining at least one material property of at least one object by using at least one detector according to any one of embodiments 50 to 75, the method comprising the following steps:

a) determining at least one reflection image of the object by using at least one sensor element having a matrix of optical sensors, the optical sensors each having a light-sensitive area;

b) determining the material property by evaluating at least one beam profile of the reflection image by using at least one evaluation device, wherein the evaluating comprises:

b1) determining at least one distance feature $\phi_{1z}$ by applying at least one distance dependent image filter $\phi_1$ to the reflection image, wherein the distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1other, \phi x}| \geq 0.40$ with $\phi_2$ being one of the depth-from-photon-ratio filter or the depth-from-defocus filter or a linear combination thereof, b2) determining at least one material feature $\phi_{2m}$ by applying at least one material dependent image filter $\phi_2$ to the reflection image, b3) determining a longitudinal coordinate z and the material property m by evaluating the distance feature $\phi_1$, and the material feature $\phi_{2m}$.

Embodiment 86: A use of the detector according to any one of embodiments 1 to 24, 25 to 49, or 50 to 75, for a purpose of use, selected from the group consisting of: a position measurement in traffic technology; an entertainment application; a security application; a surveillance application; a safety application; a human-machine interface application; a logistics application; a tracking application; an outdoor application; a mobile application; a communication application; a photography application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
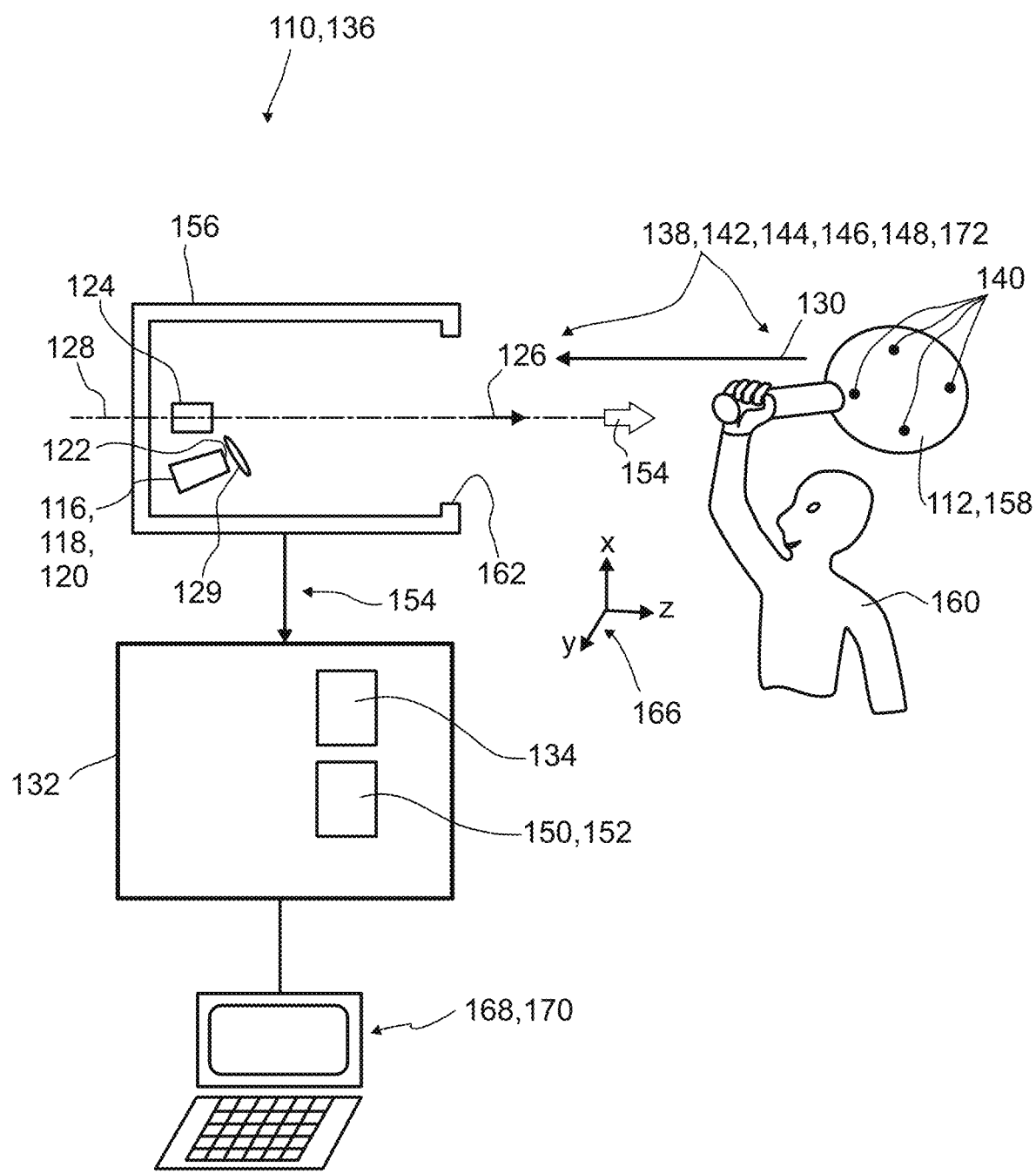
FIG. 1 shows an embodiment of a detector according to the present invention.

FIG. 1 shows in a highly schematic fashion an embodiment of a detector 110 for identifying at least one material property m of at least one object 112. The detector 110 comprises at least one sensor element 116 having a matrix 118 of optical sensors 120. The optical sensors 120 each have a light-sensitive area 122.

The sensor element 116 may be formed as a unitary, single device or as a combination of several devices. The matrix 118 specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix 118 may be a single row of pixels. Other arrangements are feasible.

The optical sensors 120 of the matrix 118 specifically may be equal in one or more of size, sensitivity and other optical, electrical and mechanical properties. The light-sensitive areas 122 of all optical sensors 120 of the matrix 118 specifically may be located in a common plane, the common plane preferably facing the object 112, such that a light beam propagating from the object to the detector 110 may generate a light spot on the common plane. The light-sensitive area 122 may specifically be located on a surface of the respective optical sensor 120. Other embodiments, however, are feasible. The optical sensors 120 may comprise for example, at least one CCD and/or CMOS device. As an example, the optical sensors 120 may be part of or constitute a pixelated optical device. As an example, the optical sensors 120 may be part of or constitute at least one CCD and/or CMOS device having a matrix of pixels, each pixel forming a light-sensitive area 122.

The optical sensors 120 specifically may be or may comprise photodetectors, preferably inorganic photodetectors, more preferably inorganic semiconductor photodetectors, most preferably silicon photodetectors. Specifically, the optical sensors 120 may be sensitive in the infrared spectral range. All of the optical sensors 120 of the matrix 118 or at least a group of the optical sensors 120 of the matrix 118 specifically may be identical. Groups of identical optical sensors 120 of the matrix 118 specifically may be provided for different spectral ranges, or all optical sensors may be identical in terms of spectral sensitivity. Further, the optical sensors 120 may be identical in size and/or with regard to their electronic or optoelectronic properties. The matrix 118 may be composed of independent optical sensors 120. Thus, a matrix 118 of inorganic photodiodes may be composed. Alternatively, however, a commercially available matrix may be used, such as one or more of a CCD detector, such as a CCD detector chip, and/or a CMOS detector, such as a CMOS detector chip.

The optical sensors 120 may form a sensor array or may be part of a sensor array, such as the above-mentioned matrix. Thus, as an example, the detector 110 may comprise an array of optical sensors 120, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤ m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix 118 specifically may be a rectangular matrix having at least one row, preferably a plurality of rows, and a plurality of columns. As an example, the rows and columns may be oriented essentially perpendicular. In order to provide a wide range of view, the matrix 118 specifically may have at least 10 rows, preferably at least 50 rows, more preferably at least 100 rows. Similarly, the matrix may have at least 10 columns, preferably at least 50 columns, more preferably at least 100 columns. The matrix 118 may comprise at least 50 optical sensors 120, preferably at least 100 optical sensors 120, more preferably at least 500 optical sensors 120. The matrix 118 may comprise a number of pixels in a multi-mega pixel range. Other embodiments, however, are feasible.

The detector 110 may further comprise an illumination source 124. As an example, the illumination source 124 may be configured for generating an illumination light beam 126 for illuminating the object 112. The detector 110 may be configured such that the illumination light beam 126 propagates from the detector 110 towards the object 112 along an optical axis 128 of the detector 110. For this purpose, the detector 110 may comprise at least one reflective element, preferably at least one prism, for deflecting the illuminating light beam onto the optical axis 128.

The illumination source 124 may comprise at least one light source. The illumination source 124 may comprise a plurality of light sources. The illumination source 124 may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source 124 may have a wavelength of 300 to 1100 nm, especially 500 to 1100 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1100 nm may be used. Using light in the near infrared region allows that light is not or only weakly detected by human eyes and is still detectable by silicon sensors, in particular standard silicon sensors. The illumination source 124 may be adapted to emit light at a single wavelength. In other embodiments, the illumination may be adapted to emit light with a plurality of wavelengths allowing additional measurements in other wavelengths channels. The light source may be or may comprise at least one multiple beam light source. For example, the light source may comprise at least one laser source and one or more diffractive optical elements (DOEs).

Specifically, the illumination source 124 may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. The illumination source 124 may comprise one or more diffractive optical elements (DOEs) adapted to generate the illumination pattern. For example, the illumination source 124 may be adapted to generate and/or to project a cloud of points, for example the illumination source 124 may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source as the illumination source is particularly preferred. The illumination source 124 may be integrated into a housing of the detector 110.

The illumination light beam 126 may propagate from the object 112 towards the detector 110. The detector 110 may be used in active and/or passive illumination scenarios. For example, the at least one illumination source 124 may be adapted to illuminate the object 112, for example, by directing a light beam towards the object 112, which reflects the light beam. Additionally or alternatively to the at least one illumination source 124, the detector 110 may use radiation already present in the scene such as from at least one ambient light source.

The illumination source 124 may illuminate the at least one object 112 with at least one illumination pattern. The illumination pattern may comprise a plurality of points as image features. These points are illustrated as light beam 126 emerging from the illumination source 124.

The detector 110 may comprise at least one transfer device 129 comprising one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. In particular, the transfer device 129 may comprise at least one collimating lens adapted to focus at least one object point in an image plane.

Each optical sensor 120 may be designed to generate at least one sensor signal in response to an illumination of its respective light-sensitive area 122 by a reflection light beam 130 propagating from the object 112 to the detector 110. The sensor element 116 may be configured for determining at least one reflection image of at least one reflection feature generated by the reflection light beam 130 on the optical sensors 120. The reflection image may be data recorded by using the sensor element 116, such as a plurality of electronic readings from an imaging device, such as the pixels of the sensor element 116. The reflection image itself may comprise pixels, the pixels of the image correlating to pixels of the matrix 118 of the sensor element 116. The matrix 118 may comprise the reflection image 126. For example, in case of illumination with a point pattern, the reflection image may comprise points as reflection features. These points may result from reflection light beams 130 originating from the at least one object 112.

The sensor element 116 may be configured for recording a beam profile of at least one reflection feature of the reflection image. The detector 110 comprises at least one evaluation device 132. The evaluation device 132 may be configured for identifying and/or selecting at least one reflection feature in the reflection image, specifically at least one light spot, provided by the sensor element 116. The evaluation device 132 may be configured for performing at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. Specifically, the evaluation of the reflection image comprises selecting the region of interest in the reflection image. The region of interest may be determined manually by a user or may be determined automatically, such as by recognizing an object within an image generated by the sensor element 116. For example, in case of a spot-like reflection feature the region of interest may be selected as a region around the spot profile.

The evaluation device 132 may be configured for determining the material property m by evaluating the beam profile of the reflection image. The beam profile of the reflection image may be selected from the group consisting of a trapezoid beam profile; a triangle beam profile; a conical beam profile and a linear combination of Gaussian beam profiles. The evaluation device 132 may be configured for applying at least one distance dependent image filter and at least one material dependent image filter to the beam profile and/or to at least one specific region of the beam profile. Specifically, the image filter $\phi$ maps an image f, or a region of interest in the image, onto a real number, $\phi(f(x,y))=\varphi$, wherein $\varphi$ is denotes a feature, in particular a distance feature in case of distance dependent image filters and a material feature in case of material dependent image filters. Images may be subject to noise and the same holds true for features. Therefore, features may be random variables. The features may be normally distributed. If features are not normally distributed, they may be transformed to be normally distributed such as by a Box-Cox-Transformation.

The evaluation device 132 is configured for determining at least one distance feature $\varphi_{1z}$ by applying at least one distance dependent image filter $\phi_1$ to the reflection image. The distance feature may be or may comprise at least one information about the distance of the object 112 such as at least one measure for the distance of the object 112, a distance value, a longitudinal coordinate of the object or the like. The distance dependent image filter is at least one filter selected from the group consisting of: a depth-from-photon-ratio filter; a depth-from-defocus filter; or a linear combination thereof; or a further distance dependent image filter $\phi_{1other}$ which correlates to the depth-from-photon-ratio filter and/or the depth-from-defocus filter or a linear combination thereof by $|\rho_{\phi 1other, \phi z}| \geq 0.40$ with $\phi_2$ being one of the depth-from-photon-ratio filter or the depth-from-defocus filter or a linear combination thereof. The further distance dependent image filter $\phi_{1other}$ may correlate to one or more of the distance dependent image filters $\phi_z$ by $|\rho_{\phi 1other, \phi z}| \geq 0.60$, preferably by $|\rho_{\phi 1other, \phi z}| \geq 0.80$. The similarity of two image filters $\phi_i$ and $\phi_j$ may be assessed through the correlation of their features, specifically, by calculating Pearson's correlation coefficients, $$\rho_{\Phi_i \Phi_j} = \frac{\text{cov}((\Phi_i(f(x, y)) - \mu_i)(\Phi_j(f(x, y)) - \mu_j))}{\sigma_i \sigma_j},$$

wherein $\mu$ and $\sigma$ are mean value and standard deviation of the obtained features. The testing of correlation of filters may be performed using a set of random test images, specifically matrices filled with random numbers. The number of random test images may be chosen as such that the results of the correlation test are statistically significant. The correlation coefficient takes values between −1 and 1, whereas 0 means there is no linear correlation. The correlation coefficients are well suited to determine whether two filters are similar or even equivalent. To measure whether the features of a filter correlate with a given property, for example the distance, the test images may be chosen as such, that a correlated filter actually yields the property. As an example, in order to measure whether the features of a filter correlate with distance, beam profiles recorded in different distances may be used as test images. To obtain a comparable, transferable, and transparent assessment, a fixed test-set of test images may be defined.

For example, the distance dependent image filter may be a depth-from-photon-ratio filter. The depth-from-photon-ratio filter may comprise evaluating a combined signal Q from at least two sensor signals of the sensor element. The evaluation device may be configured for determining the distance feature Piz by evaluation of the combined signal Q. The distance feature determined by evaluation of the combined signal Q may correspond directly to the longitudinal coordinate of the object. The combined signal Q may be determined by using various means. As an example, a software means for deriving the combined signal, a hardware means for deriving the combined signal, or both, may be used and may be implemented in the evaluation device. Thus, the evaluation device 132, as an example, may comprise at least one divider 134, wherein the divider 134 is configured for deriving the quotient signal. The divider 134 may fully or partially be embodied as one or both of a software divider or a hardware divider.

The evaluation device 132 may be configured for deriving the combined signal Q by one or more of dividing the sensor signals, dividing multiples of the sensor signals, dividing linear combinations of the sensor signals. The evaluation device 132 may be configured for using at least one predetermined relationship between the combined signal Q and the distance feature $\phi_{1z}$ for determining the distance feature $\phi_{1z}$. For example, the evaluation device may be configured for deriving the combined signal Q by $$Q(z_O) = \frac{\int\int_{A_1} E(x, y; z_O) dx dy}{\int\int_{A_2} E(x, y; z_O) dx dy},$$

wherein x and y are transversal coordinates, A1 and A2 are different areas of at least one beam profile of the light beam propagating from the object to the detector at the sensor position, and $E(x,y,z_0)$ denotes the beam profile given at the object distance $z_0$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_0)$ and beam shape $S(x,y;z_0)$. Thus, by deriving the combined signal it may allow determining the longitudinal coordinate independent from luminance. In addition, using the combined signal allows determination of the distance $z_0$ independent from the object size. Thus, the combined signal allows determination of the distance $z_0$ independent from the material properties and/or reflective properties and/or scattering properties of the object 112 and independent from alterations of the light source such as by manufacturing precision, heat, water, dirt, damages on the lens, or the like. As an example, the distance dependent feature $\phi_{1z}$ may be a function of the combined signal Q, $\phi_{1z}=\phi_{1z}(Q)$, whereas the function may be a linear, quadratic, or higher order polynomial in Q. Further, as an example, the object distance z, may be a function of the distance dependent feature $\phi_{1z}$, $z_0=z_0(\phi_{1z})$, whereas the function may be a linear, quadratic, or higher order polynomial in $\phi_{1z}$. Thus, the object distance $z_0$ may be a function of the combined signal Q, $z_0=z_0(Q)$, whereas the function may be a linear, quadratic, or higher order polynomial in Q.

The light-sensitive areas 122 of at least two optical sensors 120 may be arranged such that a first sensor signal comprises information of a first area of the beam profile and a second sensor signal comprises information of a second area of the beam profile. The first area of the beam profile and the second area of the beam profile are one or both of adjacent or overlapping regions.

The evaluation device 132 may be configured for determining and/or for selecting the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device 132 may be adapted for determining an area integral of the beam profile. The evaluation device 132 may be adapted to determine the edge information by integrating and/or summing of the first area. The evaluation device 132 may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The evaluation device 132 may be configured for deriving the combined signal Q by one or more of dividing the edge information and the center information, dividing multiples of the edge information and the center information, dividing linear combinations of the edge information and the center information. Thus, essentially, photon ratios may be used as the physical basis of the method.

The evaluation device 132 specifically may be configured for deriving the combined signal Q by dividing the first and second sensor signals, by dividing multiples of the first and second sensor signals or by dividing linear combinations of the first and second sensor signals. As an example, Q may simply be determined as $Q=s_1/s_2$ or $Q=s_2/s_1$, with $s_1$ denoting the first sensor signal and $s_2$ denoting the second sensor signal. Additionally or alternatively, Q may be determined as $Q=a \cdot s_1/b \cdot s_2$ or $Q=b \cdot s_2/a \cdot s_1$, with a and b being real numbers which, as an example, may be predetermined or determinable. Additionally or alternatively, Q may be determined as $Q=(a \cdot s_1+b \cdot s_2)/(c \cdot s_1+d \cdot \phi_2)$, with a, b, c and d being real numbers which, as an example, may be predetermined or determinable. As a simple example for the latter, Q may be determined as $Q=s_1/(s_1+\phi_2)$. Other combined or quotient signals are feasible.

With respect to further details and embodiments of evaluation of the combined signal Q and determination of the longitudinal coordinate z reference e.g. may be made to WO 2018/091640, WO 2018/091649 A1 and WO 2018/091638 A2 the full disclosure of which is incorporated herein by reference.

For example, the distance dependent image filter may be a depth-from-defocus filter. As outlined above, the evaluation device 132 may be configured for determining at least one image of the region of interest from the sensor signals. The evaluation device 132 may be configured for determining from the image the distance feature $\phi_{1z}$ of the object by optimizing at least one blurring function $f_a$. The determined distance feature $\phi_{1z}$ may correspond directly to the longitudinal coordinate of the object. The distance feature $\phi_{1z}$ may be determined by using at least one convolution-based algorithm such as a depth-from-defocus algorithm. To obtain the distance from the image, the depth-from-defocus algorithm estimates the defocus of the object. For this estimation, the blurring function is assumed. Specifically, the blurring function models the blur of a defocused object. The at least one blurring function $f_a$ may be a function or composite function composed from at least one function from the group consisting of: a Gaussian, a sinc function, a pillbox function, a square function, a Lorentzian function, a radial function, a polynomial, a Hermite polynomial, a Zernike polynomial, a Legendre polynomial.

The blurring function may be optimized by varying the parameters of the at least one blurring function. The reflection image may be a blurred image $i_b$. The evaluation device may be configured for reconstructing the distance feature $\phi_{1z}$ from the blurred image $i_b$ and the blurring function $f_a$. The distance feature $\phi_{1z}$ may be determined by minimizing a difference between the blurred image $i_b$ and the convolution of the blurring function $f_a$ with at least one further image $i'_b$, $$\min\|(i'_b * f_a(\sigma(\varphi_{1z})) - i_b)\|,$$

by varying the parameters $\sigma$ of the blurring function. $\sigma(z)$ is a set of distance dependent blurring parameters. The further image may be blurred or sharp. The at least one further image may be generated from the blurred image is by a convolution with a known blurring function. Thus, the depth-from-defocus algorithm may be used to obtain the distance feature $\phi_{1z}$.

The evaluation device 132 may be configured for determining at least one combined distance information z considering the distance feature $\phi_{1z}$ determined by applying the depth-from-photon-ratio filter and the distance feature $\phi_{1z}$ determined by applying the depth-from-defocus filter. The combined distance information z may be a real function depending on the distance feature $\phi_{1z}$ determined by applying the depth-from-photon-ratio filter and the distance feature $\phi_{1z}$ determined by applying the depth-from-defocus filter. The combined distance information z may be a rational or irrational polynomial of the distance feature $\phi_{1z}$ determined by applying the depth-from-photon-ratio filter and the distance feature $\phi_{1z}$ determined by applying the depth-from-defocus filter. Depth-from-defocus is a complementary method to depth-from-photon-ratio but uses a similar hardware set up. Further, depth-from-defocus distance measurements may have a similar accuracy. Combining both technologies may yield to advantageous distance measurement results with enhanced precision.

For example, the distance dependent image filter may be a structured-light-filter in combination with a depth-from-photon-ratio filter and/or a depth-from-defocus image filter. The detector 110 may comprise at least two sensor elements 116 each having a matrix 118 of optical sensors 120. At least one first sensor element and at least one second sensor element may be positioned at different spatial positions. A relative distance between the first sensor element and the second element may be fixed. The at least one first sensor element may be adapted to determine at least one first reflection pattern, in particular at least one first reflection feature, and the at least one second sensor element may be adapted to determine at least one second reflection pattern, in particular at least one second reflection feature. The evaluation device 132 may be configured for selecting at least one image determined by the first sensor element or the second sensor element as reflection image and to select at least one image determined by the other one of the first sensor element or the second sensor element as reference image. The reference image may be determined by one or more of recording at least one reference feature, imaging the at least one reference feature, calculating of the reference image. The reference image and the reflection image may be images of the object determined at different spatial positions having a fixed distance. The distance may be a relative distance, also called baseline. The evaluation device 132 may be adapted to select the at least one reflection feature in the reflection image and to determine at least one distance estimate of the selected reflection feature of the reflection image given by the distance feature $\phi_{1z}$ determined by applying the depth-from-photon ratio image filter and/or the depth-from-defocus image filter and an error interval $\pm\epsilon$.

The evaluation device 132 may be adapted to determine the at least one reference feature in the at least one reference image corresponding to the at least one reflection feature. The evaluation device 132 may be adapted to perform an image analysis and to identify features of the reflection image. The evaluation device 132 may be adapted to identify at least one reference feature in the reference image having an essentially identical longitudinal coordinate as the selected reflection feature. The evaluation device 132 may be adapted to determine an epipolar line in the reference image. The relative position of the reference image and reflection image may be known. For example, the relative position of the reference image and reflection image may be stored within at least one storage unit of the evaluation device. The evaluation device 132 may be adapted to determine a straight line extending from the selected reflection feature of the reflection image. The straight line may comprise possible object features corresponding to the selected feature. The straight line and the baseline span an epipolar plane. As the reference image is determined at a different relative position from the reflection image, the corresponding possible object features may be imaged on a straight line, called epipolar line, in the reference image. Thus, a feature of the reference image corresponding to the selected feature of the reflection image lies on the epipolar line. Due to distortions of the image or changes in the system parameters such as due to ageing, temperature changes, mechanical stress or the like, epipolar lines may intersect or be very close to each other and/or the correspondence between reference feature and reflection feature may be unclear. Further, each known position or object in the real world may be projected onto the reference image and vice versa. The projection may be known due to a calibration of the detector, whereas the calibration is comparable to a teach-in of the epipolar geometry of the specific camera.

The evaluation device 132 may be configured for determining at least one displacement region in the reference image corresponding to the distance estimate. Specifically, the displacement region may be a region in the reference image in which the reference feature corresponding to the selected reflection feature is expected to be located in the reference image. Depending on the distance to the object 112, an image position of the reference feature corresponding to the reflection feature may be displaced within the reference image compared to an image position of the reflection feature in the reflection image. The displacement region may comprise only one reference feature. The displacement region may also comprise more than one reference feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device 132 may be adapted to determine the reference feature along the epipolar line corresponding to the distance feature and to determine an extent of the displacement region along the epipolar line corresponding to the error interval $\pm\epsilon$ or orthogonal to an epipolar line. The measurement uncertainty of the distance estimate may result in a displacement region which is non-circular since the measurement uncertainty may be different for different directions. Specifically, the measurement uncertainty along the epipolar line or epipolar lines may be greater than the measurement uncertainty in an orthogonal direction with respect to the epipolar line or epipolar lines. The displacement region may comprise an extend in an orthogonal direction with respect to the epipolar line or epipolar lines. The evaluation device 132 may determine the displacement region around the image position of the reflection feature. The evaluation device 132 may be adapted to determine the distance estimate and to determine the displacement region along the epipolar line corresponding to $\phi_{1z}\pm\epsilon$.

The evaluation device 132 may be configured for matching the selected feature of the reflection pattern with at least one feature of the reference pattern within the displacement region. The evaluation device 132 may be configured for matching the selected feature of the reflection image with the reference feature within the displacement region by using at least one evaluation algorithm considering the determined distance estimate. The evaluation algorithm may be a linear scaling algorithm. The evaluation device 132 may be adapted to determine the epipolar line closest to and/or within the displacement region. The evaluation device 132 may be adapted to determine the epipolar line closest to the image position of the reflection feature. The extent of the displacement region along the epipolar line may be larger than the extent of the displacement region orthogonal to the epipolar line. The evaluation device may be adapted to determine an epipolar line before determining a corresponding reference feature. The evaluation device 132 may determine a displacement region around the image position of each reflection feature. The evaluation device 132 may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device 132 may be adapted to determine the reference feature corresponding to the image position of the reflection feature by determining the reference feature closest to the assigned displacement region and/or within the assigned displacement region and/or closest to the assigned displacement region along the assigned epipolar line and/or within the assigned displacement region along the assigned epipolar line.

The evaluation device 132 may be configured for determining a displacement of the matched reference feature and the selected reflection feature. The evaluation device 132 may be configured for determining a longitudinal information of the matched features using a predetermined relationship between the longitudinal coordinate and the displacement. For example, the longitudinal information may be a distance value. The predetermined relationship may be one or more of an empiric relationship, a semi-empiric relationship and an analytically derived relationship. The evaluation device 132 may comprise at least one data storage device for storing the predetermined relationship, such as a lookup list or a lookup table. The evaluation device 132 may be adapted to determine the pre-determined relationship by using triangulation methods. In case position of the selected reflection feature in the reflection image and position of the matched reference feature and/or relative displacement of the selected reflection feature and the matched reference feature are known, longitudinal coordinate of the corresponding object feature may be determined by triangulation. Thus, the evaluation device 132 may be adapted to select, for example subsequent and/or column by column, a reflection feature and to determine for each potential position of the reference feature the corresponding distance value using triangulation. Displacement and corresponding distance value may be stored in at least one storage device of the evaluation device 132.

Additionally or alternatively, the evaluation device 132 may be configured for performing the following steps:

Determining the displacement region for the image position of each reflection feature;

Assigning an epipolar line to the displacement region of each reflection feature such as by assigning the epipolar line closest to the displacement region and/or within the displacement region and/or closest to the displacement region along a direction orthogonal to the epipolar line;

Assigning and/or determining at least one reference feature to each reflection feature such as by assigning the reference feature closest to the assigned displacement region and/or within the assigned displacement region and/or closest to the assigned displacement region along the assigned epipolar line and/or within the assigned displacement region along the assigned epipolar line.

The evaluation device 132 is configured for determining at least one material feature $\phi_{2m}$ by applying at least one material dependent image filter $\phi_2$ to the reflection image. The material feature may be or may comprise at least one information about the at least one material property of the object 112.

The material dependent image filter may be at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 2other, \phi z}| \geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof. The further material dependent image filter $\phi_{2other}$ may correlate to one or more of the material dependent image filters $\phi_m$ by $|\rho_{\phi 2other, \phi z}| \geq 0.60$, preferably by $|\rho_{\phi 1other, \phi z}| \geq 0.80$.

With respect to the description of exemplary material dependent image filter, reference is made to the description of the luminance filter, the spot shape filter, the squared norm gradient, the standard deviation, the smoothness filter such as a Gaussian filter or median filter, the grey-level-occurrence-based contrast filter, the grey-level-occurrence-based energy filter, the grey-level-occurrence-based homogeneity filter, the grey-level-occurrence-based dissimilarity filter, the Law's energy filter, and the threshold area filter given above.

The material dependent image filter may be at least one arbitrary filter $\phi$ that passes a hypothesis testing. The hypothesis testing may comprise testing the material dependency of the image filter by applying the image filter to a predefined data set. The data set may comprise a plurality of beam profile images. The beam profile image may be given by a sum of $N_B$ Gaussian radial basis functions, $$f_k(x, y) = \left| \sum_{l=0}^{N_B-1} g_{lk}(x, y) \right|,$$

$$g_{lk}(x, y) = a_{lk} e^{-(\alpha(x-x_{lk}))^2} e^{-(\alpha(y-y_{lk}))^2}$$

wherein each of the $N_B$ Gaussian radial basis functions is defined by a center $(x_{lk}, y_{lk})$, a prefactor, $a_{lk}$, and an exponential factor $\alpha = 1/\epsilon$. The exponential factor is identical for all Gaussian functions in all beam profile images. The center-positions, $x_{lk}, y_{lk}$, are identical for all images $f_k:(x_0, x_1, \ldots, x_{N_B}), (y_0, y_1, \ldots, y_{N_B})$. The beam profile images may be generated by using the above formula for $f_k(x,y)$ in combination with the following parameter table:

| Image Index | Material classifier, Material Index | Distance z | Parameters |
|---|---|---|---|
| k = 0 | Skin, m = 0 | 0.4 m | $(a_{00}, a_{10}, \ldots, a_{N_B-10})$ |
| k = 1 | Skin, m = 0 | 0.6 m | $(a_{01}, a_{11}, \ldots, a_{N_B-11})$ |
| k = 2 | Fabric, m = 1 | 0.6 m | $(a_{02}, a_{12}, \ldots, a_{N_B-12})$ |
| . | . | . | |
| . | . | . | |
| k = N | Material J, m = J − 1 | | $(a_{0N}, a_{1N}, \ldots, a_{N_B-1N})$ |

The values for x, y, are integers corresponding to pixels with $$\binom{x}{y} \in [0, 1, \ldots 31]^2.$$

Figure 3:
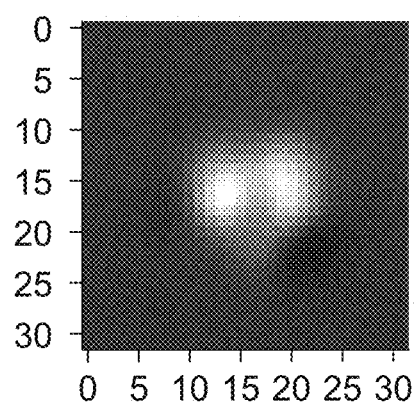
FIG. 3 shows a beam profile image.

The images may have a pixel size of 32×32. The dataset of beam profile images may be generated by using the above formula for $f_k$ in combination with a parameter set to obtain a continuous description of $f_k$. The values for each pixel in the 32×32-image may be obtained by inserting integer values from 0, ..., 31 for x, y, in $f_k(x,y)$. For example, for pixel (6,9), the value $f_k(6,9)$ may be computed. FIG. 3 shows an embodiment of a beam profile image defined by an exemplary data set.

An exemplary data set is presented in the following. The following parameter tables list the center positions, $x_{lk}=x_l$, $y_{lk}=y_l$, of all Gaussian functions $g_{lk}$ for all images $f_k$:

| l | 0 | 1 | 2 | 3 | 4 | 5 | 6 | 7 |
|---|---|---|---|---|---|---|---|---|
| $x_l$ | 14 | 11 | 10 | 19 | 15 | 20 | 12 | 17 |
| $y_l$ | 17 | 11 | 17 | 19 | 20 | 20 | 12 | 20 |

| l | 8 | 9 | 10 | 11 | 12 | 13 | 14 | 15 |
|---|---|---|---|---|---|---|---|---|
| $x_l$ | 13 | 18 | 10 | 14 | 19 | 15 | 16 | 12 |
| $y_l$ | 17 | 19 | 8 | 18 | 14 | 11 | 22 | 17 |

| l | 16 | 17 | 18 | 19 | 20 | 21 | 22 | 23 |
|---|---|---|---|---|---|---|---|---|
| $x_l$ | 25 | 13 | 18 | 8 | 9 | 10 | 14 | 19 |
| $y_l$ | 15 | 20 | 20 | 15 | 14 | 13 | 24 | 24 |

| l | 24 | 25 | 26 | 27 | 28 | 29 | 30 | 31 |
|---|---|---|---|---|---|---|---|---|
| $x_l$ | 10 | 9 | 14 | 12 | 19 | 20 | 17 | 15 |
| $y_l$ | 24 | 16 | 15 | 11 | 13 | 19 | 13 | 14 |

| l | 32 | 33 | 34 | 35 | 36 | 37 | 38 | 39 |
|---|---|---|---|---|---|---|---|---|
| $x_l$ | 16 | 13 | 12 | 20 | 18 | 17 | 21 | 13 |
| $y_l$ | 19 | 10 | 22 | 14 | 10 | 18 | 15 | 23 |

| l | 40 | 41 | 42 | 43 | 44 | 45 | 46 | 47 |
|---|---|---|---|---|---|---|---|---|
| $x_l$ | 8 | 10 | 8 | 14 | 19 | 11 | 15 | 14 |
| $y_l$ | 12 | 14 | 18 | 21 | 23 | 15 | 16 | 8 |

| l | 48 | 49 | 50 | 51 | 52 | 53 | 54 | 55 |
|---|---|---|---|---|---|---|---|---|
| $x_l$ | 16 | 20 | 11 | 17 | 16 | 15 | 21 | 13 |
| $y_l$ | 13 | 16 | 16 | 8 | 16 | 13 | 21 | 13 |

| l | 56 | 57 | 58 | 59 | 60 | 61 | 62 | 63 |
|---|---|---|---|---|---|---|---|---|
| $x_l$ | 22 | 18 | 23 | 14 | 19 | 11 | 15 | 16 |
| $y_l$ | 23 | 15 | 12 | 22 | 18 | 10 | 23 | 10 |

The following parameter tables list the material classifiers, in particular for a white Teflon target (denoted control), a fabric, a dark skin (denoted as dark_skin), a pale skin (denoted pale_skin), and a highly translucent skin (denoted trans), and the distance z for each image $f_k$, referenced by the image index k:

| k | material classifier | Distance z |
|---|---|---|
| 0 | control | 0.4 |
| 1 | control | 0.4 |
| 2 | control | 0.4 |
| 3 | control | 0.4 |
| 4 | control | 0.4 |
| 5 | control | 0.4 |
| 6 | control | 0.4 |
| 7 | control | 0.4 |
| 8 | control | 0.4 |
| 9 | control | 0.4 |
| 10 | control | 0.4 |
| 11 | control | 0.4 |
| 12 | control | 0.4 |
| 13 | control | 0.4 |
| 14 | control | 0.4 |
| 15 | control | 0.4 |

-continued

| k | material classifier | Distance z |
|---|---|---|
| 16 | fabric | 0.4 |
| 17 | fabric | 0.4 |
| 18 | fabric | 0.4 |
| 19 | fabric | 0.4 |
| 20 | fabric | 0.4 |
| 21 | fabric | 0.4 |
| 22 | fabric | 0.4 |
| 23 | fabric | 0.4 |
| 24 | fabric | 0.4 |
| 25 | fabric | 0.4 |
| 26 | fabric | 0.4 |
| 27 | fabric | 0.4 |
| 28 | fabric | 0.4 |
| 29 | fabric | 0.4 |
| 30 | fabric | 0.4 |
| 31 | fabric | 0.4 |
| 32 | dark_skin | 0.4 |
| 33 | dark_skin | 0.4 |
| 34 | dark_skin | 0.4 |
| 35 | dark_skin | 0.4 |
| 36 | dark_skin | 0.4 |
| 37 | dark_skin | 0.4 |
| 38 | dark_skin | 0.4 |
| 39 | dark_skin | 0.4 |
| 40 | dark_skin | 0.4 |
| 41 | dark_skin | 0.4 |
| 42 | dark_skin | 0.4 |
| 43 | dark_skin | 0.4 |
| 44 | dark_skin | 0.4 |
| 45 | dark_skin | 0.4 |
| 46 | dark_skin | 0.4 |
| 47 | dark_skin | 0.4 |
| 48 | pale_skin | 0.4 |
| 49 | pale_skin | 0.4 |
| 50 | pale_skin | 0.4 |
| 51 | pale_skin | 0.4 |
| 52 | pale_skin | 0.4 |
| 53 | pale_skin | 0.4 |
| 54 | pale_skin | 0.4 |
| 55 | pale_skin | 0.4 |
| 56 | pale_skin | 0.4 |
| 57 | pale_skin | 0.4 |
| 58 | pale_skin | 0.4 |
| 59 | pale_skin | 0.4 |
| 60 | pale_skin | 0.4 |
| 61 | pale_skin | 0.4 |
| 62 | pale_skin | 0.4 |
| 63 | pale_skin | 0.4 |
| 64 | trans | 0.4 |
| 65 | trans | 0.4 |
| 66 | trans | 0.4 |
| 67 | trans | 0.4 |
| 68 | trans | 0.4 |
| 69 | trans | 0.4 |
| 70 | trans | 0.4 |
| 71 | trans | 0.4 |
| 72 | trans | 0.4 |
| 73 | trans | 0.4 |
| 74 | trans | 0.4 |
| 75 | trans | 0.4 |
| 76 | trans | 0.4 |
| 77 | trans | 0.4 |
| 78 | trans | 0.4 |
| 79 | trans | 0.4 |
| 80 | control | 0.6 |
| 81 | control | 0.6 |
| 82 | control | 0.6 |
| 83 | control | 0.6 |
| 84 | control | 0.6 |
| 85 | control | 0.6 |
| 86 | control | 0.6 |
| 87 | control | 0.6 |
| 88 | control | 0.6 |
| 89 | control | 0.6 |
| 90 | control | 0.6 |
| 91 | control | 0.6 |
| 92 | control | 0.6 |

-continued

| k | material classifier | Distance z |
|---|---|---|
| 93 | control | 0.6 |
| 94 | control | 0.6 |
| 95 | control | 0.6 |
| 96 | fabric | 0.6 |
| 97 | fabric | 0.6 |
| 98 | fabric | 0.6 |
| 99 | fabric | 0.6 |
| 100 | fabric | 0.6 |
| 101 | fabric | 0.6 |
| 102 | fabric | 0.6 |
| 103 | fabric | 0.6 |
| 104 | fabric | 0.6 |
| 105 | fabric | 0.6 |
| 106 | fabric | 0.6 |
| 107 | fabric | 0.6 |
| 108 | fabric | 0.6 |
| 109 | fabric | 0.6 |
| 110 | fabric | 0.6 |
| 111 | fabric | 0.6 |
| 112 | dark_skin | 0.6 |
| 113 | dark_skin | 0.6 |
| 114 | dark_skin | 0.6 |
| 115 | dark_skin | 0.6 |
| 116 | dark_skin | 0.6 |
| 117 | dark_skin | 0.6 |
| 118 | dark_skin | 0.6 |
| 119 | dark_skin | 0.6 |
| 120 | dark_skin | 0.6 |
| 121 | dark_skin | 0.6 |
| 122 | dark_skin | 0.6 |
| 123 | dark_skin | 0.6 |
| 124 | dark_skin | 0.6 |
| 125 | dark_skin | 0.6 |
| 126 | dark_skin | 0.6 |
| 127 | dark_skin | 0.6 |
| 128 | pale_skin | 0.6 |
| 129 | pale_skin | 0.6 |
| 130 | pale_skin | 0.6 |
| 131 | pale_skin | 0.6 |
| 132 | pale_skin | 0.6 |
| 133 | pale_skin | 0.6 |
| 134 | pale_skin | 0.6 |
| 135 | pale_skin | 0.6 |
| 136 | pale_skin | 0.6 |
| 137 | pale_skin | 0.6 |
| 138 | pale_skin | 0.6 |
| 139 | pale_skin | 0.6 |
| 140 | pale_skin | 0.6 |
| 141 | pale_skin | 0.6 |
| 142 | pale_skin | 0.6 |
| 143 | pale_skin | 0.6 |
| 144 | trans | 0.6 |
| 145 | trans | 0.6 |
| 146 | trans | 0.6 |
| 147 | trans | 0.6 |
| 148 | trans | 0.6 |
| 149 | trans | 0.6 |
| 150 | trans | 0.6 |
| 151 | trans | 0.6 |
| 152 | trans | 0.6 |
| 153 | trans | 0.6 |
| 154 | trans | 0.6 |
| 155 | trans | 0.6 |
| 156 | trans | 0.6 |
| 157 | trans | 0.6 |
| 158 | trans | 0.6 |
| 159 | trans | 0.6 |
| 160 | control | 0.8 |
| 161 | control | 0.8 |
| 162 | control | 0.8 |
| 163 | control | 0.8 |
| 164 | control | 0.8 |
| 165 | control | 0.8 |
| 166 | control | 0.8 |
| 167 | control | 0.8 |
| 168 | control | 0.8 |
| 169 | control | 0.8 |
| 170 | control | 0.8 |
| 171 | control | 0.8 |
| 172 | control | 0.8 |
| 173 | control | 0.8 |
| 174 | control | 0.8 |
| 175 | control | 0.8 |
| 176 | fabric | 0.8 |
| 177 | fabric | 0.8 |
| 178 | fabric | 0.8 |
| 179 | fabric | 0.8 |
| 180 | fabric | 0.8 |
| 181 | fabric | 0.8 |
| 182 | fabric | 0.8 |
| 183 | fabric | 0.8 |
| 184 | fabric | 0.8 |
| 185 | fabric | 0.8 |
| 186 | fabric | 0.8 |
| 187 | fabric | 0.8 |
| 188 | fabric | 0.8 |
| 189 | fabric | 0.8 |
| 190 | fabric | 0.8 |
| 191 | fabric | 0.8 |
| 192 | dark_skin | 0.8 |
| 193 | dark_skin | 0.8 |
| 194 | dark_skin | 0.8 |
| 195 | dark_skin | 0.8 |
| 196 | dark_skin | 0.8 |
| 197 | dark_skin | 0.8 |
| 198 | dark_skin | 0.8 |
| 199 | dark_skin | 0.8 |
| 200 | dark_skin | 0.8 |
| 201 | dark_skin | 0.8 |
| 202 | dark_skin | 0.8 |
| 203 | dark_skin | 0.8 |
| 204 | dark_skin | 0.8 |
| 205 | dark_skin | 0.8 |
| 206 | dark_skin | 0.8 |
| 207 | dark_skin | 0.8 |
| 208 | pale_skin | 0.8 |
| 209 | pale_skin | 0.8 |
| 210 | pale_skin | 0.8 |
| 211 | pale_skin | 0.8 |
| 212 | pale_skin | 0.8 |
| 213 | pale_skin | 0.8 |
| 214 | pale_skin | 0.8 |
| 215 | pale_skin | 0.8 |
| 216 | pale_skin | 0.8 |
| 217 | pale_skin | 0.8 |
| 218 | pale_skin | 0.8 |
| 219 | pale_skin | 0.8 |
| 220 | pale_skin | 0.8 |
| 221 | pale_skin | 0.8 |
| 222 | pale_skin | 0.8 |
| 223 | pale_skin | 0.8 |
| 224 | trans | 0.8 |
| 225 | trans | 0.8 |
| 226 | trans | 0.8 |
| 227 | trans | 0.8 |
| 228 | trans | 0.8 |
| 229 | trans | 0.8 |
| 230 | trans | 0.8 |
| 231 | trans | 0.8 |
| 232 | trans | 0.8 |
| 233 | trans | 0.8 |
| 234 | trans | 0.8 |
| 235 | trans | 0.8 |
| 236 | trans | 0.8 |
| 237 | trans | 0.8 |
| 238 | trans | 0.8 |
| 239 | trans | 0.8 |

The following parameter tables list the prefactors $a_{lk}$ for the Gaussian functions $g_{lk}$ in each image $f_k$ referenced by the image index k and the Gaussian index l:

| k | a0k | a1k | a2k | a3k | a4k | a5k | a6k | a7k |
|---|---|---|---|---|---|---|---|---|
| 0 | 291.94 | −7.20 | −14.72 | −22.75 | 32.57 | 16.92 | −45.50 | −23.31 |
| 1 | 300.91 | −7.58 | −15.22 | −14.41 | 32.18 | 15.96 | −44.41 | −23.92 |
| 2 | 297.04 | −6.42 | −13.94 | −10.30 | 31.19 | 16.44 | −43.68 | −22.27 |
| 3 | 289.98 | −7.67 | −14.20 | −13.60 | 31.68 | 17.16 | −44.04 | −21.41 |
| 4 | 295.94 | −7.72 | −12.93 | −16.81 | 32.77 | 15.92 | −45.15 | −22.30 |
| 5 | 295.37 | −6.87 | −13.30 | −15.51 | 33.10 | 16.70 | −45.18 | −22.29 |
| 6 | 298.03 | −6.79 | −14.89 | −12.68 | 32.43 | 14.46 | −44.47 | −22.71 |
| 7 | 296.95 | −7.09 | −14.98 | −13.54 | 31.56 | 15.69 | −45.09 | −20.03 |
| 8 | 306.69 | −6.91 | −14.94 | −14.27 | 33.28 | 16.02 | −43.93 | −20.21 |
| 9 | 291.40 | −7.73 | −13.91 | −14.95 | 30.51 | 16.18 | −45.86 | −21.61 |
| 10 | 301.21 | −7.21 | −14.05 | −17.46 | 32.02 | 17.26 | −45.02 | −22.89 |
| 11 | 309.78 | −6.93 | −13.47 | −19.23 | 33.01 | 14.94 | −43.61 | −20.86 |
| 12 | 298.62 | −7.09 | −14.75 | −18.43 | 32.59 | 18.97 | −44.11 | −22.73 |
| 13 | 296.09 | −7.18 | −14.25 | −15.83 | 31.94 | 14.62 | −43.72 | −19.77 |
| 14 | 301.13 | −7.24 | −14.44 | −19.11 | 33.54 | 17.01 | −44.08 | −21.39 |
| 15 | 304.28 | −7.08 | −14.10 | −17.26 | 32.54 | 16.81 | −44.40 | −21.14 |
| 16 | 246.71 | −3.77 | −13.62 | 1.43 | 19.38 | −2.03 | −52.50 | −19.62 |
| 17 | 258.85 | −3.11 | −12.88 | −3.91 | 19.02 | −1.05 | −49.64 | −21.50 |
| 18 | 263.06 | −2.91 | −13.72 | 1.65 | 19.03 | −1.26 | −51.02 | −21.58 |
| 19 | 251.12 | −4.15 | −12.47 | −6.19 | 19.00 | −1.26 | −50.65 | −22.40 |
| 20 | 250.05 | −2.91 | −13.84 | 0.30 | 19.48 | −1.79 | −49.89 | −20.92 |
| 21 | 249.35 | −2.80 | −13.64 | −0.25 | 18.90 | 0.42 | −51.29 | −19.21 |
| 22 | 260.34 | −2.57 | −14.30 | 1.83 | 17.72 | −1.18 | −51.27 | −24.07 |
| 23 | 246.64 | −3.68 | −13.92 | −2.29 | 19.79 | −0.20 | −50.33 | −23.09 |
| 24 | 245.58 | −2.91 | −15.25 | −6.59 | 18.34 | −1.75 | −50.89 | −24.38 |
| 25 | 249.09 | −3.09 | −14.13 | 3.85 | 19.58 | −1.58 | −50.05 | −22.87 |
| 26 | 255.98 | −2.91 | −13.67 | 6.77 | 18.09 | −2.15 | −48.40 | −21.74 |
| 27 | 249.87 | −3.43 | −13.89 | 1.80 | 17.14 | −2.32 | −50.95 | −25.65 |
| 28 | 247.42 | −3.34 | −13.32 | 2.32 | 17.69 | −1.29 | −50.40 | −23.82 |
| 29 | 253.00 | −3.32 | −12.60 | 4.98 | 17.09 | −1.16 | −49.54 | −25.89 |
| 30 | 254.40 | −3.44 | −14.69 | 1.64 | 20.18 | −1.15 | −49.66 | −22.73 |
| 31 | 256.40 | −3.75 | −13.62 | −8.47 | 19.57 | −1.08 | −52.04 | −21.62 |
| 32 | 24.07 | −2.06 | 2.98 | −22.09 | 14.88 | 8.52 | 3.28 | −4.27 |
| 33 | 24.00 | −1.30 | 3.15 | −22.28 | 14.65 | 9.22 | 3.94 | −4.75 |
| 34 | 20.76 | −1.69 | 3.24 | −22.34 | 14.81 | 8.95 | 3.76 | −4.69 |
| 35 | 22.23 | −2.51 | 3.10 | −22.85 | 14.01 | 9.71 | 3.29 | −4.61 |
| 36 | 20.33 | −2.23 | 3.04 | −21.40 | 15.61 | 8.99 | 3.00 | −4.12 |
| 37 | 21.12 | −2.09 | 3.25 | −26.46 | 14.68 | 8.75 | 4.67 | −5.05 |
| 38 | 21.89 | −1.92 | 3.05 | −22.32 | 14.65 | 8.25 | 3.77 | −4.15 |
| 39 | 14.81 | −2.07 | 2.82 | −20.92 | 14.96 | 9.05 | 3.73 | −5.40 |

| k | a8k | a9k | a10k | a11k | a12k | a13k | a14k | a15k |
|---|---|---|---|---|---|---|---|---|
| 0 | −95.90 | −116.79 | 0.49 | −92.61 | −76.01 | 36.70 | 0.46 | 78.40 |
| 1 | −99.07 | −117.11 | 0.57 | −89.09 | −76.31 | 37.12 | −0.60 | 86.28 |
| 2 | −92.44 | −115.78 | 0.59 | −93.89 | −76.95 | 35.15 | 0.42 | 83.74 |
| 3 | −96.50 | −115.93 | 0.49 | −92.28 | −75.29 | 36.48 | −0.17 | 70.45 |
| 4 | −100.83 | −120.58 | 0.57 | −95.39 | −73.94 | 37.36 | −0.26 | 79.80 |
| 5 | −94.89 | −117.93 | 0.59 | −93.45 | −75.67 | 36.88 | 0.22 | 74.29 |
| 6 | −94.27 | −119.97 | 0.51 | −91.14 | −74.61 | 35.76 | −0.72 | 73.46 |
| 7 | −94.78 | −114.15 | 0.55 | −91.40 | −71.49 | 36.55 | −0.61 | 73.29 |
| 8 | −97.53 | −112.61 | 0.54 | −91.30 | −70.94 | 36.62 | 0.39 | 75.30 |
| 9 | −97.85 | −108.91 | 0.57 | −94.07 | −72.52 | 36.34 | −0.32 | 76.34 |
| 10 | −97.23 | −115.13 | 0.64 | −95.38 | −74.62 | 36.22 | −0.33 | 74.11 |
| 11 | −96.18 | −115.91 | 0.45 | −93.13 | −77.72 | 37.20 | −0.07 | 81.82 |
| 12 | −100.79 | −113.16 | 0.52 | −90.33 | −72.38 | 36.46 | −1.02 | 74.17 |
| 13 | −98.70 | −124.58 | 0.53 | −93.48 | −74.52 | 36.90 | −0.78 | 74.38 |
| 14 | −93.07 | −116.00 | 0.52 | −92.98 | −75.28 | 36.84 | −0.77 | 76.49 |
| 15 | −106.83 | −117.44 | 0.52 | −94.22 | −75.28 | 36.42 | −0.51 | 79.82 |
| 16 | −88.58 | −87.41 | 0.63 | −70.05 | −37.06 | 27.50 | 3.58 | 84.26 |
| 17 | −87.71 | −82.32 | 0.54 | −68.18 | −40.98 | 28.10 | 3.20 | 88.34 |
| 18 | −76.19 | −80.81 | 0.53 | −66.95 | −35.36 | 27.23 | 3.61 | 87.52 |
| 19 | −80.42 | −84.95 | 0.55 | −67.91 | −38.39 | 27.70 | 3.39 | 90.71 |
| 20 | −87.87 | −76.07 | 0.74 | −66.04 | −39.03 | 27.55 | 2.84 | 83.83 |
| 21 | −93.60 | −80.04 | 0.45 | −69.48 | −38.83 | 27.01 | 3.71 | 83.32 |
| 22 | −88.04 | −78.17 | 0.62 | −72.00 | −39.30 | 27.85 | 3.08 | 89.23 |
| 23 | −88.92 | −76.16 | 0.62 | −66.79 | −39.81 | 27.64 | 3.01 | 84.46 |
| 24 | −90.47 | −77.18 | 0.58 | −66.41 | −35.84 | 27.85 | 3.13 | 94.66 |
| 25 | −89.84 | −83.96 | 0.70 | −64.36 | −36.65 | 26.40 | 3.38 | 86.08 |
| 26 | −81.82 | −72.08 | 0.59 | −66.39 | −38.13 | 27.45 | 3.47 | 83.27 |
| 27 | −80.57 | −82.11 | 0.65 | −66.61 | −35.78 | 28.23 | 3.99 | 86.32 |
| 28 | −93.40 | −81.19 | 0.66 | −68.45 | −39.71 | 26.68 | 3.19 | 88.66 |
| 29 | −92.92 | −79.14 | 0.68 | −64.90 | −38.61 | 28.11 | 3.79 | 83.05 |
| 30 | −91.82 | −79.09 | 0.57 | −66.39 | −37.74 | 27.24 | 4.20 | 82.26 |
| 31 | −90.60 | −82.20 | 0.51 | −67.61 | −35.58 | 28.10 | 3.02 | 89.40 |
| 32 | −0.54 | −16.54 | −0.31 | −3.67 | −33.80 | 4.91 | 1.87 | 11.78 |
| 33 | −0.17 | −16.06 | −0.31 | −2.39 | −32.09 | 4.41 | 1.86 | 11.66 |
| 34 | −3.04 | −15.03 | −0.34 | −5.36 | −31.98 | 4.17 | 1.76 | 11.91 |
| 35 | −5.65 | −15.79 | −0.35 | −2.71 | −32.21 | 4.77 | 1.90 | 10.71 |

-continued

| | | | | | | | | |
|---|---|---|---|---|---|---|---|---|
| 36 | −6.54 | −15.97 | −0.29 | −3.29 | −33.09 | 4.26 | 1.69 | 14.99 |
| 37 | −1.22 | −16.20 | −0.29 | −2.79 | −32.90 | 4.42 | 1.93 | 9.92 |
| 38 | −3.85 | −13.17 | −0.22 | −2.98 | −33.98 | 4.68 | 1.84 | 11.96 |
| 39 | −5.99 | −12.87 | −0.34 | −2.53 | −34.59 | 3.97 | 1.80 | 11.77 |

| k | a16k | a17k | a18k | a19k | a20k | a21k | a22k | a23k |
|---|---|---|---|---|---|---|---|---|
| 0 | 3.86 | 18.38 | 66.68 | 70.89 | 46.30 | 51.83 | 63.61 | 6.33 |
| 1 | −1.41 | 18.18 | 66.65 | −116.27 | 47.93 | 53.00 | −19.71 | 6.14 |
| 2 | 5.49 | 17.64 | 67.40 | 86.57 | 47.99 | 51.08 | −20.20 | 6.06 |
| 3 | 1.41 | 18.29 | 68.83 | −73.86 | 49.40 | 52.06 | −9.49 | 6.14 |
| 4 | 0.58 | 17.86 | 70.11 | 73.41 | 47.45 | 52.04 | 19.20 | 6.06 |
| 5 | −0.96 | 18.19 | 71.29 | 12.08 | 48.40 | 52.10 | 36.63 | 6.18 |
| 6 | −0.98 | 18.97 | 69.33 | 107.17 | 48.12 | 51.68 | −30.34 | 6.21 |
| 7 | 1.44 | 17.76 | 67.10 | −119.11 | 46.64 | 51.64 | −19.85 | 6.11 |
| 8 | 2.83 | 18.10 | 66.62 | 42.19 | 47.28 | 52.29 | −24.88 | 6.17 |
| 9 | −0.87 | 17.50 | 68.71 | −129.91 | 45.89 | 51.63 | −43.44 | 6.23 |
| 10 | 1.24 | 18.26 | 66.88 | −12.32 | 47.49 | 52.45 | 45.87 | 6.14 |
| 11 | 0.39 | 18.50 | 68.03 | −103.43 | 47.42 | 52.40 | −25.17 | 6.01 |
| 12 | 1.60 | 18.13 | 67.42 | −159.30 | 48.41 | 52.43 | −8.06 | 6.08 |
| 13 | 2.92 | 17.75 | 68.36 | 139.40 | 45.89 | 52.74 | −16.56 | 6.19 |
| 14 | 1.69 | 17.80 | 68.48 | −16.76 | 46.43 | 52.86 | −15.34 | 6.20 |
| 15 | 0.66 | 17.51 | 68.30 | −16.84 | 46.61 | 52.23 | −12.07 | 6.00 |
| 16 | 1.53 | 10.12 | 45.53 | −105.48 | 51.47 | 53.43 | 29.32 | 3.91 |
| 17 | −0.83 | 10.67 | 47.22 | −65.54 | 49.74 | 55.32 | −3.14 | 3.90 |
| 18 | −0.05 | 11.56 | 46.07 | −38.72 | 50.65 | 54.17 | −71.99 | 3.87 |
| 19 | 1.11 | 10.54 | 47.56 | −22.99 | 50.63 | 54.47 | 19.05 | 3.81 |
| 20 | −2.77 | 10.45 | 46.29 | 102.12 | 50.39 | 54.05 | −21.67 | 3.88 |
| 21 | 1.51 | 11.03 | 46.20 | −61.41 | 52.28 | 55.89 | 51.76 | 4.01 |
| 22 | −2.08 | 11.82 | 45.96 | 121.36 | 49.18 | 55.21 | −44.05 | 3.89 |
| 23 | −0.13 | 10.89 | 46.21 | 34.94 | 52.82 | 54.93 | 26.48 | 3.82 |
| 24 | −3.52 | 10.89 | 49.08 | 97.01 | 50.10 | 55.70 | 4.07 | 3.65 |
| 25 | 2.07 | 9.39 | 46.08 | −53.59 | 51.65 | 53.65 | 4.94 | 3.97 |
| 26 | 0.44 | 11.04 | 47.23 | −188.70 | 49.01 | 55.21 | 30.06 | 4.08 |
| 27 | −4.62 | 9.33 | 47.59 | 141.42 | 51.09 | 54.20 | −1.25 | 3.95 |
| 28 | −1.78 | 10.70 | 45.70 | −47.29 | 49.84 | 54.81 | 40.79 | 3.71 |
| 29 | −2.45 | 10.65 | 47.01 | −32.51 | 51.18 | 53.56 | 11.77 | 3.93 |
| 30 | 0.03 | 10.49 | 43.45 | −149.80 | 50.93 | 53.95 | 14.36 | 3.83 |
| 31 | 3.37 | 10.57 | 46.51 | 20.87 | 49.67 | 54.60 | 22.79 | 3.96 |
| 32 | 0.86 | 7.55 | 19.63 | −6.16 | 7.11 | 9.03 | −20.02 | 1.08 |
| 33 | −1.54 | 7.76 | 20.22 | 38.99 | 7.26 | 8.99 | −10.41 | 1.12 |
| 34 | −0.19 | 7.43 | 18.78 | 21.86 | 7.75 | 8.86 | −16.09 | 1.15 |
| 35 | −2.22 | 7.79 | 19.15 | 4.23 | 7.44 | 8.75 | 19.94 | 1.06 |
| 36 | −1.11 | 7.83 | 20.15 | 20.92 | 6.25 | 8.80 | −31.48 | 1.06 |
| 37 | −0.31 | 7.90 | 19.64 | 8.33 | 7.22 | 9.07 | 18.83 | 1.12 |
| 38 | −1.59 | 7.27 | 19.37 | −18.56 | 6.82 | 8.51 | 21.93 | 1.10 |
| 39 | −1.18 | 7.41 | 19.11 | 85.48 | 7.72 | 8.69 | −17.48 | 1.01 |

| k | a24k | a25k | a26k | a27k | a28k | a29k | a30k | a31k |
|---|---|---|---|---|---|---|---|---|
| 0 | −2.45 | 11.03 | 80.28 | 37.44 | 26.08 | −32.86 | −12.63 | 179.34 |
| 1 | 4.01 | 11.52 | 78.78 | 37.44 | 24.32 | −34.91 | −12.16 | 180.51 |
| 2 | −3.35 | 10.90 | 81.50 | 37.26 | 24.80 | −33.69 | −10.77 | 180.89 |
| 3 | 1.73 | 10.84 | 80.38 | 37.51 | 25.47 | −36.57 | −15.88 | 183.66 |
| 4 | 1.27 | 9.42 | 81.14 | 38.14 | 25.13 | −35.66 | −13.87 | 180.51 |
| 5 | −1.05 | 10.89 | 78.62 | 35.99 | 24.44 | −34.31 | −10.65 | 181.52 |
| 6 | −0.46 | 10.30 | 81.92 | 35.89 | 24.74 | −34.63 | −15.73 | 180.07 |
| 7 | 2.40 | 10.57 | 78.99 | 37.01 | 23.94 | −34.87 | −12.35 | 183.67 |
| 8 | 1.32 | 10.56 | 80.87 | 37.45 | 24.70 | −35.58 | −16.41 | 180.05 |
| 9 | 1.05 | 9.87 | 79.26 | 37.63 | 24.52 | −33.58 | −12.25 | 178.55 |
| 10 | −0.78 | 9.63 | 81.05 | 38.38 | 25.20 | −33.14 | −13.41 | 176.95 |
| 11 | 3.17 | 10.63 | 81.55 | 37.98 | 24.25 | −32.39 | −8.97 | 178.12 |
| 12 | −0.12 | 10.57 | 81.11 | 38.18 | 25.06 | −32.51 | −14.47 | 180.98 |
| 13 | −3.92 | 11.23 | 81.59 | 37.07 | 24.28 | −35.06 | −13.10 | 179.20 |
| 14 | −1.14 | 11.04 | 81.63 | 36.75 | 25.25 | −34.70 | −11.65 | 180.54 |
| 15 | 1.46 | 11.05 | 80.55 | 36.57 | 23.89 | −33.64 | −12.62 | 181.91 |
| 16 | −5.70 | 11.70 | 54.00 | 34.44 | 12.44 | −14.39 | −12.01 | 171.54 |
| 17 | −0.70 | 12.09 | 55.21 | 34.71 | 9.92 | −17.13 | −11.70 | 168.02 |
| 18 | −3.57 | 11.69 | 53.52 | 34.81 | 11.95 | −13.55 | −12.37 | 172.64 |
| 19 | −3.32 | 12.04 | 54.84 | 35.03 | 11.31 | −16.56 | −8.97 | 169.62 |
| 20 | 2.59 | 12.21 | 55.48 | 35.95 | 11.23 | −16.53 | −9.56 | 169.59 |
| 21 | 2.54 | 12.19 | 54.25 | 35.20 | 10.76 | −16.90 | −12.28 | 169.58 |
| 22 | −3.44 | 11.69 | 55.10 | 35.89 | 12.10 | −18.59 | −8.83 | 171.87 |
| 23 | 0.56 | 12.26 | 53.50 | 35.39 | 10.43 | −17.85 | −6.90 | 169.62 |
| 24 | 1.18 | 11.85 | 54.90 | 34.61 | 11.57 | −14.31 | −8.59 | 170.29 |
| 25 | 4.59 | 13.16 | 55.42 | 35.65 | 11.43 | −20.08 | −11.70 | 170.01 |
| 26 | −0.12 | 11.06 | 54.09 | 34.94 | 11.37 | −15.16 | −13.76 | 172.27 |
| 27 | 1.10 | 11.81 | 55.45 | 34.85 | 10.99 | −17.00 | −9.50 | 170.91 |
| 28 | 2.78 | 11.51 | 56.06 | 34.44 | 10.57 | −13.57 | −8.79 | 172.45 |

-continued

| k | | | | | | | |
|---|---|---|---|---|---|---|---|
| 29 | −1.28 | 11.48 | 55.08 | 35.02 | 10.89 | −15.74 | −9.63 | 169.75 |
| 30 | 2.04 | 12.16 | 55.11 | 35.67 | 10.86 | −17.71 | −6.55 | 170.86 |
| 31 | 0.32 | 12.82 | 53.12 | 34.92 | 10.54 | −18.42 | −8.44 | 169.18 |
| 32 | 0.20 | 0.74 | 50.97 | −0.31 | 16.61 | −0.13 | −0.95 | 4.08 |
| 33 | −2.15 | 1.02 | 49.63 | −0.32 | 16.22 | 0.23 | 0.22 | 1.95 |
| 34 | 1.20 | 0.57 | 50.53 | −0.69 | 16.60 | 0.05 | −0.14 | 2.81 |
| 35 | 2.07 | 0.84 | 50.16 | −0.49 | 16.35 | 0.75 | −0.83 | 2.72 |
| 36 | 0.80 | 0.74 | 49.51 | 0.39 | 16.42 | −0.53 | −1.24 | 3.37 |
| 37 | −1.45 | 1.05 | 52.96 | −0.54 | 16.22 | 0.77 | −0.23 | 3.04 |
| 38 | 2.48 | 0.88 | 49.48 | 0.67 | 16.29 | −0.46 | −1.51 | 3.83 |
| 39 | −0.81 | 0.65 | 50.20 | −0.45 | 16.38 | −0.34 | −0.14 | 3.97 |

| k | a32k | a33k | a34k | a35k | a36k | a37k | a38k | a39k |
|---|---|---|---|---|---|---|---|---|
| 0 | −19.43 | −15.41 | −0.54 | 35.39 | 4.01 | 146.63 | −31.68 | −3.15 |
| 1 | −18.88 | −15.15 | −0.37 | 34.72 | 4.18 | 148.07 | −31.76 | −3.56 |
| 2 | −16.02 | −15.31 | −0.38 | 33.72 | 4.18 | 145.90 | −32.03 | −3.18 |
| 3 | −17.80 | −15.75 | −0.39 | 36.39 | 4.08 | 145.63 | −31.54 | −3.47 |
| 4 | −15.90 | −15.69 | −0.30 | 34.77 | 4.13 | 149.16 | −31.20 | −3.47 |
| 5 | −18.98 | −15.68 | −0.58 | 33.97 | 4.12 | 147.36 | −31.71 | −3.33 |
| 6 | −15.90 | −15.37 | −0.49 | 34.31 | 4.29 | 146.96 | −30.78 | −3.23 |
| 7 | −14.81 | −15.73 | −0.31 | 36.06 | 4.14 | 150.82 | −32.18 | −3.67 |
| 8 | −15.48 | −15.58 | −0.58 | 36.41 | 4.13 | 146.32 | −31.10 | −3.39 |
| 9 | −16.55 | −15.89 | −0.37 | 32.95 | 3.99 | 141.73 | −30.59 | −3.45 |
| 10 | −18.58 | −15.48 | −0.48 | 33.49 | 4.40 | 148.23 | −30.74 | −3.45 |
| 11 | −15.63 | −15.39 | −0.38 | 35.93 | 4.06 | 144.15 | −30.84 | −3.40 |
| 12 | −17.34 | −15.78 | −0.58 | 35.76 | 4.10 | 140.54 | −32.14 | −3.58 |
| 13 | −16.01 | −15.44 | −0.51 | 35.03 | 4.19 | 142.21 | −31.70 | −3.44 |
| 14 | −19.00 | −15.39 | −0.63 | 35.03 | 4.06 | 146.35 | −31.59 | −3.67 |
| 15 | −16.05 | −15.61 | −0.51 | 35.06 | 4.04 | 144.24 | −31.00 | −3.59 |
| 16 | −1.73 | −11.69 | 0.83 | 17.68 | 4.06 | 115.00 | −27.19 | −5.03 |
| 17 | −4.29 | −12.41 | 1.18 | 16.91 | 3.80 | 117.37 | −26.45 | −5.33 |
| 18 | −2.73 | −12.25 | 1.21 | 17.51 | 3.83 | 119.84 | −28.87 | −5.24 |
| 19 | −1.43 | −12.78 | 1.09 | 16.03 | 3.87 | 118.57 | −27.48 | −5.28 |
| 20 | −1.08 | −12.82 | 1.18 | 16.30 | 3.94 | 118.99 | −26.64 | −4.93 |
| 21 | −3.12 | −12.39 | 0.98 | 17.09 | 3.77 | 116.73 | −27.35 | −5.06 |
| 22 | −2.46 | −12.29 | 1.12 | 15.90 | 3.83 | 119.51 | −27.39 | −4.75 |
| 23 | −1.88 | −12.16 | 1.06 | 16.70 | 3.81 | 120.08 | −27.74 | −5.30 |
| 24 | −3.35 | −12.24 | 1.09 | 14.93 | 3.90 | 117.65 | −27.21 | −5.13 |
| 25 | −1.85 | −11.74 | 1.20 | 18.98 | 3.86 | 118.21 | −27.50 | −5.19 |
| 26 | −2.53 | −12.60 | 1.34 | 18.04 | 3.83 | 118.75 | −26.64 | −5.50 |
| 27 | −4.14 | −11.95 | 1.01 | 18.05 | 3.80 | 120.99 | −27.10 | −4.89 |
| 28 | −2.49 | −12.69 | 1.15 | 18.06 | 3.69 | 117.75 | −26.73 | −5.11 |
| 29 | −2.52 | −12.69 | 1.30 | 15.46 | 4.07 | 116.11 | −27.32 | −5.01 |
| 30 | −1.51 | −12.10 | 1.15 | 17.59 | 3.63 | 123.35 | −27.39 | −5.32 |
| 31 | −4.63 | −12.59 | 1.03 | 17.39 | 3.88 | 119.73 | −27.34 | −5.17 |
| 32 | −5.22 | 1.64 | 2.40 | 15.00 | 2.34 | 28.20 | −5.04 | −5.62 |
| 33 | −5.96 | 1.34 | 2.52 | 14.98 | 2.36 | 28.53 | −4.99 | −5.55 |
| 34 | −5.47 | 1.64 | 2.42 | 14.89 | 2.39 | 29.51 | −4.77 | −5.28 |
| 35 | −4.58 | 1.75 | 2.52 | 14.33 | 2.30 | 31.32 | −5.18 | −5.29 |
| 36 | −6.27 | 1.70 | 2.46 | 14.36 | 2.42 | 31.69 | −5.05 | −5.67 |
| 37 | −5.85 | 1.50 | 2.37 | 14.83 | 2.33 | 29.47 | −5.19 | −5.62 |
| 38 | −4.86 | 1.37 | 2.45 | 14.20 | 2.32 | 30.31 | −5.13 | −5.42 |
| 39 | −6.24 | 1.66 | 2.42 | 14.65 | 2.30 | 31.65 | −5.26 | −5.40 |

| k | a40k | a41k | a42k | a43k | a44k | a45k | a46k | a47k |
|---|---|---|---|---|---|---|---|---|
| 0 | −10.74 | −128.40 | −12.06 | −27.68 | −47.57 | 129.47 | −144.26 | 5.82 |
| 1 | −10.79 | −126.25 | −6.60 | −27.37 | 30.05 | 129.30 | −151.57 | 0.18 |
| 2 | −10.74 | −126.91 | 22.40 | −24.92 | 8.00 | 127.04 | −148.75 | 4.11 |
| 3 | −10.77 | −125.83 | −0.47 | −27.97 | −22.77 | 127.09 | −144.81 | −5.16 |
| 4 | −10.78 | −123.99 | 31.65 | −28.65 | 24.12 | 128.49 | −154.50 | 13.78 |
| 5 | −10.58 | −125.15 | −1.09 | −27.15 | −24.40 | 127.57 | −149.54 | 5.15 |
| 6 | −10.85 | −124.37 | −9.75 | −27.32 | −4.55 | 126.41 | −145.43 | −4.92 |
| 7 | −10.65 | −127.00 | 0.46 | −27.02 | −13.23 | 129.75 | −144.09 | −13.95 |
| 8 | −11.02 | −126.29 | −13.90 | −26.51 | −7.75 | 127.78 | −152.92 | 8.36 |
| 9 | −10.68 | −124.07 | −7.82 | −27.67 | −23.63 | 127.87 | −150.02 | 8.26 |
| 10 | −10.83 | −124.06 | 47.68 | −28.79 | 7.39 | 124.57 | −149.34 | −3.62 |
| 11 | −10.80 | −128.19 | −2.30 | −25.63 | −6.57 | 129.60 | −150.58 | −9.25 |
| 12 | −10.87 | −124.73 | −54.90 | −24.31 | 41.58 | 134.82 | −151.79 | −4.73 |
| 13 | −10.82 | −127.07 | −0.98 | −28.09 | 7.94 | 130.29 | −148.24 | −10.15 |
| 14 | −11.01 | −125.00 | −2.61 | −26.15 | −9.59 | 129.00 | −148.98 | −19.14 |
| 15 | −10.69 | −125.55 | 6.16 | −27.16 | 5.81 | 130.83 | −152.90 | −9.64 |
| 16 | −11.43 | −133.31 | 27.27 | −18.30 | −26.33 | 148.91 | −121.02 | 7.67 |
| 17 | −11.74 | −134.46 | −52.34 | −16.89 | −23.99 | 151.23 | −120.04 | −19.73 |
| 18 | −11.45 | −130.80 | 18.52 | −16.85 | −48.77 | 150.98 | −122.92 | 10.85 |
| 19 | −11.27 | −133.08 | −29.76 | −17.58 | 3.69 | 149.84 | −121.37 | −4.93 |
| 20 | −11.27 | −134.65 | 8.68 | −16.64 | 34.24 | 149.00 | −118.06 | −9.55 |
| 21 | −11.71 | −137.87 | 30.52 | −14.52 | 0.44 | 149.28 | −119.23 | 7.09 |

-continued

| k | | | | | | | |
|---|---|---|---|---|---|---|---|
| 22 | −11.44 | −133.43 | 27.53 | −14.99 | 8.31 | 149.32 | −122.39 | −19.43 |
| 23 | −11.34 | −135.85 | −13.46 | −14.85 | 0.51 | 149.46 | −118.80 | 12.65 |
| 24 | −11.46 | −134.89 | −32.30 | −18.64 | 3.14 | 145.98 | −119.97 | 5.91 |
| 25 | −10.92 | −135.14 | −16.97 | −16.50 | 9.98 | 148.08 | −126.66 | 0.91 |
| 26 | −11.38 | −132.17 | 38.54 | −18.23 | 23.72 | 150.56 | −114.45 | 1.06 |
| 27 | −11.44 | −134.82 | −43.20 | −14.82 | −21.37 | 150.11 | −123.74 | −7.24 |
| 28 | −11.64 | −136.08 | −8.20 | −17.05 | 0.87 | 153.36 | −125.50 | 18.53 |
| 29 | −11.25 | −132.85 | −28.20 | −17.77 | −16.83 | 146.70 | −118.61 | −2.81 |
| 30 | −11.21 | −133.55 | −22.12 | −16.42 | −9.17 | 150.89 | −123.39 | 7.29 |
| 31 | −11.50 | −135.59 | 16.35 | −17.71 | −39.44 | 149.92 | −117.21 | −17.87 |
| 32 | −1.75 | −17.34 | −4.56 | −15.38 | −4.53 | 27.52 | −4.76 | −15.17 |
| 33 | −1.66 | −18.40 | −1.44 | −15.69 | −11.54 | 27.41 | −2.83 | −8.66 |
| 34 | −1.72 | −17.15 | 3.10 | −14.93 | −13.85 | 27.41 | 0.29 | 18.03 |
| 35 | −1.60 | −18.29 | 10.53 | −16.01 | 10.69 | 27.36 | −0.67 | −6.10 |
| 36 | −1.70 | −17.23 | −4.85 | −14.95 | 7.00 | 25.49 | −2.44 | −2.75 |
| 37 | −1.65 | −17.09 | −18.55 | −15.00 | 3.78 | 27.40 | 1.75 | 3.17 |
| 38 | −1.68 | −17.34 | 10.25 | −15.93 | −2.93 | 27.08 | −9.32 | 12.10 |
| 39 | −1.66 | −16.95 | 6.80 | −16.81 | −3.07 | 27.33 | −0.14 | −2.79 |

| k | a48k | a49k | a50k | a51k | a52k | a53k | a54k | a55k |
|---|---|---|---|---|---|---|---|---|
| 0 | 37.14 | 79.32 | −51.17 | −1.76 | 107.54 | −136.45 | −0.70 | 49.45 |
| 1 | 39.73 | 78.51 | −53.02 | −3.67 | 107.24 | −137.40 | −0.92 | 48.53 |
| 2 | 38.32 | 79.55 | −53.33 | 6.10 | 109.08 | −137.60 | −0.44 | 47.48 |
| 3 | 43.04 | 78.76 | −49.78 | −5.20 | 109.63 | −137.79 | −0.41 | 49.72 |
| 4 | 41.97 | 78.51 | −51.25 | −3.82 | 108.30 | −134.67 | −0.72 | 47.28 |
| 5 | 43.91 | 79.20 | −53.25 | 5.02 | 104.46 | −134.65 | −0.72 | 50.25 |
| 6 | 41.71 | 79.71 | −51.24 | 9.31 | 106.65 | −135.02 | −0.97 | 48.74 |
| 7 | 44.52 | 80.29 | −48.51 | −2.75 | 107.04 | −140.33 | 0.13 | 49.50 |
| 8 | 39.20 | 80.04 | −52.02 | −1.21 | 109.14 | −135.03 | −0.87 | 48.70 |
| 9 | 42.96 | 79.10 | −48.95 | 0.10 | 107.27 | −135.84 | −1.15 | 51.11 |
| 10 | 42.98 | 80.11 | −51.37 | 2.86 | 107.63 | −136.54 | −1.02 | 49.77 |
| 11 | 41.67 | 78.52 | −54.87 | 9.25 | 107.78 | −137.56 | −0.36 | 49.93 |
| 12 | 41.54 | 78.66 | −49.72 | 12.58 | 108.48 | −138.05 | −1.51 | 50.82 |
| 13 | 45.53 | 79.40 | −53.00 | −0.90 | 106.29 | −138.06 | −1.22 | 48.46 |
| 14 | 41.05 | 78.05 | −50.05 | 5.44 | 108.17 | −134.77 | −1.00 | 49.65 |
| 15 | 40.71 | 80.07 | −56.73 | −3.43 | 106.52 | −136.43 | −0.06 | 50.09 |
| 16 | 37.90 | 83.28 | −64.08 | −0.55 | 90.49 | −120.94 | 4.79 | 58.73 |
| 17 | 39.35 | 84.15 | −61.34 | 14.09 | 91.22 | −115.20 | 4.42 | 58.38 |
| 18 | 39.25 | 83.87 | −64.28 | −2.73 | 90.15 | −119.81 | 5.17 | 59.14 |
| 19 | 44.51 | 83.85 | −64.77 | −5.83 | 91.64 | −120.52 | 4.96 | 59.80 |
| 20 | 39.23 | 84.11 | −64.08 | −0.47 | 90.61 | −119.79 | 4.41 | 58.04 |
| 21 | 33.64 | 84.97 | −66.24 | 2.00 | 90.84 | −119.05 | 4.36 | 55.65 |
| 22 | 40.09 | 84.70 | −68.59 | 8.97 | 89.54 | −122.30 | 4.21 | 58.89 |
| 23 | 39.94 | 84.58 | −64.95 | 9.90 | 90.45 | −118.55 | 4.20 | 58.47 |
| 24 | 41.44 | 83.21 | −61.49 | 21.96 | 86.40 | −121.01 | 5.88 | 59.02 |
| 25 | 43.13 | 84.06 | −71.09 | 5.92 | 91.68 | −121.74 | 5.43 | 58.39 |
| 26 | 40.08 | 84.02 | −62.57 | −16.45 | 90.01 | −124.94 | 5.37 | 59.22 |
| 27 | 42.77 | 83.17 | −60.93 | −3.80 | 90.21 | −119.34 | 4.16 | 59.00 |
| 28 | 38.19 | 83.14 | −68.75 | 0.93 | 89.45 | −118.83 | 4.65 | 58.62 |
| 29 | 40.28 | 84.08 | −66.06 | 2.04 | 90.85 | −121.14 | 4.95 | 58.58 |
| 30 | 38.60 | 83.57 | −63.85 | 4.02 | 90.34 | −121.73 | 5.02 | 59.52 |
| 31 | 38.72 | 83.98 | −62.23 | −8.14 | 90.87 | −118.15 | 4.47 | 57.21 |
| 32 | 11.57 | 21.55 | −10.03 | −6.33 | 68.62 | −1.53 | −1.26 | 5.29 |
| 33 | 12.52 | 21.60 | −9.90 | 5.14 | 67.28 | −2.03 | −1.17 | 6.06 |
| 34 | 10.52 | 21.27 | −9.92 | 7.48 | 62.26 | −1.26 | −1.10 | 6.49 |
| 35 | 9.72 | 21.00 | −9.55 | 4.65 | 67.09 | −2.90 | −1.42 | 5.32 |
| 36 | 10.18 | 21.30 | −10.46 | 0.53 | 68.50 | −1.87 | −1.28 | 5.86 |
| 37 | 11.41 | 21.45 | −10.21 | −5.58 | 69.19 | −2.94 | −0.93 | 6.38 |
| 38 | 10.20 | 21.55 | −10.48 | −0.02 | 72.00 | −2.62 | −1.45 | 5.82 |
| 39 | 10.76 | 21.90 | −9.25 | 2.27 | 70.02 | −3.28 | −1.69 | 5.49 |

| k | a56k | a57k | a58k | a59k | a60k | a61k | a62k | a63k |
|---|---|---|---|---|---|---|---|---|
| 0 | −12.86 | 129.34 | −0.04 | 14.92 | 138.37 | −1.55 | 89.62 | 30.73 |
| 1 | −5.85 | 128.69 | 0.01 | 15.19 | 137.24 | −1.35 | −3.02 | −80.51 |
| 2 | −4.35 | 128.38 | 0.04 | 15.14 | 134.51 | −1.28 | 41.45 | −64.49 |
| 3 | −12.07 | 129.28 | 0.00 | 15.99 | 138.44 | −1.79 | 43.17 | −32.41 |
| 4 | −29.61 | 130.64 | 0.05 | 15.92 | 138.34 | −1.07 | −61.32 | −48.06 |
| 5 | −8.28 | 128.31 | 0.04 | 16.59 | 134.68 | −1.42 | 22.30 | 2.66 |
| 6 | 19.35 | 130.30 | 0.02 | 13.87 | 136.49 | −1.67 | −84.92 | 0.79 |
| 7 | 24.36 | 127.83 | 0.04 | 15.94 | 138.86 | −1.90 | 0.65 | −3.65 |
| 8 | −14.01 | 128.40 | 0.03 | 15.30 | 137.88 | −1.44 | −4.38 | −31.18 |
| 9 | 0.91 | 129.12 | 0.02 | 14.12 | 135.10 | −1.55 | 69.96 | 4.18 |
| 10 | 23.68 | 129.32 | 0.07 | 16.18 | 140.35 | −1.81 | −95.92 | −40.96 |
| 11 | −17.89 | 127.87 | −0.02 | 14.63 | 137.22 | −1.64 | −53.97 | −21.93 |
| 12 | −16.16 | 127.54 | 0.03 | 15.68 | 139.52 | −1.33 | −2.36 | −18.42 |
| 13 | −9.14 | 128.00 | 0.04 | 15.45 | 137.55 | −1.47 | −154.65 | −37.01 |
| 14 | 6.32 | 128.51 | 0.01 | 15.55 | 135.27 | −1.61 | −75.40 | 17.78 |

-continued

| | | | | | | | | |
|---|---|---|---|---|---|---|---|---|
| 15 | −56.04 | 128.95 | −0.01 | 15.81 | 140.72 | −1.50 | 15.30 | −0.58 |
| 16 | 11.07 | 103.86 | 0.32 | 12.40 | 106.49 | −3.15 | −17.66 | −6.34 |
| 17 | 1.20 | 103.57 | 0.30 | 11.80 | 105.25 | −3.35 | 158.30 | −11.96 |
| 18 | 15.81 | 104.02 | 0.31 | 12.73 | 105.76 | −3.14 | 27.25 | 38.46 |
| 19 | −38.30 | 105.03 | 0.26 | 13.24 | 105.45 | −3.08 | 55.65 | −53.71 |
| 20 | −11.59 | 103.10 | 0.28 | 12.71 | 104.03 | −3.53 | −163.96 | 49.02 |
| 21 | −12.52 | 102.37 | 0.36 | 13.19 | 102.12 | −2.92 | −173.39 | −5.65 |
| 22 | −9.62 | 103.25 | 0.33 | 12.39 | 108.93 | −2.99 | 52.22 | −161.59 |
| 23 | 25.92 | 103.48 | 0.29 | 11.74 | 106.99 | −2.55 | 105.11 | −85.85 |
| 24 | −5.50 | 103.73 | 0.35 | 12.51 | 104.40 | −3.33 | 69.39 | −5.04 |
| 25 | −10.31 | 105.43 | 0.32 | 12.82 | 105.99 | −3.71 | −26.84 | −118.93 |
| 26 | 18.71 | 106.00 | 0.30 | 10.96 | 106.89 | −3.08 | −32.36 | −84.52 |
| 27 | 20.64 | 104.18 | 0.31 | 10.98 | 105.86 | −2.84 | −60.72 | −27.19 |
| 28 | −15.68 | 105.50 | 0.30 | 12.70 | 106.94 | −2.97 | 88.69 | 23.52 |
| 29 | −13.79 | 104.57 | 0.35 | 11.66 | 106.15 | −3.25 | 26.48 | −34.70 |
| 30 | 0.58 | 103.49 | 0.33 | 12.68 | 105.58 | −2.79 | −41.33 | 6.57 |
| 31 | −41.18 | 104.89 | 0.34 | 12.31 | 105.97 | −3.75 | 29.53 | −6.35 |
| 32 | 1.27 | 44.57 | 0.12 | 13.53 | 42.01 | 2.37 | 17.83 | 3.10 |
| 33 | 6.12 | 45.81 | 0.10 | 13.35 | 42.85 | 2.35 | −40.89 | −6.28 |
| 34 | −2.92 | 44.37 | 0.10 | 13.49 | 42.40 | 2.50 | 118.60 | −8.15 |
| 35 | −5.72 | 45.65 | 0.09 | 13.59 | 42.95 | 2.35 | −24.50 | 42.41 |
| 36 | 8.16 | 46.19 | 0.13 | 13.25 | 42.19 | 2.58 | −23.66 | −14.21 |
| 37 | −2.52 | 45.21 | 0.10 | 14.30 | 42.49 | 2.21 | 10.46 | 8.05 |
| 38 | 1.03 | 44.35 | 0.08 | 13.11 | 42.30 | 2.30 | −19.72 | −34.53 |
| 39 | 7.84 | 44.14 | 0.07 | 12.77 | 41.49 | 2.14 | −87.32 | −9.49 |

| k | a0k | a1k | a2k | a3k | a4k | a5k | a6k | a7k |
|---|---|---|---|---|---|---|---|---|
| 40 | 19.90 | −2.13 | 3.40 | −23.58 | 14.75 | 9.48 | 3.86 | −5.28 |
| 41 | 18.83 | −2.16 | 2.85 | −22.88 | 14.32 | 8.82 | 4.18 | −4.88 |
| 42 | 20.70 | −1.65 | 3.27 | −20.35 | 15.25 | 9.24 | 3.58 | −4.35 |
| 43 | 20.25 | −1.77 | 3.20 | −22.22 | 15.27 | 9.16 | 3.48 | −3.80 |
| 44 | 24.14 | −2.06 | 3.32 | −21.09 | 15.40 | 8.40 | 4.18 | −4.42 |
| 45 | 18.27 | −1.69 | 3.27 | −23.09 | 14.59 | 8.75 | 3.83 | −4.73 |
| 46 | 25.79 | −2.16 | 2.67 | −23.50 | 13.93 | 9.50 | 3.72 | −4.28 |
| 47 | 20.38 | −2.29 | 3.08 | −22.68 | 15.06 | 8.65 | 2.52 | −5.19 |
| 48 | 50.37 | −1.77 | 3.59 | −24.60 | 18.28 | 10.50 | 5.85 | −7.96 |
| 49 | 49.85 | −2.31 | 3.47 | −28.05 | 18.13 | 10.17 | 7.16 | −7.75 |
| 50 | 41.67 | −2.30 | 3.79 | −26.10 | 18.67 | 10.55 | 6.25 | −8.25 |
| 51 | 42.09 | −2.00 | 3.53 | −25.53 | 18.63 | 10.87 | 5.39 | −5.86 |
| 52 | 50.69 | −2.14 | 3.14 | −26.33 | 19.35 | 9.35 | 6.52 | −7.00 |
| 53 | 42.49 | −1.43 | 3.63 | −27.22 | 19.41 | 9.91 | 6.84 | −7.48 |
| 54 | 53.71 | −2.44 | 3.50 | −31.61 | 18.14 | 11.45 | 6.06 | −9.48 |
| 55 | 46.99 | −2.19 | 3.48 | −29.49 | 18.31 | 10.81 | 6.44 | −6.38 |
| 56 | 51.56 | −2.37 | 2.97 | −27.93 | 19.01 | 11.39 | 5.33 | −6.22 |
| 57 | 46.94 | −2.41 | 3.00 | −30.06 | 17.38 | 9.09 | 6.34 | −7.10 |
| 58 | 41.31 | −2.75 | 3.65 | −25.85 | 19.08 | 9.83 | 6.07 | −6.96 |
| 59 | 44.49 | −2.22 | 3.61 | −32.55 | 18.31 | 10.01 | 6.66 | −7.11 |
| 60 | 45.40 | −2.42 | 3.22 | −27.27 | 18.00 | 11.33 | 6.80 | −7.85 |
| 61 | 48.69 | −2.05 | 3.04 | −27.02 | 19.11 | 10.47 | 6.21 | −8.31 |
| 62 | 51.91 | −2.10 | 3.23 | −24.02 | 18.61 | 10.14 | 6.24 | −8.18 |
| 63 | 49.12 | −2.03 | 3.79 | −26.05 | 19.92 | 9.39 | 6.41 | −7.48 |
| 64 | 14.82 | −1.26 | 2.54 | −14.92 | 10.38 | 5.70 | 4.36 | −2.13 |
| 65 | 18.85 | −1.68 | 2.35 | −15.32 | 10.60 | 5.67 | 4.25 | −2.41 |
| 66 | 12.30 | −1.35 | 2.98 | −13.25 | 10.11 | 6.36 | 5.11 | −2.88 |
| 67 | 10.43 | −0.99 | 2.47 | −13.28 | 10.38 | 6.20 | 5.13 | −2.15 |
| 68 | 10.66 | −1.07 | 2.81 | −16.65 | 10.22 | 5.83 | 3.98 | −2.43 |
| 69 | 14.27 | −1.20 | 2.24 | −13.79 | 9.68 | 4.91 | 3.57 | −2.61 |
| 70 | 14.63 | −0.95 | 2.44 | −13.66 | 10.38 | 4.72 | 4.73 | −2.55 |
| 71 | 13.43 | −1.33 | 2.57 | −16.19 | 9.82 | 5.72 | 4.41 | −2.84 |
| 72 | 12.29 | −1.25 | 2.24 | −13.42 | 9.93 | 5.64 | 4.34 | −2.66 |
| 73 | 13.65 | −1.66 | 2.41 | −16.32 | 10.52 | 5.40 | 4.92 | −2.50 |
| 74 | 13.37 | −1.27 | 2.47 | −15.49 | 9.98 | 5.94 | 3.65 | −1.62 |
| 75 | 14.10 | −1.64 | 2.34 | −14.76 | 10.05 | 5.40 | 4.82 | −2.77 |
| 76 | 16.53 | −1.24 | 1.83 | −18.07 | 9.51 | 6.44 | 4.40 | −2.85 |
| 77 | 15.73 | −1.15 | 2.18 | −13.81 | 9.36 | 5.62 | 4.61 | −2.36 |
| 78 | 17.20 | −1.32 | 2.68 | −13.10 | 9.52 | 5.70 | 4.78 | −2.81 |
| 79 | 18.10 | −1.03 | 2.61 | −14.46 | 10.11 | 5.73 | 4.83 | −2.49 |

| k | a8k | a9k | a10k | a11k | a12k | a13k | a14k | a15k |
|---|---|---|---|---|---|---|---|---|
| 40 | −0.48 | −14.13 | −0.26 | −4.85 | −32.91 | 4.45 | 1.62 | 14.53 |
| 41 | −2.55 | −14.69 | −0.26 | −2.59 | −32.83 | 4.48 | 1.64 | 10.87 |
| 42 | −2.32 | −13.82 | −0.25 | −3.21 | −32.11 | 4.71 | 1.92 | 12.41 |
| 43 | 0.25 | −13.86 | −0.32 | −0.74 | −32.76 | 4.46 | 2.18 | 10.08 |
| 44 | −2.98 | −14.88 | −0.29 | −0.15 | −33.19 | 4.33 | 1.78 | 12.83 |
| 45 | 0.26 | −14.82 | −0.34 | −3.73 | −35.01 | 4.39 | 1.93 | 11.13 |
| 46 | −0.55 | −13.52 | −0.27 | −2.21 | −32.26 | 4.23 | 1.58 | 13.57 |
| 47 | −2.58 | −14.57 | −0.27 | −1.27 | −32.66 | 4.42 | 1.55 | 11.73 |

-continued

| | | | | | | | | |
|---|---|---|---|---|---|---|---|---|
| 48 | −9.49 | −17.26 | −0.40 | −7.16 | −36.29 | 5.87 | 2.34 | 25.11 |
| 49 | −15.26 | −17.26 | −0.39 | −9.71 | −37.64 | 6.04 | 2.21 | 24.19 |
| 50 | −17.74 | −16.05 | −0.38 | −8.14 | −37.86 | 5.44 | 2.03 | 27.35 |
| 51 | −7.51 | −17.69 | −0.44 | −7.78 | −36.26 | 6.10 | 2.27 | 26.16 |
| 52 | −16.09 | −16.80 | −0.45 | −7.39 | −35.79 | 6.14 | 2.29 | 22.75 |
| 53 | −21.20 | −18.29 | −0.46 | −6.47 | −37.56 | 6.01 | 2.73 | 22.73 |
| 54 | −14.84 | −18.42 | −0.34 | −6.94 | −35.71 | 6.25 | 2.47 | 23.41 |
| 55 | −16.75 | −17.24 | −0.39 | −7.01 | −38.93 | 6.20 | 2.67 | 26.48 |
| 56 | −8.39 | −22.20 | −0.43 | −6.67 | −40.21 | 5.83 | 2.38 | 22.94 |
| 57 | −14.66 | −19.71 | −0.36 | −8.63 | −40.12 | 6.05 | 2.57 | 23.51 |
| 58 | −16.77 | −15.89 | −0.40 | −8.32 | −38.01 | 6.03 | 2.53 | 23.62 |
| 59 | −16.13 | −20.60 | −0.48 | −7.39 | −36.88 | 6.09 | 2.39 | 23.28 |
| 60 | −14.21 | −16.48 | −0.41 | −8.28 | −39.00 | 5.52 | 2.26 | 23.17 |
| 61 | −14.30 | −22.10 | −0.43 | −8.26 | −37.30 | 6.59 | 2.03 | 22.66 |
| 62 | −17.72 | −18.12 | −0.41 | −7.89 | −37.81 | 6.13 | 2.04 | 25.89 |
| 63 | −17.68 | −18.26 | −0.39 | −6.30 | −36.11 | 5.40 | 2.04 | 21.67 |
| 64 | 2.73 | −5.49 | −0.33 | 1.00 | −13.27 | 1.08 | 2.61 | 11.70 |
| 65 | −4.20 | −5.79 | −0.38 | −1.97 | −13.62 | 1.34 | 2.28 | 11.01 |
| 66 | −5.39 | −6.55 | −0.36 | 0.72 | −12.79 | 0.98 | 2.48 | 13.80 |
| 67 | −4.50 | −5.76 | −0.33 | −1.87 | −13.93 | 0.96 | 2.58 | 11.78 |
| 68 | −4.01 | −5.60 | −0.37 | −1.22 | −14.53 | 1.28 | 2.37 | 12.48 |
| 69 | −6.29 | −5.07 | −0.33 | 0.39 | −14.47 | 1.50 | 2.31 | 13.61 |
| 70 | −6.11 | −5.86 | −0.40 | −0.83 | −14.26 | 1.23 | 2.63 | 10.62 |
| 71 | −8.03 | −5.00 | −0.32 | −0.78 | −12.45 | 1.14 | 2.62 | 12.27 |
| 72 | −6.81 | −6.73 | −0.38 | 0.34 | −14.42 | 1.52 | 2.49 | 12.46 |
| 73 | −7.12 | −6.95 | −0.33 | 0.12 | −13.53 | 1.04 | 2.45 | 10.32 |
| 74 | −6.57 | −3.28 | −0.31 | 0.22 | −14.17 | 1.09 | 2.41 | 13.68 |
| 75 | −6.00 | −3.61 | −0.33 | −0.67 | −13.40 | 1.23 | 2.67 | 12.09 |
| 76 | −5.23 | −7.88 | −0.38 | −0.19 | −14.11 | 1.19 | 2.52 | 13.16 |
| 77 | −7.27 | −3.96 | −0.32 | 1.76 | −14.15 | 1.23 | 2.79 | 11.77 |
| 78 | −3.39 | −7.77 | −0.34 | −0.85 | −13.00 | 1.32 | 2.61 | 10.48 |
| 79 | −4.11 | −6.10 | −0.36 | −1.01 | −13.69 | 1.30 | 2.55 | 11.87 |

| k | a16k | a17k | a18k | a19k | a20k | a21k | a22k | a23k |
|---|---|---|---|---|---|---|---|---|
| 40 | −1.34 | 7.31 | 20.08 | −43.84 | 7.06 | 8.83 | 3.34 | 1.08 |
| 41 | −1.10 | 7.79 | 19.71 | 8.41 | 7.32 | 8.92 | 15.86 | 1.04 |
| 42 | 1.31 | 8.00 | 19.19 | −20.28 | 6.83 | 8.82 | 24.92 | 1.08 |
| 43 | 1.45 | 7.98 | 19.87 | 46.25 | 6.78 | 8.45 | −2.96 | 1.00 |
| 44 | 0.33 | 7.34 | 19.54 | −38.90 | 6.92 | 8.67 | −12.94 | 1.11 |
| 45 | 1.75 | 7.10 | 20.14 | −21.37 | 6.82 | 8.73 | −27.46 | 1.13 |
| 46 | 0.61 | 8.00 | 20.03 | −28.34 | 7.09 | 8.93 | 31.83 | 1.12 |
| 47 | −0.64 | 7.87 | 19.53 | −46.57 | 7.31 | 8.89 | −30.39 | 1.07 |
| 48 | −0.15 | 11.06 | 25.54 | −2.80 | 12.05 | 11.55 | −13.03 | 1.27 |
| 49 | −0.12 | 11.11 | 25.52 | 8.12 | 12.20 | 12.65 | −6.52 | 1.32 |
| 50 | −1.32 | 10.83 | 24.11 | 37.99 | 12.63 | 11.38 | 32.37 | 1.35 |
| 51 | 0.13 | 10.49 | 25.74 | 8.31 | 12.13 | 11.86 | −5.37 | 1.28 |
| 52 | −1.83 | 11.17 | 26.01 | 33.77 | 12.42 | 11.00 | 34.57 | 1.29 |
| 53 | −1.54 | 11.10 | 25.30 | 42.41 | 11.53 | 11.16 | 50.78 | 1.36 |
| 54 | 0.86 | 10.54 | 23.84 | −10.95 | 12.27 | 11.29 | 7.27 | 1.27 |
| 55 | 0.11 | 11.02 | 25.47 | −32.01 | 11.40 | 11.13 | 0.00 | 1.32 |
| 56 | 1.25 | 10.62 | 26.27 | 11.39 | 11.63 | 11.39 | 0.65 | 1.32 |
| 57 | −1.16 | 10.55 | 25.32 | 76.10 | 12.37 | 11.06 | 17.89 | 1.41 |
| 58 | −0.85 | 11.14 | 24.88 | 25.65 | 11.81 | 11.47 | −34.03 | 1.31 |
| 59 | −1.57 | 10.72 | 25.21 | −19.84 | 11.67 | 12.01 | −12.65 | 1.17 |
| 60 | 0.05 | 10.51 | 24.90 | −78.84 | 12.63 | 12.01 | −6.74 | 1.37 |
| 61 | −1.47 | 10.82 | 25.26 | 46.37 | 12.04 | 11.15 | −18.96 | 1.39 |
| 62 | 1.03 | 10.49 | 25.79 | 18.87 | 12.11 | 11.18 | −7.43 | 1.35 |
| 63 | 0.25 | 10.96 | 26.25 | 59.58 | 11.55 | 11.69 | −2.09 | 1.42 |
| 64 | −0.42 | 5.86 | 11.16 | 66.99 | 8.70 | 6.34 | 31.58 | 1.06 |
| 65 | 1.35 | 5.34 | 11.18 | 14.04 | 8.27 | 6.43 | 59.34 | 1.01 |
| 66 | 0.05 | 5.54 | 10.70 | −52.21 | 8.29 | 6.36 | 6.84 | 1.05 |
| 67 | 0.45 | 5.43 | 11.31 | 18.29 | 7.77 | 6.55 | 8.15 | 1.01 |
| 68 | −0.61 | 6.04 | 9.77 | 28.80 | 7.99 | 6.69 | 3.61 | 1.10 |
| 69 | −0.84 | 5.57 | 10.58 | 42.30 | 8.11 | 6.44 | −41.16 | 1.11 |
| 70 | 0.34 | 5.48 | 10.22 | 22.47 | 8.03 | 6.57 | −21.22 | 1.11 |
| 71 | −0.40 | 6.13 | 10.13 | −19.36 | 8.25 | 6.63 | −9.41 | 1.03 |
| 72 | −0.74 | 5.96 | 10.71 | 15.47 | 7.99 | 6.60 | −11.79 | 1.10 |
| 73 | 0.30 | 5.77 | 10.78 | −35.45 | 8.02 | 7.23 | −7.79 | 1.12 |
| 74 | 0.31 | 6.04 | 9.85 | −2.67 | 7.43 | 6.23 | −16.70 | 0.99 |
| 75 | 0.07 | 5.67 | 11.17 | −30.70 | 7.82 | 6.03 | −41.32 | 1.03 |
| 76 | 0.91 | 6.31 | 10.37 | 65.63 | 7.65 | 6.38 | −19.29 | 1.11 |
| 77 | −0.55 | 5.90 | 10.02 | 41.19 | 7.65 | 6.85 | 26.33 | 1.08 |
| 78 | 0.38 | 5.93 | 10.95 | −33.73 | 8.60 | 6.71 | 15.83 | 1.07 |
| 79 | 0.08 | 5.82 | 10.18 | 55.66 | 8.03 | 6.07 | 15.49 | 1.06 |

-continued

| k | a24k | a25k | a26k | a27k | a28k | a29k | a30k | a31k |
|---|------|------|------|------|------|------|------|------|
| 40 | −1.53 | 1.02 | 52.10 | −0.48 | 16.66 | 0.51 | −0.48 | 3.17 |
| 41 | 1.12 | 0.85 | 50.58 | −0.66 | 16.94 | −0.20 | −1.60 | 1.47 |
| 42 | −0.14 | 0.54 | 49.36 | −0.28 | 16.62 | −0.54 | −0.84 | 2.34 |
| 43 | 1.89 | −0.17 | 50.32 | −0.77 | 16.71 | 0.11 | −0.84 | 2.40 |
| 44 | 2.72 | 0.93 | 51.66 | 0.03 | 16.64 | −0.52 | −0.93 | 3.31 |
| 45 | 0.90 | 0.89 | 50.79 | −0.49 | 16.85 | 0.29 | −0.30 | 2.02 |
| 46 | 0.92 | 1.06 | 49.05 | −0.55 | 15.95 | −0.36 | −0.75 | 2.36 |
| 47 | −1.10 | 0.50 | 50.20 | −0.34 | 16.34 | −0.29 | −0.96 | 2.86 |
| 48 | 1.43 | 2.74 | 66.38 | −2.26 | 21.67 | 0.95 | −5.11 | 7.11 |
| 49 | 0.16 | 3.22 | 63.74 | −1.00 | 21.20 | 1.23 | −4.04 | 5.34 |
| 50 | 1.56 | 2.91 | 65.05 | −1.22 | 20.65 | 1.57 | −3.43 | 4.36 |
| 51 | −0.08 | 2.84 | 63.90 | −2.64 | 21.54 | −0.16 | −4.06 | 5.01 |
| 52 | −1.22 | 3.14 | 64.73 | −2.15 | 20.73 | 1.26 | −3.17 | 6.76 |
| 53 | 2.12 | 3.35 | 63.77 | −2.31 | 20.64 | 1.90 | −2.79 | 4.15 |
| 54 | −0.09 | 3.01 | 65.03 | −2.19 | 21.60 | 0.00 | −3.75 | 3.41 |
| 55 | 2.71 | 3.52 | 62.85 | −2.18 | 21.41 | 1.02 | −3.95 | 4.22 |
| 56 | −1.83 | 3.25 | 64.90 | −2.23 | 20.87 | 1.17 | −5.24 | 6.48 |
| 57 | −1.32 | 3.01 | 65.44 | −1.67 | 20.99 | 0.86 | −4.19 | 4.77 |
| 58 | −1.32 | 3.42 | 67.01 | −1.82 | 20.89 | 0.54 | −2.96 | 6.01 |
| 59 | −1.20 | 3.13 | 67.59 | −2.06 | 21.62 | 0.29 | −4.53 | 7.54 |
| 60 | 3.64 | 2.66 | 65.10 | −1.51 | 20.53 | 2.64 | −2.72 | 4.43 |
| 61 | −2.11 | 2.97 | 65.31 | −2.06 | 21.06 | 1.06 | −5.37 | 5.61 |
| 62 | 1.09 | 2.90 | 65.18 | −2.28 | 21.55 | 1.93 | −3.25 | 4.31 |
| 63 | 3.76 | 3.61 | 62.63 | −3.22 | 19.95 | 0.38 | −4.80 | 6.77 |
| 64 | 2.01 | 3.49 | 35.08 | −1.73 | 7.78 | −0.78 | 0.64 | −7.62 |
| 65 | 0.65 | 3.75 | 37.57 | −1.59 | 8.16 | 0.25 | 1.16 | −6.40 |
| 66 | −0.59 | 3.12 | 35.67 | −1.59 | 8.70 | −0.65 | 0.44 | −7.70 |
| 67 | 0.84 | 3.74 | 36.42 | −1.44 | 8.46 | 0.59 | 0.32 | −7.58 |
| 68 | 1.82 | 3.81 | 36.20 | −0.96 | 8.04 | 0.50 | 0.78 | −6.98 |
| 69 | −3.57 | 3.82 | 34.70 | −1.26 | 8.63 | 0.05 | 0.45 | −6.48 |
| 70 | −0.26 | 3.34 | 35.18 | −1.92 | 8.23 | −0.19 | 0.54 | −6.45 |
| 71 | 0.42 | 3.34 | 36.22 | −1.78 | 7.93 | 0.71 | 1.11 | −6.50 |
| 72 | −2.08 | 3.40 | 36.98 | −1.86 | 8.30 | −0.10 | −0.07 | −6.00 |
| 73 | 0.88 | 3.39 | 36.43 | −1.80 | 8.82 | 1.05 | 2.09 | −6.28 |
| 74 | 0.13 | 3.49 | 37.23 | −1.68 | 7.89 | 0.03 | 0.84 | −6.37 |
| 75 | 0.72 | 3.63 | 34.17 | −1.43 | 8.40 | −0.15 | 1.45 | −6.18 |
| 76 | 1.16 | 3.70 | 37.28 | −1.47 | 8.24 | 0.62 | 0.36 | −6.41 |
| 77 | −1.66 | 3.54 | 36.23 | −1.32 | 8.74 | −0.46 | 1.47 | −6.34 |
| 78 | 0.57 | 3.54 | 37.16 | −1.52 | 8.39 | 0.23 | 0.68 | −5.44 |
| 79 | 1.19 | 3.07 | 36.90 | −2.02 | 8.87 | 0.19 | 0.45 | −6.90 |

| k | a32k | a33k | a34k | a35k | a36k | a37k | a38k | a39k |
|---|------|------|------|------|------|------|------|------|
| 40 | −5.34 | 1.56 | 2.37 | 14.21 | 2.38 | 29.25 | −5.24 | −4.95 |
| 41 | −5.33 | 1.96 | 2.51 | 14.89 | 2.30 | 29.91 | −4.95 | −5.64 |
| 42 | −4.23 | 1.47 | 2.50 | 14.89 | 2.39 | 30.13 | −5.49 | −5.67 |
| 43 | −5.61 | 1.39 | 2.40 | 14.13 | 2.39 | 30.04 | −5.16 | −5.43 |
| 44 | −5.26 | 1.42 | 2.47 | 14.70 | 2.47 | 29.51 | −5.46 | −5.65 |
| 45 | −4.85 | 1.38 | 2.49 | 14.53 | 2.35 | 31.15 | −5.49 | −5.35 |
| 46 | −5.17 | 1.42 | 2.66 | 14.21 | 2.40 | 31.82 | −5.15 | −5.79 |
| 47 | −5.68 | 1.57 | 2.53 | 15.07 | 2.40 | 29.24 | −5.09 | −5.72 |
| 48 | −6.00 | 2.58 | 2.50 | 14.63 | 3.20 | 38.48 | −3.62 | −5.61 |
| 49 | −6.67 | 2.35 | 2.72 | 14.89 | 3.23 | 37.63 | −3.69 | −6.09 |
| 50 | −5.81 | 2.30 | 2.52 | 15.66 | 3.28 | 38.95 | −4.26 | −6.18 |
| 51 | −5.13 | 2.44 | 2.67 | 15.54 | 3.18 | 36.41 | −4.09 | −5.84 |
| 52 | −4.42 | 1.99 | 2.54 | 15.71 | 3.13 | 39.60 | −4.01 | −6.18 |
| 53 | −5.04 | 2.06 | 2.66 | 17.16 | 3.12 | 36.76 | −4.33 | −6.06 |
| 54 | −6.10 | 2.53 | 2.50 | 16.41 | 3.27 | 37.65 | −4.36 | −6.06 |
| 55 | −5.57 | 2.26 | 2.60 | 16.96 | 3.16 | 40.02 | −3.85 | −6.00 |
| 56 | −4.10 | 1.92 | 2.64 | 14.69 | 3.17 | 39.48 | −4.48 | −6.07 |
| 57 | −4.38 | 2.29 | 2.61 | 15.62 | 3.22 | 38.06 | −3.97 | −6.03 |
| 58 | −5.50 | 2.09 | 2.58 | 16.36 | 3.27 | 40.47 | −3.28 | −5.79 |
| 59 | −4.45 | 2.46 | 2.78 | 16.60 | 3.15 | 39.11 | −3.78 | −6.16 |
| 60 | −3.34 | 2.51 | 2.52 | 15.15 | 3.23 | 38.56 | −4.02 | −5.90 |
| 61 | −5.04 | 2.20 | 2.58 | 16.64 | 3.16 | 38.05 | −4.02 | −5.69 |
| 62 | −4.07 | 2.51 | 2.61 | 16.88 | 3.27 | 38.29 | −3.92 | −6.25 |
| 63 | −5.47 | 2.46 | 2.56 | 17.19 | 3.20 | 36.88 | −3.81 | −5.98 |
| 64 | −3.26 | 1.93 | 2.58 | 6.64 | 1.79 | 15.55 | −0.68 | −6.62 |
| 65 | −1.96 | 1.80 | 2.75 | 6.53 | 1.80 | 14.47 | −1.32 | −6.52 |
| 66 | −2.93 | 1.95 | 2.58 | 6.37 | 1.80 | 13.31 | −1.55 | −6.16 |
| 67 | −2.63 | 1.77 | 2.78 | 6.77 | 1.79 | 14.86 | −0.93 | −6.19 |
| 68 | −3.09 | 2.07 | 2.62 | 6.63 | 1.85 | 13.31 | −0.92 | −6.44 |
| 69 | −2.86 | 1.95 | 2.66 | 6.79 | 1.74 | 13.74 | −1.00 | −6.61 |
| 70 | −1.71 | 1.92 | 2.68 | 5.20 | 1.78 | 15.31 | −1.48 | −6.46 |
| 71 | −3.02 | 1.93 | 2.72 | 6.27 | 1.83 | 13.72 | −1.27 | −6.62 |
| 72 | −2.50 | 2.08 | 2.62 | 6.55 | 1.75 | 12.96 | −1.31 | −6.45 |
| 73 | −2.41 | 2.11 | 2.70 | 6.32 | 1.82 | 15.33 | −1.06 | −6.63 |

-continued

| 74 | −2.92 | 2.10 | 2.73 | 6.78 | 1.77 | 15.18 | −1.17 | −6.35 |
| 75 | −2.50 | 1.93 | 2.62 | 6.95 | 1.85 | 15.54 | −1.22 | −6.55 |
| 76 | −2.98 | 2.03 | 2.66 | 6.13 | 1.77 | 14.15 | −1.40 | −6.31 |
| 77 | −2.17 | 1.67 | 2.73 | 6.52 | 1.86 | 12.99 | −0.97 | −6.39 |
| 78 | −3.26 | 1.85 | 2.79 | 5.93 | 1.78 | 15.29 | −1.24 | −6.51 |
| 79 | −2.63 | 2.13 | 2.65 | 6.26 | 1.82 | 14.10 | −1.09 | −6.49 |

| k | $a_{40k}$ | $a_{41k}$ | $a_{42k}$ | $a_{43k}$ | $a_{44k}$ | $a_{45k}$ | $a_{46k}$ | $a_{47k}$ |
|---|---|---|---|---|---|---|---|---|
| 40 | −1.63 | −17.33 | −15.14 | −16.17 | −29.42 | 28.83 | −1.30 | −12.03 |
| 41 | −1.62 | −16.73 | 15.47 | −15.91 | −10.45 | 27.24 | −4.18 | −15.77 |
| 42 | −1.76 | −17.69 | −4.99 | −16.03 | 12.60 | 28.26 | −1.18 | 19.16 |
| 43 | −1.73 | −16.97 | 12.09 | −15.62 | −11.85 | 26.94 | −0.37 | 0.46 |
| 44 | −1.61 | −17.12 | −5.19 | −15.90 | 2.02 | 26.26 | −0.46 | −5.74 |
| 45 | −1.70 | −17.11 | 2.87 | −15.47 | −1.41 | 27.27 | 2.06 | 2.50 |
| 46 | −1.71 | −18.19 | −5.68 | −15.33 | −1.19 | 27.62 | 1.22 | 2.53 |
| 47 | −1.69 | −17.28 | −11.69 | −15.44 | −22.75 | 27.70 | −1.62 | 1.81 |
| 48 | −2.35 | −23.98 | −5.23 | −19.65 | 22.91 | 35.28 | −12.08 | −13.87 |
| 49 | −2.43 | −27.18 | 5.93 | −18.98 | −27.08 | 38.11 | −20.01 | −4.01 |
| 50 | −2.31 | −25.96 | −1.21 | −17.47 | −3.80 | 36.94 | −16.15 | 0.74 |
| 51 | −2.43 | −25.54 | −5.39 | −18.91 | 2.69 | 37.51 | −17.32 | −10.40 |
| 52 | −2.34 | −25.63 | −0.54 | −16.74 | −13.52 | 38.11 | −12.87 | 1.63 |
| 53 | −2.28 | −26.61 | 18.39 | −19.47 | 38.54 | 36.67 | −15.14 | −8.79 |
| 54 | −2.24 | −25.23 | 0.96 | −18.66 | −4.01 | 37.97 | −12.54 | 3.16 |
| 55 | −2.46 | −26.20 | 3.85 | −20.41 | −20.02 | 38.86 | −9.05 | −6.67 |
| 56 | −2.20 | −26.94 | −5.01 | −19.81 | 20.93 | 36.49 | −12.64 | 1.44 |
| 57 | −2.24 | −26.94 | −1.68 | −18.68 | −1.71 | 36.78 | −9.21 | 13.52 |
| 58 | −2.27 | −24.52 | 0.95 | −18.90 | −12.42 | 39.65 | −21.43 | −15.86 |
| 59 | −2.33 | −25.67 | −10.70 | −19.74 | 1.12 | 39.45 | −18.24 | 7.89 |
| 60 | −2.30 | −26.36 | 11.17 | −18.81 | −2.69 | 39.28 | −17.71 | −4.19 |
| 61 | −2.29 | −24.66 | 3.78 | −19.38 | −19.97 | 38.21 | −17.79 | −5.47 |
| 62 | −2.42 | −24.80 | 11.78 | −19.14 | 3.75 | 38.29 | −17.86 | −0.73 |
| 63 | −2.44 | −24.51 | −21.78 | −18.50 | 23.88 | 36.49 | −15.04 | −0.89 |
| 64 | −1.83 | −13.40 | −11.14 | −13.47 | 6.68 | 20.28 | −11.60 | 8.74 |
| 65 | −1.62 | −15.70 | 1.68 | −12.90 | 6.44 | 19.59 | −9.48 | −7.91 |
| 66 | −1.80 | −13.18 | −15.05 | −13.18 | 1.99 | 18.97 | −9.93 | −3.74 |
| 67 | −1.63 | −13.75 | −7.33 | −13.37 | −23.16 | 18.82 | −6.33 | −1.89 |
| 68 | −1.76 | −13.83 | 8.46 | −12.67 | 5.10 | 20.29 | −9.76 | 5.80 |
| 69 | −1.74 | −13.90 | 1.52 | −12.82 | −22.21 | 18.64 | −11.50 | −0.64 |
| 70 | −1.78 | −14.92 | 1.24 | −12.89 | 4.97 | 19.29 | −7.71 | −4.83 |
| 71 | −1.90 | −13.09 | −9.94 | −13.40 | −18.68 | 19.39 | −5.61 | 6.31 |
| 72 | −1.81 | −14.30 | −9.16 | −13.84 | 13.20 | 18.53 | −6.02 | −1.96 |
| 73 | −1.76 | −14.66 | −2.27 | −12.31 | −4.24 | 18.90 | −6.41 | 14.15 |
| 74 | −1.79 | −13.88 | −6.26 | −12.21 | −0.23 | 19.15 | −10.59 | −0.15 |
| 75 | −1.64 | −13.15 | 2.92 | −13.45 | −9.89 | 19.10 | −10.12 | −5.30 |
| 76 | −1.77 | −13.07 | 4.78 | −13.52 | −1.98 | 19.49 | −8.17 | −0.11 |
| 77 | −1.67 | −13.32 | 0.73 | −13.84 | 5.22 | 20.52 | −11.56 | −5.77 |
| 78 | −1.77 | −13.99 | −4.65 | −12.55 | −8.03 | 18.97 | −7.84 | 0.31 |
| 79 | −1.70 | −13.62 | 3.32 | −13.01 | 5.30 | 20.11 | −7.49 | 7.78 |

| k | $a_{48k}$ | $a_{49k}$ | $a_{50k}$ | $a_{51k}$ | $a_{52k}$ | $a_{53k}$ | $a_{54k}$ | $a_{55k}$ |
|---|---|---|---|---|---|---|---|---|
| 40 | 10.47 | 21.27 | −10.21 | 0.10 | 68.25 | −3.70 | −1.40 | 6.15 |
| 41 | 10.05 | 21.29 | −10.73 | −5.80 | 66.81 | −3.54 | −1.12 | 5.55 |
| 42 | 9.65 | 21.44 | −10.41 | 3.16 | 64.95 | −2.16 | −1.26 | 5.51 |
| 43 | 10.09 | 20.98 | −9.71 | −1.86 | 66.84 | −1.27 | −1.51 | 5.68 |
| 44 | 10.76 | 21.46 | −10.07 | −3.57 | 67.32 | −1.94 | −1.25 | 6.11 |
| 45 | 12.36 | 21.09 | −11.19 | −6.00 | 66.15 | −1.00 | −1.45 | 5.81 |
| 46 | 9.57 | 21.06 | −10.42 | −7.61 | 64.58 | −2.32 | −1.27 | 4.69 |
| 47 | 10.48 | 21.27 | −8.46 | −5.23 | 67.39 | −2.78 | −1.50 | 5.91 |
| 48 | 19.85 | 26.07 | −17.78 | 5.77 | 76.70 | −5.97 | −1.33 | 7.34 |
| 49 | 17.76 | 26.10 | −18.03 | −11.44 | 73.40 | −5.48 | −1.67 | 5.96 |
| 50 | 19.37 | 25.92 | −17.34 | −2.21 | 75.97 | −4.95 | −1.61 | 6.77 |
| 51 | 19.60 | 26.19 | −15.93 | 1.24 | 77.29 | −6.90 | −0.94 | 6.74 |
| 52 | 20.65 | 25.47 | −17.51 | −0.40 | 74.81 | −5.15 | −1.53 | 6.92 |
| 53 | 20.51 | 24.90 | −17.03 | 6.78 | 78.03 | −4.57 | −1.38 | 7.08 |
| 54 | 19.00 | 25.89 | −16.67 | −8.22 | 78.44 | −7.80 | −0.90 | 5.93 |
| 55 | 19.61 | 26.07 | −16.10 | −4.31 | 75.29 | −5.28 | −0.84 | 7.33 |
| 56 | 17.19 | 25.63 | −17.16 | −4.83 | 76.12 | −6.28 | −1.30 | 7.15 |
| 57 | 16.12 | 26.62 | −18.85 | −10.03 | 76.11 | −7.80 | −1.48 | 6.26 |
| 58 | 22.83 | 25.80 | −18.76 | 0.78 | 79.84 | −6.48 | −1.62 | 6.51 |
| 59 | 18.77 | 25.66 | −19.39 | −3.45 | 75.39 | −5.64 | −1.89 | 5.89 |
| 60 | 18.65 | 26.05 | −17.83 | 9.61 | 75.07 | −4.95 | −1.50 | 7.25 |
| 61 | 20.10 | 25.50 | −17.72 | 5.46 | 79.24 | −5.64 | −0.75 | 6.04 |
| 62 | 18.06 | 26.18 | −16.77 | −0.60 | 75.60 | −5.70 | −1.29 | 5.48 |
| 63 | 20.15 | 26.14 | −18.30 | 0.52 | 77.40 | −5.65 | −1.63 | 6.15 |
| 64 | 4.17 | 11.78 | −11.14 | −6.19 | 47.76 | 4.84 | −0.10 | 1.22 |
| 65 | 4.95 | 11.91 | −11.29 | −7.40 | 49.57 | 5.36 | −0.13 | 0.55 |
| 66 | 5.23 | 11.69 | −11.24 | 2.25 | 47.65 | 3.93 | −0.44 | 1.66 |

-continued

| k | | | | | | | |
|---|---|---|---|---|---|---|---|
| 67 | 4.34 | 11.68 | −12.65 | −2.83 | 44.20 | 6.00 | −0.18 | 1.83 |
| 68 | 4.77 | 11.73 | −10.81 | −7.30 | 48.16 | 4.80 | 0.07 | 1.50 |
| 69 | 5.63 | 12.02 | −11.26 | −5.67 | 46.34 | 4.37 | −0.32 | 1.27 |
| 70 | 6.80 | 11.44 | −12.79 | 4.52 | 46.72 | 4.09 | −0.01 | 1.03 |
| 71 | 4.40 | 11.61 | −10.90 | 3.28 | 46.91 | 5.31 | −0.15 | 1.20 |
| 72 | 5.63 | 11.86 | −9.84 | −2.76 | 47.55 | 4.03 | −0.09 | 1.07 |
| 73 | 5.57 | 11.65 | −11.73 | 4.00 | 48.09 | 5.29 | −0.14 | 1.55 |
| 74 | 6.56 | 12.02 | −11.78 | 5.11 | 47.54 | 4.43 | −0.34 | 1.50 |
| 75 | 4.76 | 11.61 | −12.34 | −1.54 | 46.82 | 4.11 | −0.51 | 1.09 |
| 76 | 3.83 | 11.41 | −11.62 | 5.85 | 45.35 | 5.55 | −0.03 | 1.42 |
| 77 | 5.23 | 11.93 | −10.66 | −2.98 | 46.92 | 4.34 | −0.39 | 1.13 |
| 78 | 6.95 | 12.23 | −11.66 | 2.36 | 44.43 | 5.72 | −0.37 | 1.19 |
| 79 | 5.55 | 11.92 | −10.93 | 2.02 | 45.36 | 5.01 | −0.28 | 1.38 |

| k | a56k | a57k | a58k | a59k | a60k | a61k | a62k | a63k |
|---|---|---|---|---|---|---|---|---|
| 40 | −13.21 | 46.06 | 0.12 | 12.76 | 40.97 | 2.21 | −5.81 | 30.19 |
| 41 | 5.60 | 43.87 | 0.12 | 12.55 | 40.42 | 2.20 | −5.66 | 10.59 |
| 42 | 1.30 | 43.78 | 0.08 | 13.33 | 42.36 | 2.34 | 104.95 | 11.44 |
| 43 | −7.10 | 45.74 | 0.12 | 12.70 | 41.80 | 2.17 | 53.45 | 1.42 |
| 44 | −15.01 | 43.41 | 0.08 | 13.65 | 40.16 | 2.34 | 7.38 | 7.04 |
| 45 | −4.50 | 44.35 | 0.10 | 13.38 | 42.10 | 2.24 | −60.08 | 29.55 |
| 46 | −6.08 | 43.93 | 0.11 | 12.88 | 41.53 | 2.30 | 43.67 | −37.28 |
| 47 | −1.42 | 43.77 | 0.10 | 12.83 | 42.02 | 2.03 | −33.22 | −1.93 |
| 48 | 7.40 | 55.67 | 0.34 | 15.31 | 49.80 | 3.58 | −32.69 | −7.42 |
| 49 | 0.03 | 55.98 | 0.35 | 15.00 | 48.94 | 3.07 | −12.52 | −12.64 |
| 50 | 13.40 | 56.33 | 0.38 | 16.14 | 50.79 | 2.89 | 79.93 | −57.05 |
| 51 | −14.93 | 53.37 | 0.35 | 15.22 | 51.09 | 2.85 | 70.33 | 27.06 |
| 52 | 2.81 | 54.09 | 0.35 | 15.14 | 49.42 | 3.15 | 3.52 | −55.33 |
| 53 | −6.01 | 56.32 | 0.35 | 14.90 | 50.48 | 2.85 | −83.24 | −53.13 |
| 54 | −22.63 | 56.03 | 0.32 | 15.27 | 49.90 | 2.96 | 131.84 | −18.47 |
| 55 | −12.38 | 57.33 | 0.34 | 14.90 | 48.67 | 2.74 | 61.03 | 8.29 |
| 56 | 15.92 | 55.65 | 0.35 | 16.30 | 50.40 | 2.95 | −128.30 | −29.08 |
| 57 | 5.86 | 54.69 | 0.34 | 14.83 | 50.68 | 3.04 | 60.23 | 14.95 |
| 58 | 6.32 | 56.35 | 0.37 | 16.09 | 50.08 | 3.27 | −61.65 | −31.02 |
| 59 | −4.18 | 54.81 | 0.39 | 15.12 | 49.89 | 2.74 | 48.95 | −25.32 |
| 60 | −1.82 | 55.12 | 0.32 | 16.16 | 49.81 | 2.53 | 23.54 | 38.64 |
| 61 | −6.60 | 56.15 | 0.31 | 14.82 | 50.61 | 3.48 | −15.81 | −62.06 |
| 62 | 13.52 | 55.60 | 0.36 | 14.65 | 50.81 | 2.75 | −55.36 | 2.84 |
| 63 | 6.26 | 55.11 | 0.35 | 16.22 | 50.09 | 2.78 | −38.96 | −9.46 |
| 64 | −6.41 | 21.29 | 0.06 | 13.13 | 25.53 | 2.19 | 3.75 | 28.78 |
| 65 | 5.40 | 20.54 | 0.03 | 12.43 | 26.21 | 2.26 | −53.85 | −56.62 |
| 66 | −1.36 | 21.26 | 0.08 | 12.95 | 24.86 | 1.82 | 19.76 | −12.86 |
| 67 | 2.78 | 19.53 | 0.06 | 13.77 | 25.62 | 1.69 | −28.92 | 2.03 |
| 68 | −2.41 | 19.89 | 0.07 | 12.87 | 24.40 | 2.26 | 4.00 | 8.27 |
| 69 | −0.42 | 20.76 | 0.08 | 13.75 | 25.35 | 2.40 | −7.41 | −16.89 |
| 70 | 2.68 | 21.11 | 0.06 | 12.80 | 26.02 | 1.63 | −34.09 | −1.22 |
| 71 | −2.07 | 20.29 | 0.06 | 13.23 | 24.64 | 2.14 | −0.73 | 27.99 |
| 72 | 13.77 | 19.43 | 0.03 | 12.95 | 25.40 | 2.05 | −41.90 | 41.49 |
| 73 | 6.38 | 21.39 | 0.07 | 12.67 | 25.45 | 2.27 | 64.46 | 10.51 |
| 74 | 14.28 | 20.99 | 0.05 | 12.33 | 26.63 | 1.89 | 72.91 | 18.93 |
| 75 | 11.50 | 20.47 | 0.07 | 13.27 | 25.94 | 1.95 | 95.35 | 4.58 |
| 76 | −2.82 | 20.91 | 0.06 | 12.71 | 25.71 | 2.04 | 58.62 | 12.36 |
| 77 | −11.93 | 21.90 | 0.02 | 13.81 | 25.86 | 2.21 | −10.84 | 12.70 |
| 78 | −11.93 | 20.49 | 0.07 | 13.10 | 25.82 | 2.10 | 20.80 | 15.62 |
| 79 | −4.90 | 21.84 | 0.05 | 13.09 | 25.78 | 1.86 | −24.02 | 21.73 |

| k | a0k | a1k | a2k | a3k | a4k | a5k | a6k | a7k |
|---|---|---|---|---|---|---|---|---|
| 80 | 237.62 | −19.42 | −15.00 | 22.16 | 76.44 | 7.36 | 55.13 | 20.11 |
| 81 | 245.81 | −19.54 | −15.13 | 18.05 | 77.32 | 7.05 | 55.20 | 19.51 |
| 82 | 239.03 | −19.32 | −14.10 | 14.18 | 76.56 | 7.65 | 54.42 | 21.17 |
| 83 | 239.85 | −19.51 | −14.78 | 16.79 | 75.94 | 7.74 | 53.67 | 19.67 |
| 84 | 236.54 | −19.33 | −14.34 | 17.57 | 76.25 | 5.88 | 54.22 | 20.28 |
| 85 | 233.79 | −19.10 | −14.73 | 18.82 | 77.02 | 7.74 | 55.42 | 19.18 |
| 86 | 244.29 | −19.38 | −14.24 | 21.06 | 76.84 | 7.05 | 53.39 | 21.57 |
| 87 | 245.46 | −19.23 | −14.63 | 19.52 | 76.89 | 6.20 | 55.06 | 19.29 |
| 88 | 237.27 | −19.52 | −15.00 | 11.51 | 75.62 | 6.84 | 54.76 | 18.98 |
| 89 | 246.30 | −19.38 | −14.77 | 19.82 | 76.40 | 7.87 | 53.51 | 19.31 |
| 90 | 239.99 | −19.66 | −14.51 | 23.01 | 78.38 | 7.62 | 54.41 | 20.58 |
| 91 | 246.68 | −19.32 | −14.48 | 19.30 | 76.38 | 6.57 | 54.02 | 19.59 |
| 92 | 244.90 | −18.74 | −14.76 | 19.33 | 75.50 | 8.02 | 53.86 | 19.84 |
| 93 | 240.25 | −19.46 | −14.08 | 15.51 | 77.25 | 6.68 | 54.41 | 20.96 |
| 94 | 236.25 | −19.15 | −14.29 | 15.40 | 77.92 | 8.29 | 54.72 | 20.92 |
| 95 | 234.53 | −19.51 | −14.79 | 15.95 | 76.96 | 7.71 | 53.95 | 19.60 |
| 96 | 225.80 | −14.96 | −12.69 | 32.62 | 79.10 | −8.15 | 47.15 | 29.30 |
| 97 | 224.72 | −15.06 | −12.31 | 38.11 | 78.67 | −8.34 | 47.15 | 28.12 |
| 98 | 219.05 | −15.08 | −12.67 | 33.06 | 78.99 | −8.10 | 46.83 | 29.35 |
| 99 | 225.28 | −15.07 | −12.13 | 34.86 | 78.98 | −7.64 | 46.64 | 29.02 |

-continued

| | | | | | | | |
|---|---|---|---|---|---|---|---|
| 100 | 219.18 | −15.13 | −12.51 | 32.24 | 79.59 | −8.61 | 46.55 | 28.06 |
| 101 | 223.01 | −14.98 | −12.59 | 32.56 | 78.79 | −7.85 | 47.48 | 29.74 |
| 102 | 226.92 | −15.06 | −12.82 | 35.50 | 78.13 | −8.46 | 47.53 | 29.39 |
| 103 | 218.47 | −15.15 | −12.70 | 31.58 | 77.22 | −8.28 | 47.09 | 28.69 |
| 104 | 217.40 | −15.08 | −12.47 | 31.83 | 77.80 | −8.14 | 47.10 | 29.56 |
| 105 | 211.59 | −15.13 | −12.39 | 34.55 | 78.57 | −8.92 | 46.36 | 27.44 |
| 106 | 218.37 | −14.92 | −13.15 | 31.41 | 78.23 | −8.59 | 47.33 | 28.58 |
| 107 | 213.20 | −15.28 | −12.69 | 32.20 | 78.63 | −8.15 | 47.25 | 28.56 |
| 108 | 211.17 | −15.16 | −12.35 | 33.61 | 78.13 | −8.64 | 46.45 | 29.12 |
| 109 | 225.61 | −15.22 | −12.14 | 30.36 | 76.95 | −7.72 | 47.83 | 29.32 |
| 110 | 225.64 | −15.32 | −12.32 | 30.59 | 79.54 | −8.44 | 47.85 | 29.54 |
| 111 | 224.91 | −15.05 | −12.61 | 33.73 | 78.88 | −8.69 | 47.23 | 29.07 |
| 112 | −89.51 | −0.54 | 3.33 | −33.39 | 1.42 | 11.15 | 2.84 | −3.79 |
| 113 | −86.30 | −0.64 | 3.48 | −32.33 | 1.63 | 11.26 | 2.88 | −3.91 |
| 114 | −80.17 | −0.41 | 3.36 | −33.65 | 1.40 | 11.45 | 2.87 | −2.39 |
| 115 | −86.94 | −0.54 | 3.66 | −33.07 | 1.89 | 10.91 | 3.66 | −2.75 |
| 116 | −80.07 | −0.67 | 3.73 | −32.76 | 1.05 | 11.32 | 2.95 | −2.93 |
| 117 | −87.45 | −0.91 | 3.55 | −31.94 | 1.72 | 11.40 | 3.03 | −3.38 |
| 118 | −80.27 | −0.56 | 3.49 | −31.59 | 1.38 | 11.19 | 3.53 | −3.49 |
| 119 | −90.36 | −0.70 | 3.58 | −32.58 | 1.11 | 10.70 | 3.54 | −3.50 |

| k | a8k | a9k | a10k | a11k | a12k | a13k | a14k | a15k |
|---|---|---|---|---|---|---|---|---|
| 80 | −186.45 | −104.53 | −2.49 | −80.09 | −134.45 | 10.24 | −14.72 | 95.88 |
| 81 | −192.97 | −107.51 | −2.51 | −80.49 | −133.61 | 10.69 | −14.16 | 94.57 |
| 82 | −187.71 | −108.95 | −2.46 | −79.35 | −133.97 | 10.30 | −14.36 | 97.20 |
| 83 | −196.02 | −105.38 | −2.44 | −78.86 | −135.96 | 9.68 | −14.04 | 92.95 |
| 84 | −194.61 | −105.27 | −2.45 | −79.94 | −133.74 | 10.20 | −14.61 | 95.05 |
| 85 | −198.68 | −106.99 | −2.42 | −81.39 | −132.72 | 10.63 | −14.47 | 94.83 |
| 86 | −194.46 | −107.19 | −2.42 | −82.50 | −134.72 | 10.43 | −14.56 | 95.38 |
| 87 | −200.13 | −106.43 | −2.49 | −78.22 | −134.53 | 10.86 | −14.80 | 93.82 |
| 88 | −193.98 | −106.70 | −2.47 | −81.14 | −133.25 | 10.47 | −14.52 | 93.65 |
| 89 | −196.03 | −107.53 | −2.45 | −80.79 | −133.78 | 9.95 | −14.23 | 95.79 |
| 90 | −197.87 | −106.99 | −2.47 | −79.13 | −135.12 | 10.49 | −14.67 | 92.70 |
| 91 | −196.90 | −110.92 | −2.43 | −82.52 | −133.55 | 10.59 | −14.29 | 95.36 |
| 92 | −197.47 | −106.85 | −2.47 | −82.24 | −133.42 | 10.28 | −14.49 | 95.94 |
| 93 | −195.18 | −104.82 | −2.46 | −82.04 | −134.55 | 10.47 | −14.71 | 94.09 |
| 94 | −195.83 | −106.77 | −2.42 | −79.90 | −131.30 | 10.06 | −14.41 | 92.75 |
| 95 | −195.81 | −104.92 | −2.43 | −82.97 | −133.36 | 10.49 | −14.20 | 92.97 |
| 96 | −181.47 | −115.06 | −2.02 | −70.47 | −131.47 | 11.38 | −17.41 | 86.99 |
| 97 | −188.01 | −114.36 | −2.00 | −72.63 | −131.68 | 10.99 | −17.24 | 89.31 |
| 98 | −180.37 | −115.61 | −1.98 | −70.70 | −131.42 | 10.72 | −17.68 | 87.15 |
| 99 | −180.37 | −114.48 | −2.02 | −67.98 | −131.22 | 10.86 | −17.79 | 89.21 |
| 100 | −182.21 | −111.90 | −2.00 | −70.02 | −132.86 | 10.41 | −17.62 | 92.41 |
| 101 | −178.91 | −117.06 | −2.03 | −71.92 | −129.11 | 11.31 | −17.42 | 90.89 |
| 102 | −181.48 | −113.66 | −2.01 | −69.24 | −130.05 | 11.09 | −17.57 | 94.75 |
| 103 | −180.28 | −117.23 | −2.03 | −71.54 | −128.29 | 10.24 | −17.24 | 92.37 |
| 104 | −185.23 | −115.73 | −2.01 | −69.82 | −129.67 | 11.10 | −17.39 | 87.03 |
| 105 | −182.95 | −111.77 | −2.03 | −71.93 | −130.92 | 11.05 | −17.50 | 90.66 |
| 106 | −180.42 | −115.91 | −2.02 | −71.93 | −132.11 | 10.58 | −17.60 | 89.10 |
| 107 | −184.49 | −115.82 | −2.04 | −70.93 | −133.27 | 10.63 | −17.39 | 92.69 |
| 108 | −182.04 | −114.89 | −2.02 | −73.68 | −130.74 | 10.27 | −17.30 | 88.48 |
| 109 | −187.39 | −116.94 | −2.00 | −70.45 | −133.71 | 10.58 | −17.37 | 88.44 |
| 110 | −183.45 | −115.03 | −2.00 | −72.48 | −131.80 | 10.55 | −17.51 | 87.44 |
| 111 | −178.97 | −116.76 | −2.03 | −70.39 | −131.76 | 11.18 | −17.83 | 90.02 |
| 112 | 53.55 | 15.02 | −0.01 | 26.67 | −5.88 | −9.21 | 0.67 | −27.37 |
| 113 | 55.15 | 13.52 | −0.06 | 23.88 | −7.50 | −9.22 | 0.32 | −26.84 |
| 114 | 55.34 | 13.76 | −0.05 | 25.76 | −6.52 | −9.00 | 0.45 | −23.41 |
| 115 | 56.13 | 12.27 | −0.04 | 26.72 | −7.43 | −8.65 | 0.23 | −25.40 |
| 116 | 58.20 | 12.54 | 0.00 | 27.33 | −8.21 | −9.11 | 0.39 | −25.47 |
| 117 | 53.40 | 11.55 | −0.04 | 24.89 | −6.52 | −9.32 | 0.47 | −26.03 |
| 118 | 57.18 | 15.39 | −0.04 | 26.82 | −6.54 | −9.12 | 0.17 | −26.77 |
| 119 | 53.75 | 13.14 | −0.04 | 25.75 | −5.81 | −9.26 | 0.44 | −26.64 |

| k | a16k | a17k | a18k | a19k | a20k | a21k | a22k | a23k |
|---|---|---|---|---|---|---|---|---|
| 80 | 1.25 | 31.48 | 36.45 | 5.03 | −4.19 | −13.70 | 34.65 | 3.63 |
| 81 | 1.58 | 31.20 | 35.32 | 3.71 | −4.06 | −13.75 | −25.86 | 3.60 |
| 82 | 0.39 | 32.65 | 36.13 | −66.31 | −4.02 | −13.44 | 2.89 | 3.60 |
| 83 | 1.13 | 32.53 | 35.72 | 9.35 | −4.30 | −13.69 | −12.59 | 3.59 |
| 84 | 1.32 | 32.05 | 35.43 | 77.97 | −4.23 | −13.75 | −11.80 | 3.64 |
| 85 | 0.40 | 32.67 | 35.83 | 10.64 | −4.27 | −13.54 | −13.35 | 3.59 |
| 86 | 1.24 | 31.25 | 36.79 | −0.20 | −4.24 | −13.69 | −7.93 | 3.61 |
| 87 | 0.63 | 32.68 | 36.03 | −9.71 | −3.66 | −13.65 | 28.19 | 3.65 |
| 88 | 1.29 | 31.34 | 35.88 | 45.80 | −4.03 | −13.27 | −1.63 | 3.60 |
| 89 | −1.15 | 32.21 | 35.54 | 38.92 | −4.00 | −13.62 | −23.70 | 3.68 |
| 90 | −0.43 | 31.99 | 35.51 | −10.68 | −4.34 | −13.83 | −29.95 | 3.70 |
| 91 | 0.06 | 31.39 | 37.08 | 16.14 | −3.99 | −13.78 | −12.77 | 3.64 |
| 92 | −2.56 | 32.15 | 36.26 | −18.55 | −3.82 | −13.57 | −2.25 | 3.67 |

-continued

| k | | | | | | | |
|---|---|---|---|---|---|---|---|
| 93 | −1.69 | 31.85 | 35.62 | −46.41 | −3.96 | −13.64 | −21.34 | 3.64 |
| 94 | 0.62 | 32.69 | 35.98 | −64.99 | −4.18 | −13.56 | −7.76 | 3.68 |
| 95 | 2.32 | 32.37 | 36.68 | 2.72 | −3.94 | −13.79 | −10.48 | 3.62 |
| 96 | 1.91 | 27.17 | 35.46 | 31.42 | −6.83 | −14.35 | −4.68 | 3.04 |
| 97 | −0.84 | 28.04 | 36.09 | 66.63 | −6.64 | −14.40 | −26.19 | 3.11 |
| 98 | −0.22 | 28.28 | 35.61 | −27.73 | −6.88 | −14.78 | −1.46 | 3.08 |
| 99 | 0.40 | 28.54 | 36.22 | −57.05 | −6.45 | −14.68 | 10.02 | 3.12 |
| 100 | −1.97 | 28.51 | 35.25 | −1.24 | −6.95 | −14.54 | −11.66 | 3.11 |
| 101 | −0.27 | 28.64 | 35.64 | −32.40 | −6.88 | −14.72 | −4.98 | 3.09 |
| 102 | −0.47 | 27.32 | 35.97 | 27.27 | −6.83 | −14.57 | 10.59 | 3.08 |
| 103 | 0.44 | 28.14 | 35.71 | −30.29 | −7.15 | −14.77 | −9.52 | 3.05 |
| 104 | 1.54 | 28.04 | 35.70 | 17.22 | −7.02 | −14.61 | −8.51 | 3.08 |
| 105 | 1.01 | 27.15 | 36.02 | 15.69 | −6.67 | −14.79 | −14.83 | 3.10 |
| 106 | −0.91 | 27.98 | 35.25 | 12.21 | −6.68 | −14.71 | −3.81 | 3.04 |
| 107 | 0.73 | 26.90 | 35.44 | −45.54 | −7.21 | −14.30 | −8.87 | 3.12 |
| 108 | 0.21 | 28.51 | 35.12 | −4.38 | −6.82 | −14.75 | −32.65 | 3.15 |
| 109 | 1.95 | 28.09 | 35.19 | −12.43 | −7.11 | −14.39 | 17.18 | 3.04 |
| 110 | −0.93 | 28.33 | 36.14 | −55.64 | −6.91 | −14.73 | 9.19 | 3.13 |
| 111 | 1.20 | 28.73 | 35.63 | −23.48 | −6.74 | −14.51 | 0.11 | 3.05 |
| 112 | −0.02 | −4.26 | 4.39 | −21.84 | −1.95 | −1.90 | 4.25 | 0.50 |
| 113 | −0.19 | −5.10 | 4.80 | −4.81 | −1.96 | −1.52 | 0.62 | 0.54 |
| 114 | −0.55 | −5.07 | 4.62 | 20.67 | −2.08 | −1.80 | 1.84 | 0.56 |
| 115 | −0.12 | −4.51 | 4.51 | 41.62 | −1.85 | −1.93 | 2.57 | 0.56 |
| 116 | −0.88 | −3.89 | 4.43 | −8.71 | −1.84 | −1.74 | −0.13 | 0.55 |
| 117 | −0.21 | −4.95 | 4.50 | −8.92 | −1.94 | −1.54 | −3.25 | 0.54 |
| 118 | −0.11 | −4.62 | 4.46 | 15.90 | −1.87 | −1.91 | 1.65 | 0.54 |
| 119 | −0.29 | −4.89 | 4.58 | −6.43 | −1.68 | −1.77 | −5.02 | 0.52 |

| k | a24k | a25k | a26k | a27k | a28k | a29k | a30k | a31k |
|---|---|---|---|---|---|---|---|---|
| 80 | −0.72 | 13.41 | 156.23 | −22.05 | 54.69 | −21.12 | −36.70 | −16.35 |
| 81 | 1.23 | 12.76 | 154.12 | −21.44 | 53.34 | −21.60 | −37.59 | −15.05 |
| 82 | 1.64 | 13.48 | 158.87 | −21.61 | 53.88 | −20.64 | −36.38 | −19.94 |
| 83 | −0.66 | 13.19 | 153.77 | −22.15 | 54.43 | −20.25 | −34.46 | −17.11 |
| 84 | 0.56 | 13.61 | 156.37 | −21.57 | 54.48 | −19.82 | −35.80 | −16.25 |
| 85 | −0.14 | 13.52 | 158.07 | −21.30 | 54.41 | −20.91 | −34.52 | −12.68 |
| 86 | 0.41 | 13.54 | 156.75 | −21.79 | 53.12 | −20.37 | −36.33 | −13.44 |
| 87 | −1.00 | 12.92 | 156.99 | −21.66 | 53.95 | −19.99 | −35.01 | −12.89 |
| 88 | −0.16 | 14.20 | 155.55 | −21.40 | 54.41 | −20.89 | −34.07 | −15.57 |
| 89 | −1.85 | 12.45 | 156.90 | −21.26 | 53.80 | −21.84 | −36.75 | −17.41 |
| 90 | 0.51 | 13.56 | 157.68 | −21.81 | 54.28 | −20.43 | −34.55 | −16.46 |
| 91 | 2.46 | 13.10 | 155.86 | −22.04 | 54.75 | −20.86 | −34.88 | −13.51 |
| 92 | −1.96 | 13.68 | 155.14 | −22.09 | 53.98 | −20.80 | −37.23 | −20.04 |
| 93 | 4.18 | 13.40 | 158.36 | −21.82 | 54.19 | −20.46 | −36.36 | −16.43 |
| 94 | 3.18 | 13.43 | 156.65 | −22.12 | 53.60 | −20.05 | −35.90 | −16.26 |
| 95 | −1.71 | 13.55 | 155.07 | −22.08 | 53.90 | −20.33 | −36.81 | −16.48 |
| 96 | −1.87 | 11.55 | 132.79 | −19.54 | 51.83 | −3.17 | −27.20 | 2.49 |
| 97 | 1.90 | 11.74 | 132.36 | −19.78 | 51.36 | −2.55 | −26.79 | −1.40 |
| 98 | 2.83 | 11.98 | 133.42 | −19.47 | 52.29 | −2.64 | −26.69 | 2.37 |
| 99 | −2.49 | 11.82 | 130.84 | −19.85 | 52.62 | −2.99 | −27.51 | 0.39 |
| 100 | −2.51 | 12.23 | 132.00 | −19.92 | 52.38 | −2.79 | −27.31 | 1.30 |
| 101 | −0.33 | 11.25 | 135.64 | −19.17 | 52.55 | −3.21 | −28.44 | 0.79 |
| 102 | −0.66 | 11.59 | 132.50 | −19.63 | 51.89 | −2.65 | −28.62 | 0.35 |
| 103 | 4.76 | 11.46 | 133.48 | −19.67 | 51.71 | −3.21 | −25.00 | 0.87 |
| 104 | 3.28 | 11.84 | 132.09 | −19.71 | 52.27 | −3.36 | −27.45 | 2.13 |
| 105 | 0.21 | 11.47 | 129.46 | −19.72 | 51.54 | −2.97 | −27.22 | −2.11 |
| 106 | 1.65 | 12.36 | 134.76 | −19.93 | 52.29 | −2.91 | −28.74 | 3.66 |
| 107 | 5.53 | 11.96 | 132.76 | −19.63 | 52.03 | −3.21 | −29.41 | −1.15 |
| 108 | −3.77 | 11.16 | 131.28 | −19.55 | 51.37 | −2.87 | −27.01 | 1.87 |
| 109 | −3.12 | 11.83 | 134.62 | −19.65 | 52.18 | −2.48 | −26.46 | 0.83 |
| 110 | 2.85 | 12.08 | 133.21 | −19.44 | 52.47 | −3.09 | −27.62 | −1.18 |
| 111 | 0.07 | 11.77 | 131.28 | −19.90 | 52.21 | −2.69 | −27.81 | 2.83 |
| 112 | 2.49 | −2.66 | 30.15 | −1.56 | 4.27 | −0.80 | −2.30 | −49.05 |
| 113 | −0.21 | −3.10 | 31.04 | −1.60 | 4.31 | −0.43 | −2.86 | −49.25 |
| 114 | 1.94 | −2.82 | 31.03 | −1.86 | 4.12 | −1.00 | −2.97 | −50.39 |
| 115 | 1.08 | −2.63 | 31.21 | −1.55 | 3.77 | −0.67 | −3.06 | −50.02 |
| 116 | −0.40 | −2.46 | 31.05 | −1.70 | 4.43 | −0.82 | −2.46 | −50.67 |
| 117 | −0.06 | −2.74 | 31.50 | −1.52 | 4.41 | −0.77 | −2.77 | −50.13 |
| 118 | −0.80 | −2.66 | 31.91 | −1.62 | 3.94 | −0.64 | −2.97 | −49.29 |
| 119 | −0.25 | −2.75 | 32.83 | −1.54 | 3.88 | −0.49 | −2.99 | −49.55 |

| k | a32k | a33k | a34k | a35k | a36k | a37k | a38k | a39k |
|---|---|---|---|---|---|---|---|---|
| 80 | −95.69 | 0.82 | −1.10 | 46.86 | −0.54 | 130.43 | −0.31 | −6.35 |
| 81 | −95.93 | 0.92 | −0.98 | 46.06 | −0.58 | 127.11 | 0.13 | −6.43 |
| 82 | −96.16 | 0.86 | −1.01 | 45.27 | −0.54 | 127.80 | −0.38 | −6.37 |
| 83 | −95.92 | 0.73 | −0.94 | 45.00 | −0.54 | 128.49 | 0.19 | −6.34 |
| 84 | −95.27 | 0.81 | −1.04 | 44.91 | −0.64 | 126.65 | −0.16 | −6.39 |
| 85 | −92.81 | 0.66 | −0.86 | 47.10 | −0.53 | 130.24 | 0.06 | −6.42 |

-continued

|     |          |      |       |       |       |        |       |       |
|-----|----------|------|-------|-------|-------|--------|-------|-------|
| 86  | −96.29   | 0.72 | −0.91 | 45.81 | −0.46 | 128.86 | −0.40 | −6.39 |
| 87  | −96.00   | 1.01 | −0.93 | 46.00 | −0.58 | 128.57 | 0.25  | −6.31 |
| 88  | −94.99   | 0.62 | −0.94 | 45.13 | −0.55 | 128.39 | 0.16  | −6.34 |
| 89  | −96.60   | 0.78 | −0.89 | 45.47 | −0.52 | 126.84 | −0.11 | −6.40 |
| 90  | −94.71   | 1.23 | −1.19 | 45.58 | −0.62 | 128.54 | −0.77 | −6.34 |
| 91  | −94.84   | 0.65 | −1.13 | 45.76 | −0.67 | 128.77 | −0.04 | −6.34 |
| 92  | −98.94   | 0.90 | −1.10 | 46.93 | −0.58 | 126.04 | 0.20  | −6.35 |
| 93  | −95.55   | 0.79 | −1.08 | 45.13 | −0.51 | 126.68 | 0.11  | −6.38 |
| 94  | −95.94   | 0.89 | −0.91 | 46.23 | −0.61 | 127.94 | −0.21 | −6.32 |
| 95  | −95.34   | 1.31 | −1.05 | 44.16 | −0.61 | 129.03 | −0.25 | −6.34 |
| 96  | −107.90  | 0.76 | 0.00  | 43.98 | −0.72 | 132.70 | 4.65  | −5.94 |
| 97  | −107.59  | 0.99 | −0.20 | 44.15 | −0.85 | 132.48 | 4.73  | −5.90 |
| 98  | −107.87  | 0.85 | −0.02 | 44.18 | −0.77 | 134.56 | 4.47  | −5.93 |
| 99  | −107.13  | 0.84 | −0.11 | 44.50 | −0.88 | 132.73 | 5.06  | −5.89 |
| 100 | −107.14  | 0.81 | −0.29 | 43.22 | −0.80 | 132.40 | 4.81  | −5.89 |
| 101 | −107.45  | 1.18 | −0.09 | 44.08 | −0.83 | 129.23 | 4.52  | −5.89 |
| 102 | −107.72  | 0.94 | −0.04 | 43.68 | −0.76 | 128.11 | 4.76  | −5.93 |
| 103 | −108.87  | 0.85 | −0.20 | 44.01 | −0.84 | 131.58 | 4.83  | −5.90 |
| 104 | −106.70  | 0.96 | −0.25 | 42.66 | −0.82 | 129.83 | 5.01  | −5.99 |
| 105 | −106.40  | 0.98 | −0.08 | 43.16 | −0.85 | 130.13 | 4.95  | −5.86 |
| 106 | −106.63  | 1.09 | −0.06 | 44.91 | −0.82 | 129.33 | 4.92  | −5.93 |
| 107 | −107.55  | 1.00 | −0.13 | 43.78 | −0.79 | 131.18 | 4.41  | −6.02 |
| 108 | −105.69  | 1.12 | −0.27 | 44.38 | −0.87 | 131.80 | 5.34  | −5.86 |
| 109 | −105.87  | 1.07 | 0.08  | 43.11 | −0.79 | 133.55 | 4.85  | −5.86 |
| 110 | −107.71  | 0.90 | −0.20 | 43.99 | −0.87 | 133.70 | 4.92  | −6.02 |
| 111 | −106.95  | 0.78 | −0.10 | 44.61 | −0.76 | 130.77 | 4.70  | −5.93 |
| 112 | −4.44    | 1.70 | 1.70  | 0.99  | −0.98 | −0.86  | 2.56  | −2.05 |
| 113 | −4.14    | 1.83 | 1.66  | 1.66  | −0.97 | −1.69  | 2.43  | −2.09 |
| 114 | −4.10    | 1.81 | 1.72  | 0.63  | −0.94 | −2.98  | 2.44  | −1.99 |
| 115 | −4.14    | 1.83 | 1.69  | 0.96  | −0.99 | −3.20  | 2.68  | −2.10 |
| 116 | −4.28    | 1.80 | 1.62  | 0.80  | −0.98 | −3.96  | 2.41  | −2.02 |
| 117 | −3.84    | 1.93 | 1.78  | 0.41  | −1.00 | −4.36  | 2.44  | −2.03 |
| 118 | −4.50    | 1.70 | 1.76  | 0.90  | −1.00 | −2.13  | 2.54  | −2.05 |
| 119 | −4.48    | 1.88 | 1.66  | 0.14  | −0.95 | −2.51  | 2.49  | −2.04 |

| k   | a40k | a41k  | a42k  | a43k   | a44k   | a45k   | a46k   | a47k   |
|-----|------|-------|-------|--------|--------|--------|--------|--------|
| 80  | 3.40 | 19.84 | 3.52  | −78.11 | −37.18 | −14.13 | −71.01 | 6.01   |
| 81  | 3.35 | 20.61 | −0.60 | −78.24 | −9.91  | −13.29 | −75.61 | −1.14  |
| 82  | 3.41 | 20.64 | 0.82  | −76.73 | 19.98  | −13.42 | −70.88 | −6.79  |
| 83  | 3.46 | 20.20 | −0.67 | −78.09 | −14.48 | −13.16 | −78.82 | 0.37   |
| 84  | 3.44 | 21.50 | 0.15  | −78.53 | −27.77 | −12.11 | −74.33 | −4.33  |
| 85  | 3.42 | 20.07 | −1.55 | −77.34 | −15.72 | −13.50 | −71.87 | −5.76  |
| 86  | 3.47 | 19.94 | −3.51 | −80.03 | 9.79   | −13.72 | −76.54 | −2.25  |
| 87  | 3.49 | 20.55 | 6.58  | −77.18 | 14.38  | −13.78 | −73.69 | −8.28  |
| 88  | 3.47 | 20.61 | 10.20 | −77.82 | −7.27  | −12.83 | −76.26 | −5.58  |
| 89  | 3.41 | 20.55 | 2.07  | −76.65 | 5.56   | −12.96 | −75.26 | −0.05  |
| 90  | 3.43 | 20.12 | −1.73 | −76.33 | −3.90  | −13.35 | −72.26 | 5.49   |
| 91  | 3.44 | 20.60 | 0.77  | −77.71 | −11.89 | −13.52 | −68.06 | −2.05  |
| 92  | 3.46 | 20.20 | 3.82  | −77.63 | −0.28  | −12.97 | −79.25 | −10.64 |
| 93  | 3.43 | 20.64 | 1.29  | −77.80 | −18.28 | −12.80 | −72.32 | 0.38   |
| 94  | 3.44 | 20.07 | 0.60  | −76.68 | 15.97  | −13.62 | −76.04 | 6.19   |
| 95  | 3.41 | 20.74 | −1.12 | −77.81 | 2.76   | −13.11 | −72.34 | −2.04  |
| 96  | 3.65 | 25.16 | 2.76  | −72.70 | −2.57  | −15.00 | −62.60 | −2.69  |
| 97  | 3.65 | 25.10 | 3.51  | −72.06 | −1.31  | −16.34 | −66.97 | 5.31   |
| 98  | 3.66 | 25.35 | 0.27  | −73.24 | 8.88   | −15.21 | −61.74 | 2.10   |
| 99  | 3.62 | 25.43 | −5.10 | −73.18 | −11.54 | −15.52 | −62.32 | 1.04   |
| 100 | 3.61 | 25.28 | 0.40  | −72.53 | −1.10  | −15.47 | −70.69 | −4.99  |
| 101 | 3.62 | 24.49 | −3.88 | −73.96 | −0.97  | −15.72 | −68.40 | 2.03   |
| 102 | 3.58 | 25.52 | 2.92  | −73.28 | 4.49   | −15.85 | −61.30 | −5.42  |
| 103 | 3.58 | 25.33 | 1.26  | −73.93 | −13.86 | −15.93 | −64.63 | −4.88  |
| 104 | 3.65 | 25.41 | 3.75  | −73.70 | 4.01   | −15.94 | −63.18 | 5.70   |
| 105 | 3.65 | 25.65 | −0.10 | −71.82 | −4.99  | −15.83 | −71.39 | −2.33  |
| 106 | 3.63 | 24.95 | 1.65  | −72.28 | −7.68  | −15.71 | −61.19 | 0.91   |
| 107 | 3.64 | 25.07 | 0.78  | −73.83 | −7.90  | −15.93 | −61.00 | −4.62  |
| 108 | 3.65 | 24.83 | −0.31 | −74.01 | 5.44   | −15.62 | −62.16 | 0.71   |
| 109 | 3.62 | 24.79 | 1.58  | −72.87 | −16.26 | −15.41 | −54.83 | −3.32  |
| 110 | 3.57 | 24.99 | 4.36  | −73.64 | 3.01   | −16.03 | −57.92 | 2.51   |
| 111 | 3.63 | 24.88 | 2.53  | −72.63 | −2.20  | −15.87 | −69.05 | 2.72   |
| 112 | 0.31 | 4.79  | −0.41 | −1.00  | 4.16   | −7.16  | 62.77  | −1.29  |
| 113 | 0.36 | 4.94  | −1.85 | −0.77  | −0.50  | −6.81  | 58.70  | 2.31   |
| 114 | 0.36 | 5.23  | 1.31  | −1.09  | −3.95  | −6.47  | 60.91  | −2.13  |
| 115 | 0.37 | 5.08  | −0.23 | −1.37  | −5.48  | −6.74  | 63.68  | 2.69   |
| 116 | 0.37 | 4.81  | −0.94 | −1.59  | −1.18  | −7.42  | 64.90  | 2.51   |
| 117 | 0.32 | 5.26  | −0.40 | −1.36  | 7.83   | −6.88  | 69.96  | 1.83   |
| 118 | 0.34 | 4.88  | −1.21 | −1.55  | −8.41  | −6.50  | 60.24  | 2.64   |
| 119 | 0.30 | 5.04  | −0.69 | −1.16  | −8.28  | −6.90  | 62.01  | −0.35  |

-continued

| k | a48k | a49k | a50k | a51k | a52k | a53k | a54k | a55k |
|---|------|------|------|------|------|------|------|------|
| 80 | 35.18 | −18.92 | −15.82 | −4.04 | 123.00 | −19.42 | −1.04 | −51.71 |
| 81 | 34.09 | −18.91 | −16.07 | 6.61 | 118.59 | −17.87 | −1.15 | −52.53 |
| 82 | 36.45 | −18.80 | −17.25 | 2.41 | 120.53 | −15.35 | −0.15 | −51.71 |
| 83 | 35.43 | −19.22 | −15.75 | −0.26 | 121.11 | −14.13 | −1.33 | −51.60 |
| 84 | 35.61 | −19.31 | −15.80 | 3.78 | 122.22 | −13.50 | −0.46 | −51.12 |
| 85 | 35.84 | −19.29 | −15.60 | −3.07 | 113.52 | −19.69 | −1.38 | −51.49 |
| 86 | 34.84 | −19.11 | −15.75 | 6.88 | 119.39 | −19.36 | −1.24 | −51.76 |
| 87 | 31.00 | −18.93 | −16.37 | 2.25 | 118.69 | −14.80 | −0.99 | −52.10 |
| 88 | 34.90 | −19.56 | −16.97 | −5.46 | 121.17 | −18.96 | −1.06 | −52.00 |
| 89 | 34.10 | −19.04 | −15.91 | 1.89 | 118.31 | −15.26 | −0.99 | −51.50 |
| 90 | 34.94 | −18.97 | −16.30 | 5.87 | 119.97 | −19.67 | −1.19 | −52.26 |
| 91 | 29.87 | −19.33 | −16.96 | 4.69 | 119.99 | −15.82 | −1.76 | −51.64 |
| 92 | 34.26 | −18.90 | −16.35 | −0.85 | 119.09 | −13.64 | −1.06 | −51.17 |
| 93 | 35.63 | −18.87 | −16.09 | −2.07 | 123.06 | −16.23 | −0.80 | −51.82 |
| 94 | 37.07 | −19.29 | −16.14 | 11.96 | 121.62 | −15.06 | −1.21 | −51.56 |
| 95 | 36.78 | −19.43 | −16.06 | −2.11 | 119.46 | −17.76 | −1.23 | −51.70 |
| 96 | 21.23 | −22.94 | −15.56 | −2.98 | 85.63 | −20.85 | 2.54 | −46.27 |
| 97 | 24.91 | −22.30 | −14.76 | 2.60 | 81.48 | −21.58 | 2.96 | −44.93 |
| 98 | 21.70 | −22.33 | −14.50 | −3.51 | 88.57 | −21.05 | 1.94 | −46.62 |
| 99 | 22.56 | −21.99 | −14.26 | −10.16 | 85.86 | −20.91 | 2.38 | −45.87 |
| 100 | 22.17 | −22.94 | −14.66 | 8.34 | 86.53 | −21.30 | 2.37 | −46.47 |
| 101 | 21.08 | −23.03 | −14.09 | −0.27 | 87.85 | −22.21 | 2.51 | −46.73 |
| 102 | 19.67 | −22.16 | −14.80 | 3.10 | 85.87 | −21.61 | 2.82 | −47.10 |
| 103 | 22.49 | −22.60 | −14.67 | 3.54 | 87.94 | −21.15 | 2.48 | −46.57 |
| 104 | 22.32 | −22.83 | −15.55 | −3.03 | 89.65 | −19.85 | 2.31 | −46.25 |
| 105 | 22.19 | −22.25 | −14.09 | 5.15 | 84.82 | −18.96 | 2.62 | −47.25 |
| 106 | 21.33 | −22.63 | −15.21 | −6.48 | 86.04 | −20.04 | 2.40 | −47.84 |
| 107 | 21.61 | −22.56 | −13.73 | 2.23 | 87.92 | −19.20 | 2.10 | −46.74 |
| 108 | 19.32 | −22.17 | −15.69 | −1.33 | 86.07 | −18.90 | 2.44 | −46.14 |
| 109 | 21.27 | −22.66 | −13.80 | 0.11 | 86.80 | −20.63 | 2.40 | −46.11 |
| 110 | 21.06 | −22.97 | −14.68 | −2.90 | 86.30 | −22.66 | 2.28 | −46.75 |
| 111 | 22.19 | −22.73 | −15.73 | −5.40 | 87.87 | −19.19 | 2.68 | −46.05 |
| 112 | 2.40 | −6.68 | 6.28 | −2.72 | 70.14 | 32.73 | −4.02 | −3.00 |
| 113 | 1.66 | −6.52 | 6.68 | −1.88 | 71.24 | 32.05 | −4.00 | −1.76 |
| 114 | 2.74 | −6.41 | 6.80 | −2.46 | 72.66 | 32.14 | −4.04 | −3.13 |
| 115 | 2.97 | −6.78 | 6.95 | −1.73 | 71.59 | 31.97 | −3.94 | −3.26 |
| 116 | 1.87 | −6.57 | 6.62 | −2.56 | 71.55 | 32.38 | −3.96 | −3.04 |
| 117 | 2.38 | −6.59 | 7.29 | 0.80 | 73.77 | 32.78 | −4.12 | −2.99 |
| 118 | 2.23 | −6.52 | 7.40 | 4.06 | 73.25 | 32.26 | −4.00 | −2.40 |
| 119 | 2.04 | −6.41 | 6.41 | −1.61 | 69.82 | 31.86 | −3.80 | −3.61 |

| k | a56k | a57k | a58k | a59k | a60k | a61k | a62k | a63k |
|---|------|------|------|------|------|------|------|------|
| 80 | 7.22 | 128.52 | −1.88 | 43.51 | 39.31 | 15.41 | −14.23 | 23.79 |
| 81 | 16.34 | 128.59 | −1.91 | 43.36 | 39.03 | 15.48 | −28.20 | 5.78 |
| 82 | −6.02 | 129.83 | −1.88 | 43.69 | 37.71 | 15.66 | −12.79 | −13.12 |
| 83 | 0.26 | 129.91 | −1.89 | 43.46 | 38.12 | 15.62 | 39.21 | 11.40 |
| 84 | −13.98 | 128.38 | −1.87 | 43.41 | 37.06 | 15.59 | 13.00 | −4.79 |
| 85 | −20.46 | 130.06 | −1.87 | 43.02 | 38.18 | 15.67 | −23.98 | −72.21 |
| 86 | −2.59 | 127.98 | −1.90 | 43.07 | 37.21 | 15.58 | −30.51 | 7.52 |
| 87 | 11.87 | 128.01 | −1.88 | 43.97 | 37.46 | 15.56 | −27.53 | 39.33 |
| 88 | −8.42 | 128.67 | −1.91 | 43.50 | 40.10 | 15.60 | −39.33 | −13.06 |
| 89 | −19.59 | 130.39 | −1.86 | 43.48 | 38.13 | 15.66 | −15.58 | 38.94 |
| 90 | 4.00 | 129.94 | −1.85 | 43.36 | 37.51 | 15.62 | −16.66 | 20.91 |
| 91 | −15.39 | 128.60 | −1.89 | 43.80 | 38.56 | 15.60 | −8.93 | 13.06 |
| 92 | 13.67 | 129.15 | −1.87 | 42.93 | 37.77 | 15.50 | −15.23 | 5.92 |
| 93 | 3.75 | 129.33 | −1.92 | 43.30 | 37.36 | 15.57 | 3.32 | −17.65 |
| 94 | −15.76 | 130.12 | −1.87 | 43.29 | 37.20 | 15.39 | −11.95 | −15.64 |
| 95 | −20.12 | 129.29 | −1.85 | 43.60 | 40.08 | 15.90 | −60.06 | −10.83 |
| 96 | −17.10 | 114.33 | −2.02 | 39.62 | 9.75 | 12.73 | 52.83 | −29.46 |
| 97 | 0.00 | 113.68 | −2.03 | 39.64 | 9.45 | 12.67 | −31.55 | 15.89 |
| 98 | −5.74 | 115.79 | −2.01 | 39.91 | 10.43 | 13.02 | 45.48 | −21.84 |
| 99 | 1.37 | 115.20 | −2.04 | 40.55 | 7.81 | 12.62 | 7.80 | −103.58 |
| 100 | 4.74 | 115.96 | −2.03 | 40.13 | 11.11 | 12.59 | 40.56 | −60.33 |
| 101 | 9.00 | 115.12 | −2.03 | 40.05 | 9.51 | 12.81 | 8.19 | 18.79 |
| 102 | 15.33 | 113.84 | −2.02 | 39.69 | 9.57 | 12.73 | 29.45 | 79.46 |
| 103 | 9.99 | 114.81 | −2.04 | 40.46 | 9.24 | 12.55 | −24.76 | −12.46 |
| 104 | 2.29 | 114.70 | −2.04 | 40.01 | 10.31 | 12.96 | 8.96 | 24.34 |
| 105 | −3.84 | 114.69 | −2.03 | 39.86 | 9.44 | 12.77 | −20.44 | −33.68 |
| 106 | −16.27 | 115.65 | −2.04 | 40.05 | 9.97 | 12.69 | 31.92 | −4.97 |
| 107 | −8.85 | 114.18 | −2.02 | 40.49 | 9.01 | 12.48 | 6.07 | −18.59 |
| 108 | 13.66 | 113.88 | −2.07 | 39.23 | 11.45 | 12.60 | 38.66 | −56.12 |
| 109 | −8.74 | 114.98 | −2.03 | 39.73 | 10.32 | 12.72 | −4.35 | −32.95 |
| 110 | 7.85 | 116.66 | −2.01 | 40.22 | 9.71 | 12.66 | −0.79 | −36.94 |
| 111 | 3.91 | 115.17 | −1.99 | 39.78 | 9.93 | 12.55 | 9.97 | 15.23 |
| 112 | 1.14 | 13.18 | −0.14 | 2.79 | 24.72 | 0.07 | −16.74 | 8.49 |
| 113 | 4.25 | 13.58 | −0.14 | 2.10 | 24.18 | 0.17 | 17.27 | 13.28 |

-continued

| k | | | | | | | |
|---|---|---|---|---|---|---|---|
| 114 | −3.59 | 13.49 | −0.16 | 2.96 | 24.03 | 0.26 | 6.52 | 41.70 |
| 115 | 5.11 | 14.28 | −0.14 | 2.68 | 24.04 | 0.36 | 10.37 | 38.29 |
| 116 | 6.99 | 13.92 | −0.14 | 2.68 | 24.65 | 0.11 | 10.23 | −3.54 |
| 117 | 5.35 | 14.04 | −0.16 | 2.83 | 24.69 | 0.32 | −1.11 | 7.77 |
| 118 | −14.75 | 13.75 | −0.12 | 2.85 | 24.55 | 0.22 | −16.30 | 0.78 |
| 119 | 7.24 | 13.73 | −0.13 | 2.73 | 24.81 | 0.13 | −1.81 | 10.69 |

| k | a0k | a1k | a2k | a3k | a4k | a5k | a6k | a7k |
|---|---|---|---|---|---|---|---|---|
| 120 | −86.29 | −0.63 | 3.88 | −32.02 | 1.84 | 11.04 | 2.67 | −3.79 |
| 121 | −85.57 | −0.73 | 3.64 | −32.07 | 1.65 | 11.44 | 2.57 | −2.83 |
| 122 | −80.08 | −0.26 | 3.98 | −32.67 | 1.94 | 10.85 | 2.31 | −3.57 |
| 123 | −89.15 | −0.56 | 3.69 | −32.93 | 1.34 | 11.29 | 2.70 | −3.13 |
| 124 | −93.09 | −0.87 | 3.69 | −33.69 | 1.66 | 11.05 | 2.62 | −2.62 |
| 125 | −79.10 | −0.35 | 3.46 | −34.24 | 1.35 | 11.14 | 3.71 | −2.73 |
| 126 | −79.96 | −0.48 | 3.30 | −34.24 | 1.28 | 11.20 | 2.45 | −3.40 |
| 127 | −88.22 | −0.65 | 3.53 | −36.03 | 1.47 | 11.34 | 3.62 | −3.03 |
| 128 | −64.37 | −4.04 | 1.18 | −12.23 | 6.38 | 4.37 | 5.12 | −0.76 |
| 129 | −69.64 | −4.14 | 1.10 | −13.64 | 6.02 | 4.69 | 5.44 | −0.43 |
| 130 | −63.61 | −4.12 | 0.95 | −10.49 | 6.13 | 4.01 | 4.92 | −0.32 |
| 131 | −66.53 | −4.06 | 0.94 | −13.49 | 5.92 | 4.79 | 5.35 | −0.99 |
| 132 | −70.96 | −4.00 | 1.10 | −13.01 | 6.39 | 3.96 | 5.16 | −0.30 |
| 133 | −67.75 | −4.00 | 1.23 | −15.14 | 6.04 | 3.95 | 5.44 | −0.43 |
| 134 | −64.48 | −4.20 | 0.82 | −13.91 | 5.82 | 4.06 | 5.23 | −0.18 |
| 135 | −61.97 | −4.07 | 0.68 | −13.86 | 5.92 | 4.81 | 5.69 | −0.76 |
| 136 | −68.31 | −4.09 | 0.82 | −13.67 | 5.52 | 4.21 | 5.11 | −0.62 |
| 137 | −57.85 | −4.15 | 1.00 | −14.37 | 5.78 | 4.21 | 5.63 | −1.43 |
| 138 | −68.14 | −4.06 | 0.87 | −13.57 | 5.80 | 4.44 | 5.36 | −0.51 |
| 139 | −71.48 | −4.31 | 1.21 | −16.35 | 6.10 | 4.03 | 5.38 | −0.61 |
| 140 | −65.76 | −4.29 | 0.82 | −14.07 | 6.50 | 4.40 | 5.54 | −0.17 |
| 141 | −61.81 | −4.12 | 1.10 | −12.99 | 5.91 | 4.76 | 4.79 | −0.75 |
| 142 | −66.55 | −4.48 | 1.08 | −12.19 | 5.67 | 4.64 | 5.21 | −0.94 |
| 143 | −63.27 | −4.03 | 1.02 | −14.10 | 5.86 | 4.08 | 6.23 | −1.19 |
| 144 | −38.06 | −4.80 | −0.40 | −7.99 | 5.14 | 1.07 | 4.09 | −2.19 |
| 145 | −34.73 | −5.10 | −0.37 | −9.37 | 4.70 | 0.55 | 3.89 | −1.54 |
| 146 | −36.22 | −4.93 | −0.66 | −8.77 | 4.53 | 0.87 | 3.70 | −1.89 |
| 147 | −38.97 | −4.91 | −0.26 | −8.19 | 4.97 | 0.85 | 4.47 | −1.42 |
| 148 | −39.77 | −4.98 | −0.42 | −9.31 | 5.15 | 0.76 | 4.33 | −2.09 |
| 149 | −40.83 | −4.93 | −0.29 | −7.86 | 4.61 | 0.53 | 4.00 | −1.78 |
| 150 | −42.55 | −4.97 | −0.37 | −8.84 | 4.88 | 1.17 | 4.23 | −1.88 |
| 151 | −40.43 | −4.83 | −0.39 | −10.02 | 4.55 | 0.64 | 3.83 | −2.11 |
| 152 | −35.57 | −4.98 | −0.28 | −9.08 | 4.79 | 1.04 | 4.22 | −1.39 |
| 153 | −36.15 | −4.86 | −0.47 | −10.73 | 4.58 | 1.24 | 3.96 | −1.78 |
| 154 | −40.29 | −4.90 | −0.50 | −9.89 | 4.86 | 1.22 | 3.86 | −2.27 |
| 155 | −36.78 | −5.15 | −0.39 | −9.03 | 5.19 | 0.90 | 4.12 | −1.66 |
| 156 | −39.53 | −5.04 | −0.58 | −9.80 | 5.07 | 0.85 | 4.06 | −1.30 |
| 157 | −42.15 | −4.89 | −0.60 | −9.48 | 4.90 | 0.85 | 3.62 | −2.15 |
| 158 | −38.22 | −5.10 | −0.56 | −7.54 | 4.48 | 0.71 | 4.17 | −1.92 |
| 159 | −40.67 | −5.02 | −0.56 | −9.52 | 4.98 | 0.99 | 3.72 | −1.58 |

| k | a8k | a9k | a10k | a11k | a12k | a13k | a14k | a15k |
|---|---|---|---|---|---|---|---|---|
| 120 | 53.48 | 10.31 | −0.06 | 26.05 | −6.81 | −9.45 | 0.35 | −27.38 |
| 121 | 58.44 | 14.49 | −0.03 | 26.18 | −6.15 | −9.19 | 0.45 | −24.02 |
| 122 | 55.08 | 11.57 | −0.02 | 23.35 | −9.94 | −9.11 | 0.39 | −25.86 |
| 123 | 56.58 | 12.31 | −0.04 | 26.82 | −7.44 | −9.01 | 0.26 | −25.55 |
| 124 | 54.35 | 10.39 | −0.05 | 24.98 | −8.46 | −9.02 | 0.44 | −25.96 |
| 125 | 53.81 | 15.02 | −0.04 | 27.99 | −7.80 | −9.58 | 0.44 | −25.95 |
| 126 | 53.27 | 14.24 | −0.04 | 27.91 | −7.71 | −9.26 | 0.47 | −25.63 |
| 127 | 58.03 | 12.68 | −0.01 | 25.01 | −6.40 | −8.74 | 0.40 | −28.05 |
| 128 | 39.98 | −1.05 | −0.33 | 21.96 | −22.04 | −4.80 | −0.41 | −15.66 |
| 129 | 41.22 | −2.03 | −0.36 | 22.19 | −21.99 | −5.06 | −0.56 | −15.90 |
| 130 | 40.95 | −2.24 | −0.34 | 21.97 | −22.07 | −5.14 | −0.57 | −19.52 |
| 131 | 40.26 | −0.35 | −0.34 | 20.92 | −20.71 | −5.18 | −0.39 | −18.20 |
| 132 | 41.86 | −2.16 | −0.37 | 22.34 | −21.90 | −4.85 | −0.56 | −16.02 |
| 133 | 43.88 | −2.36 | −0.34 | 21.20 | −21.58 | −5.34 | −0.51 | −16.43 |
| 134 | 36.87 | −2.70 | −0.33 | 20.90 | −21.32 | −5.10 | −0.61 | −19.40 |
| 135 | 39.83 | −2.87 | −0.36 | 18.90 | −21.75 | −4.79 | −0.38 | −17.56 |
| 136 | 45.23 | −0.60 | −0.35 | 22.43 | −21.35 | −5.04 | −0.36 | −17.73 |
| 137 | 41.16 | −0.89 | −0.36 | 23.49 | −20.47 | −5.32 | −0.67 | −14.10 |
| 138 | 38.19 | −1.59 | −0.35 | 21.84 | −23.38 | −5.16 | −0.48 | −17.71 |
| 139 | 41.58 | −2.39 | −0.39 | 21.34 | −24.13 | −4.83 | −0.53 | −17.91 |
| 140 | 42.51 | −2.42 | −0.38 | 23.72 | −21.10 | −5.44 | −0.54 | −15.10 |
| 141 | 40.30 | 0.10 | −0.36 | 22.77 | −22.23 | −5.06 | −0.67 | −17.92 |
| 142 | 41.11 | 0.05 | −0.35 | 22.22 | −20.58 | −4.96 | −0.59 | −18.54 |
| 143 | 42.21 | −2.62 | −0.33 | 21.58 | −22.83 | −5.20 | −0.53 | −18.43 |
| 144 | 23.17 | 3.07 | −0.39 | 11.72 | −4.83 | −2.20 | 0.03 | −8.73 |
| 145 | 20.93 | 1.49 | −0.37 | 13.64 | −5.71 | −2.24 | −0.03 | −7.18 |
| 146 | 23.18 | 3.13 | −0.37 | 12.07 | −6.08 | −2.29 | −0.04 | −9.87 |

-continued

| | | | | | | | |
|---|---|---|---|---|---|---|---|
| 147 | 24.10 | 2.17 | −0.37 | 12.71 | −6.07 | −1.98 | 0.18 | −8.85 |
| 148 | 21.38 | 3.16 | −0.34 | 12.79 | −5.25 | −2.21 | −0.02 | −7.81 |
| 149 | 23.10 | 3.56 | −0.37 | 13.95 | −6.65 | −2.46 | −0.06 | −9.00 |
| 150 | 19.33 | 3.00 | −0.38 | 12.67 | −5.73 | −2.00 | −0.07 | −7.75 |
| 151 | 25.90 | 2.23 | −0.36 | 11.71 | −6.53 | −2.38 | 0.09 | −8.28 |
| 152 | 24.52 | 2.63 | −0.37 | 14.16 | −6.56 | −2.29 | 0.02 | −8.56 |
| 153 | 24.20 | 3.68 | −0.34 | 12.92 | −5.60 | −2.00 | −0.12 | −8.80 |
| 154 | 20.10 | 2.21 | −0.36 | 13.40 | −5.76 | −2.46 | 0.13 | −8.69 |
| 155 | 23.10 | 1.82 | −0.36 | 12.73 | −5.94 | −2.06 | 0.12 | −8.08 |
| 156 | 24.71 | 2.42 | −0.37 | 12.42 | −5.34 | −2.50 | −0.12 | −9.17 |
| 157 | 23.11 | 3.73 | −0.39 | 12.30 | −6.50 | −2.19 | −0.03 | −9.57 |
| 158 | 24.10 | 3.93 | −0.35 | 14.40 | −6.18 | −2.17 | 0.00 | −8.30 |
| 159 | 22.82 | 4.16 | −0.34 | 13.30 | −6.05 | −2.27 | 0.10 | −7.50 |

| k | a16k | a17k | a18k | a19k | a20k | a21k | a22k | a23k |
|---|---|---|---|---|---|---|---|---|
| 120 | 0.31 | −5.03 | 4.62 | −32.56 | −1.82 | −1.70 | 4.33 | 0.53 |
| 121 | 0.72 | −4.01 | 4.85 | 1.24 | −1.88 | −1.74 | −1.33 | 0.54 |
| 122 | 0.45 | −4.10 | 4.84 | −2.36 | −1.67 | −1.69 | −2.20 | 0.55 |
| 123 | 0.11 | −4.61 | 4.79 | 14.98 | −1.97 | −1.76 | −1.86 | 0.53 |
| 124 | −0.04 | −4.58 | 4.63 | 0.19 | −1.97 | −1.92 | 1.82 | 0.55 |
| 125 | 0.56 | −4.69 | 4.83 | −20.06 | −1.93 | −1.77 | 3.49 | 0.53 |
| 126 | −0.20 | −4.71 | 4.49 | 4.85 | −1.85 | −1.65 | −2.92 | 0.54 |
| 127 | −0.06 | −4.54 | 4.62 | −14.70 | −1.93 | −1.83 | −4.25 | 0.55 |
| 128 | −0.59 | −1.46 | 4.32 | −19.70 | 1.52 | 0.78 | 1.79 | 0.51 |
| 129 | −0.28 | −1.64 | 4.09 | −34.57 | 1.15 | 0.54 | 5.08 | 0.51 |
| 130 | 0.18 | −1.25 | 4.46 | 22.73 | 1.33 | 0.70 | 7.53 | 0.48 |
| 131 | 1.03 | −1.55 | 4.43 | 8.79 | 1.40 | 0.59 | 5.14 | 0.47 |
| 132 | −0.07 | −1.65 | 4.37 | −34.22 | 1.36 | 0.55 | −0.52 | 0.48 |
| 133 | 0.09 | −1.60 | 4.25 | 6.16 | 1.45 | 0.59 | 7.45 | 0.50 |
| 134 | 0.59 | −1.67 | 4.41 | −25.72 | 1.17 | 0.73 | 6.02 | 0.48 |
| 135 | −1.51 | −1.42 | 4.83 | −0.65 | 1.22 | 0.56 | 7.84 | 0.49 |
| 136 | −0.64 | −1.43 | 4.64 | −25.29 | 1.16 | 0.77 | 2.70 | 0.47 |
| 137 | 0.38 | −1.91 | 4.26 | 29.50 | 1.25 | 0.50 | 3.59 | 0.47 |
| 138 | −0.51 | −1.60 | 4.68 | −16.14 | 1.52 | 0.61 | −4.79 | 0.49 |
| 139 | −0.07 | −1.17 | 4.53 | 42.81 | 1.29 | 0.66 | 6.75 | 0.50 |
| 140 | −0.70 | −1.19 | 4.06 | 6.12 | 1.09 | 0.81 | −3.05 | 0.55 |
| 141 | −0.06 | −1.58 | 4.40 | 6.81 | 1.20 | 0.47 | 3.59 | 0.52 |
| 142 | −0.30 | −1.72 | 3.98 | −8.17 | 1.33 | 0.76 | 4.02 | 0.50 |
| 143 | −0.08 | −1.32 | 4.27 | −7.54 | 1.36 | 0.36 | −7.33 | 0.50 |
| 144 | 0.45 | 0.82 | 3.10 | 11.79 | 3.12 | 2.48 | −2.30 | 0.22 |
| 145 | −0.01 | 0.44 | 2.79 | −4.24 | 3.08 | 2.36 | −0.35 | 0.25 |
| 146 | 0.37 | 0.43 | 2.61 | −14.16 | 3.16 | 2.41 | 0.10 | 0.20 |
| 147 | 0.50 | 0.65 | 2.30 | 16.23 | 3.18 | 2.47 | 13.38 | 0.22 |
| 148 | −0.08 | 0.27 | 2.63 | 15.55 | 3.20 | 2.50 | 6.03 | 0.22 |
| 149 | 0.77 | 0.39 | 2.89 | 11.11 | 3.10 | 2.45 | 1.68 | 0.23 |
| 150 | −0.07 | 0.70 | 2.73 | −7.13 | 3.16 | 2.45 | 6.97 | 0.23 |
| 151 | −0.14 | 0.72 | 2.70 | 16.50 | 3.19 | 2.47 | 7.78 | 0.23 |
| 152 | −0.05 | 0.58 | 3.11 | 5.90 | 3.31 | 2.60 | 5.82 | 0.21 |
| 153 | −0.41 | 0.77 | 2.48 | −3.59 | 3.23 | 2.64 | 1.59 | 0.21 |
| 154 | −0.34 | 0.61 | 2.63 | 13.77 | 3.13 | 2.70 | 5.05 | 0.23 |
| 155 | −0.58 | 0.21 | 2.43 | −4.03 | 3.19 | 2.42 | 0.11 | 0.21 |
| 156 | −0.25 | 0.71 | 2.85 | −12.11 | 3.07 | 2.63 | 6.59 | 0.24 |
| 157 | 0.54 | 0.53 | 2.69 | 2.39 | 3.20 | 2.50 | −3.10 | 0.21 |
| 158 | 0.28 | 0.84 | 2.99 | −14.40 | 3.08 | 2.52 | −6.42 | 0.19 |
| 159 | 0.26 | 0.25 | 2.33 | 8.40 | 3.20 | 2.36 | 5.99 | 0.25 |

| k | a24k | a25k | a26k | a27k | a28k | a29k | a30k | a31k |
|---|---|---|---|---|---|---|---|---|
| 120 | −3.15 | −2.74 | 32.68 | −1.28 | 4.17 | −0.54 | −2.97 | −49.03 |
| 121 | 0.37 | −2.71 | 32.30 | −1.60 | 4.71 | −0.70 | −2.92 | −49.08 |
| 122 | −1.57 | −2.50 | 33.88 | −1.53 | 4.70 | −0.59 | −2.22 | −49.68 |
| 123 | −2.35 | −2.72 | 30.56 | −1.41 | 4.83 | −0.77 | −2.27 | −49.43 |
| 124 | −1.34 | −2.41 | 29.44 | −1.53 | 4.20 | −0.64 | −3.11 | −49.42 |
| 125 | −0.38 | −2.90 | 32.38 | −1.44 | 3.98 | −0.92 | −3.34 | −49.54 |
| 126 | −0.34 | −2.87 | 30.15 | −1.49 | 4.13 | −0.79 | −3.50 | −50.50 |
| 127 | −1.26 | −2.59 | 31.97 | −1.33 | 3.99 | −0.36 | −2.67 | −50.02 |
| 128 | 1.14 | −0.88 | 32.09 | −0.37 | 9.19 | −2.91 | −3.97 | −36.02 |
| 129 | 0.01 | −0.90 | 29.34 | −1.01 | 8.94 | −2.71 | −3.49 | −35.29 |
| 130 | −0.35 | −0.83 | 32.11 | −0.90 | 9.10 | −3.05 | −4.29 | −34.94 |
| 131 | −1.21 | −1.12 | 32.67 | −0.71 | 9.25 | −3.00 | −3.36 | −36.80 |
| 132 | −0.17 | −1.05 | 30.63 | −0.91 | 8.77 | −2.89 | −4.80 | −36.50 |
| 133 | 1.87 | −0.79 | 31.14 | −0.52 | 9.94 | −2.94 | −3.83 | −36.11 |
| 134 | −0.47 | −1.01 | 30.51 | −0.75 | 9.13 | −3.33 | −3.84 | −35.71 |
| 135 | 0.30 | −0.80 | 30.54 | −1.22 | 9.54 | −2.83 | −3.54 | −35.94 |
| 136 | −1.37 | −0.96 | 32.28 | −0.65 | 9.08 | −2.91 | −3.37 | −36.61 |
| 137 | 2.06 | −1.05 | 29.71 | −0.50 | 9.28 | −2.99 | −3.87 | −35.73 |
| 138 | −0.62 | −0.65 | 28.44 | −0.93 | 9.22 | −2.73 | −3.47 | −36.62 |
| 139 | −1.69 | −0.79 | 32.28 | −0.62 | 9.13 | −2.77 | −3.37 | −36.46 |

-continued

| | | | | | | | | |
|---|---|---|---|---|---|---|---|---|
| 140 | −1.42 | −0.48 | 31.05 | −0.86 | 9.25 | −3.21 | −3.49 | −35.39 |
| 141 | 2.17 | −0.73 | 31.65 | −0.97 | 9.05 | −3.07 | −4.55 | −35.42 |
| 142 | −1.91 | −0.93 | 29.79 | −0.57 | 8.76 | −2.92 | −3.90 | −35.86 |
| 143 | 0.66 | −0.81 | 33.30 | −0.84 | 9.12 | −3.15 | −4.24 | −37.51 |
| 144 | 1.11 | 0.42 | 18.05 | 0.99 | 2.98 | −0.40 | 1.34 | −22.51 |
| 145 | 0.18 | 0.19 | 18.46 | 0.91 | 2.43 | −0.95 | 1.18 | −21.18 |
| 146 | −0.04 | 0.32 | 17.97 | 0.82 | 2.36 | −0.36 | 0.97 | −22.37 |
| 147 | −0.54 | 0.58 | 18.34 | 1.07 | 2.36 | −0.56 | 0.77 | −22.28 |
| 148 | 0.51 | 0.19 | 18.43 | 0.91 | 2.45 | −0.37 | 0.93 | −22.38 |
| 149 | 0.27 | 0.47 | 18.05 | 0.97 | 2.15 | −0.67 | 1.19 | −22.81 |
| 150 | 0.84 | 0.36 | 17.25 | 1.26 | 2.25 | −0.60 | 1.62 | −22.12 |
| 151 | 1.21 | 0.45 | 18.18 | 1.26 | 2.77 | −0.41 | 1.26 | −22.47 |
| 152 | −1.01 | 0.39 | 18.00 | 1.08 | 2.27 | −0.42 | 1.60 | −23.23 |
| 153 | −0.96 | 0.54 | 17.76 | 1.28 | 2.68 | −0.65 | 1.19 | −22.35 |
| 154 | −1.06 | 0.43 | 18.31 | 0.95 | 1.97 | −0.58 | 1.72 | −22.32 |
| 155 | −1.09 | 0.56 | 16.71 | 0.46 | 2.04 | −0.37 | 1.65 | −21.98 |
| 156 | −1.60 | 0.60 | 18.48 | 0.96 | 2.26 | −0.62 | 1.03 | −22.74 |
| 157 | 1.04 | 0.44 | 16.36 | 0.86 | 2.27 | −0.58 | 1.05 | −23.32 |
| 158 | −0.46 | 0.44 | 16.89 | 0.97 | 2.06 | −0.66 | 1.13 | −21.35 |
| 159 | 0.16 | 0.47 | 18.03 | 1.13 | 2.51 | −0.59 | 1.34 | −22.34 |

| k | a32k | a33k | a34k | a35k | a36k | a37k | a38k | a39k |
|---|---|---|---|---|---|---|---|---|
| 120 | −4.42 | 1.84 | 1.76 | 1.01 | −0.98 | −2.13 | 2.45 | −2.01 |
| 121 | −4.37 | 2.00 | 1.74 | 0.71 | −0.97 | −1.82 | 2.59 | −2.07 |
| 122 | −3.96 | 1.87 | 1.66 | 0.88 | −0.98 | −1.29 | 2.49 | −2.04 |
| 123 | −3.97 | 1.99 | 1.80 | 0.12 | −0.92 | −1.94 | 2.43 | −2.10 |
| 124 | −4.29 | 1.75 | 1.75 | 0.79 | −0.97 | −3.66 | 2.39 | −2.04 |
| 125 | −4.25 | 1.90 | 1.82 | 1.10 | −0.98 | −2.15 | 2.39 | −2.09 |
| 126 | −4.33 | 1.92 | 1.73 | 1.23 | −0.96 | −3.61 | 2.43 | −2.04 |
| 127 | −4.28 | 1.86 | 1.88 | 1.40 | −1.02 | −3.55 | 2.51 | −1.98 |
| 128 | −7.95 | 0.11 | 1.68 | 8.51 | −0.87 | 10.98 | −2.80 | −2.96 |
| 129 | −8.25 | 0.12 | 1.63 | 9.09 | −0.88 | 8.94 | −2.75 | −3.10 |
| 130 | −8.36 | 0.16 | 1.71 | 8.72 | −0.86 | 9.22 | −2.60 | −3.06 |
| 131 | −8.59 | 0.00 | 1.59 | 7.62 | −0.86 | 11.42 | −2.57 | −2.99 |
| 132 | −8.02 | 0.21 | 1.68 | 8.66 | −0.87 | 9.90 | −2.69 | −3.05 |
| 133 | −8.27 | 0.18 | 1.74 | 8.45 | −0.92 | 9.04 | −2.93 | −3.06 |
| 134 | −8.28 | −0.01 | 1.69 | 8.82 | −0.93 | 9.85 | −2.73 | −3.04 |
| 135 | −8.91 | 0.14 | 1.71 | 8.75 | −0.83 | 9.35 | −2.74 | −3.04 |
| 136 | −8.32 | 0.14 | 1.68 | 8.33 | −0.91 | 9.73 | −2.51 | −3.02 |
| 137 | −8.23 | 0.27 | 1.76 | 8.53 | −0.86 | 10.43 | −2.72 | −2.95 |
| 138 | −8.15 | 0.11 | 1.60 | 8.97 | −0.93 | 10.95 | −2.78 | −2.98 |
| 139 | −8.33 | 0.06 | 1.70 | 8.68 | −0.89 | 10.59 | −3.01 | −3.00 |
| 140 | −7.64 | 0.16 | 1.68 | 8.39 | −0.82 | 9.51 | −2.84 | −3.02 |
| 141 | −9.02 | 0.15 | 1.58 | 8.08 | −0.92 | 10.09 | −2.75 | −3.09 |
| 142 | −8.73 | 0.14 | 1.68 | 8.98 | −0.89 | 10.21 | −2.67 | −3.04 |
| 143 | −7.95 | 0.22 | 1.63 | 9.15 | −0.98 | 9.25 | −3.00 | −3.00 |
| 144 | −2.45 | −1.17 | 0.94 | 4.61 | −0.40 | 1.78 | −3.48 | −2.51 |
| 145 | −2.39 | −1.16 | 1.04 | 4.32 | −0.39 | 2.64 | −3.46 | −2.56 |
| 146 | −1.88 | −1.16 | 0.98 | 4.39 | −0.41 | 0.79 | −3.46 | −2.50 |
| 147 | −2.14 | −1.10 | 1.02 | 4.42 | −0.42 | 2.73 | −3.50 | −2.53 |
| 148 | −2.58 | −1.01 | 0.97 | 4.80 | −0.36 | 2.52 | −3.48 | −2.52 |
| 149 | −2.46 | −1.06 | 0.97 | 4.32 | −0.38 | 2.31 | −3.48 | −2.54 |
| 150 | −2.92 | −1.09 | 1.00 | 4.66 | −0.42 | 2.15 | −3.46 | −2.52 |
| 151 | −2.89 | −1.10 | 0.90 | 4.61 | −0.37 | 2.57 | −3.54 | −2.54 |
| 152 | −2.62 | −1.10 | 0.98 | 4.88 | −0.37 | 2.24 | −3.62 | −2.56 |
| 153 | −3.08 | −1.12 | 1.01 | 4.37 | −0.35 | 3.16 | −3.55 | −2.56 |
| 154 | −2.80 | −1.10 | 0.94 | 4.54 | −0.41 | 2.04 | −3.56 | −2.52 |
| 155 | −2.13 | −1.11 | 0.95 | 4.54 | −0.41 | 2.28 | −3.54 | −2.48 |
| 156 | −2.77 | −1.04 | 0.95 | 4.39 | −0.36 | 1.86 | −3.63 | −2.55 |
| 157 | −3.33 | −1.13 | 1.01 | 3.85 | −0.38 | 3.13 | −3.50 | −2.49 |
| 158 | −2.72 | −0.98 | 0.94 | 4.57 | −0.36 | 2.95 | −3.54 | −2.53 |
| 159 | −2.54 | −1.18 | 1.01 | 4.96 | −0.35 | 1.73 | −3.52 | −2.48 |

| k | a40k | a41k | a42k | a43k | a44k | a45k | a46k | a47k |
|---|---|---|---|---|---|---|---|---|
| 120 | 0.33 | 4.92 | −0.31 | −1.59 | 0.68 | −6.93 | 56.35 | 1.36 |
| 121 | 0.30 | 4.77 | 0.00 | −1.50 | 4.89 | −6.96 | 59.88 | −3.65 |
| 122 | 0.34 | 4.82 | 4.31 | −1.16 | −7.78 | −6.96 | 67.78 | −1.90 |
| 123 | 0.31 | 4.96 | −0.12 | −2.05 | −5.38 | −7.09 | 66.01 | 0.16 |
| 124 | 0.36 | 4.79 | 3.53 | −0.49 | 6.42 | −6.72 | 66.01 | 2.43 |
| 125 | 0.35 | 5.13 | −0.44 | −1.41 | −1.40 | −6.90 | 63.79 | 3.73 |
| 126 | 0.33 | 4.75 | −1.99 | −1.23 | −9.02 | −6.86 | 58.33 | 3.46 |
| 127 | 0.36 | 4.73 | 0.36 | −1.53 | 4.56 | −7.29 | 61.10 | 3.11 |
| 128 | −0.07 | −1.38 | 2.12 | −8.54 | −9.27 | −1.78 | 54.45 | −0.97 |
| 129 | −0.13 | −1.34 | 2.14 | −8.46 | 0.16 | −2.53 | 47.17 | −2.51 |
| 130 | −0.06 | −1.74 | −2.76 | −8.60 | 2.08 | −2.47 | 57.05 | −0.39 |
| 131 | −0.15 | −1.22 | 0.09 | −8.08 | 5.34 | −2.74 | 64.38 | −0.47 |
| 132 | −0.10 | −2.01 | −3.16 | −8.12 | −3.11 | −2.73 | 54.72 | 3.38 |

-continued

| | | | | | | | | |
|---|---|---|---|---|---|---|---|---|
| 133 | −0.13 | −1.45 | 2.02 | −8.04 | 2.46 | −2.24 | 68.54 | 1.40 |
| 134 | −0.11 | −1.36 | −2.75 | −7.68 | 0.87 | −2.20 | 62.77 | 0.46 |
| 135 | −0.10 | −1.66 | 0.80 | −7.99 | −6.50 | −2.85 | 58.11 | −3.03 |
| 136 | −0.10 | −1.39 | −0.66 | −8.05 | −0.64 | −2.58 | 60.67 | −1.20 |
| 137 | −0.08 | −2.04 | −0.70 | −8.62 | 5.92 | −2.03 | 63.08 | 2.07 |
| 138 | −0.11 | −1.44 | −2.66 | −8.23 | −3.00 | −2.64 | 52.05 | −12.58 |
| 139 | −0.09 | −1.34 | 1.73 | −7.92 | 1.25 | −2.09 | 54.21 | −4.23 |
| 140 | −0.13 | −1.72 | −1.14 | −8.65 | 3.68 | −2.46 | 60.90 | −3.56 |
| 141 | −0.14 | −1.29 | −1.05 | −8.42 | −4.40 | −1.80 | 55.03 | −1.73 |
| 142 | −0.10 | −1.33 | −4.62 | −9.38 | −5.19 | −2.68 | 56.49 | −0.74 |
| 143 | −0.09 | −1.35 | −1.42 | −9.07 | 3.70 | −2.50 | 61.63 | 0.05 |
| 144 | −0.44 | −6.62 | −0.08 | −8.43 | 3.03 | 2.65 | 34.50 | 2.06 |
| 145 | −0.47 | −6.28 | 1.57 | −9.29 | −6.12 | 2.33 | 29.93 | −1.97 |
| 146 | −0.44 | −6.15 | −0.35 | −8.90 | −6.12 | 2.76 | 31.77 | −0.39 |
| 147 | −0.47 | −6.03 | 1.02 | −8.50 | −3.98 | 2.55 | 27.37 | 6.41 |
| 148 | −0.47 | −6.47 | 0.58 | −9.16 | −4.25 | 2.53 | 29.28 | −2.16 |
| 149 | −0.47 | −6.41 | 0.58 | −8.59 | −7.69 | 2.66 | 32.78 | −4.26 |
| 150 | −0.44 | −6.63 | 0.33 | −8.96 | 5.06 | 2.56 | 29.31 | 0.25 |
| 151 | −0.45 | −6.32 | 4.26 | −8.83 | −3.55 | 2.68 | 35.36 | −1.39 |
| 152 | −0.44 | −6.65 | 0.05 | −8.71 | −11.51 | 2.71 | 30.30 | 3.43 |
| 153 | −0.44 | −6.47 | −0.37 | −8.79 | 7.18 | 2.80 | 30.82 | −6.53 |
| 154 | −0.44 | −6.12 | 0.06 | −8.76 | 3.86 | 2.95 | 28.19 | −2.98 |
| 155 | −0.44 | −6.12 | 1.80 | −9.11 | −9.21 | 2.68 | 30.34 | 6.30 |
| 156 | −0.46 | −6.68 | −0.77 | −8.69 | 1.26 | 2.63 | 30.94 | −0.36 |
| 157 | −0.47 | −6.39 | −0.08 | −8.15 | 7.13 | 2.80 | 28.23 | 1.12 |
| 158 | −0.45 | −6.39 | −0.75 | −8.70 | 8.69 | 2.90 | 31.24 | 1.50 |
| 159 | −0.46 | −6.57 | −1.82 | −8.71 | −3.29 | 2.75 | 28.59 | −2.87 |

| k | a48k | a49k | a50k | a51k | a52k | a53k | a54k | a55k |
|---|---|---|---|---|---|---|---|---|
| 120 | 2.78 | −6.70 | 6.71 | −4.07 | 75.91 | 32.50 | −4.02 | −2.35 |
| 121 | 1.75 | −6.51 | 6.99 | 1.30 | 76.01 | 32.64 | −3.86 | −1.98 |
| 122 | 2.33 | −6.45 | 7.21 | −2.74 | 73.44 | 32.65 | −3.94 | −3.11 |
| 123 | 2.80 | −6.68 | 7.26 | −2.89 | 72.83 | 33.33 | −3.87 | −2.74 |
| 124 | 3.47 | −6.47 | 6.87 | 1.60 | 66.53 | 32.72 | −3.73 | −1.95 |
| 125 | 1.90 | −6.45 | 7.49 | 0.13 | 71.55 | 33.59 | −3.90 | −2.40 |
| 126 | 2.54 | −6.66 | 7.75 | −4.69 | 70.82 | 32.24 | −3.83 | −3.09 |
| 127 | 1.80 | −6.47 | 6.30 | −0.37 | 75.11 | 32.34 | −3.76 | −2.51 |
| 128 | 5.08 | −2.11 | 4.54 | −3.75 | 56.90 | 24.33 | −1.11 | −3.41 |
| 129 | 6.93 | −2.21 | 4.69 | −1.04 | 53.20 | 22.82 | −0.86 | −3.26 |
| 130 | 5.71 | −2.02 | 4.77 | −2.04 | 59.19 | 22.72 | −1.09 | −3.87 |
| 131 | 6.18 | −2.16 | 5.19 | −1.55 | 56.71 | 22.38 | −0.87 | −3.38 |
| 132 | 4.92 | −2.36 | 4.70 | −3.26 | 53.43 | 21.56 | −0.71 | −3.77 |
| 133 | 5.37 | −2.04 | 5.37 | 4.33 | 55.12 | 23.02 | −1.00 | −3.41 |
| 134 | 4.82 | −2.12 | 4.95 | 2.78 | 57.33 | 21.93 | −1.02 | −4.04 |
| 135 | 5.17 | −2.10 | 4.70 | 2.48 | 52.38 | 21.10 | −0.78 | −3.61 |
| 136 | 5.59 | −2.43 | 5.28 | −2.07 | 55.91 | 21.57 | −1.07 | −3.74 |
| 137 | 6.13 | −2.32 | 4.42 | −3.71 | 55.69 | 22.77 | −0.81 | −3.72 |
| 138 | 4.85 | −2.26 | 4.81 | 6.46 | 55.44 | 22.67 | −0.71 | −3.47 |
| 139 | 4.82 | −2.22 | 5.09 | 2.24 | 54.98 | 22.90 | −0.79 | −3.88 |
| 140 | 6.04 | −2.27 | 4.38 | −0.44 | 59.54 | 22.51 | −0.85 | −3.18 |
| 141 | 6.36 | −2.39 | 5.49 | −0.20 | 54.86 | 21.78 | −0.90 | −3.71 |
| 142 | 5.02 | −2.24 | 5.11 | 2.02 | 57.42 | 21.87 | −0.84 | −3.51 |
| 143 | 5.52 | −2.22 | 4.91 | 1.56 | 58.08 | 23.02 | −1.00 | −3.42 |
| 144 | −0.21 | 1.06 | 1.30 | −0.44 | 38.34 | 16.26 | 0.17 | −2.55 |
| 145 | −0.70 | 1.07 | 0.82 | 0.28 | 39.73 | 16.77 | 0.10 | −2.79 |
| 146 | −0.67 | 0.88 | 0.94 | 0.56 | 41.10 | 17.62 | 0.23 | −2.75 |
| 147 | −0.68 | 1.10 | 1.41 | 0.32 | 40.17 | 16.63 | 0.19 | −2.42 |
| 148 | −0.41 | 1.17 | 1.07 | 0.73 | 37.75 | 15.98 | 0.12 | −2.83 |
| 149 | −0.55 | 1.15 | 1.39 | 3.93 | 39.29 | 16.75 | 0.30 | −3.12 |
| 150 | −1.68 | 1.29 | 1.09 | 2.30 | 41.93 | 16.56 | 0.33 | −2.48 |
| 151 | −0.46 | 1.00 | 1.37 | −0.76 | 41.86 | 16.89 | 0.23 | −3.06 |
| 152 | −1.16 | 0.71 | 0.72 | −3.59 | 36.96 | 15.92 | 0.09 | −2.85 |
| 153 | −0.73 | 1.16 | 1.43 | −2.06 | 37.10 | 16.71 | 0.20 | −2.38 |
| 154 | −0.77 | 1.19 | 1.48 | 0.25 | 39.82 | 16.00 | 0.06 | −1.96 |
| 155 | −0.23 | 1.11 | 0.91 | 0.10 | 39.59 | 16.68 | 0.02 | −2.58 |
| 156 | −0.49 | 1.09 | 1.59 | 1.28 | 37.71 | 16.57 | 0.07 | −2.28 |
| 157 | −0.44 | 1.01 | 0.76 | 0.78 | 41.09 | 16.19 | 0.21 | −2.43 |
| 158 | −0.30 | 1.03 | 1.11 | −2.55 | 38.76 | 15.61 | 0.29 | −2.24 |
| 159 | −1.59 | 1.10 | 1.12 | −0.03 | 39.03 | 16.28 | 0.16 | −2.11 |

| k | a56k | a57k | a58k | a59k | a60k | a61k | a62k | a63k |
|---|---|---|---|---|---|---|---|---|
| 120 | −3.49 | 13.40 | −0.17 | 2.77 | 24.03 | 0.22 | −1.92 | 8.36 |
| 121 | −1.56 | 13.53 | −0.15 | 2.91 | 24.00 | 0.19 | −0.13 | 9.30 |
| 122 | −0.33 | 13.08 | −0.14 | 2.69 | 23.29 | −0.11 | −10.57 | 21.22 |
| 123 | 4.41 | 13.72 | −0.15 | 2.98 | 24.76 | 0.23 | −14.55 | 8.52 |
| 124 | −5.43 | 13.28 | −0.15 | 2.53 | 23.69 | 0.36 | 3.17 | 30.92 |
| 125 | −2.68 | 13.25 | −0.13 | 2.61 | 24.53 | 0.23 | 43.45 | 1.59 |

-continued

| | | | | | | | |
|---|---|---|---|---|---|---|---|
| 126 | 7.50 | 15.48 | −0.16 | 2.78 | 24.04 | 0.28 | −3.80 | 25.95 |
| 127 | 4.32 | 14.32 | −0.14 | 2.77 | 23.76 | 0.04 | 2.42 | −25.97 |
| 128 | −13.42 | 27.45 | −0.24 | 7.34 | 17.51 | 2.47 | 0.94 | 9.49 |
| 129 | 10.58 | 26.06 | −0.24 | 7.23 | 17.53 | 2.31 | 14.43 | 46.44 |
| 130 | 4.21 | 24.93 | −0.25 | 7.19 | 17.44 | 2.41 | −21.84 | −14.67 |
| 131 | 1.14 | 27.25 | −0.25 | 7.89 | 17.62 | 2.36 | −6.28 | −1.76 |
| 132 | −1.71 | 25.57 | −0.28 | 7.46 | 17.35 | 2.48 | 0.91 | 32.36 |
| 133 | 12.79 | 24.80 | −0.28 | 7.83 | 17.59 | 2.47 | −0.89 | −14.20 |
| 134 | 3.23 | 24.22 | −0.24 | 7.25 | 17.33 | 2.29 | 7.74 | 36.11 |
| 135 | 5.29 | 24.94 | −0.25 | 7.41 | 17.48 | 2.41 | 0.58 | 13.47 |
| 136 | −3.92 | 26.67 | −0.25 | 7.53 | 17.72 | 2.42 | −8.16 | 22.44 |
| 137 | −3.58 | 26.44 | −0.26 | 7.61 | 16.62 | 2.49 | −1.47 | −16.57 |
| 138 | 4.11 | 25.58 | −0.24 | 7.62 | 17.52 | 2.36 | −16.44 | −25.70 |
| 139 | −1.61 | 25.23 | −0.24 | 7.50 | 17.71 | 2.41 | −13.21 | 25.78 |
| 140 | −2.54 | 27.55 | −0.25 | 7.87 | 18.15 | 2.40 | 1.36 | 18.40 |
| 141 | −12.06 | 26.71 | −0.24 | 7.31 | 17.41 | 2.28 | −12.71 | 9.79 |
| 142 | 1.45 | 25.83 | −0.25 | 7.40 | 17.14 | 2.38 | −6.48 | −4.14 |
| 143 | 3.09 | 26.96 | −0.25 | 7.34 | 17.09 | 2.50 | −5.15 | 17.91 |
| 144 | −4.85 | 8.77 | −0.03 | 7.05 | 9.88 | 2.53 | 14.66 | 9.71 |
| 145 | −3.68 | 8.85 | −0.04 | 7.36 | 9.83 | 2.65 | 13.40 | 23.05 |
| 146 | −2.12 | 8.74 | −0.03 | 7.62 | 10.26 | 2.57 | −4.56 | −13.00 |
| 147 | 0.77 | 9.60 | −0.04 | 7.20 | 10.29 | 2.55 | −1.43 | 5.03 |
| 148 | 1.14 | 9.42 | −0.03 | 7.40 | 10.21 | 2.61 | −10.34 | 1.62 |
| 149 | 1.93 | 8.85 | −0.04 | 7.68 | 9.93 | 2.31 | −10.78 | 11.24 |
| 150 | −1.34 | 10.06 | −0.04 | 7.44 | 10.26 | 2.50 | 2.13 | 6.41 |
| 151 | 3.92 | 9.28 | −0.03 | 7.41 | 10.52 | 2.47 | −23.89 | 21.08 |
| 152 | 1.39 | 9.20 | −0.02 | 7.35 | 10.53 | 2.59 | 16.81 | 5.07 |
| 153 | −8.77 | 8.14 | −0.02 | 7.68 | 10.60 | 2.67 | 2.72 | −9.55 |
| 154 | −0.43 | 9.26 | −0.04 | 7.60 | 10.54 | 2.54 | −2.97 | 14.19 |
| 155 | 0.07 | 9.38 | −0.03 | 7.27 | 10.46 | 2.65 | 2.90 | 14.79 |
| 156 | −0.81 | 9.37 | −0.05 | 7.54 | 10.21 | 2.54 | 10.72 | 0.67 |
| 157 | −1.46 | 9.47 | −0.05 | 7.26 | 10.23 | 2.60 | −7.04 | −39.70 |
| 158 | −5.91 | 8.46 | −0.04 | 7.27 | 9.78 | 2.38 | 0.29 | 9.16 |
| 159 | −3.15 | 8.99 | −0.05 | 7.41 | 10.58 | 2.70 | −10.17 | 2.93 |

| k | a0k | a1k | a2k | a3k | a4k | a5k | a6k | a7k |
|---|---|---|---|---|---|---|---|---|
| 160 | −183.25 | 2.14 | 5.62 | −25.74 | 3.13 | 10.32 | 3.56 | 11.78 |
| 161 | −200.77 | 1.99 | 5.47 | −27.03 | 3.73 | 10.43 | 3.14 | 12.40 |
| 162 | −189.77 | 1.88 | 5.81 | −25.08 | 3.29 | 10.28 | 2.50 | 12.23 |
| 163 | −180.47 | 1.92 | 5.11 | −24.66 | 3.56 | 9.96 | 3.94 | 11.75 |
| 164 | −190.80 | 2.23 | 5.54 | −24.51 | 1.97 | 10.54 | 4.33 | 11.66 |
| 165 | −202.82 | 2.32 | 5.41 | −25.31 | 2.83 | 10.24 | 3.98 | 11.72 |
| 166 | −191.96 | 2.42 | 5.77 | −26.22 | 4.19 | 10.76 | 2.92 | 12.35 |
| 167 | −202.76 | 2.17 | 6.14 | −25.94 | 2.82 | 10.63 | 3.41 | 11.44 |
| 168 | −200.75 | 1.98 | 4.80 | −24.85 | 2.05 | 10.13 | 4.60 | 11.72 |
| 169 | −203.33 | 2.07 | 4.43 | −25.07 | 3.21 | 10.43 | 4.22 | 11.70 |
| 170 | −210.89 | 2.59 | 5.25 | −26.95 | 2.38 | 10.55 | 4.53 | 11.48 |
| 171 | −182.98 | 1.78 | 5.53 | −26.40 | 2.18 | 10.46 | 3.14 | 12.03 |
| 172 | −198.69 | 1.99 | 5.10 | −24.36 | 2.57 | 10.33 | 3.05 | 11.84 |
| 173 | −188.40 | 1.90 | 5.59 | −24.79 | 3.64 | 10.55 | 3.01 | 11.43 |
| 174 | −214.04 | 2.14 | 5.54 | −24.92 | 2.11 | 10.22 | 2.96 | 11.82 |
| 175 | −184.63 | 2.21 | 5.32 | −25.17 | 2.94 | 10.15 | 4.37 | 12.25 |
| 176 | −200.57 | 2.15 | 5.04 | −22.81 | 1.93 | 9.60 | 4.05 | 11.62 |
| 177 | −192.89 | 1.82 | 5.99 | −23.73 | 1.29 | 9.49 | 3.28 | 11.57 |
| 178 | −203.63 | 1.64 | 5.83 | −20.94 | −0.29 | 9.36 | 3.67 | 12.18 |
| 179 | −188.18 | 2.06 | 5.25 | −23.68 | 1.11 | 9.95 | 5.50 | 11.80 |
| 180 | −209.99 | 1.94 | 5.75 | −22.03 | 1.03 | 9.56 | 4.07 | 11.49 |
| 181 | −186.37 | 1.67 | 5.88 | −21.16 | 0.82 | 9.68 | 4.08 | 11.39 |
| 182 | −179.41 | 2.00 | 4.79 | −22.47 | 1.65 | 9.46 | 3.93 | 11.91 |
| 183 | −205.64 | 1.85 | 6.10 | −21.08 | 0.69 | 9.89 | 2.51 | 12.14 |
| 184 | −191.97 | 1.98 | 5.27 | −22.05 | 0.35 | 9.36 | 3.29 | 11.41 |
| 185 | −189.61 | 1.88 | 5.68 | −22.09 | 1.18 | 9.34 | 3.93 | 11.81 |
| 186 | −194.95 | 2.16 | 5.47 | −23.46 | 2.22 | 9.99 | 4.03 | 11.41 |
| 187 | −199.69 | 1.98 | 5.83 | −21.48 | 0.05 | 9.70 | 3.21 | 11.41 |
| 188 | −186.98 | 1.60 | 5.00 | −23.36 | 1.17 | 9.80 | 2.65 | 11.23 |
| 189 | −194.99 | 1.63 | 5.53 | −23.27 | 1.00 | 9.60 | 4.56 | 12.00 |
| 190 | −195.44 | 1.23 | 5.91 | −21.99 | 1.57 | 9.26 | 3.87 | 12.39 |
| 191 | −197.60 | 1.64 | 5.88 | −21.36 | 0.88 | 9.76 | 2.72 | 10.91 |
| 192 | −80.99 | 1.13 | 5.78 | −41.96 | −7.61 | 14.12 | 4.56 | −2.34 |
| 193 | −89.68 | 0.98 | 5.35 | −40.67 | −7.33 | 14.32 | 4.86 | −3.09 |
| 194 | −87.61 | 1.04 | 5.68 | −40.81 | −7.47 | 14.54 | 5.72 | −3.11 |
| 195 | −75.78 | 0.82 | 5.89 | −41.56 | −7.69 | 14.38 | 4.84 | −3.28 |
| 196 | −81.87 | 1.14 | 5.62 | −39.90 | −7.61 | 14.36 | 5.82 | −3.01 |
| 197 | −86.38 | 1.03 | 5.52 | −40.84 | −7.57 | 14.22 | 4.74 | −2.69 |
| 198 | −90.67 | 1.07 | 5.62 | −40.01 | −7.85 | 14.09 | 4.38 | −2.72 |
| 199 | −85.90 | 0.90 | 5.82 | −39.91 | −7.87 | 14.58 | 4.61 | −3.11 |

-continued

| k | a8k | a9k | a10k | a11k | a12k | a13k | a14k | a15k |
|---|---|---|---|---|---|---|---|---|
| 160 | 93.69 | 50.35 | −0.06 | 43.76 | −7.96 | −11.45 | −1.65 | −39.83 |
| 161 | 94.19 | 51.22 | 0.05 | 41.97 | −8.07 | −11.77 | −1.83 | −35.89 |
| 162 | 96.08 | 50.24 | −0.01 | 44.07 | −8.94 | −11.94 | −1.74 | −33.20 |
| 163 | 91.01 | 50.82 | −0.02 | 41.62 | −9.97 | −11.61 | −1.79 | −35.37 |
| 164 | 94.91 | 51.64 | −0.03 | 44.52 | −10.47 | −11.14 | −1.66 | −38.97 |
| 165 | 99.80 | 49.04 | −0.02 | 49.32 | −10.67 | −11.51 | −1.78 | −35.32 |
| 166 | 100.32 | 49.55 | 0.01 | 48.96 | −8.32 | −11.16 | −1.87 | −35.89 |
| 167 | 91.74 | 50.26 | −0.03 | 47.65 | −8.62 | −11.54 | −1.66 | −34.51 |
| 168 | 99.23 | 48.64 | −0.05 | 42.04 | −8.21 | −11.68 | −1.67 | −34.09 |
| 169 | 91.16 | 51.29 | −0.01 | 48.34 | −11.59 | −11.22 | −1.69 | −38.04 |
| 170 | 84.86 | 50.02 | 0.02 | 47.47 | −8.47 | −12.16 | −1.65 | −39.32 |
| 171 | 104.41 | 49.99 | −0.04 | 46.22 | −7.03 | −11.70 | −1.61 | −36.51 |
| 172 | 95.70 | 51.92 | 0.01 | 43.17 | −11.26 | −11.33 | −1.77 | −42.20 |
| 173 | 99.92 | 49.58 | 0.00 | 46.70 | −8.98 | −12.03 | −1.72 | −36.09 |
| 174 | 92.96 | 50.20 | −0.05 | 47.19 | −10.20 | −11.95 | −1.65 | −39.79 |
| 175 | 87.99 | 50.84 | −0.06 | 47.82 | −10.64 | −11.26 | −1.78 | −40.49 |
| 176 | 92.57 | 45.83 | −0.03 | 46.46 | −3.54 | −10.29 | −1.66 | −40.48 |
| 177 | 103.07 | 45.08 | −0.08 | 46.56 | −6.48 | −10.76 | −1.59 | −34.80 |
| 178 | 89.56 | 45.20 | −0.04 | 45.63 | −3.64 | −10.46 | −1.56 | −43.17 |
| 179 | 100.68 | 43.71 | −0.03 | 49.09 | −2.93 | −10.14 | −1.61 | −40.29 |
| 180 | 105.61 | 44.15 | −0.06 | 48.19 | −3.47 | −9.72 | −1.61 | −40.95 |
| 181 | 91.34 | 45.93 | −0.02 | 50.35 | −3.56 | −10.55 | −1.62 | −40.77 |
| 182 | 87.76 | 44.55 | 0.00 | 46.54 | −7.49 | −10.17 | −1.51 | −43.01 |
| 183 | 97.67 | 44.55 | −0.04 | 49.44 | −4.48 | −10.41 | −1.59 | −36.79 |
| 184 | 93.30 | 44.01 | −0.02 | 47.30 | −2.87 | −10.32 | −1.78 | −37.03 |
| 185 | 101.12 | 47.15 | 0.00 | 45.58 | −6.35 | −9.75 | −1.68 | −42.95 |
| 186 | 92.30 | 43.85 | −0.03 | 49.68 | −5.53 | −10.36 | −1.73 | −39.98 |
| 187 | 90.84 | 43.94 | −0.02 | 44.30 | −1.86 | −10.72 | −1.55 | −37.11 |
| 188 | 101.37 | 42.91 | −0.04 | 48.77 | −4.67 | −9.64 | −1.62 | −45.48 |
| 189 | 95.02 | 44.73 | −0.04 | 45.22 | −2.35 | −10.64 | −1.65 | −39.73 |
| 190 | 93.66 | 43.89 | −0.01 | 45.99 | −6.29 | −9.88 | −1.58 | −39.34 |
| 191 | 103.16 | 44.83 | −0.01 | 47.51 | −5.19 | −10.19 | −1.53 | −36.73 |
| 192 | 59.69 | 57.64 | −0.04 | 16.47 | 24.54 | −9.22 | 2.64 | −37.59 |
| 193 | 69.07 | 58.35 | −0.09 | 18.14 | 26.55 | −9.27 | 2.42 | −38.58 |
| 194 | 64.30 | 59.42 | −0.09 | 19.73 | 26.26 | −9.01 | 2.47 | −37.31 |
| 195 | 64.31 | 57.75 | −0.08 | 18.64 | 26.38 | −9.27 | 2.49 | −39.18 |
| 196 | 66.35 | 57.50 | −0.09 | 17.61 | 26.14 | −9.63 | 2.47 | −34.66 |
| 197 | 70.49 | 57.92 | −0.09 | 19.08 | 25.79 | −9.25 | 2.47 | −36.50 |
| 198 | 67.45 | 59.20 | −0.07 | 19.74 | 26.43 | −9.27 | 2.38 | −38.96 |
| 199 | 69.13 | 57.68 | −0.11 | 19.25 | 26.73 | −9.21 | 2.41 | −38.46 |

| k | a16k | a17k | a18k | a19k | a20k | a21k | a22k | a23k |
|---|---|---|---|---|---|---|---|---|
| 160 | 0.05 | −6.82 | −24.67 | −24.74 | −2.61 | −2.86 | −2.71 | −1.60 |
| 161 | 0.00 | −6.42 | −24.61 | −59.26 | −2.55 | −2.53 | 6.00 | −1.60 |
| 162 | −0.30 | −6.70 | −24.98 | 8.36 | −2.47 | −2.78 | 20.37 | −1.59 |
| 163 | −0.11 | −5.77 | −24.59 | 50.59 | −2.62 | −2.67 | 6.97 | −1.61 |
| 164 | 0.19 | −6.04 | −24.78 | −12.92 | −2.65 | −2.69 | −11.54 | −1.60 |
| 165 | −0.02 | −5.73 | −24.78 | −25.13 | −2.64 | −2.84 | 8.52 | −1.63 |
| 166 | −0.06 | −7.15 | −24.72 | 10.36 | −2.90 | −2.60 | 11.33 | −1.60 |
| 167 | 0.05 | −5.02 | −24.62 | −18.12 | −2.65 | −2.70 | −9.13 | −1.60 |
| 168 | −0.18 | −5.74 | −24.65 | −43.31 | −2.61 | −2.74 | 2.60 | −1.63 |
| 169 | 0.05 | −3.92 | −24.69 | −0.11 | −2.62 | −2.81 | −0.57 | −1.59 |
| 170 | −0.22 | −6.42 | −24.74 | 31.59 | −2.54 | −2.42 | 4.93 | −1.60 |
| 171 | 0.38 | −6.29 | −24.79 | 17.32 | −2.47 | −2.80 | 3.16 | −1.58 |
| 172 | −0.20 | −4.47 | −24.71 | −76.32 | −2.72 | −2.81 | 14.78 | −1.58 |
| 173 | −0.02 | −3.41 | −24.55 | 12.62 | −2.59 | −2.77 | 13.40 | −1.61 |
| 174 | −0.19 | −6.36 | −24.80 | −30.09 | −2.58 | −2.56 | 11.87 | −1.60 |
| 175 | 0.01 | −5.58 | −24.80 | −0.33 | −2.57 | −2.98 | 8.06 | −1.59 |
| 176 | −0.21 | −7.35 | −22.87 | −2.52 | −2.79 | −3.04 | −3.04 | −1.43 |
| 177 | 0.42 | −6.96 | −22.77 | −14.25 | −2.87 | −2.93 | −3.93 | −1.45 |
| 178 | −0.02 | −6.32 | −22.67 | 6.85 | −2.92 | −3.19 | −7.99 | −1.45 |
| 179 | −0.09 | −6.74 | −22.78 | −7.19 | −2.85 | −2.83 | 8.51 | −1.45 |
| 180 | 0.17 | −6.39 | −22.66 | 56.84 | −2.89 | −2.75 | 1.92 | −1.46 |
| 181 | 0.19 | −5.99 | −22.80 | 8.81 | −2.85 | −2.82 | −0.75 | −1.45 |
| 182 | 0.14 | −5.99 | −22.76 | 24.31 | −2.86 | −2.90 | −4.31 | −1.46 |
| 183 | −0.08 | −7.56 | −22.53 | 13.39 | −2.79 | −2.74 | 16.60 | −1.45 |
| 184 | −0.11 | −6.77 | −22.95 | 19.90 | −3.09 | −2.74 | 1.85 | −1.47 |
| 185 | 0.08 | −6.63 | −22.79 | 28.47 | −2.86 | −3.04 | −8.57 | −1.44 |
| 186 | −0.04 | −6.29 | −22.94 | 53.97 | −2.89 | −3.03 | −0.93 | −1.44 |
| 187 | −0.14 | −6.33 | −22.59 | 99.70 | −3.14 | −2.75 | −4.33 | −1.43 |
| 188 | 0.00 | −7.06 | −22.71 | −0.85 | −2.92 | −2.89 | 0.54 | −1.45 |
| 189 | −0.07 | −8.13 | −22.59 | −18.23 | −2.91 | −3.01 | −8.11 | −1.44 |
| 190 | −0.17 | −7.08 | −22.39 | 23.48 | −2.85 | −2.87 | −3.17 | −1.46 |
| 191 | −0.06 | −7.27 | −22.67 | 41.89 | −2.92 | −2.76 | −3.93 | −1.46 |
| 192 | −0.08 | −4.09 | −16.51 | −9.54 | −3.59 | −2.93 | −0.63 | −1.16 |
| 193 | −0.14 | −3.11 | −16.34 | 18.48 | −3.60 | −3.00 | 1.15 | −1.14 |

-continued

| | | | | | | | |
|---|---|---|---|---|---|---|---|
| 194 | 0.04 | −3.51 | −16.64 | 17.91 | −3.51 | −2.91 | 1.10 | −1.13 |
| 195 | −0.17 | −3.94 | −16.52 | 15.91 | −3.51 | −2.89 | −1.44 | −1.13 |
| 196 | 0.08 | −3.88 | −16.58 | −20.06 | −3.47 | −2.90 | 5.56 | −1.13 |
| 197 | 0.09 | −3.67 | −16.49 | −16.57 | −3.57 | −2.88 | 3.05 | −1.13 |
| 198 | 0.05 | −3.94 | −16.42 | −16.93 | −3.42 | −2.97 | 1.59 | −1.11 |
| 199 | 0.02 | −4.02 | −16.51 | −25.71 | −3.60 | −2.90 | 2.24 | −1.14 |

| k | a24k | a25k | a26k | a27k | a28k | a29k | a30k | a31k |
|---|---|---|---|---|---|---|---|---|
| 160 | −1.72 | −4.57 | −3.31 | −5.64 | 1.91 | 1.82 | 6.79 | −74.96 |
| 161 | 2.72 | −4.07 | 0.55 | −5.64 | 1.76 | 1.89 | 6.87 | −73.97 |
| 162 | −4.32 | −4.19 | −2.77 | −5.46 | 2.01 | 1.92 | 7.05 | −73.97 |
| 163 | −1.39 | −4.01 | −0.95 | −5.48 | 2.46 | 1.69 | 6.74 | −74.71 |
| 164 | −0.61 | −4.33 | −1.97 | −5.78 | 2.93 | 1.84 | 6.85 | −75.67 |
| 165 | 2.85 | −4.36 | −3.46 | −5.41 | 2.81 | 1.98 | 6.35 | −75.37 |
| 166 | −1.58 | −3.98 | −1.06 | −5.35 | 1.94 | 1.90 | 6.59 | −74.94 |
| 167 | −0.38 | −5.08 | −3.13 | −5.36 | 2.77 | 1.81 | 6.39 | −75.00 |
| 168 | 2.47 | −3.87 | −0.88 | −5.81 | 2.49 | 1.71 | 7.18 | −75.15 |
| 169 | −2.51 | −4.45 | −6.66 | −4.91 | 1.83 | 2.03 | 6.90 | −76.07 |
| 170 | 6.57 | −3.95 | −4.60 | −5.75 | 1.82 | 2.01 | 6.96 | −73.68 |
| 171 | 2.24 | −3.92 | −1.15 | −5.47 | 2.71 | 1.61 | 6.63 | −73.51 |
| 172 | 3.40 | −4.54 | −2.52 | −5.54 | 2.40 | 2.00 | 6.80 | −73.48 |
| 173 | −0.75 | −4.31 | 2.15 | −5.78 | 2.35 | 1.56 | 6.88 | −74.65 |
| 174 | 3.78 | −4.76 | −3.69 | −5.35 | 1.90 | 1.99 | 7.05 | −75.07 |
| 175 | 2.70 | −4.13 | −3.26 | −5.61 | 1.83 | 1.74 | 6.62 | −75.22 |
| 176 | −3.40 | −4.70 | −1.81 | −4.85 | 1.49 | 1.10 | 5.28 | −69.91 |
| 177 | 3.89 | −4.52 | −2.20 | −5.42 | 1.47 | 1.05 | 5.44 | −68.29 |
| 178 | −0.89 | −4.57 | −0.54 | −5.06 | 1.72 | 1.23 | 5.32 | −68.69 |
| 179 | 0.34 | −4.88 | −0.94 | −5.10 | 1.60 | 1.22 | 5.19 | −67.29 |
| 180 | 2.91 | −4.43 | −2.20 | −5.38 | 1.18 | 1.28 | 5.03 | −68.04 |
| 181 | 0.20 | −4.51 | 0.35 | −5.67 | 1.11 | 1.13 | 5.20 | −69.65 |
| 182 | −5.24 | −4.31 | −1.03 | −5.08 | 1.14 | 1.21 | 4.73 | −67.72 |
| 183 | 2.46 | −4.05 | 0.58 | −5.67 | 0.91 | 1.03 | 5.01 | −68.14 |
| 184 | −1.50 | −4.78 | −1.48 | −5.34 | 1.04 | 1.23 | 5.58 | −68.25 |
| 185 | 0.24 | −5.14 | 0.73 | −4.87 | 1.21 | 1.05 | 5.17 | −68.14 |
| 186 | −0.78 | −4.30 | −4.96 | −5.25 | 1.03 | 1.33 | 5.06 | −68.46 |
| 187 | 1.72 | −5.38 | 0.77 | −4.80 | 1.35 | 0.99 | 5.47 | −67.65 |
| 188 | −0.43 | −5.19 | −0.03 | −5.43 | 1.03 | 1.19 | 5.13 | −71.14 |
| 189 | 4.51 | −4.64 | −3.26 | −4.93 | 0.78 | 0.95 | 5.52 | −68.34 |
| 190 | 0.38 | −4.65 | 0.48 | −4.86 | 1.19 | 1.08 | 5.19 | −69.56 |
| 191 | −3.32 | −4.37 | 4.83 | −5.59 | 1.22 | 1.00 | 5.24 | −71.35 |
| 192 | −1.10 | −6.19 | 10.44 | −5.27 | −10.64 | 1.78 | 8.50 | −46.49 |
| 193 | −0.22 | −5.99 | 10.70 | −5.10 | −10.32 | 1.84 | 8.95 | −46.44 |
| 194 | 1.19 | −6.00 | 10.41 | −5.23 | −9.90 | 1.72 | 8.65 | −45.75 |
| 195 | −0.99 | −6.04 | 11.34 | −5.36 | −10.16 | 1.78 | 8.59 | −44.99 |
| 196 | −1.78 | −5.87 | 9.88 | −5.37 | −10.11 | 1.82 | 8.86 | −46.13 |
| 197 | 0.12 | −6.17 | 11.67 | −5.32 | −10.56 | 1.82 | 8.33 | −46.32 |
| 198 | 0.29 | −6.03 | 10.23 | −5.05 | −10.16 | 1.82 | 8.42 | −44.92 |
| 199 | −2.02 | −5.95 | 9.82 | −5.22 | −9.75 | 1.57 | 8.69 | −45.94 |

| k | a32k | a33k | a34k | a35k | a36k | a37k | a38k | a39k |
|---|---|---|---|---|---|---|---|---|
| 160 | −7.10 | 3.84 | 2.29 | 7.25 | −1.41 | −42.89 | −2.47 | −2.31 |
| 161 | −7.16 | 4.00 | 2.40 | 6.79 | −1.29 | −44.10 | −2.43 | −2.37 |
| 162 | −6.88 | 3.82 | 2.18 | 6.67 | −1.35 | −44.13 | −2.49 | −2.35 |
| 163 | −7.18 | 3.48 | 2.31 | 6.99 | −1.38 | −42.27 | −2.53 | −2.32 |
| 164 | −6.67 | 3.67 | 2.34 | 6.50 | −1.34 | −42.33 | −2.46 | −2.34 |
| 165 | −8.06 | 3.80 | 2.15 | 6.43 | −1.41 | −42.56 | −2.48 | −2.36 |
| 166 | −6.97 | 3.84 | 2.07 | 6.30 | −1.37 | −41.59 | −2.35 | −2.30 |
| 167 | −7.50 | 3.63 | 2.27 | 8.27 | −1.29 | −43.63 | −2.40 | −2.33 |
| 168 | −7.23 | 3.84 | 2.14 | 7.07 | −1.36 | −42.42 | −2.44 | −2.32 |
| 169 | −6.82 | 3.72 | 2.20 | 6.12 | −1.31 | −43.38 | −2.53 | −2.33 |
| 170 | −6.81 | 3.71 | 2.21 | 7.09 | −1.38 | −41.57 | −2.45 | −2.37 |
| 171 | −6.97 | 3.74 | 2.16 | 7.13 | −1.35 | −42.14 | −2.49 | −2.32 |
| 172 | −6.01 | 3.77 | 2.13 | 7.48 | −1.41 | −42.50 | −2.42 | −2.30 |
| 173 | −6.58 | 3.62 | 2.20 | 6.64 | −1.30 | −41.40 | −2.46 | −2.35 |
| 174 | −6.09 | 3.80 | 2.19 | 6.27 | −1.46 | −42.84 | −2.53 | −2.33 |
| 175 | −7.31 | 3.70 | 2.41 | 6.68 | −1.30 | −41.21 | −2.56 | −2.35 |
| 176 | −6.83 | 3.47 | 2.53 | 4.38 | −1.11 | −39.26 | −2.01 | −2.17 |
| 177 | −7.14 | 3.45 | 2.16 | 4.46 | −1.08 | −38.15 | −2.01 | −2.17 |
| 178 | −6.84 | 3.45 | 2.44 | 4.82 | −1.20 | −37.87 | −1.96 | −2.14 |
| 179 | −7.17 | 3.28 | 2.32 | 4.76 | −1.15 | −38.48 | −2.04 | −2.17 |
| 180 | −6.73 | 3.38 | 2.39 | 3.85 | −1.07 | −36.51 | −1.99 | −2.13 |
| 181 | −6.45 | 3.47 | 2.29 | 5.05 | −0.93 | −37.26 | −1.92 | −2.14 |
| 182 | −6.41 | 3.52 | 2.16 | 4.22 | −1.01 | −40.58 | −2.04 | −2.16 |
| 183 | −6.37 | 3.34 | 2.26 | 4.47 | −1.11 | −38.40 | −1.98 | −2.14 |
| 184 | −6.07 | 3.42 | 2.22 | 5.10 | −1.07 | −38.98 | −1.95 | −2.18 |
| 185 | −6.69 | 3.57 | 2.23 | 4.02 | −1.03 | −37.01 | −2.01 | −2.19 |
| 186 | −6.10 | 3.26 | 2.21 | 4.04 | −1.15 | −37.83 | −1.92 | −2.15 |

-continued

| k | | | | | | | |
|---|---|---|---|---|---|---|---|
| 187 | −6.41 | 3.36 | 2.25 | 4.21 | −1.12 | −41.20 | −2.00 | −2.14 |
| 188 | −6.48 | 3.30 | 2.49 | 4.27 | −1.03 | −39.02 | −1.98 | −2.14 |
| 189 | −6.73 | 3.32 | 2.34 | 4.37 | −1.12 | −37.91 | −1.96 | −2.18 |
| 190 | −6.61 | 3.66 | 2.16 | 4.43 | −1.14 | −37.43 | −1.86 | −2.15 |
| 191 | −7.03 | 3.45 | 2.56 | 4.75 | −1.13 | −38.65 | −1.94 | −2.17 |
| 192 | 14.34 | 3.23 | 0.52 | −6.89 | −0.44 | −54.93 | −0.40 | −0.38 |
| 193 | 15.28 | 3.27 | 0.54 | −6.69 | −0.47 | −54.20 | −0.34 | −0.37 |
| 194 | 15.25 | 3.25 | 0.65 | −6.55 | −0.50 | −55.28 | −0.39 | −0.36 |
| 195 | 15.22 | 3.25 | 0.61 | −6.99 | −0.47 | −54.89 | −0.36 | −0.38 |
| 196 | 15.23 | 3.32 | 0.62 | −6.76 | −0.44 | −55.82 | −0.36 | −0.31 |
| 197 | 14.98 | 3.30 | 0.73 | −7.01 | −0.45 | −54.51 | −0.36 | −0.36 |
| 198 | 14.34 | 3.25 | 0.68 | −7.27 | −0.47 | −54.67 | −0.36 | −0.37 |
| 199 | 14.44 | 3.17 | 0.51 | −6.82 | −0.48 | −54.34 | −0.37 | −0.36 |

| k | a40k | a41k | a42k | a43k | a44k | a45k | a46k | a47k |
|---|---|---|---|---|---|---|---|---|
| 160 | 0.37 | 6.16 | −4.89 | −3.95 | −0.18 | −5.80 | 216.68 | −4.24 |
| 161 | 0.44 | 6.30 | −5.02 | −1.35 | 9.89 | −6.94 | 215.70 | 0.94 |
| 162 | 0.47 | 5.80 | −2.58 | −2.61 | 8.27 | −5.37 | 202.79 | −3.53 |
| 163 | 0.41 | 6.05 | 2.06 | −4.03 | 5.60 | −6.26 | 205.63 | −4.57 |
| 164 | 0.40 | 5.86 | 4.56 | −3.05 | −1.66 | −6.13 | 201.34 | −2.44 |
| 165 | 0.43 | 6.14 | −4.27 | −1.20 | −3.83 | −6.40 | 219.57 | −2.51 |
| 166 | 0.35 | 6.13 | −2.92 | −2.09 | 8.70 | −6.09 | 207.33 | 1.18 |
| 167 | 0.39 | 5.87 | −2.87 | −4.76 | 8.99 | −7.35 | 200.76 | 5.54 |
| 168 | 0.38 | 6.11 | 2.58 | −1.78 | −3.50 | −5.84 | 212.19 | −5.32 |
| 169 | 0.41 | 5.65 | −0.03 | −1.87 | 9.47 | −6.14 | 212.81 | 2.41 |
| 170 | 0.44 | 5.74 | −2.44 | −1.68 | 6.05 | −6.48 | 202.50 | 3.86 |
| 171 | 0.45 | 6.48 | −1.42 | −1.59 | 4.23 | −6.51 | 218.85 | −1.59 |
| 172 | 0.38 | 6.75 | 2.44 | −0.51 | 1.69 | −6.58 | 204.05 | −0.83 |
| 173 | 0.46 | 5.72 | −0.38 | −0.25 | 5.15 | −5.50 | 191.42 | 0.98 |
| 174 | 0.45 | 6.33 | 3.98 | −2.61 | −5.38 | −5.59 | 205.05 | −3.88 |
| 175 | 0.40 | 5.97 | 6.85 | −2.28 | 7.55 | −6.99 | 200.65 | −0.70 |
| 176 | 0.45 | 7.06 | −0.46 | −1.72 | 1.09 | −6.70 | 193.26 | 3.23 |
| 177 | 0.44 | 6.59 | 0.91 | −1.08 | −0.45 | −7.42 | 197.52 | 2.04 |
| 178 | 0.46 | 7.05 | −2.54 | −0.60 | 1.25 | −6.31 | 187.34 | 0.15 |
| 179 | 0.47 | 6.80 | −3.35 | −0.78 | 2.85 | −7.77 | 196.66 | 2.32 |
| 180 | 0.45 | 6.54 | −0.56 | −2.66 | 5.28 | −7.34 | 204.22 | −2.50 |
| 181 | 0.49 | 6.72 | 2.50 | −0.06 | 5.80 | −6.91 | 198.68 | −4.05 |
| 182 | 0.51 | 7.05 | −4.15 | −2.54 | −1.36 | −7.48 | 201.35 | 0.50 |
| 183 | 0.45 | 7.01 | −1.19 | −0.48 | 3.29 | −8.19 | 205.06 | −2.27 |
| 184 | 0.50 | 6.51 | 1.42 | −1.52 | 2.04 | −7.31 | 184.98 | 5.86 |
| 185 | 0.46 | 6.88 | 0.90 | −0.33 | 1.45 | −7.19 | 200.08 | −1.33 |
| 186 | 0.41 | 6.38 | −0.92 | 0.12 | −2.64 | −8.02 | 193.03 | 4.59 |
| 187 | 0.48 | 7.11 | −1.69 | −1.28 | −2.29 | −7.25 | 195.79 | −4.40 |
| 188 | 0.44 | 6.54 | 3.58 | −0.63 | 5.67 | −6.94 | 198.26 | −5.30 |
| 189 | 0.42 | 6.39 | −4.58 | −1.29 | 7.96 | −7.29 | 198.65 | −3.19 |
| 190 | 0.46 | 6.64 | −4.68 | −1.11 | −4.70 | −7.46 | 196.34 | 3.04 |
| 191 | 0.45 | 6.81 | 2.51 | −2.38 | 0.31 | −7.21 | 195.56 | 1.44 |
| 192 | 0.51 | 7.88 | −0.86 | 5.86 | −1.23 | −9.89 | 31.77 | −1.15 |
| 193 | 0.49 | 7.70 | 0.24 | 5.63 | −4.70 | −9.82 | 32.51 | −0.43 |
| 194 | 0.54 | 7.71 | −0.61 | 5.51 | −5.12 | −9.75 | 32.83 | 1.99 |
| 195 | 0.49 | 7.83 | 0.62 | 5.83 | 2.58 | −9.67 | 33.03 | 0.79 |
| 196 | 0.52 | 7.78 | −1.62 | 5.24 | −1.38 | −9.49 | 37.38 | 1.85 |
| 197 | 0.54 | 7.94 | 0.26 | 4.88 | 0.93 | −9.66 | 28.25 | −0.89 |
| 198 | 0.48 | 7.63 | −0.16 | 6.08 | 1.97 | −9.63 | 26.78 | −1.78 |
| 199 | 0.50 | 7.86 | −1.26 | 5.43 | 1.97 | −9.74 | 29.21 | −1.97 |

| k | a48k | a49k | a50k | a51k | a52k | a53k | a54k | a55k |
|---|---|---|---|---|---|---|---|---|
| 160 | −15.09 | 1.43 | 8.38 | 2.09 | 67.10 | 50.59 | −4.05 | −2.61 |
| 161 | −15.99 | 1.74 | 8.50 | −0.09 | 74.46 | 49.89 | −3.80 | −2.33 |
| 162 | −15.23 | 1.34 | 8.48 | −1.80 | 66.68 | 50.94 | −3.90 | −2.70 |
| 163 | −14.71 | 1.41 | 6.35 | −3.76 | 65.56 | 52.11 | −3.89 | −3.17 |
| 164 | −15.64 | 1.35 | 8.94 | −11.87 | 69.07 | 50.02 | −3.94 | −2.36 |
| 165 | −15.55 | 1.51 | 9.37 | 4.37 | 68.67 | 53.08 | −3.92 | −2.80 |
| 166 | −15.40 | 1.37 | 8.38 | 2.83 | 69.57 | 52.07 | −3.76 | −1.98 |
| 167 | −15.25 | 1.65 | 7.20 | −1.24 | 69.80 | 49.58 | −4.03 | −3.15 |
| 168 | −15.21 | 1.29 | 7.64 | −5.76 | 65.67 | 51.80 | −3.99 | −4.23 |
| 169 | −15.65 | 1.44 | 7.37 | 0.61 | 67.24 | 51.04 | −3.94 | −3.61 |
| 170 | −15.53 | 1.54 | 7.44 | −3.07 | 72.23 | 52.70 | −4.07 | −2.45 |
| 171 | −14.94 | 1.54 | 9.01 | −0.48 | 66.04 | 51.64 | −4.11 | −2.67 |
| 172 | −15.34 | 1.52 | 8.43 | 2.06 | 71.91 | 50.70 | −4.02 | −2.48 |
| 173 | −14.78 | 1.57 | 7.45 | −2.85 | 62.87 | 50.65 | −3.87 | −1.81 |
| 174 | −15.51 | 1.51 | 9.59 | 0.14 | 65.71 | 49.51 | −4.02 | −1.82 |
| 175 | −15.48 | 1.26 | 6.97 | 7.15 | 69.96 | 53.52 | −3.95 | −3.26 |
| 176 | −12.35 | 1.49 | 9.88 | −9.25 | 57.89 | 46.03 | −3.59 | −1.89 |
| 177 | −12.31 | 1.61 | 9.42 | −3.73 | 67.80 | 45.21 | −3.64 | −2.45 |
| 178 | −12.14 | 1.49 | 10.23 | −0.63 | 58.49 | 45.33 | −3.73 | −2.72 |
| 179 | −12.13 | 1.61 | 10.38 | 0.24 | 55.05 | 46.72 | −3.63 | −2.00 |

-continued

| k | | | | | | | |
|---|---|---|---|---|---|---|---|
| 180 | −11.85 | 1.51 | 9.89 | −9.35 | 58.31 | 44.55 | −3.63 | −3.61 |
| 181 | −11.39 | 1.68 | 10.30 | −3.55 | 55.82 | 44.55 | −3.69 | −0.74 |
| 182 | −11.71 | 1.58 | 9.81 | −3.65 | 60.66 | 45.97 | −3.65 | −2.52 |
| 183 | −11.84 | 1.62 | 7.87 | −3.91 | 62.48 | 45.42 | −3.52 | −2.08 |
| 184 | −12.30 | 1.57 | 9.70 | 8.09 | 55.78 | 46.36 | −3.52 | −2.01 |
| 185 | −11.78 | 1.63 | 8.33 | −0.93 | 55.84 | 45.39 | −3.58 | −2.29 |
| 186 | −11.46 | 1.71 | 9.94 | −4.37 | 60.19 | 44.13 | −3.66 | −3.12 |
| 187 | −12.17 | 1.61 | 8.29 | −5.53 | 58.65 | 44.83 | −3.78 | −2.80 |
| 188 | −11.84 | 1.68 | 7.48 | −2.86 | 65.02 | 45.54 | −3.61 | −2.11 |
| 189 | −11.77 | 1.64 | 9.14 | 2.22 | 55.82 | 44.24 | −3.61 | −2.37 |
| 190 | −12.38 | 1.71 | 7.76 | −4.37 | 63.61 | 45.04 | −3.67 | −2.30 |
| 191 | −11.86 | 1.57 | 8.30 | 0.81 | 62.45 | 45.01 | −3.51 | −2.05 |
| 192 | −14.53 | 1.99 | 13.18 | 1.33 | 106.76 | 38.07 | −5.34 | −5.15 |
| 193 | −13.82 | 2.08 | 13.41 | 1.91 | 104.39 | 37.64 | −5.16 | −4.44 |
| 194 | −14.37 | 2.15 | 13.46 | −0.20 | 110.70 | 38.01 | −5.34 | −5.04 |
| 195 | −13.91 | 2.12 | 13.46 | 0.42 | 102.96 | 38.66 | −5.33 | −4.93 |
| 196 | −14.24 | 2.07 | 14.12 | 2.08 | 97.99 | 38.20 | −5.46 | −5.31 |
| 197 | −14.21 | 2.13 | 13.13 | −1.64 | 100.89 | 37.80 | −5.44 | −4.59 |
| 198 | −14.39 | 2.09 | 13.96 | −2.45 | 103.11 | 38.34 | −5.33 | −5.41 |
| 199 | −13.74 | 2.08 | 13.50 | −2.52 | 105.29 | 38.24 | −5.41 | −4.78 |

| k | a56k | a57k | a58k | a59k | a60k | a61k | a62k | a63k |
|---|---|---|---|---|---|---|---|---|
| 160 | 4.80 | −3.26 | −0.21 | 3.57 | 2.42 | −0.68 | −12.67 | −24.28 |
| 161 | −3.84 | −4.72 | −0.18 | 2.94 | 2.29 | −0.37 | 1.69 | 35.79 |
| 162 | 2.38 | −4.79 | −0.18 | 3.21 | 2.09 | −0.33 | 4.88 | −13.73 |
| 163 | −0.25 | −2.02 | −0.17 | 2.96 | 2.59 | −0.43 | 27.32 | 49.32 |
| 164 | 3.73 | −5.32 | −0.15 | 3.77 | 2.77 | −0.50 | −9.12 | 57.33 |
| 165 | 0.28 | −2.82 | −0.17 | 3.31 | 2.63 | −0.50 | 22.97 | 31.74 |
| 166 | −4.59 | −3.20 | −0.18 | 3.25 | 3.45 | −0.72 | −15.61 | 33.03 |
| 167 | −1.01 | −4.60 | −0.17 | 4.16 | 2.50 | −0.33 | −27.43 | −11.64 |
| 168 | −4.66 | −1.98 | −0.19 | 4.12 | 2.54 | −0.22 | −1.92 | −10.90 |
| 169 | 3.96 | −7.01 | −0.20 | 2.86 | 2.56 | −0.62 | 17.28 | −12.73 |
| 170 | 2.95 | −4.19 | −0.21 | 3.43 | 2.63 | −0.19 | −14.50 | −1.16 |
| 171 | −7.27 | −3.21 | −0.20 | 3.49 | 2.62 | −0.49 | 1.07 | −12.08 |
| 172 | 7.69 | −6.61 | −0.16 | 2.74 | 2.46 | −0.33 | 12.29 | −21.91 |
| 173 | 0.38 | −3.77 | −0.20 | 3.10 | 2.67 | −0.35 | −8.43 | 25.41 |
| 174 | 1.04 | −2.66 | −0.18 | 3.00 | 2.98 | −0.48 | −6.63 | −62.55 |
| 175 | 1.60 | −1.83 | −0.18 | 3.19 | 2.77 | −0.62 | −10.72 | −93.17 |
| 176 | −0.52 | −7.31 | −0.07 | 2.13 | 2.59 | −0.40 | −6.00 | 14.91 |
| 177 | −0.77 | −6.06 | −0.12 | 1.95 | 3.14 | −0.16 | −9.91 | −11.31 |
| 178 | −1.38 | −6.04 | −0.11 | 1.95 | 2.90 | −0.10 | −14.84 | −5.31 |
| 179 | 3.62 | −5.16 | −0.12 | 2.88 | 2.42 | −0.29 | −2.65 | 24.60 |
| 180 | −0.82 | −5.22 | −0.08 | 2.50 | 2.59 | −0.01 | −9.33 | 68.11 |
| 181 | 1.07 | −4.69 | −0.09 | 1.89 | 2.66 | −0.23 | 5.36 | 72.62 |
| 182 | 1.54 | −7.98 | −0.10 | 2.35 | 2.91 | −0.19 | −19.95 | −12.65 |
| 183 | 0.38 | −6.18 | −0.10 | 2.44 | 2.23 | −0.51 | 30.27 | 7.42 |
| 184 | −1.62 | −7.10 | −0.09 | 1.94 | 2.99 | −0.47 | −3.11 | −34.92 |
| 185 | 2.42 | −5.25 | −0.08 | 2.10 | 2.45 | −0.43 | 3.54 | 3.01 |
| 186 | −5.80 | −6.76 | −0.10 | 1.44 | 2.25 | −0.49 | −21.05 | 17.21 |
| 187 | 7.44 | −5.48 | −0.12 | 2.46 | 2.44 | −0.27 | 23.77 | 30.52 |
| 188 | −5.44 | −6.90 | −0.11 | 2.41 | 2.25 | −0.51 | 10.61 | −0.47 |
| 189 | 0.88 | −6.94 | −0.09 | 2.24 | 2.12 | −0.02 | 20.18 | −19.77 |
| 190 | 8.28 | −6.66 | −0.10 | 2.54 | 2.34 | −0.33 | 21.36 | 57.54 |
| 191 | −3.19 | −5.28 | −0.09 | 2.05 | 2.63 | −0.25 | 7.47 | 31.17 |
| 192 | 5.63 | −31.18 | 0.32 | −1.71 | 12.41 | 0.20 | −0.23 | 7.04 |
| 193 | 2.70 | −30.14 | 0.28 | −2.06 | 12.10 | 0.16 | −29.14 | 20.81 |
| 194 | −1.45 | −29.85 | 0.28 | −1.81 | 12.41 | 0.08 | 17.53 | 16.41 |
| 195 | −2.76 | −29.39 | 0.31 | −1.97 | 12.28 | 0.17 | −0.96 | 15.02 |
| 196 | −3.77 | −29.74 | 0.29 | −2.19 | 12.65 | 0.09 | −9.79 | 31.38 |
| 197 | −3.05 | −29.86 | 0.30 | −1.86 | 12.48 | 0.13 | −18.07 | 9.58 |
| 198 | −2.17 | −30.42 | 0.30 | −1.83 | 12.21 | 0.18 | −5.19 | 14.38 |
| 199 | −2.93 | −30.44 | 0.29 | −1.97 | 12.62 | 0.04 | 16.43 | −0.26 |

| k | a0k | a1k | a2k | a3k | a4k | a5k | a6k | a7k |
|---|---|---|---|---|---|---|---|---|
| 200 | −84.84 | 1.13 | 5.88 | −40.53 | −7.81 | 13.76 | 5.16 | −2.61 |
| 201 | −86.46 | 1.17 | 5.92 | −41.73 | −7.49 | 14.37 | 4.96 | −2.65 |
| 202 | −85.65 | 0.92 | 5.61 | −41.84 | −7.73 | 14.39 | 4.88 | −3.04 |
| 203 | −83.58 | 0.92 | 5.57 | −41.07 | −7.79 | 14.00 | 5.78 | −2.87 |
| 204 | −84.03 | 0.90 | 5.59 | −40.04 | −8.07 | 15.05 | 5.36 | −2.80 |
| 205 | −88.01 | 1.00 | 5.82 | −40.27 | −7.37 | 14.65 | 5.64 | −2.95 |
| 206 | −91.14 | 1.09 | 5.67 | −38.94 | −7.49 | 13.90 | 5.00 | −3.05 |
| 207 | −87.84 | 1.13 | 5.79 | −39.92 | −7.62 | 14.06 | 4.61 | −3.12 |
| 208 | −139.32 | 2.88 | 8.38 | −29.54 | −7.87 | 11.87 | 0.06 | 1.37 |
| 209 | −136.35 | 2.65 | 8.20 | −29.63 | −7.90 | 11.88 | 0.14 | 1.88 |
| 210 | −136.39 | 2.88 | 8.19 | −29.62 | −7.91 | 11.54 | 0.09 | 1.74 |
| 211 | −140.86 | 2.90 | 8.40 | −28.91 | −8.02 | 11.83 | 1.40 | 1.81 |
| 212 | −141.28 | 2.64 | 8.02 | −30.90 | −8.11 | 11.87 | 0.91 | 1.38 |

-continued

|  |  |  |  |  |  |  |  |  |
|---|---|---|---|---|---|---|---|---|
| 213 | −147.44 | 3.03 | 8.55 | −29.96 | −8.18 | 12.28 | 0.27 | 0.89 |
| 214 | −137.06 | 2.83 | 8.21 | −28.00 | −7.95 | 11.69 | −0.13 | 1.43 |
| 215 | −136.69 | 2.81 | 8.31 | −31.18 | −8.32 | 12.24 | −0.51 | 1.76 |
| 216 | −144.43 | 3.02 | 8.72 | −30.56 | −7.94 | 11.59 | 0.02 | 1.81 |
| 217 | −137.63 | 2.89 | 8.13 | −30.66 | −7.76 | 11.71 | 0.40 | 1.39 |
| 218 | −132.91 | 2.90 | 8.74 | −30.41 | −8.04 | 11.61 | 0.24 | 2.17 |
| 219 | −146.30 | 2.70 | 8.31 | −32.57 | −8.00 | 12.00 | 0.33 | 1.31 |
| 220 | −141.57 | 2.69 | 8.20 | −30.05 | −8.02 | 11.79 | 0.65 | 1.73 |
| 221 | −143.00 | 2.79 | 8.25 | −29.94 | −7.79 | 11.74 | −0.08 | 1.70 |
| 222 | −138.77 | 2.83 | 8.47 | −28.20 | −7.64 | 11.82 | 0.14 | 1.48 |
| 223 | −140.99 | 2.63 | 8.27 | −30.91 | −7.93 | 11.74 | 0.18 | 1.55 |
| 224 | −54.29 | 0.60 | 4.08 | −17.30 | −4.02 | 6.24 | 2.53 | −0.47 |
| 225 | −49.96 | 0.52 | 4.11 | −17.63 | −3.57 | 6.25 | 2.57 | −0.65 |
| 226 | −53.86 | 0.63 | 4.07 | −16.88 | −3.88 | 6.15 | 2.39 | −0.17 |
| 227 | −53.38 | 0.55 | 4.12 | −16.78 | −3.97 | 6.27 | 2.64 | −0.44 |
| 228 | −52.04 | 0.58 | 4.25 | −17.54 | −3.97 | 6.26 | 2.50 | −0.44 |
| 229 | −49.03 | 0.59 | 4.08 | −16.65 | −3.89 | 6.26 | 2.41 | −0.68 |
| 230 | −51.57 | 0.47 | 3.92 | −17.80 | −4.05 | 6.13 | 2.83 | −0.45 |
| 231 | −51.91 | 0.73 | 4.07 | −16.88 | −3.72 | 6.31 | 2.68 | −0.76 |
| 232 | −53.06 | 0.54 | 4.08 | −17.42 | −3.88 | 6.13 | 2.80 | −0.66 |
| 233 | −55.52 | 0.57 | 4.00 | −17.43 | −3.79 | 6.01 | 2.67 | −0.74 |
| 234 | −52.68 | 0.62 | 3.76 | −16.64 | −3.85 | 6.32 | 2.48 | −0.51 |
| 235 | −57.68 | 0.48 | 4.06 | −16.80 | −3.86 | 5.94 | 2.56 | −0.56 |
| 236 | −53.28 | 0.60 | 4.17 | −17.07 | −3.56 | 6.08 | 2.93 | −0.65 |
| 237 | −50.64 | 0.50 | 4.15 | −16.55 | −3.98 | 5.93 | 2.86 | −0.63 |
| 238 | −54.90 | 0.57 | 3.85 | −17.16 | −3.98 | 6.12 | 2.89 | −0.43 |
| 239 | −54.82 | 0.69 | 3.85 | −16.27 | −3.91 | 6.14 | 2.75 | −0.44 |

| k | a8k | a9k | a10k | a11k | a12k | a13k | a14k | a15k |
|---|---|---|---|---|---|---|---|---|
| 200 | 66.06 | 57.96 | −0.06 | 20.15 | 25.87 | −9.12 | 2.49 | −40.56 |
| 201 | 68.69 | 59.17 | −0.05 | 18.98 | 26.20 | −9.42 | 2.57 | −38.06 |
| 202 | 65.93 | 58.25 | −0.06 | 17.31 | 26.06 | −9.06 | 2.45 | −37.70 |
| 203 | 66.02 | 57.57 | −0.06 | 17.54 | 24.57 | −9.56 | 2.48 | −37.48 |
| 204 | 62.62 | 60.56 | −0.05 | 18.59 | 26.34 | −9.47 | 2.50 | −37.12 |
| 205 | 69.42 | 59.25 | −0.07 | 18.44 | 25.76 | −9.14 | 2.51 | −38.09 |
| 206 | 69.43 | 58.91 | −0.08 | 17.90 | 25.60 | −9.19 | 2.56 | −38.37 |
| 207 | 66.76 | 59.12 | −0.06 | 17.58 | 23.78 | −9.08 | 2.57 | −36.53 |
| 208 | 105.25 | 45.16 | 0.14 | 30.65 | 17.19 | −11.84 | 1.41 | −56.05 |
| 209 | 100.97 | 49.11 | 0.17 | 33.24 | 19.20 | −11.96 | 1.36 | −54.82 |
| 210 | 110.23 | 47.17 | 0.14 | 32.19 | 18.96 | −11.95 | 1.33 | −57.81 |
| 211 | 99.46 | 47.41 | 0.17 | 34.11 | 19.23 | −11.51 | 1.40 | −58.91 |
| 212 | 100.89 | 47.64 | 0.20 | 32.97 | 18.91 | −11.64 | 1.29 | −55.22 |
| 213 | 105.89 | 47.15 | 0.17 | 34.74 | 19.38 | −11.71 | 1.35 | −54.68 |
| 214 | 100.66 | 48.39 | 0.12 | 33.05 | 18.56 | −11.70 | 1.47 | −55.39 |
| 215 | 105.40 | 48.05 | 0.14 | 35.47 | 19.87 | −11.73 | 1.47 | −56.98 |
| 216 | 107.76 | 46.39 | 0.15 | 32.78 | 18.55 | −11.55 | 1.40 | −56.60 |
| 217 | 102.67 | 46.58 | 0.16 | 34.43 | 19.08 | −11.72 | 1.35 | −56.71 |
| 218 | 106.31 | 45.50 | 0.13 | 35.30 | 18.10 | −11.87 | 1.42 | −56.77 |
| 219 | 103.64 | 46.85 | 0.14 | 34.19 | 18.24 | −11.49 | 1.25 | −56.12 |
| 220 | 105.64 | 46.90 | 0.17 | 34.57 | 17.92 | −11.69 | 1.39 | −57.90 |
| 221 | 104.76 | 45.29 | 0.14 | 35.97 | 21.36 | −11.91 | 1.36 | −56.05 |
| 222 | 103.79 | 46.27 | 0.14 | 33.43 | 19.41 | −11.53 | 1.41 | −56.73 |
| 223 | 101.88 | 45.23 | 0.17 | 34.42 | 19.64 | −12.02 | 1.45 | −53.76 |
| 224 | 44.53 | 25.82 | −0.06 | 11.68 | 10.35 | −5.06 | 0.95 | −25.85 |
| 225 | 45.43 | 25.95 | −0.04 | 11.59 | 10.33 | −4.95 | 1.01 | −27.25 |
| 226 | 42.76 | 25.29 | −0.04 | 11.55 | 10.68 | −4.99 | 1.00 | −26.64 |
| 227 | 44.83 | 25.97 | −0.05 | 12.62 | 10.83 | −5.07 | 0.98 | −26.88 |
| 228 | 43.61 | 25.36 | −0.03 | 12.76 | 10.30 | −4.92 | 1.10 | −27.08 |
| 229 | 46.60 | 25.62 | −0.05 | 11.49 | 10.21 | −5.09 | 1.00 | −26.17 |
| 230 | 43.98 | 25.50 | −0.06 | 11.29 | 10.13 | −5.14 | 0.85 | −26.86 |
| 231 | 43.86 | 25.36 | −0.04 | 11.30 | 10.41 | −4.94 | 1.01 | −25.41 |
| 232 | 46.44 | 25.68 | −0.05 | 10.66 | 10.53 | −5.00 | 0.95 | −27.32 |
| 233 | 47.20 | 25.26 | −0.02 | 10.75 | 11.18 | −5.01 | 0.97 | −26.35 |
| 234 | 45.19 | 26.43 | −0.02 | 11.44 | 10.41 | −5.05 | 0.94 | −25.67 |
| 235 | 46.18 | 25.03 | −0.03 | 11.83 | 10.34 | −4.91 | 1.00 | −26.54 |
| 236 | 45.28 | 25.60 | −0.04 | 11.79 | 10.74 | −5.00 | 0.99 | −27.22 |
| 237 | 45.71 | 26.50 | −0.06 | 11.87 | 10.86 | −5.00 | 0.99 | −28.24 |
| 238 | 44.83 | 25.30 | −0.04 | 11.05 | 10.70 | −5.05 | 0.95 | −26.50 |
| 239 | 45.99 | 25.08 | −0.06 | 11.38 | 10.68 | −4.93 | 0.88 | −26.89 |

| k | a16k | a17k | a18k | a19k | a20k | a21k | a22k | a23k |
|---|---|---|---|---|---|---|---|---|
| 200 | −0.14 | −3.90 | −16.42 | 18.94 | −3.52 | −2.90 | 2.97 | −1.12 |
| 201 | −0.01 | −3.17 | −16.60 | 20.24 | −3.57 | −2.91 | 4.30 | −1.14 |
| 202 | 0.14 | −3.90 | −16.67 | 6.48 | −3.59 | −2.84 | −0.10 | −1.11 |
| 203 | −0.24 | −3.89 | −16.69 | 4.00 | −3.46 | −3.00 | −2.50 | −1.12 |
| 204 | −0.10 | −3.70 | −16.54 | 0.10 | −3.60 | −2.94 | −1.46 | −1.13 |
| 205 | −0.10 | −3.49 | −16.60 | 1.65 | −3.53 | −2.91 | 1.37 | −1.12 |

-continued

| k | | | | | | | |
|---|---|---|---|---|---|---|---|
| 206 | 0.11 | −3.34 | −16.64 | 5.16 | −3.55 | −2.70 | −1.01 | −1.15 |
| 207 | 0.02 | −4.27 | −16.57 | −0.97 | −3.50 | −2.94 | 9.24 | −1.12 |
| 208 | 0.27 | −7.69 | −16.18 | 9.78 | −3.44 | −1.72 | 2.71 | −1.02 |
| 209 | −0.04 | −7.39 | −15.94 | −9.32 | −3.51 | −1.63 | 1.56 | −1.04 |
| 210 | −0.07 | −7.15 | −16.15 | 14.88 | −3.47 | −1.77 | −0.45 | −1.06 |
| 211 | 0.08 | −7.65 | −16.49 | 5.04 | −3.52 | −1.64 | −0.63 | −1.05 |
| 212 | −0.03 | −7.56 | −16.13 | −45.52 | −3.43 | −1.85 | −3.97 | −1.04 |
| 213 | 0.07 | −6.72 | −16.27 | −34.23 | −3.53 | −1.73 | −1.11 | −1.03 |
| 214 | 0.17 | −7.68 | −16.15 | 2.33 | −3.41 | −1.95 | 2.65 | −1.04 |
| 215 | 0.23 | −7.81 | −16.12 | 8.35 | −3.41 | −1.63 | −1.63 | −1.05 |
| 216 | −0.06 | −7.14 | −16.07 | −6.69 | −3.47 | −1.52 | 1.36 | −1.04 |
| 217 | −0.18 | −7.44 | −16.05 | −10.69 | −3.52 | −1.66 | 4.16 | −1.04 |
| 218 | −0.16 | −7.64 | −16.02 | 4.38 | −3.55 | −1.58 | −0.43 | −1.03 |
| 219 | −0.09 | −7.83 | −16.27 | 51.83 | −3.50 | −1.72 | 2.93 | −1.05 |
| 220 | −0.08 | −7.89 | −16.36 | −26.86 | −3.50 | −1.95 | 1.99 | −1.04 |
| 221 | −0.24 | −7.62 | −16.20 | −13.42 | −3.47 | −1.61 | −0.73 | −1.07 |
| 222 | 0.22 | −7.37 | −16.13 | −6.98 | −3.48 | −1.67 | 5.77 | −1.05 |
| 223 | −0.05 | −8.48 | −16.17 | 7.62 | −3.47 | −1.88 | 1.22 | −1.02 |
| 224 | 0.08 | −2.72 | −7.93 | −0.84 | −2.21 | −1.51 | 1.68 | −0.53 |
| 225 | 0.06 | −2.53 | −7.92 | 0.54 | −2.21 | −1.54 | 1.26 | −0.55 |
| 226 | −0.03 | −2.53 | −8.02 | 3.16 | −2.19 | −1.67 | 1.70 | −0.53 |
| 227 | −0.03 | −2.64 | −7.78 | 3.03 | −2.22 | −1.61 | −2.87 | −0.53 |
| 228 | −0.07 | −2.56 | −7.82 | −6.44 | −2.22 | −1.52 | −0.46 | −0.53 |
| 229 | 0.06 | −2.67 | −7.95 | 7.79 | −2.17 | −1.65 | −0.30 | −0.54 |
| 230 | 0.03 | −2.67 | −7.73 | −7.24 | −2.21 | −1.63 | −0.68 | −0.53 |
| 231 | 0.08 | −2.32 | −7.83 | −8.27 | −2.18 | −1.51 | 0.09 | −0.52 |
| 232 | −0.01 | −2.60 | −7.85 | −3.83 | −2.19 | −1.56 | −0.25 | −0.54 |
| 233 | 0.14 | −2.88 | −7.84 | 2.24 | −2.19 | −1.51 | 0.55 | −0.54 |
| 234 | −0.05 | −2.42 | −7.90 | −4.40 | −2.19 | −1.60 | 0.13 | −0.54 |
| 235 | −0.02 | −2.55 | −7.79 | −11.70 | −2.22 | −1.55 | −0.60 | −0.53 |
| 236 | 0.19 | −2.48 | −7.84 | 12.76 | −2.20 | −1.54 | 3.63 | −0.53 |
| 237 | −0.02 | −2.83 | −7.95 | 2.25 | −2.23 | −1.51 | −0.31 | −0.53 |
| 238 | −0.12 | −2.61 | −7.96 | 13.30 | −2.23 | −1.60 | −0.31 | −0.51 |
| 239 | 0.10 | −2.52 | −7.69 | 18.92 | −2.22 | −1.58 | 0.44 | −0.54 |

| k | a24k | a25k | a26k | a27k | a28k | a29k | a30k | a31k |
|---|---|---|---|---|---|---|---|---|
| 200 | 3.99 | −5.95 | 11.60 | −5.28 | −9.88 | 1.58 | 8.77 | −45.86 |
| 201 | 0.55 | −5.96 | 10.24 | −5.13 | −9.75 | 1.70 | 8.73 | −46.07 |
| 202 | −1.77 | −6.09 | 11.31 | −4.91 | −9.69 | 1.63 | 8.59 | −45.79 |
| 203 | 1.56 | −5.98 | 10.38 | −5.02 | −10.51 | 1.79 | 8.69 | −45.10 |
| 204 | 1.56 | −6.08 | 10.34 | −5.40 | −10.12 | 1.67 | 8.71 | −45.35 |
| 205 | 2.13 | −6.31 | 10.69 | −5.05 | −10.29 | 1.70 | 8.93 | −45.65 |
| 206 | 2.79 | −6.28 | 10.42 | −5.44 | −10.01 | 1.75 | 8.49 | −46.18 |
| 207 | −0.59 | −6.19 | 11.15 | −5.23 | −10.73 | 1.85 | 8.51 | −46.18 |
| 208 | −0.86 | −7.96 | −3.95 | −3.60 | −9.52 | 0.68 | 11.12 | −49.79 |
| 209 | 0.81 | −8.49 | −5.59 | −3.29 | −8.62 | 0.65 | 11.07 | −50.16 |
| 210 | −1.82 | −8.57 | −4.86 | −3.74 | −8.55 | 0.75 | 11.01 | −50.88 |
| 211 | −0.18 | −8.60 | −5.31 | −3.43 | −8.14 | 0.70 | 11.15 | −50.58 |
| 212 | 2.61 | −8.70 | −6.29 | −3.63 | −8.86 | 0.61 | 10.85 | −50.54 |
| 213 | −3.08 | −8.69 | −3.95 | −3.63 | −9.03 | 0.68 | 11.10 | −50.64 |
| 214 | −1.21 | −8.67 | −3.89 | −3.44 | −8.30 | 0.57 | 10.92 | −50.48 |
| 215 | −0.63 | −8.21 | −5.17 | −3.56 | −8.01 | 0.58 | 10.75 | −51.30 |
| 216 | −2.33 | −8.45 | −6.57 | −3.49 | −8.58 | 0.62 | 10.57 | −49.36 |
| 217 | −1.75 | −8.63 | −4.28 | −3.72 | −9.07 | 0.52 | 11.17 | −51.38 |
| 218 | −1.16 | −8.33 | −3.96 | −3.48 | −8.78 | 0.65 | 11.05 | −52.15 |
| 219 | −1.30 | −8.25 | −5.48 | −3.26 | −8.99 | 0.67 | 10.97 | −50.97 |
| 220 | −2.13 | −8.82 | −5.83 | −3.54 | −8.76 | 0.61 | 10.94 | −50.33 |
| 221 | 0.26 | −8.28 | −5.24 | −4.00 | −8.47 | 0.67 | 10.96 | −50.23 |
| 222 | 1.12 | −8.32 | −6.96 | −3.18 | −9.03 | 0.48 | 11.17 | −52.19 |
| 223 | 2.79 | −8.82 | −5.29 | −3.80 | −8.83 | 0.67 | 10.90 | −50.60 |
| 224 | 0.34 | −4.36 | 2.59 | −2.85 | −4.74 | 0.74 | 5.72 | −22.17 |
| 225 | −0.31 | −4.18 | 2.99 | −3.02 | −4.17 | 0.66 | 5.46 | −22.03 |
| 226 | −0.12 | −4.41 | 2.85 | −2.84 | −4.73 | 0.61 | 5.85 | −21.93 |
| 227 | −0.33 | −4.36 | 3.11 | −2.91 | −4.70 | 0.71 | 5.44 | −21.77 |
| 228 | 0.44 | −4.44 | 3.35 | −2.94 | −4.84 | 0.57 | 5.52 | −22.25 |
| 229 | 0.33 | −4.39 | 3.32 | −2.77 | −4.87 | 0.60 | 5.59 | −22.24 |
| 230 | −0.06 | −4.13 | 2.39 | −2.85 | −4.78 | 0.58 | 5.64 | −21.99 |
| 231 | 0.24 | −4.30 | 4.62 | −2.89 | −4.63 | 0.62 | 5.66 | −22.01 |
| 232 | 0.96 | −4.38 | 4.07 | −3.03 | −4.86 | 0.60 | 5.48 | −22.08 |
| 233 | −0.65 | −4.41 | 3.56 | −2.99 | −4.53 | 0.68 | 5.63 | −21.70 |
| 234 | 0.36 | −4.36 | 3.33 | −2.77 | −4.45 | 0.63 | 5.65 | −21.98 |
| 235 | −0.71 | −4.32 | 3.30 | −2.85 | −4.91 | 0.59 | 5.67 | −22.12 |
| 236 | −0.29 | −4.26 | 3.75 | −2.72 | −4.75 | 0.66 | 5.69 | −22.65 |
| 237 | 0.22 | −4.19 | 2.49 | −2.91 | −4.69 | 0.71 | 5.68 | −22.50 |
| 238 | −1.44 | −4.36 | 3.56 | −2.73 | −5.08 | 0.70 | 5.66 | −22.30 |
| 239 | −0.57 | −4.42 | 2.22 | −2.74 | −4.73 | 0.58 | 5.58 | −22.22 |

-continued

| k | a32k | a33k | a34k | a35k | a36k | a37k | a38k | a39k |
|---|---|---|---|---|---|---|---|---|
| 200 | 14.32 | 3.22 | 0.58 | −6.43 | −0.50 | −53.19 | −0.36 | −0.36 |
| 201 | 14.99 | 3.34 | 0.54 | −6.74 | −0.49 | −54.35 | −0.39 | −0.36 |
| 202 | 14.82 | 3.28 | 0.68 | −7.03 | −0.52 | −54.80 | −0.41 | −0.36 |
| 203 | 14.71 | 3.23 | 0.63 | −6.98 | −0.46 | −54.42 | −0.37 | −0.36 |
| 204 | 14.96 | 3.30 | 0.60 | −7.13 | −0.47 | −55.09 | −0.35 | −0.36 |
| 205 | 14.23 | 3.28 | 0.66 | −6.96 | −0.49 | −55.95 | −0.36 | −0.36 |
| 206 | 15.18 | 3.28 | 0.69 | −7.34 | −0.50 | −55.62 | −0.37 | −0.35 |
| 207 | 14.69 | 3.23 | 0.61 | −6.88 | −0.52 | −53.88 | −0.36 | −0.35 |
| 208 | 9.47 | 3.48 | 1.57 | −4.65 | −0.96 | −45.31 | −1.00 | −0.74 |
| 209 | 9.10 | 3.48 | 1.40 | −3.70 | −0.97 | −43.24 | −1.04 | −0.68 |
| 210 | 9.37 | 3.51 | 1.54 | −3.31 | −0.90 | −42.54 | −0.99 | −0.72 |
| 211 | 9.83 | 3.51 | 1.58 | −3.74 | −0.92 | −42.03 | −0.94 | −0.72 |
| 212 | 9.76 | 3.52 | 1.42 | −3.73 | −0.93 | −43.64 | −0.96 | −0.71 |
| 213 | 9.51 | 3.50 | 1.54 | −4.16 | −0.90 | −44.19 | −1.03 | −0.72 |
| 214 | 9.23 | 3.38 | 1.59 | −3.62 | −0.89 | −43.99 | −1.02 | −0.71 |
| 215 | 9.61 | 3.50 | 1.54 | −3.80 | −0.93 | −44.32 | −1.01 | −0.74 |
| 216 | 8.98 | 3.46 | 1.50 | −3.79 | −0.98 | −44.82 | −0.98 | −0.72 |
| 217 | 9.21 | 3.52 | 1.53 | −3.92 | −0.92 | −44.28 | −0.94 | −0.73 |
| 218 | 9.94 | 3.55 | 1.52 | −4.54 | −0.91 | −41.51 | −1.02 | −0.72 |
| 219 | 9.63 | 3.53 | 1.40 | −3.79 | −0.93 | −43.59 | −0.99 | −0.73 |
| 220 | 9.23 | 3.46 | 1.49 | −3.60 | −0.89 | −45.16 | −0.99 | −0.73 |
| 221 | 8.94 | 3.48 | 1.46 | −3.51 | −0.91 | −44.60 | −0.97 | −0.72 |
| 222 | 9.57 | 3.47 | 1.57 | −3.09 | −0.87 | −43.51 | −1.02 | −0.73 |
| 223 | 9.36 | 3.49 | 1.43 | −3.84 | −0.88 | −43.84 | −0.98 | −0.72 |
| 224 | 6.36 | 1.72 | 0.50 | −2.51 | −0.38 | −24.29 | −0.56 | −0.24 |
| 225 | 6.20 | 1.80 | 0.47 | −1.97 | −0.35 | −25.26 | −0.57 | −0.23 |
| 226 | 6.18 | 1.80 | 0.46 | −2.30 | −0.37 | −24.28 | −0.51 | −0.24 |
| 227 | 6.37 | 1.78 | 0.42 | −2.20 | −0.34 | −23.88 | −0.53 | −0.23 |
| 228 | 6.45 | 1.78 | 0.51 | −1.83 | −0.37 | −24.04 | −0.54 | −0.23 |
| 229 | 7.00 | 1.71 | 0.46 | −1.80 | −0.35 | −24.35 | −0.53 | −0.23 |
| 230 | 6.17 | 1.71 | 0.53 | −2.11 | −0.33 | −25.11 | −0.55 | −0.21 |
| 231 | 6.09 | 1.76 | 0.48 | −2.36 | −0.36 | −23.07 | −0.53 | −0.23 |
| 232 | 5.82 | 1.77 | 0.43 | −2.38 | −0.37 | −24.22 | −0.56 | −0.22 |
| 233 | 5.85 | 1.74 | 0.46 | −2.27 | −0.32 | −24.46 | −0.55 | −0.25 |
| 234 | 6.48 | 1.79 | 0.52 | −2.15 | −0.37 | −23.83 | −0.56 | −0.25 |
| 235 | 6.59 | 1.79 | 0.45 | −2.00 | −0.36 | −24.26 | −0.56 | −0.23 |
| 236 | 6.53 | 1.80 | 0.54 | −2.13 | −0.35 | −24.30 | −0.53 | −0.25 |
| 237 | 6.32 | 1.77 | 0.46 | −2.42 | −0.32 | −24.11 | −0.54 | −0.23 |
| 238 | 6.42 | 1.76 | 0.48 | −2.25 | −0.34 | −24.32 | −0.51 | −0.22 |
| 239 | 6.80 | 1.81 | 0.45 | −2.12 | −0.34 | −25.08 | −0.53 | −0.24 |

| k | a40k | a41k | a42k | a43k | a44k | a45k | a46k | a47k |
|---|---|---|---|---|---|---|---|---|
| 200 | 0.46 | 7.85 | −0.13 | 6.00 | −0.66 | −9.63 | 27.73 | −0.71 |
| 201 | 0.49 | 7.88 | 1.56 | 5.01 | 5.66 | −9.86 | 37.21 | −0.38 |
| 202 | 0.50 | 7.82 | −0.21 | 5.62 | 3.39 | −9.78 | 36.01 | −3.02 |
| 203 | 0.47 | 7.87 | 1.17 | 5.57 | 6.66 | −9.76 | 28.22 | −1.35 |
| 204 | 0.47 | 7.73 | −1.49 | 4.73 | −0.17 | −9.85 | 34.81 | −0.69 |
| 205 | 0.51 | 7.78 | 0.66 | 4.81 | 0.90 | −9.79 | 27.69 | −1.68 |
| 206 | 0.48 | 7.68 | 0.46 | 5.55 | 0.83 | −9.68 | 33.16 | 0.42 |
| 207 | 0.49 | 7.68 | 1.72 | 5.43 | −3.05 | −9.64 | 30.82 | 2.49 |
| 208 | 0.15 | 6.36 | −2.14 | 8.22 | −2.43 | −9.98 | 99.11 | −0.05 |
| 209 | 0.19 | 6.61 | 0.32 | 8.42 | 3.47 | −9.67 | 83.51 | −0.45 |
| 210 | 0.14 | 6.61 | −1.32 | 7.86 | 6.02 | −10.02 | 86.68 | 1.50 |
| 211 | 0.16 | 6.66 | 2.90 | 7.31 | 0.41 | −9.81 | 87.51 | 1.78 |
| 212 | 0.22 | 6.31 | −1.30 | 7.70 | −0.04 | −9.87 | 87.42 | −0.67 |
| 213 | 0.15 | 6.49 | −1.79 | 7.85 | 5.42 | −9.54 | 85.96 | −0.59 |
| 214 | 0.22 | 6.46 | 0.30 | 8.60 | 2.92 | −9.67 | 90.41 | 0.31 |
| 215 | 0.20 | 6.38 | −0.86 | 8.71 | 4.58 | −9.76 | 83.46 | −0.82 |
| 216 | 0.19 | 6.15 | 0.25 | 7.76 | −2.22 | −9.68 | 91.93 | −0.68 |
| 217 | 0.20 | 6.57 | −1.20 | 8.05 | −1.02 | −9.91 | 86.11 | 1.29 |
| 218 | 0.17 | 6.27 | −1.14 | 7.68 | 2.32 | −10.04 | 91.11 | −1.23 |
| 219 | 0.15 | 6.39 | −0.80 | 7.44 | 5.12 | −9.89 | 88.36 | 0.45 |
| 220 | 0.15 | 6.49 | −3.00 | 8.07 | 4.47 | −9.78 | 95.29 | −0.28 |
| 221 | 0.19 | 6.40 | 0.75 | 7.85 | 6.16 | −9.63 | 90.57 | −0.67 |
| 222 | 0.18 | 6.41 | 1.30 | 8.33 | 0.11 | −9.71 | 81.50 | 3.06 |
| 223 | 0.22 | 6.24 | −1.01 | 8.04 | 5.86 | −9.95 | 86.36 | −0.02 |
| 224 | 0.27 | 4.44 | −0.04 | 3.08 | 2.50 | −6.38 | 20.25 | −1.03 |
| 225 | 0.24 | 4.52 | −0.34 | 3.01 | −1.29 | −6.25 | 16.20 | −0.21 |
| 226 | 0.25 | 4.55 | −0.39 | 3.51 | −0.60 | −6.37 | 18.03 | −1.33 |
| 227 | 0.26 | 4.52 | 0.03 | 3.32 | −1.50 | −6.28 | 24.04 | −0.27 |
| 228 | 0.26 | 4.70 | −0.29 | 3.18 | −0.44 | −6.27 | 17.92 | −1.90 |
| 229 | 0.25 | 4.57 | 0.92 | 3.34 | 1.93 | −6.40 | 22.77 | −0.80 |
| 230 | 0.28 | 4.73 | −0.66 | 2.98 | 4.13 | −6.28 | 15.11 | −0.47 |
| 231 | 0.24 | 4.58 | 0.43 | 3.54 | −0.58 | −6.26 | 25.20 | 0.44 |
| 232 | 0.27 | 4.64 | 0.84 | 3.11 | 0.14 | −6.38 | 22.13 | −0.19 |
| 233 | 0.25 | 4.51 | 0.22 | 3.69 | −2.72 | −6.35 | 21.97 | 0.80 |

-continued

| 234 | 0.27 | 4.51 | −0.11 | 3.55 | 1.86 | −6.42 | 25.28 | −0.06 |
| --- | --- | --- | --- | --- | --- | --- | --- | --- |
| 235 | 0.26 | 4.67 | 1.15 | 3.35 | 0.05 | −6.42 | 23.04 | −1.52 |
| 236 | 0.27 | 4.61 | −0.75 | 3.40 | −1.85 | −6.07 | 16.17 | 1.21 |
| 237 | 0.26 | 4.65 | −2.07 | 3.25 | 1.95 | −6.27 | 18.98 | −0.86 |
| 238 | 0.22 | 4.73 | −0.73 | 3.27 | −0.72 | −6.28 | 20.99 | 0.14 |
| 239 | 0.24 | 4.67 | 1.08 | 3.59 | −0.16 | −6.19 | 18.79 | −0.29 |

| k | a48k | a49k | a50k | a51k | a52k | a53k | a54k | a55k |
| --- | --- | --- | --- | --- | --- | --- | --- | --- |
| 200 | −14.58 | 2.15 | 13.52 | 1.39 | 98.94 | 38.13 | −5.24 | −4.83 |
| 201 | −14.85 | 2.12 | 13.25 | −1.46 | 105.91 | 38.10 | −5.40 | −4.96 |
| 202 | −14.77 | 2.04 | 13.42 | −0.83 | 108.07 | 37.94 | −5.43 | −4.34 |
| 203 | −14.29 | 2.04 | 13.65 | 1.22 | 104.62 | 38.41 | −5.42 | −4.76 |
| 204 | −14.52 | 2.02 | 13.38 | −2.48 | 103.69 | 38.64 | −5.38 | −5.42 |
| 205 | −13.83 | 2.00 | 13.13 | −1.90 | 100.76 | 38.11 | −5.22 | −5.16 |
| 206 | −14.72 | 2.09 | 13.54 | 1.63 | 99.44 | 36.76 | −5.42 | −5.11 |
| 207 | −14.24 | 2.13 | 13.38 | −2.68 | 106.04 | 38.62 | −5.44 | −5.01 |
| 208 | −18.04 | 2.04 | 17.33 | −4.13 | 80.49 | 45.11 | −4.33 | −0.42 |
| 209 | −18.35 | 1.98 | 18.32 | 0.33 | 75.08 | 44.55 | −4.26 | −0.29 |
| 210 | −18.34 | 1.91 | 17.45 | −5.83 | 78.06 | 45.51 | −4.19 | 0.29 |
| 211 | −17.86 | 2.06 | 18.77 | −1.57 | 76.22 | 44.80 | −4.37 | −0.99 |
| 212 | −18.15 | 2.07 | 17.42 | 3.49 | 68.79 | 44.77 | −4.29 | −0.51 |
| 213 | −17.90 | 1.96 | 18.27 | 2.48 | 78.99 | 45.19 | −4.26 | −1.08 |
| 214 | −18.00 | 2.17 | 16.74 | 1.35 | 81.10 | 45.50 | −4.36 | 0.34 |
| 215 | −18.07 | 2.03 | 18.09 | −0.23 | 80.85 | 45.97 | −4.42 | −0.63 |
| 216 | −17.82 | 2.01 | 17.98 | −1.08 | 76.05 | 44.86 | −4.26 | 0.54 |
| 217 | −18.26 | 1.97 | 17.85 | 2.39 | 76.52 | 45.77 | −4.35 | −0.24 |
| 218 | −18.22 | 1.93 | 17.46 | −2.42 | 78.00 | 44.64 | −4.34 | −0.75 |
| 219 | −18.12 | 2.02 | 17.20 | −2.55 | 79.55 | 45.31 | −4.45 | −0.57 |
| 220 | −18.32 | 2.05 | 18.01 | −0.15 | 73.51 | 44.83 | −4.23 | −1.39 |
| 221 | −18.65 | 1.85 | 17.38 | 1.55 | 75.38 | 45.01 | −4.24 | 0.04 |
| 222 | −18.24 | 2.01 | 17.33 | 3.21 | 79.54 | 44.83 | −4.33 | −0.20 |
| 223 | −17.86 | 2.09 | 17.70 | −2.31 | 78.34 | 45.15 | −4.28 | 0.51 |
| 224 | −9.08 | 1.04 | 9.54 | −0.38 | 45.23 | 20.55 | −2.26 | −2.70 |
| 225 | −8.99 | 1.11 | 9.50 | −2.62 | 47.46 | 20.68 | −2.31 | −2.31 |
| 226 | −8.93 | 1.09 | 9.73 | −1.20 | 48.83 | 20.40 | −2.28 | −2.68 |
| 227 | −8.58 | 1.14 | 9.31 | −0.97 | 45.76 | 20.14 | −2.25 | −2.35 |
| 228 | −8.73 | 1.14 | 9.72 | 1.59 | 49.19 | 20.34 | −2.30 | −2.72 |
| 229 | −9.14 | 1.21 | 9.50 | 0.67 | 47.88 | 20.41 | −2.25 | −2.50 |
| 230 | −8.91 | 1.09 | 9.32 | 0.39 | 49.39 | 20.28 | −2.25 | −2.31 |
| 231 | −9.06 | 1.07 | 9.52 | 1.36 | 48.38 | 20.82 | −2.31 | −2.84 |
| 232 | −8.97 | 1.08 | 9.76 | 0.66 | 47.42 | 20.49 | −2.30 | −2.82 |
| 233 | −8.95 | 1.16 | 9.71 | −0.24 | 48.65 | 20.33 | −2.32 | −2.82 |
| 234 | −8.79 | 1.05 | 9.83 | 0.41 | 50.36 | 20.50 | −2.29 | −2.90 |
| 235 | −8.84 | 1.09 | 9.42 | 0.66 | 45.98 | 20.80 | −2.30 | −2.95 |
| 236 | −9.18 | 1.08 | 9.80 | −2.83 | 45.60 | 19.75 | −2.31 | −2.90 |
| 237 | −9.04 | 1.19 | 9.56 | 1.14 | 49.97 | 20.36 | −2.42 | −2.38 |
| 238 | −9.17 | 1.08 | 9.84 | 2.18 | 49.18 | 19.80 | −2.27 | −2.61 |
| 239 | −8.69 | 1.11 | 9.76 | 2.64 | 47.25 | 20.56 | −2.31 | −2.38 |

| k | a56k | a57k | a58k | a59k | a60k | a61k | a62k | a63k |
| --- | --- | --- | --- | --- | --- | --- | --- | --- |
| 200 | −1.36 | −29.64 | 0.29 | −1.93 | 12.05 | 0.24 | 6.43 | 22.33 |
| 201 | 3.10 | −29.13 | 0.30 | −1.91 | 12.36 | 0.07 | −7.30 | −0.91 |
| 202 | −5.52 | −29.28 | 0.29 | −2.07 | 12.24 | 0.09 | −9.28 | 8.15 |
| 203 | −4.47 | −29.11 | 0.30 | −1.96 | 12.32 | 0.14 | −6.20 | 8.77 |
| 204 | −2.98 | −29.56 | 0.32 | −1.95 | 12.15 | 0.15 | 7.99 | 31.91 |
| 205 | −1.35 | −29.64 | 0.30 | −1.68 | 12.64 | 0.24 | −18.47 | −13.38 |
| 206 | 1.26 | −30.90 | 0.30 | −1.91 | 12.30 | 0.25 | 6.12 | 4.06 |
| 207 | 2.52 | −29.07 | 0.29 | −1.96 | 12.47 | 0.22 | 3.27 | −13.81 |
| 208 | −0.08 | −22.82 | 0.23 | −3.30 | 8.90 | −1.48 | 9.45 | −22.79 |
| 209 | −0.46 | −23.73 | 0.20 | −3.31 | 9.41 | −1.13 | 3.74 | −10.82 |
| 210 | 3.20 | −22.42 | 0.22 | −3.21 | 9.23 | −1.46 | −3.21 | 9.83 |
| 211 | −1.51 | −22.56 | 0.20 | −3.15 | 8.81 | −1.43 | −20.84 | −1.75 |
| 212 | 3.07 | −23.26 | 0.20 | −3.21 | 9.20 | −1.39 | 0.80 | −30.30 |
| 213 | −2.33 | −23.08 | 0.23 | −2.69 | 8.98 | −1.30 | −19.53 | 8.55 |
| 214 | −6.54 | −23.51 | 0.22 | −3.41 | 8.76 | −1.14 | 27.04 | 6.01 |
| 215 | −3.79 | −21.32 | 0.21 | −3.00 | 8.93 | −1.33 | −17.66 | −2.79 |
| 216 | −0.24 | −23.24 | 0.22 | −3.03 | 9.09 | −1.24 | 6.07 | 24.80 |
| 217 | 3.44 | −24.06 | 0.20 | −3.67 | 8.63 | −1.29 | −8.15 | 19.18 |
| 218 | −1.92 | −22.05 | 0.20 | −3.29 | 9.00 | −1.18 | 6.54 | 10.41 |
| 219 | 0.30 | −22.68 | 0.21 | −3.36 | 8.67 | −1.31 | −10.55 | 1.54 |
| 220 | −2.80 | −23.71 | 0.20 | −3.40 | 8.54 | −1.20 | 16.87 | −20.57 |
| 221 | −4.02 | −23.59 | 0.23 | −3.23 | 8.89 | −1.33 | −29.66 | −8.53 |
| 222 | 3.71 | −22.32 | 0.22 | −3.65 | 9.42 | −1.27 | −7.45 | 20.01 |
| 223 | 4.01 | −22.74 | 0.20 | −3.23 | 9.05 | −1.11 | −0.92 | 8.73 |
| 224 | −0.07 | −13.13 | 0.10 | −1.31 | 4.94 | 0.10 | −2.81 | 9.80 |
| 225 | 3.00 | −13.34 | 0.13 | −1.17 | 5.09 | 0.13 | 9.49 | 1.20 |
| 226 | 1.83 | −13.14 | 0.12 | −1.12 | 4.86 | 0.09 | −6.43 | 7.09 |

-continued

| | | | | | | | |
|---|---|---|---|---|---|---|---|
| 227 | 2.44 | −12.89 | 0.11 | −1.27 | 4.92 | 0.14 | 11.11 | 3.43 |
| 228 | −1.82 | −12.71 | 0.11 | −1.30 | 5.04 | 0.23 | 5.82 | 2.18 |
| 229 | 2.60 | −13.68 | 0.12 | −1.18 | 4.89 | 0.13 | −13.54 | −2.96 |
| 230 | −0.58 | −12.59 | 0.13 | −1.32 | 5.16 | 0.14 | 5.68 | 2.50 |
| 231 | −1.66 | −13.08 | 0.12 | −1.37 | 5.20 | 0.05 | 0.12 | 4.41 |
| 232 | 4.51 | −13.15 | 0.12 | −1.50 | 4.62 | 0.10 | −3.69 | −7.06 |
| 233 | 1.30 | −12.99 | 0.10 | −1.29 | 5.15 | 0.15 | −8.75 | −0.68 |
| 234 | 3.05 | −13.52 | 0.12 | −1.26 | 5.30 | 0.06 | −5.26 | −12.29 |
| 235 | 1.63 | −13.65 | 0.11 | −1.20 | 5.12 | 0.00 | −9.46 | 4.53 |
| 236 | 4.38 | −13.38 | 0.12 | −1.23 | 5.11 | 0.11 | −0.87 | −0.28 |
| 237 | −2.09 | −14.06 | 0.12 | −1.23 | 4.84 | 0.01 | −7.24 | −4.51 |
| 238 | 2.60 | −13.88 | 0.11 | −1.47 | 4.69 | 0.15 | −10.41 | −5.46 |
| 239 | 1.90 | −12.57 | 0.11 | −1.22 | 5.22 | 0.13 | 12.39 | 8.11 |

For all Gaussian functions $g_{lk}$ for all images $f_k$, the exponential factor $\alpha = 1/\epsilon$ is given by $\epsilon = 2.0615528128088303$.

Subsequently, for each image $f_k$, the feature value $\varphi_k$ corresponding to the filter $\phi$ may be calculated, $\phi(f_k(x,y), z_k) = \varphi_k$, wherein $z_k$ is a distance value corresponding to the image $f_k$ from the predefined data set. This yields a dataset with corresponding generated feature values $\varphi_k$. The hypothesis testing may use a Null-hypothesis that the filter does not describe the material classifier. The Null-Hypothesis may be given by $$H_0 : \mu_1 = \mu_2 = \ldots = \mu_J,$$

wherein $\mu_m$ is the expectation value of each material-group corresponding to the feature values $\varphi_k$. The hypothesis testing may use as alternative hypothesis that the filter does describe the material classifier. The alternative hypothesis may be given by $H_1 : \exists m, m' : \mu_m \neq \mu_{m'}$. The hypothesis testing may comprise at least one analysis of variance (ANOVA) on the generated feature values. In particular, the hypothesis testing may comprise determining a mean-value of the feature values for each material, i.e. in total J mean values, $$\overline{\varphi}_m = \frac{\sum_i \varphi_{i,m}}{N_m},$$

for $m \in [0,1, \ldots, J-1]$, wherein $N_m$ gives the number of feature values for material for each of the J materials in the predefined data set. The hypothesis testing may comprise determining a mean-value of all feature values $$\overline{\varphi} = \frac{\sum_m \sum_i \varphi_{i,m}}{N}.$$

The hypothesis testing may comprise determining a Mean Sum Squares within: $\mathrm{mssw} = (\sum_m \sum_i (\varphi_{i,m} - \overline{\varphi}_m)^2)/(N-J)$. The hypothesis testing may comprise determining a Mean Sum of Squares between, $\mathrm{mssb} = (\sum_m (\overline{\varphi}_m - \overline{\varphi})^2 \, N_m)/(J-1)$. The hypothesis testing may comprise performing an F-Test:

$$CDF(x) = I_{\frac{d_1 x}{d_1 x + d_2}}\left(\frac{d_1}{2}, \frac{d_2}{2}\right), \text{ where } d_1 = N - J, d_2 = J - 1,$$

$$F(x) = 1 - CDF(x)$$

$$p = F(mssb/mssw)$$

Herein, I is the regularized incomplete Beta-Function, $$I_x(a, b) = \frac{B(x; a, b)}{B(a, b)},$$

with the Euler Beta-Function $$B(a, b) = \int_0^1 t^{a-1}(1-t)^{b-1} dt$$

and $$B(x; a, b) = \int_0^x t^{a-1}(1-t)^{b-1} dt$$

being the incomplete Beta-Function. The image filter may pass the hypothesis testing if a p-value, p, is smaller or equal than a pre-defined level of significance. The filter may pass the hypothesis testing if $p \leq 0.075$, preferably $p \leq 0.05$, more preferably $p \leq 0.025$, and most preferably $p \leq 0.01$. For example, the image filter may pass the hypothesis testing if the p-value is smaller than $\alpha = 0.05$. In this case the Null-hypothesis $H_0$ can be rejected and the alternative hypothesis $H_1$ can be accepted. The image filter thus distinguishes at least two material classifiers. Thus, the image filter passes the hypothesis testing.

Figure 2:
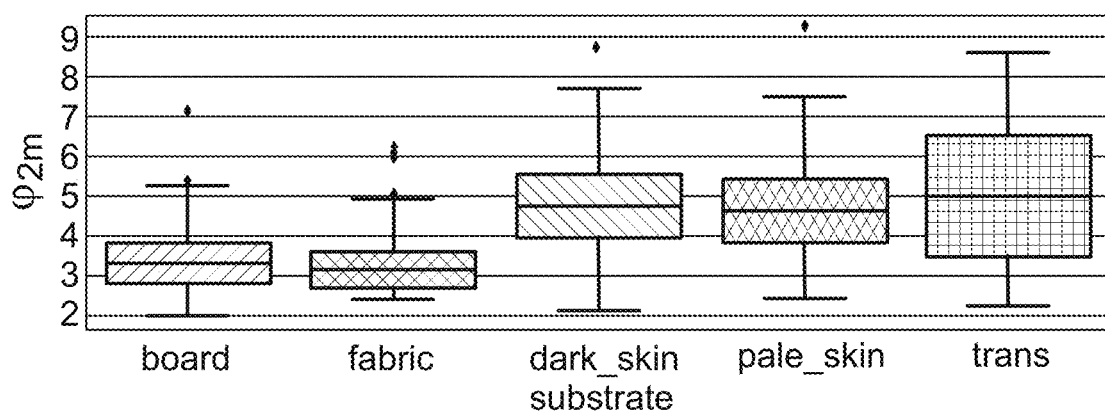
FIG. 2 shows the statistics of the resulting material features of the spot shape material dependent image filter applied to the data set.

FIG. 2 shows experimental results of using the spot shape filter to calculate the material feature for different material groups. Specifically, the material feature $\phi_{2m}$ is shown for different materials, namely from left to right for a wooden board denoted board, a fabric, a dark skin, a pale skin, and a highly translucent skin denoted trans, and illustrates the separation of skin materials (right) from other materials (left). The spot shape filter passes the hypothesis testing. The p-value computed from the F-test is 0.0076. Thus, the Null-hypothesis $H_0$ can be rejected with respect to a significance level of 0.01. Further, the alternative hypothesis $H_1$ can be accepted with respect to a significance level of 0.01. Thus, the image filter is distinguishes at least two material classifiers. In addition, FIG. 2 shows the mean value of the feature per material, $\overline{\varphi}_m$, as the line within the respective box. Vertical bars mark the Q1-1.5 interquartile range (IQR) and Q3+1.5 IQR, wherein IQR=Q3−Q1, with Q1 and Q3 being the first and third quartiles. The box marks the Q1 and Q3 quartiles. Outliers are plotted as points. FIG. 2 shows, that this material feature separates all skin samples from the non-skin samples. In other words, the expectation values of the Skin Features for skin and non-skin materials differ.

FIG. 1 moreover shows, in a highly schematic illustration, an exemplary embodiment of the detector 110, wherein the detector 110 specifically may be embodied as a camera 136 and/or may be part of a camera 136. The camera 136 may be made for imaging, specifically for 3D imaging, and may be made for acquiring standstill images and/or image sequences such as digital video clips. Other embodiments are feasible. FIG. 1 further shows an embodiment of a detector system 138, which, besides the at least one detector 110, comprises one or more beacon devices 140, which, in this example, may be attached and/or integrated into an object 112, the position of which shall be detected by using the detector 110. FIG. 1 further shows an exemplary embodiment of a human-machine interface 142, which comprises the at least one detector system 138 and, further, an entertainment device 144, which comprises the human-machine interface 142. The figure further shows an embodiment of a tracking system 146 for tracking a position of the object 112, which comprises the detector system 138. The components of the devices and systems shall be explained in further detail below.

FIG. 1 further shows an exemplary embodiment of a scanning system 148 for scanning a scenery comprising the object 112, such as for scanning the object 112 and/or for determining at least one position of the at least one object 112. The scanning system 148 comprises the at least one detector 110, and, further, optionally, the at least one illumination source 124 as well as, optionally, at least one further illumination source, not depicted here. The illumination source 124, generally, is configured for emitting at least one illumination light beam, such as for illumination of at least one dot, e.g. a dot located on one or more of the positions of the beacon devices 140 and/or on a surface of the object 112. The scanning system 148 may be designed to generate a profile of the scenery including the object 112 and/or a profile of the object 112, and/or may be designed to generate at least one item of information about the distance between the at least one dot and the scanning system 148, specifically the detector 110, by using the at least one detector 110.

The detector 110, besides the optical sensors 120, comprises the at least one evaluation device 132, having e.g. at least one image analysis device 150 and/or the at least one position evaluation device 152, as symbolically depicted in FIG. 1. The components of the evaluation device 132 may fully or partially be integrated into a distinct device and/or may fully or partially be integrated into other components of the detector 110. Besides the possibility of fully or partially combining two or more components, one or more of the optical sensors 120 and one or more of the components of the evaluation device 132 may be interconnected by one or more connectors 154 and/or by one or more interfaces, as symbolically depicted in FIG. 1. Further, the one or more connectors 154 may comprise one or more drivers and/or one or more devices for modifying or preprocessing sensor signals. Further, instead of using the at least one optional connector 154, the evaluation device 132 may fully or partially be integrated into one or both of the optical sensors 120 and/or into a housing 156 of the detector 110. Additionally or alternatively, the evaluation device 132 may fully or partially be designed as a separate device.

In this exemplary embodiment, the object 112, the position of which may be detected, may be designed as an article of sports equipment and/or may form a control element or a control device 158, the position of which may be manipulated by a user 160. As an example, the object 112 may be or may comprise a bat, a racket, a club or any other article of sports equipment and/or fake sports equipment. Other types of objects 112 are possible. Further, the user 160 himself or herself may be considered as the object 112, the position of which shall be detected.

As outlined above, the detector 110 comprises optical sensors 120. The optical sensors 120 may be located inside the housing 156. Further, the detector 110 may comprise the at least one transfer device 129 such as one or more optical systems, preferably comprising one or more lenses. An opening 162 inside the housing 156, which, preferably, is located concentrically with regard to the optical axis 128 of the detector 110, preferably defines a direction of view 164 of the detector 110. A coordinate system 166 may be defined, in which a direction parallel or anti-parallel to the optical axis 128 may be defined as a longitudinal direction, whereas directions perpendicular to the optical axis 128 may be defined as transversal directions. In the coordinate system 166, symbolically depicted in FIG. 1, a longitudinal direction is denoted by z, and transversal directions are denoted by x and y, respectively. Other types of coordinate systems are feasible, such as non-Cartesian coordinate systems.

As outlined above, the determination of the position of the object 112 and/or a part thereof by using the detector 110 may be used for providing a human-machine interface 142, in order to provide at least one item of information to a machine 168. In the embodiments schematically depicted in FIG. 1, the machine 168 may be a computer and/or may comprise a computer. Other embodiments are feasible. The evaluation device 132 may even be fully or partially integrated into the machine 168, such as into the computer.

As outlined above, FIG. 1 also depicts an example of a tracking system 146, configured for tracking the position of the at least one object 112 and/or of parts thereof. The tracking system 146 comprises the detector 110 and at least one track controller 170. The track controller 170 may be adapted to track a series of positions of the object 112 at specific points in time. The track controller 170 may be an independent device and/or may be fully or partially integrated into the machine 168, specifically the computer, as indicated in FIG. 1 and/or into the evaluation device 132.

Similarly, as outlined above, the human-machine interface 142 may form part of an entertainment device 144. The machine 168, specifically the computer, may also form part of the entertainment device 144. Thus, by means of the user 160 functioning as the object 112 and/or by means of the user 160 handling a control device functioning as the object 112, the user 160 may input at least one item of information, such as at least one control command, into the computer, thereby varying the entertainment functions, such as controlling the course of a computer.

FIG. 1 also depicts an example of an inertial measurement unit 172 for use in an electronic device. The inertial measurement unit 172 is adapted to receive data determined by the detector 110. The inertial measurement unit 172 further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope, wherein the inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, speed.

The inertial measurement unit 172 may comprise the detector 110 and/or may be connected to the detector 110, via at least one data connection. The evaluation device 132 and/or at least one processing device of the inertial measurement unit 172 may be configured for determining at least one combined distance information, in particular using at least one recursive filter. The recursive filter may be configured for determining the combined distance information considering further sensor data and/or further parameters such as further sensor data from the further sensor of the inertial measurement unit 172.

LIST OF REFERENCE NUMBERS

110 detector
112 object
116 sensor element
118 matrix
120 optical sensor
122 light-sensitive area
124 illumination source
126 illumination light beam
128 optical axis
129 transfer device
130 reflection light beam
132 evaluation device
134 divider
136 camera
138 detector system
140 beacon device
142 human-machine-interface
144 entertainment device
146 tracking system
148 scanning system
150 image analysis device
152 position evaluation device
154 connector
156 housing
158 control device
160 user
162 opening
164 direction of view
166 coordinate system
168 machine
170 track controller
172 inertial measurement unit

CITED REFERENCES

US 2016/0206216 A1
US 2016/155006 A1
"Lasertechnik in der Medizin: Grundlagen, Systeme, Anwendungen", "Wirkung von Laserstrahlung auf Gewebe", 1991, pages 171 to 266, Jürgen Eichler, Theo Seiler, Springer
Verlag, ISBN 0939-0979
WO 2014/097181 A1
WO 2018/091640 A1
WO 2018/091649 A1 and WO 2018/091638 A2
chapter 2 in X. Jiang, H. Bunke: "Dreidimensionales Computersehen" Springer, Berlin Heidelberg, 1997
R.A. Street (Ed.): Technology and Applications of Amorphous Silicon, Springer-Verlag Heidelberg, 2010, pp. 346-349
WO 2012/110924 A1
DE 198 46 619 A1
CN 108 363 482 A
US 2018/033146 A1

The invention claimed is:

1. A detector for identifying at least one material property m comprising
at least one light projector, wherein the light projector is configured for generating at least one illumination pattern for illumination of the object, wherein the illumination pattern comprises at least one pattern selected from the group consisting of: at least one point pattern; a pseudo-random point pattern; a random point pattern or a quasi-random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern; at least one pattern comprising convex uniform tilings; at least one line pattern comprising at least one line;
at least one line pattern comprising at least two lines; and at least one line pattern comprising parallel or crossing lines;
at least one camera comprising a matrix of optical sensors, the optical sensors each having a light-sensitive area, wherein the camera is configured for recording at least one reflection image of a light beam originating from at least one object; and
at least one processor configured for determining the material property by evaluation of at least one beam profile of the reflection image,
wherein the processor is configured for determining at least one material feature $\varphi 2m$ by applying at least one material dependent image filter $\Phi 2$ to the reflection image, wherein the material dependent image filter is at least one filter selected from the group consisting of: a luminance filter; a spot shape filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; and a linear combination thereof;
wherein the processor is configured for determining the material property m by evaluating the material feature $\varphi 2m$.

2. The detector according claim 1, wherein the material dependent image filter is a spot shape filter.

3. The detector according to claim 1, wherein the material dependent image filter is Law's energy filter.

4. The detector according to claim 1, wherein the at least one material property is a property selected from the group consisting of: a scattering coefficient, a translucency, a transparency, and a deviation from a Lambertian surface reflection.

5. The detector according to claim 1, wherein the processor is configured for determining at least one distance feature $\varphi 1z$ by applying at least one distance dependent image filter $\Phi 1$ to the reflection image, and
wherein the processor is configured for determining a longitudinal coordinate z by evaluating the distance feature $\varphi 1z$.

6. The detector according to claim 5, wherein the distance dependent image filter is a structured-light-filter.

7. The detector according to claim 1, wherein the camera comprises at least one CMOS sensor.

8. The detector according to claim 7, wherein the CMOS sensor comprises at least 100000 optical sensors.

9. The detector according to claim 8, wherein the CMOS sensor is sensitive in the range of 700 nm to 1000 nm.

10. The detector according to claim 1, wherein the light projector comprises at least one laser source and at least one diffractive optical element.

11. The detector according to claim 10, wherein the light projector is configured for generating at least one random point pattern or a quasi-random pattern for illumination of the object.

12. The detector according to claim 11, wherein the light projector emits light having a wavelength of 700 nm to 1000 nm.

13. The detector according to claim 12, wherein the light projector comprises at least one vertical cavity surface-emitting laser.

14. The detector according to claim 13, wherein the light projector is integrated into a smartphone.

15. The detector according to claim 1, wherein the light projector emits light having a wavelength of 700 nm to 1000 nm.

16. The detector according to claim 15, wherein the light projector is configured for generating at least one random point pattern or a quasi-random pattern for illumination of the object.

17. The detector according to claim 1, wherein the light projector is integrated into a smartphone.

18. The detector according to claim 17, wherein the light projector and the optical sensors is arranged in a common plane.

19. The detector according to claim 18, wherein the light projector emits light having a wavelength of 700 nm to 1000 nm.

20. The detector according to claim 1, wherein the object is a human.

21. The detector according to claim 1, wherein the detector is configured for identification and/or classification of the material.

22. The detector according to claim 20, wherein the detector is configured for determining and/or validating whether a surface to be examined is or comprises human skin.

23. The detector according to claim 1, wherein the detector is configured for detection of human skin.

24. The detector according to claim 23, wherein the at least one material property is a property selected from the group consisting of: a scattering coefficient, a translucency, a transparency, and a deviation from a Lambertian surface reflection.

25. The detector according to claim 1, wherein the processor is configured for performing at least one image analysis and/or image processing in order to identify a reflection feature in the reflection image.

26. The detector according to claim 25, wherein the processor is adapted to identify at least one reference feature in the reference image having an essentially identical longitudinal coordinate as the selected reflection feature.

27. The detector according to claim 25, wherein the processor is adapted to determine at least one reference feature in at least one reference image corresponding to the at least one reflection feature.

28. The detector according to claim 25, wherein the image analysis and/or image processing comprises selection of at least one region of interest.

29. The detector according to claim 25, wherein the image analysis and/or image processing comprises a background correction.

30. The detector according to claim 25, wherein the image analysis and/or image processing comprises applying a principle curvature-based region detector.

* * * * *